United States Patent
Kim et al.

(10) Patent No.: US 12,245,324 B2
(45) Date of Patent: Mar. 4, 2025

(54) METHOD AND APPARATUS FOR CONTROLLING ACCESS IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Donggun Kim, Seoul (KR); Alexander Sayenko, Seoul (KR); Jaehyuk Jang, Suwon-si (KR); Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/592,824

(22) Filed: Feb. 4, 2022

(65) Prior Publication Data

US 2022/0159779 A1    May 19, 2022

Related U.S. Application Data

(63) Continuation of application No. 16/054,517, filed on Aug. 3, 2018, now Pat. No. 11,246,183.

(30) Foreign Application Priority Data

Aug. 3, 2017  (KR) .................. 10-2017-0098553
Jan. 5, 2018   (KR) .................. 10-2018-0001960
(Continued)

(51) Int. Cl.
*H04W 76/50* (2018.01)
*H04W 4/90* (2018.01)
(Continued)

(52) U.S. Cl.
CPC ............. *H04W 76/50* (2018.02); *H04W 4/90* (2018.02); *H04W 12/08* (2013.01); *H04W 48/02* (2013.01);
(Continued)

(58) Field of Classification Search
CPC ..... H04W 76/15; H04W 76/19; H04W 76/28; H04W 76/27; H04W 4/90; H04W 48/02
See application file for complete search history.

(56) References Cited

U.S. PATENT DOCUMENTS

2012/0040643 A1    2/2012  Diachina et al.
2013/0148490 A1    6/2013  Yi et al.
(Continued)

FOREIGN PATENT DOCUMENTS

CN    102625421 A    8/2012
CN    102905388 A    1/2013
(Continued)

OTHER PUBLICATIONS

Indian Office Action dated Apr. 6, 2022, issued in a counterpart Indian Application No. 202037025247.
(Continued)

*Primary Examiner* — Muthuswamy G Manoharan
(74) *Attorney, Agent, or Firm* — Jefferson IP Law, LLP

(57) ABSTRACT

An apparatus and a method to apply 5G communication systems to IoT networks is provided. The apparatus includes technologies, such as a sensor network, machine type communication (MTC), and machine-to-machine (M2M) communication may be implemented by beamforming, multiple-input multiple-output (MIMO), and array antennas. Application of a cloud radio access network (RAN) as the above-described big data processing technology may also be considered to be as an example of convergence between the 5G technology and the IoT technology. The disclosure
(Continued)

relates to a method and an apparatus for controlling network access in a next generation mobile communication system.

8 Claims, 64 Drawing Sheets

(30) Foreign Application Priority Data

Jan. 10, 2018 (KR) ........................ 10-2018-0003416
Jan. 23, 2018 (KR) ........................ 10-2018-0008417

(51) Int. Cl.
  *H04W 12/08* (2021.01)
  *H04W 48/02* (2009.01)
  *H04W 76/19* (2018.01)
  *H04W 76/27* (2018.01)
  *H04W 76/28* (2018.01)

(52) U.S. Cl.
  CPC ........... *H04W 76/19* (2018.02); *H04W 76/27* (2018.02); *H04W 76/28* (2018.02)

(56) References Cited

U.S. PATENT DOCUMENTS

| | | | |
|---|---|---|---|
| 2013/0242859 | A1 | 9/2013 | Celik et al. |
| 2014/0036794 | A1 | 2/2014 | Koc et al. |
| 2014/0044029 | A1 | 2/2014 | Chou et al. |
| 2015/0004924 | A1 | 1/2015 | Kim et al. |
| 2015/0036489 | A1 | 2/2015 | Rajadurai et al. |
| 2015/0111520 | A1 | 4/2015 | Hsu |
| 2015/0223146 | A1 | 8/2015 | Pinheiro et al. |
| 2016/0014672 | A1 | 1/2016 | Jang et al. |
| 2016/0219493 | A1 | 7/2016 | Kim et al. |
| 2017/0013498 | A1 | 1/2017 | Yi et al. |
| 2017/0013501 | A1 | 1/2017 | Kim et al. |
| 2017/0019820 | A1 | 1/2017 | Das |
| 2017/0064534 | A1 | 3/2017 | Loehr et al. |
| 2017/0201939 | A1 | 7/2017 | Lee et al. |
| 2017/0094525 | A1 | 8/2017 | Salkini et al. |
| 2017/0318496 | A1 | 11/2017 | Yi et al. |
| 2018/0020382 | A1 | 1/2018 | Kim et al. |
| 2018/0213435 | A1 | 7/2018 | Kim et al. |
| 2018/0359681 | A1 | 12/2018 | Futaki |
| 2019/0097936 | A1 | 3/2019 | Yang et al. |
| 2019/0116521 | A1 | 4/2019 | Qiao et al. |
| 2019/0174392 | A1* | 6/2019 | Chun .................... H04W 48/08 |
| 2019/0200273 | A1 | 6/2019 | Pedersen et al. |
| 2020/0077299 | A1 | 3/2020 | Wu et al. |
| 2020/0187092 | A1 | 6/2020 | Lindheimer et al. |

FOREIGN PATENT DOCUMENTS

| | | | |
|---|---|---|---|
| CN | 103581861 | A | 2/2014 |
| CN | 104137612 | A | 11/2014 |
| CN | 106664596 | A | 5/2017 |
| CN | 106921996 | A | 7/2017 |
| EP | 2809102 | A1 | 12/2014 |
| EP | 3300431 | A1 | 3/2018 |
| KR | 10-2016-0130405 | A | 11/2016 |
| KR | 10-2018-0007697 | A | 1/2018 |
| TW | 201703489 | A | 1/2017 |
| WO | 2012/155597 | A1 | 11/2012 |
| WO | 2015/035591 | A1 | 3/2015 |
| WO | 2016/003140 | A1 | 1/2016 |
| WO | 2016/184500 | A1 | 11/2016 |
| WO | 2016/190639 | A1 | 12/2016 |
| WO | 2017/017890 | A1 | 2/2017 |
| WO | 2018/142203 | A1 | 8/2018 |

OTHER PUBLICATIONS

Chinese Office Action dated May 30, 2022, issued in a counterpart Chinese Application No. 201980007804.5.
CATT; Introduction of DEFLATE based UDC Solution; 3GPP TSG-RAN2 Meeting #100; R2-1714278; Dec. 1, 2017, Reno, USA.
International Search Report dated Nov. 20, 2018, issued in International Application No. PCT/KR2018/008855.
LG Electronics Inc., 'Supporting IMS Emergency services in NR', R2-1707179, 3GPP TSG-RAN WG2 Meeting NR AH#2, Qingdao, China, Jun. 16, 2017, See section 2.
International Search Report dated Apr. 19, 2019, issued in an International application No. PCT/KR2019/000395.
3GPP; TSGRAN; E-UTRA and NR; Service Data Adaptation Protocol (SDAP) specification (Release 15)', 3GPP TS 37.324 V1.1.1, Sections 4-6; and Figure 4.2.2-1; Nov. 16, 2017.
Asustek, 'Discussion on changing presence of SDAP header', R2-1712207, 3GPP TSG-RAN WG2 Meeting #100, Section 2, Nov. 16, 2017; Reno, USA.
LG Electronics Inc., 'Configurability for the presence of SDAP header', R2-1713659, 3GPP TSG-RAN2 Meeting #100, Section 2; Nov. 17, 2017; Reno, USA.
3GPP; TSGRAN; NR; NR and NG-RAN Overall Description; Stage 2 (Release 15) 3GPP TS 38.300 V15.0.0, Sections 6.4-6.6; Jan. 4, 2018.
A U.S. Notice of Allowance dated Oct. 2, 2020, issued by the U.S. Patent and Trademark Office; U.S. Appl. No. 16/244,655.
Extended European Search Report dated Oct. 1, 2020, issued in a counterpart European Application No. 19738121.3-1212.
"3rd Generation Partnership Project; Technical Specification Group Radio Access Network; NR; Packet Data Convergence Protocol (PDCP) specification (Release 15)", 3GPP Standard; Technical Specification; 3GPP TS 38.323, 3RD Generation Partnership Project (3GPP), vol. RAN WG2, No. XP051450270, V1.1.0; Dec. 12, 2017. pp. 1-31.
Nokia Alcatel-Lucent Shanghai Bell: "Soap header", 3GPP Draft; R2-1702644 Soap Header, 3rd Generation Partnership Project (3GPP), vol. RAN WG2, No. XP051253235; Mar. 24, 2017, Spokane, USA. Retrieved from the Internet: URL: http://www.3gpp.org/ftp/tsg_ran/WG2_RL2/Docs/.
Qualcomm Incorporated: "SOAP header hardware implications", 3GPP Draft; R2-1713727, 3rd Generation Partnership Project (3GPP), vol. RAN WG2, No. XP051372385; Nov. 17, 2017, Reno, USA. Retrieved from the Internet: URL: http://www.3gpp.org/ftp/tsg%5Fran/WG2%5FRL2/TSGR2%5F100/Docs/.
VIVO: "Discussion on the SOAP header format", 3GPP Draft; R2-1704594_DISCUSSION On the SOAP Header Format, 3rd Generation Partnership Project (3GPP), vol. RAN WG2, No. XP051275149; May 14, 2017, Hangzhou, China. Retrieved from the Internet: URL: http://www.3gpp.org/ftp/Meetings_3GPP SYNC/RAN2/Docs/.
Korean Office Action dated Jun. 15, 2021, issued in a counterpart Korean Application No. 10-2017-0098553.
Chinese Office Action dated Sep. 24, 2021, issued in a counterpart Chinese Application No. 201880050623.6.
Chinese Office Action dated Jan. 28, 2021, issued in a counterpart Chinese Application No. 201980007804.5.
Extended European Search Report dated Mar. 25, 2021, issued in a counterpart European Application No. 18842264.6-1212/3649805.
European Office Action dated Apr. 19, 2021, issued in a counterpart European Application No. 19 738 121.3-1212.
ERICSSON: "Access Control for NR", 3GPP Draft; R2-1702865 Access Control for NR, 3rd Generation Partnership Project (3GPP), vol. RAN WG2, No. XP051244845; Apr. 3, 2017, Spokane, USA. Retrieved from the Internet: URL: http://www.3gpp.org/ftp/Meetings_3GPP_SYNC/RAN2/Docs/.
Intel Corporation: "5G access control mechanism", 3GPP Draft; R2-1707046_NR_ACCESS_CONTROL, 3rd Generation Partnership Project (3GPP), vol. RAN WG2, No. XP051307295; Jun. 17, 2017, Qingdao, China Retrieved from the Internet: URL: http://www.3gpp.org/ftp/tsg_ran/WG2_RL2/TSGR2_AHs/2017_06_NR/Docs/.
Qualcomm Incorporated: "Unified Access Control in different RRC Modes", 3GPP Draft; R2-1706890_NR_ACCESS_CONTROL, 3rd Generation Partnership Project (3GPP), vol. RAN WG2, No.

(56) References Cited

OTHER PUBLICATIONS

XP051307185; Jun. 17, 2017, Qingdao, China. Retrieved from the Internet: URL: http://www.3gpp.org/ftp/tsg_ran/WG2_RL2/TSGR2_AHs/2017_06_NR/Docs/.
LG Electronics Inc: "Access category based access barring for RRCJDLE and RRCJNACTIVE", 3GPP Draft; R2-1707138 Category Based Access Barring in Idle and Inactive, 3rd Generation Partnership Project (3GPP), vol. RAN WG2, No. XP051301631; Jun. 26, 2017; Qingdao, China. Retrieved from the Internet: URL: http://www.3gpp.org/ftp/Meetings_3GPP_SYNC/RAN2/Docs/.
Mediatek Inc: "Discussion on Unified Access Control in 5GS", 3GPP Draft; C1-171579 Unified Access Control in 5GS, 3rd Generation Partnership Project (3GPP), vol. CT WG1, No. XP051241722; Apr. 2, 2017, Spokane (WA), USA. Retrieved from the Internet: URL: http://www.3gpp.org/ftp/Meetings_3GPP_SYNC/CT1/Docs/.
Qualcomm Incorporated: "SDAP header excluded from PDCP ciphering", 3GPP Draft; R2-1710906, 3rd Generation Partnership Project (3GPP), vol. RAN WG2, No. XP051354400; Sep. 28, 2017, Prague, Czech Republic. Retrieved from the Internet: URL: http://www.3gpp.org/ftp/tsg_ran/WG2_RL2/TSGR2_99bis/Docs/.
U.S. Office Action dated Jan. 19, 2022, issued by the U.S. Appl. No. 17/128,867.
Korean Office Action dated Nov. 10, 2021, issued in a counterpart Korean Application No. 10-2018-0008417.
3GPP TS 22.261 V15.3.0 (2017-12) 3rd Generation Partnership Project; Technical Specification Group Services and System Aspects; Service requirements for the 5G system; Stage 1.
Indian Hearing Notice dated Jul. 4, 2023, issued in Indian Patent Application No. 202037025247.
"3 Generation Partnership Project; Technical Specification Group Radio Access Network; Evolved Universal Terrestrial Radio Access (E-UTRA); Packet Data Convergence Protocol (PDCP) specification (Release 14)", 3GPP Standard; Technical Specification; 3GPP TS 36.323 V14.5.0, Jan. 7, 2018, pp. 1-43, XP051392411.
Huawei et al., "CR on UDC functionality in PDCP layer", 3GPP Draft; R2-1712723, 3GPP TSG-RAN2 Meeting #100, Reno, Nevada, Nov. 17, 2017, XP051371629.
Huawei et al., "Discussion on UDC functionality in PDCP layer", 3GPP Draft; R2-1712722, 3GPP TSG RAN2 Meeting #100, Reno, Nevada, Nov. 17, 2017, XP051371628.
Extended European Search Report dated Feb. 21, 2023, issued in European Patent Application No. 22196560.1.
Intel, 5G Access Control, 3GPP Draft, C1-172291, 3GPP TSG CT WG1 Meeting #104, May 14, 2017, XP051270531.
European Office Action dated May 17, 2024, issued in European Patent Application No. 18842264.6.
3rd Generation Partnership Project; Technical Specification Group Radio Access Network; NR; Packet Data Convergence Protocol (PDCP) specification (Release 15), 3GPP TS 38.323 V15.1.0 (Mar. 2018), Apr. 2, 2018, pp. 1-25, XP051450734.
Samsung, Changes to delay budget reporting related to ASN.1 review, R2-1705496, 3GPP TSG-RAN2 Meeting #98, May 8, 2017.
Zhuo Chen, Status Report for WI Core part: Voice and Video Enhancement for LTE, RP-170803, 3GPP TSG RAN meeting #75, Mar. 10, 2017.
European Office Action dated Aug. 30, 2024, issued in European Patent Application No. 22196560.1.
Chinese Office Action dated Aug. 19, 2024, issued in Chinese Patent Application No. 202211441326.9.

* cited by examiner (a)

(b)

(c)

(d)

PDCP status report using 12 bits SN

PDCP status report using 18 bits SN

PDCP status report using PDCP COUNT value

METHOD AND APPARATUS FOR CONTROLLING ACCESS IN NEXT GENERATION MOBILE COMMUNICATION SYSTEM

CROSS-REFERENCE TO RELATED APPLICATION(S)

This application is a continuation application of prior application Ser. No. 16/054,517, filed on Aug. 3, 2018, which will be issued as U.S. Pat. No. 11,246,183 on Feb. 8, 2022, which is based on and claimed priority under 35 U.S.C. § 119(a) of a Korean patent application numbers 10-2017-0098553, filed on Aug. 3, 2017, 10-2018-0001960, filed on Jan. 5, 2018, 10-2018-0003416, filed on Jan. 10, 2018, and 10-2018-0008417, filed on Jan. 23, 2018, in the Korean Intellectual Property Office, the disclosure of each of which is incorporated by reference herein in its entirety.

BACKGROUND

1. Field

The disclosure relates to a method and an apparatus for controlling access in a next generation mobile communication system. More particularly, the disclosure relates to a receiver-triggered packet data convergence protocol (PDCP) status reporting-method in a next generation mobile communication system.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude (QAM) modulation, frequency and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for controlling access in a next generation mobile communication system.

Another aspect of the disclosure is to provide a method and an apparatus for controlling access of a terminal.

Additional aspects will be set forth in part in the description which follows and, in part, will be apparent from the description, or may be learned by practice of the presented embodiments.

In addition, the disclosure specifies parts to be modified in the packet delay tolerance report that is applied in a wireless communication system (LTE system) and detailed operations necessary for applying the packet delay tolerance report to a next generation mobile communication system. The packet delay tolerance report is used to adjust a discontinuous reception (DRX) for improving voice over LTE (VoLTE) performance and to enhance data (physical uplink shared channel (PUSCH)) transmission for extending coverage. For example, a terminal transmits an RRC report message to request for DRX cycle and repetitive retransmission period to improve delay tolerance level according to current VoLTE call quality and extend the coverage.

In the next generation mobile communication system supporting a high data rate, if PDCP PDUs are lost or arrived late in a single connectivity environment, if PDCP PDUs are discarded at a transmitter because of the expiry of the PDCP expiry timer, or if one of two PDCP entities receives a PDCP PDU late in a dual connectivity environment, all the received data should be stored in a buffer until a reordering timer that is triggered at the receive PDCP layer expires, resulting in transmission delay. Accordingly, the terminal has to have a large capacity memory or buffer to store all of the data being received while the reordering timer is running. If the memory or buffer capacity is not sufficient, data loss may occur. If the data that has triggered the PDCP reordering timer arrives before the expiry of the timer or if the PDCP reordering timer expires, a large amount of data received while the timer is running may be delivered to the upper layer at one time and, thus, the upper layer is likely to fail to process all of the data, resulting in data loss.

In accordance with an aspect of the disclosure, an access control method of a terminal in a wireless communication system is provided. The method includes checking, if an access is triggered, an access type of the triggered access and determining the access type of the triggered access as a predetermined access category based on the checked access type.

Preferably, determining the access type of the triggered access as the access category includes determining whether the checked access type is an emergency access type and determining, if the checked access type is the emergency access type, the triggered access type as a first access category related to the emergency access type.

Preferably, the method further includes determining, if the checked access type is not the emergency access type, whether the triggered access type is an operator-providing service access type and determining, if the triggered access type is the operator-providing service access type, the triggered access type as a second access category related to the operator-providing service access type.

Preferably, the method further includes determining, if the checked access type is not the operator-providing service access type, the triggered access type as a third access category.

Preferably, the method further includes receiving information on the second access category related to the operator-providing service access type from an operator server.

Preferably, the method further includes receiving information on an access category list from a base station, and determining the access type of the triggered access as a predetermined access category includes determining the access type of the triggered access based on the checked access type and the information on the access category list.

Preferably, the method further includes determining whether to perform the triggered access based on the determined access category and transmitting, if it is determined to perform the triggered access, a connection request message to a base station.

In accordance with another aspect of the disclosure, a terminal of a wireless communication system is provided. The terminal includes a transceiver and at least one processor configured to control to check, if an access is triggered, an access type of the triggered access and determine the access type of the triggered access as a predetermined access category based on the checked access type.

Preferably, the at least one processor is configured to control to determine whether the checked access type is an emergency access type and determine, if the checked access type is the emergency access type, the triggered access type as a first access category related to the emergency access type.

Preferably, the at least one processor is configured to control to determine, if the checked access type is not the emergency access type, whether the triggered access type is an operator-providing service access type and determine, if the triggered access type is the operator-providing service access type, the triggered access type as a second access category related to the operator-providing service access type.

Preferably, the at least one processor is configured to control to determine, if the checked access type is not the operator-providing service access type, the triggered access type as a third access category.

Preferably, the at least one processor is configured to control the transceiver to receive information on the second access category related to the operator-providing service access type from an operator server.

Preferably, the at least one processor is configured to control the transceiver to receive information on an access category list from a base station, the access type of the triggered access being determined based on the checked access type and the information on the access category list.

Preferably, the at least one processor is configured to control to determine whether to perform the triggered access based on the determined access category and control the transceiver to transmit, if it is determined to perform the triggered access, a connection request message to a base station.

Preferably, the at least one processor is configured to determine whether to perform the triggered access based on the determined access category and the triggered access type.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
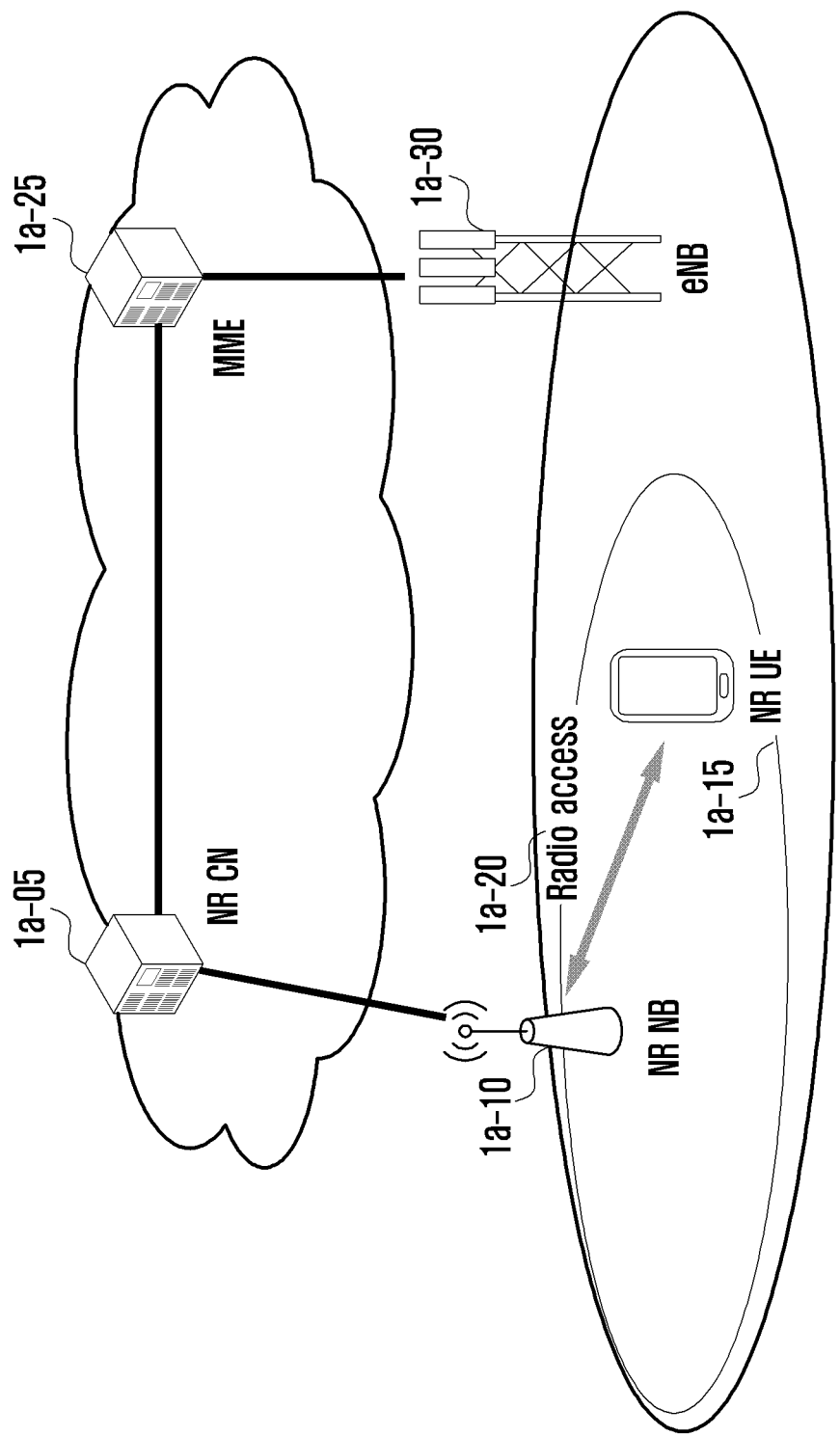
FIG. 1A is a diagram illustrating an architecture of a next generation mobile communication system according to an embodiment of disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Detailed descriptions of well-known functions and structures incorporated herein may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the disclosure and methods of accomplishing the same may be understood more readily by reference to the following detailed description of embodiments and the accompanying drawings. The disclosure may, however, be embodied in many different forms and should not be construed as being limited to the embodiments set forth herein. Rather, these embodiments are provided so that this invention will be thorough and complete and will fully convey the concept of the invention to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the disclosure, the term "module" means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card. According to various embodiments of the disclosure, a module may include at least one processor.

Embodiment 1

FIG. 1A is a diagram illustrating an architecture of a next generation mobile communication system according to an embodiment of disclosure.

Referring to FIG. 1A, a radio access network 1a-20 of the next generation mobile communication system includes a new radio Node B (NR NB) 1a-10 and a new radio core network (NR CN) 1a-05. A new radio user equipment (hereinafter, referred to as a new radio user equipment (NR UE) or simply UE) 1a-15 connects to an external network via the NR NB 1a-10 and the NR CN 1a-05.

In FIG. 1A, the NR NB 1a-10 corresponds to the evolved Node B (eNB) in the legacy LTE system. The NR UE 1a-15 connects to the NR NB, which may provide services superior to those of the legacy eNB. In the next generation mobile communication system where all user traffic is served through shared channels, there is a need of an entity for collecting UE-specific status information (such as buffer status, power headroom status, and channel status) and scheduling the UEs based on the collected information, and the NR NB 1a-10 takes charge of such functions. Typically, one NR NB hosts multiple cells. In order to meet the data rate requirement that is higher than that for legacy LTE, it is necessary to secure a maximum bandwidth broader than ever before by employing advanced technologies, such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE. The NR CN 1a-05 is responsible for mobility management, bearer setup, and QoS setup. The NR CN 1a-05 is responsible for other control functions as well as UE mobility management functions in connection with a plurality of NR NBs. The next generation mobile communication system may interoperate with legacy LTE systems in such a way of connecting the NR CN 1a-05 to a mobility management entity (MME) 1a-25 through a network interface. The MME 1a-25 is connected to an eNB 1a-30 as a legacy base station.

Figure 1B:
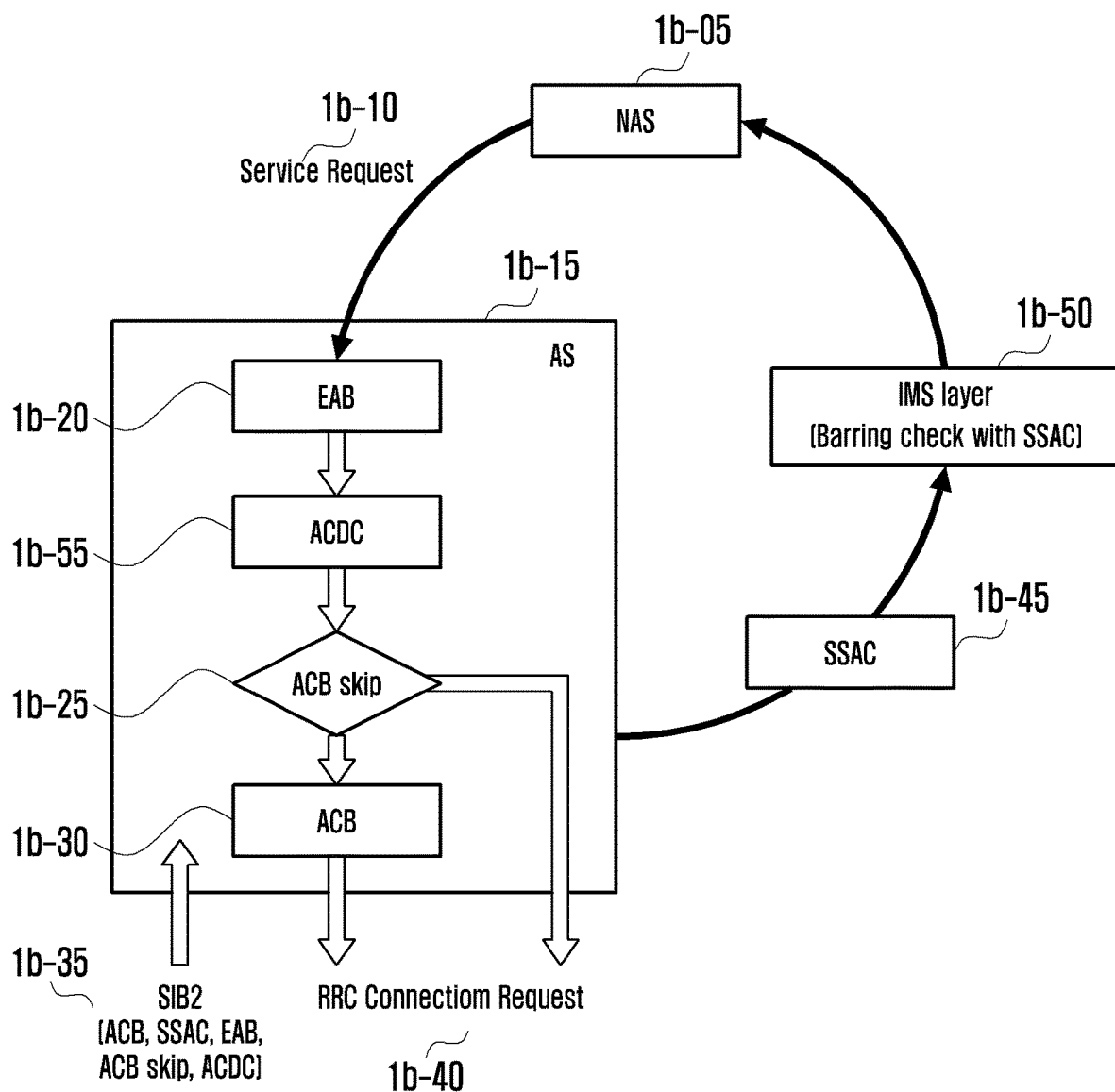
FIG. 1B is a diagram illustrating a method for determining whether to accept an access in a legacy long term evolution (LTE) system according to an embodiment of disclosure.

FIG. 1B is a diagram illustrating a method for determining whether to accept an access in a legacy LTE system according to an embodiment of disclosure.

Referring to FIG. 1B, typically, the functionalities of an LTE UE are split into an access stratum (AS) 1b-15 and a non-access stratum (NAS) 1b-05. The AS is responsible for all access-related functionalities, and the NAS is responsible for non-access-related functionalities, such as public land mobile network (PLMN) selection and service request. The accessibility determination may be mainly determined by the UE AS. As aforementioned, the network in congestion may restrict new access and, for this purpose, it broadcasts related configuration information in order for each UE to make its own access determination as denoted by reference number 1b-35. Along with the introduction of new requirements in the legacy LTE system, a new barring mechanism has been proposed, which as a consequence allows for multiple access barring checks. If the UE NAS layer issues a service request as denoted by reference number 1b-10, the UE AS checks whether the UE can actually access the network. If an establishment cause value of the service request is "delay tolerant access", the UE AS performs extended access barring (EAB) first, as denoted by reference number 1b-20. The EAB barring mechanism is performed as an access check procedure applied only for machine type communication (MTC). If the EAB check is passed, the UE AS performs application specific congestion control for data communication (ACDC), as denoted by reference number 1b-55. An application requesting for the service is assigned an ACDC category, the value of which may be included in the service request being transferred to the UE AS. The network may provide barring configuration information per ACDC category. Accordingly, the access check procedure may be performed per group, the groups being categorized by the ACDC category. If the barring configuration information per ACDC category is not provided by the network, the UE AS omits the ACDC access check procedure. If the ACDC check is passed, the UE AS performs access class barring (ACB) as denoted by reference number 1b-30. The ACB is an access check procedure using the barring configuration information provided separately according to mobile originating (MO) data or MO signaling. For multiple telephony (MMTEL) voice/video/SMS services, the ACB procedure may be omitted with the use of an ACB skip indicator as denoted by reference number 1b-25. If all the aforementioned access check procedures are passed, the UE AS may attempt access to the network. For example, the UE AS performs random access and transmits a radio resource control (RRC) connection request message to the eNB, as denoted by reference number 1b-40. There may be another access check procedure that is not performed by the UE AS. If the barring configuration information for the MMTEL voice/video (SSAC) is received from the network as denoted by reference number 1b-45, the UE AS transfers the information to the IMS layer that is responsible for managing the services in the UE as denoted by reference number 1b-50. After receiving the barring configuration information, the IMS layer may perform the access check procedure when the service is triggered. The SSAC, when it was introduced, was designed such that the UE AS performs the corresponding function regardless of the type of application or service. Accordingly, in order to control the determination on whether to accept the access for a specific service, such as MMTEL voice/video, it was necessary to directly transfer the barring configuration information to a layer managing the service in order for the corresponding layer to perform the access check procedure.

In the next generation mobile communication system, such a complex procedure is not necessary. This is because it is possible to design a single access check procedure encompassing, from the beginning, all requirements introduced in LTE. The disclosure proposes a single barring mechanism evolved from the legacy ACDC access check procedure.

Figure 1C:
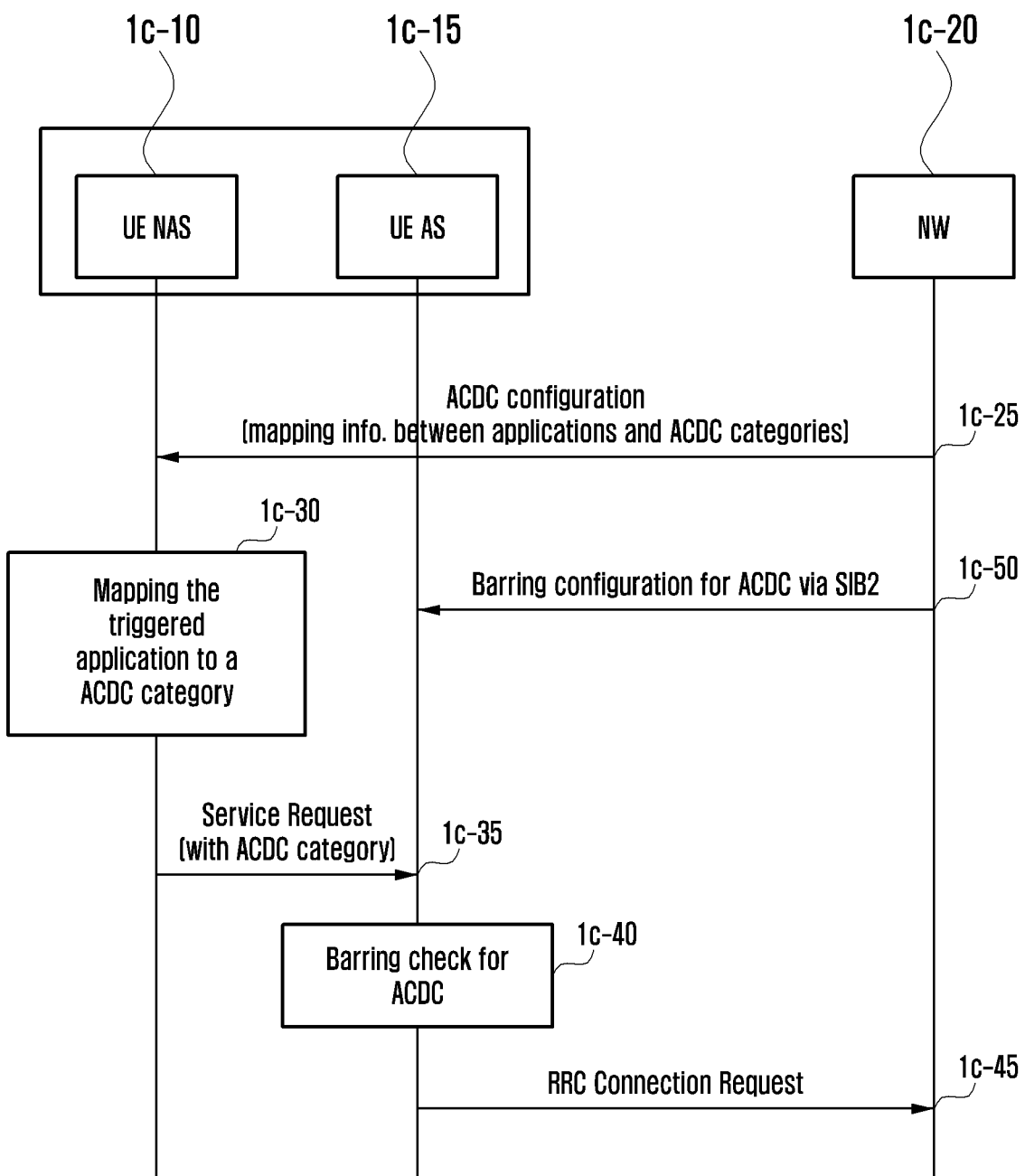
FIG. 1C is a diagram illustrating a procedure for performing an application specific congestion control for data communication (ACDC) operation in a legacy LTE system according to an embodiment of disclosure.

FIG. 1C is a diagram illustrating a procedure for performing an ACDC operation in a legacy LTE system according to an embodiment of disclosure.

Referring to FIG. 1C, in the legacy LTE system, it has been proposed that the ACDC makes an accessibility determination per application (service). Every application is assigned at least one ACDC category value. The ACDC category value is selected in the range from 1 to 16. The network 1c-20 provides the UE NAS 1c-10 with per-application ACDC category information using a NAS message at operation 1c-25. The network 1c-20 provides the UE AS 1c-15 with the barring configuration information to be applied per ACDC category using system information block 2 (SIB2) at operation 1c-50. The barring configuration information includes an ac-BarringFactor information element (IE) and an ac-Barringtime IE. The ac-BarringFactor $\alpha$ has a value in the range of $0 \leq \alpha < 1$. The UE AS 1c-15 draws a random value of rand in the range of $0 \leq \text{rand} < 1$; if the random value is less than the ac-BarringFactor, it is assumed that the access is not barred, and, if not, it is assumed that the access is barred. If it is determined that the access is barred, the UE AS 1c-15 delays the access attempt for a duration drawn based on the following equation.

$$\text{"Tbarring"}(0.7+0.6*\text{rand})*\text{ac-BarringTime}. \quad \text{Equation 1}$$

If a service request is triggered, the UE AS 1c-15 draws an ACDC category value corresponding to the application for the service at operation 1c-30. The UE NAS 1c-10 sends the service request including the ACDC category value to the UE AS 1c-15 at operation 1c-35. Upon receipt of the service request, the UE AS 1c-15 determines at operation 1c-40 whether the access is accepted based on the ACDC barring configuration information included in the SIB2 according to the ACDC category value. If the SIB2 includes no barring configuration information corresponding to the ACDC category, it is assumed that the application belonging to the ACDC category is allowed for access in the ACDC procedure. If the access is permitted through the access barring check procedure, the UE AS 1c-15 transmits an RRC Connection Request for random access to the network at operation 1c-45.

Figure 1D:
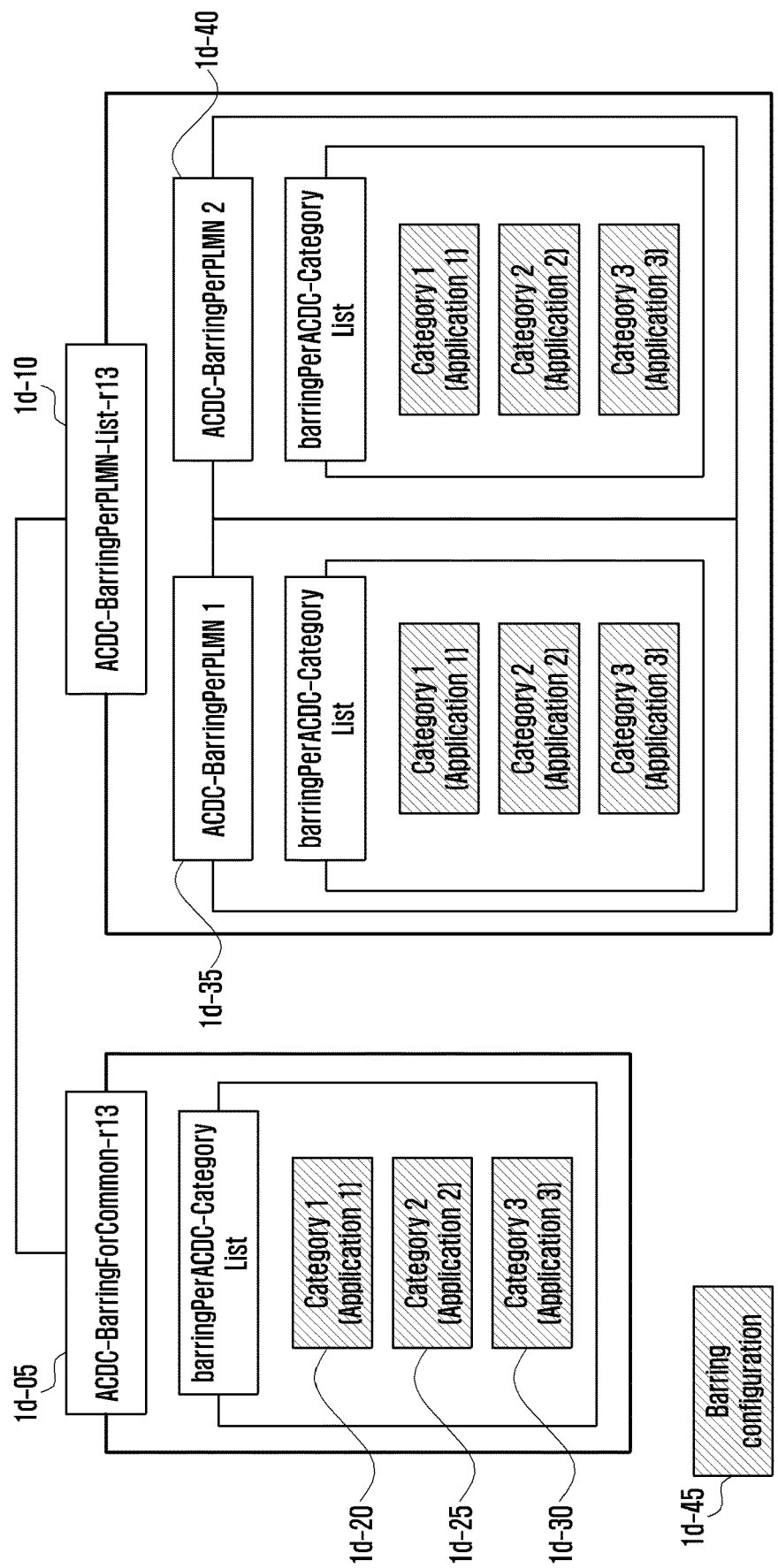
FIG. 1D is a diagram illustrating a structure of ACDC configuration information for use in the legacy LTE system according to an embodiment of disclosure.

FIG. 1D is a diagram illustrating a structure of ACDC configuration information for use in the legacy LTE system according to an embodiment of disclosure.

Referring to FIG. 1D, the ACDC configuration information (ACDC-BarringForCommon-r13) 1d-10 may provide PLMN-specific barring configuration information sets (ACDC-BarringPerPLMN 1, ACDC-BarringPerPLMN 2, . . . ) 1d-35 and 1d-40. If all PLMNs have the same barring configuration information set, it may be possible to broadest one barring configuration information set (ACDC-BarringForCommon-r13) 1d-05. The PLMN-specific barring configuration information or common barring configuration information set includes category-specific barring configuration information 1d-20, 1d-25, and 1d-30. As described above, the barring configuration information 1d-45 includes the ac-BarringFactor IE and the ac-Barringtime IE. If there is not barring configuration information for a specific ACDC category, it is assumed that the application belonging to the corresponding ACDC category is not barred by the ACDC.

Figure 1E:
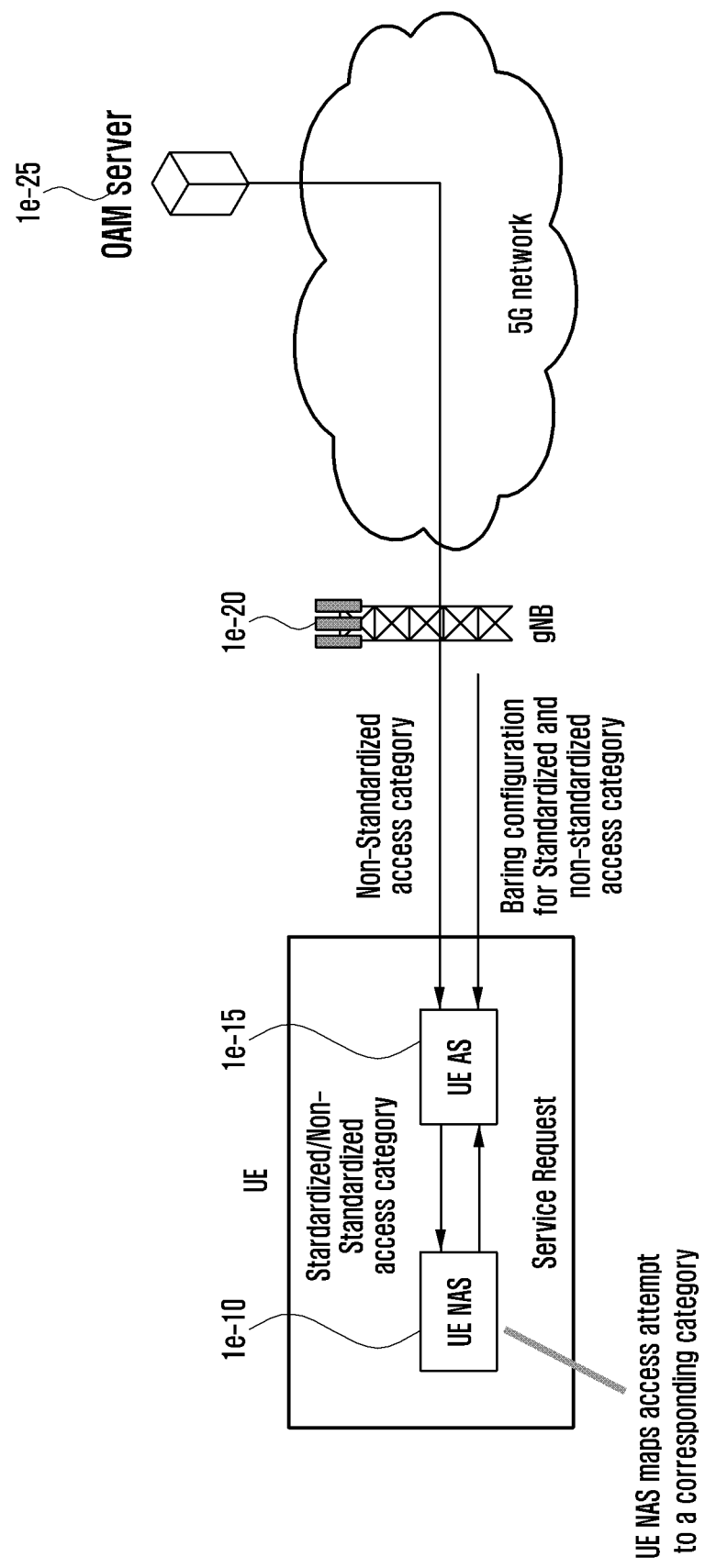
FIG. 1E is a diagram illustrating a procedure for a UE access control operation according to an embodiment of the disclosure.

FIG. 1E is a diagram illustrating a procedure for a UE access control operation according to an embodiment of the disclosure.

Referring to FIG. 1E, the disclosure proposes a category-based access control scheme similar to the legacy ACDC. However, the proposed access control scheme differs from the legacy ACDC in that the categorization is made with other elements as well as an application, e.g., service access type, call type, UE class, user group, signaling type, slice type, and any combination thereof. For example, the access control may be performed for certain element-specific types of access. In the disclosure, access is categorized into two categories. One of the two categories is a standardized access category. This category is defined at a RAN level, i.e., explicitly categorized in the standard document. In the disclosure, an emergency-related category belongs to the standard access category. Every access belongs to at least one standardized access category. The other is a non-standardized access category. This category is defined outside the $3^{rd}$ generation partnership project (3GPP) architecture and thus is not explicitly categorized in the standard document. This is identical in characteristic with the categories in the legacy ACDC. However, a certain access triggered by the UE NAS may not be mapped to the non-standardized access category. The operator's server 1e-25 provides the UE NAS 1e-10 with non-standardized category information through NAS signaling or application level data transmission. The non-standardized category information provides the mapping between the non-standardized categories and categorized elements, such as applications. The new radio Node B (gNB) 1e-20 provides UEs with a category list containing the barring configuration information and per-category barring configuration information using system information. The UE AS 1e-15 sends the UE NAS 1e-10 the category list provided by the gNB 1e-20. The UE NAS 1e-10 maps the triggered access to one of the categories according to a predetermined rule. The UE NAS 1e-10 sends the UE AS 1e-15 the information on the mapped category along with the service request. The UE AS 1e-15 determines whether the access triggered by the UE NAS 1e-10 is permitted based on the barring configuration information (barring check).

Embodiment 1-1

The disclosure proposes a method for mapping an access triggered by a UE NAS to a specific category. In the embodiment 1-1, the UE NAS maps an access to one category.

In embodiment 1-1, an access is mapped to at least one standardized access category. In addition, an access may not be mapped to any subcategory of the non-standardized access category provided by the network. In the disclosure, the categories provided by the network for use in mapping an access thereto are assigned at least one of predetermined priorities. The triggered access is mapped to a category with the highest priority among the categories to which the access can be mapped. In the disclosure, a category corresponding to "Emergency" belongs to a category set with the highest priority. A category corresponding to a "high priority access" may belong to the category set with the highest priority. The high priority access denotes a mobile communication operator-exclusive or public office-exclusive access, such as that of the police and a firefighter. It corresponds to the access classes (ACs) 11 to 15 of the legacy LTE. All categories belonging to the non-standardized access category belong to the second highest priority category set. All categories belonging to the standardized access category with the exception of the emergency and high priority access belong to the third highest priority category set.

For example, the UE NAS maps the triggered access to a category as follows.

[Operation 1] The UE NAS determines whether the triggered access can be mapped to one of the following standardized access categories. The following categories have the highest priority.

emergency high priority access (AC 11~15)

If there is no category to which the access can be mapped among the standardized access categories provided by the network, the procedure goes to operation 2.

[Operation 2] The UE NAS determines whether the triggered access can be mapped to one of the following non-standardized access categories. All of the non-standardized access categories have the second highest priority.
application
UE type, user group
service access type
call type
signaling type
slice type
combination of above elements If there is no category to which the access among the non-standardized access categories provided by the network can be mapped, the procedure goes to operation 3.

[Operation 3] The UE NAS determines whether the triggered access can be mapped to one of standardized access categories other than those considered in operation 1. All of the standardized access categories except for those with the highest priority have the third highest priority. All access belongs to at least one standardized access category.

Figure 1F:
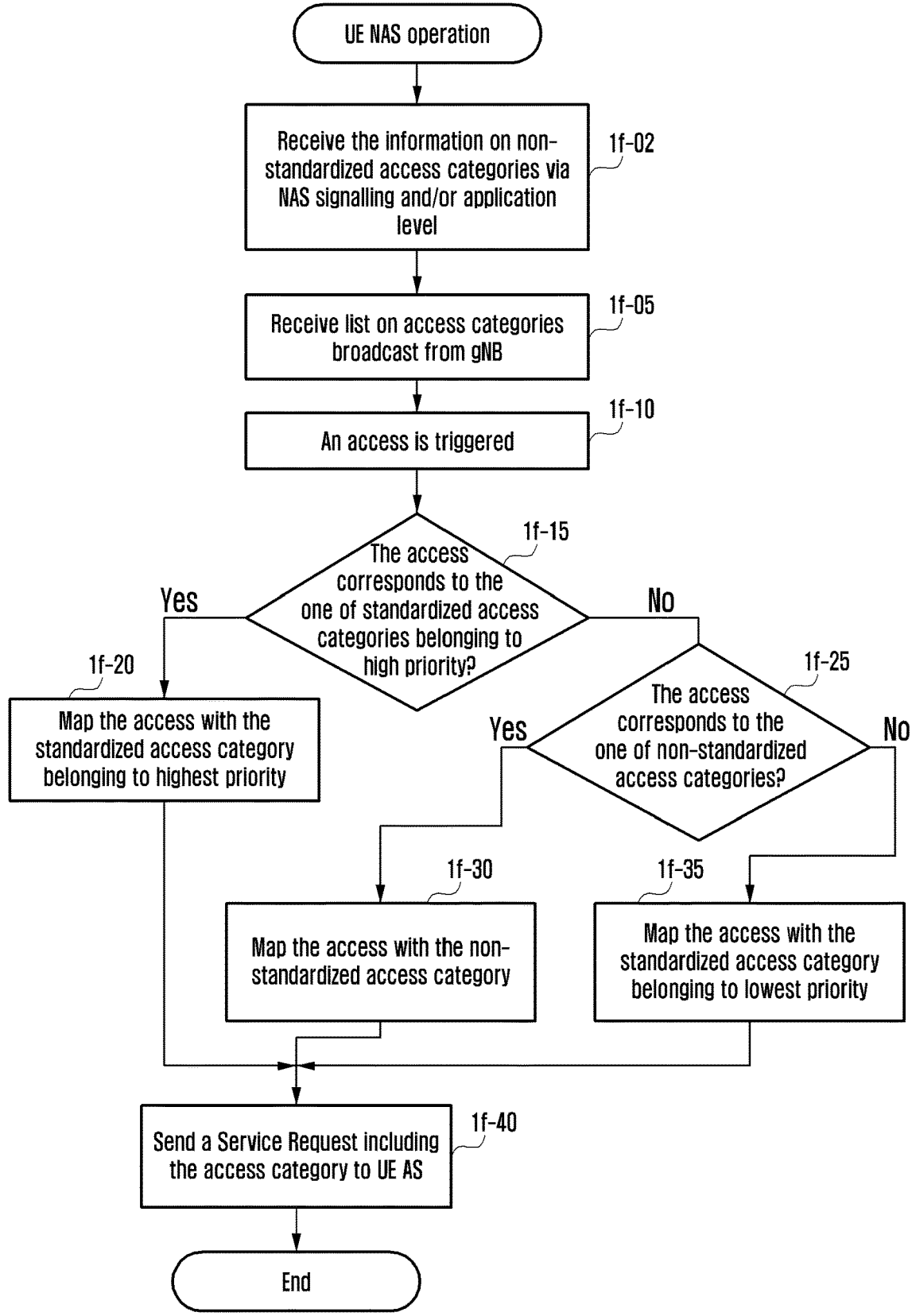
FIG. 1F is a flowchart illustrating user equipment (UE) non-access stratum (NAS) operations according to an embodiment of the disclosure.

FIG. 1F is a flowchart illustrating UE NAS operations according to an embodiment of the disclosure.

Referring to FIG. 1F, at operation 1*f*-02, the UE NAS receives information on the non-standardized access categories supportable in the network through NAS signaling or application level signaling. This information includes information on the mapping between categories and elements. For example, the information may include information on the mapping between categories and applications.

At operation 1*f*-05, the UE NAS receives a list of access categories from the UE AS, the list providing the barring configuration information in the system information transmitted by the gNB. At operation 1*f*-10, the UE NAS triggers an access. At operation 1*f*-15, the UE NAS determines whether the access can be mapped to one of the categories with the highest priority. The categories with the highest priority include the categories corresponding to "emergency" or "high priority access". If it is determined that the access can be mapped to one of the categories with the highest priority, the UE NAS maps the access to the corresponding category at operation 1*f*-20. If it is determined that the access cannot be mapped to one of the categories with the highest priority, the UE NAS determines at operation 1*f*-25 whether the access can be mapped to one of the non-standardized access categories included in the non-standardized access category information received from the network at operation 1*f*-02 and the list provided by the gNB at operation 1*f*-05. If it is determined that the access can be mapped to one of the non-standardized access categories, the UE NAS maps the access to the corresponding category at operation 1*f*-30. If it is determined that the access cannot be mapped to one of the non-standardized access categories, the UE NAS maps the access to one of the standardized access categories at operation 1*f*-35. At operation 1*f*-40, the UE NAS sends the UE AS a service request message including the mapped category.

Embodiment 1-2

In the embodiment 1-2, the UE NAS maps an access to a standardized access category and, additionally, a non-standardized access category to which the access can be mapped. In the disclosure, the service request that the UE NAS transmits to the UE AS includes the information indicating a standardized access category because the triggered access should be mapped to one standardized access category. At operation 1*f*-05, no access category list is provided by the UE AS. Accordingly, the operation of determining whether the access can be mapped to one of non-standardized access categories at operation 1*f*-25 is not performed based on the non-standardized access category included in the list. For example, the UE NAS determines whether there is a non-standardized access category based on only the information on non-standardized access categories supportable by the network that is provided through NAS signaling or application level signaling.

In embodiment 1-2, the UE NAS may send the UE AS both the standardized access category and non-standardized access category. In this case, the UE AS selects one of the standardized access category and non-standardized access category for use of the barring configuration information corresponding to the selected access category. If the barring configuration information associated with both the mapped standardized access category and non-standardized access category is broadcast by the gNB, the UE NAS performs an access barring check with the barring configuration information corresponding to the non-standardized access category. If the barring configuration information associated with the non-standardized access category is not broadcast by the gNB, the UE NAS performs an access barring check with the barring configuration information corresponding to the standardized access category. If neither the barring configuration information associated with the mapped standardized access category nor the barring configuration information associated with the mapped non-standardized access category is broadcast by the gNB, the UE NAS does not perform an access barring check on the access and assumes that access is permitted. However, there is an exception. If the mapped standardized access category corresponds to "emergency" or "high priority access" with the highest priority, if the barring configuration information about the category is broadcast by the gNB, and if the barring configuration information indicates permission for the access, the mapped non-standardized access category provided along with the mapped standardized access category is not considered. For example, the access is permitted.

Figure 1G:
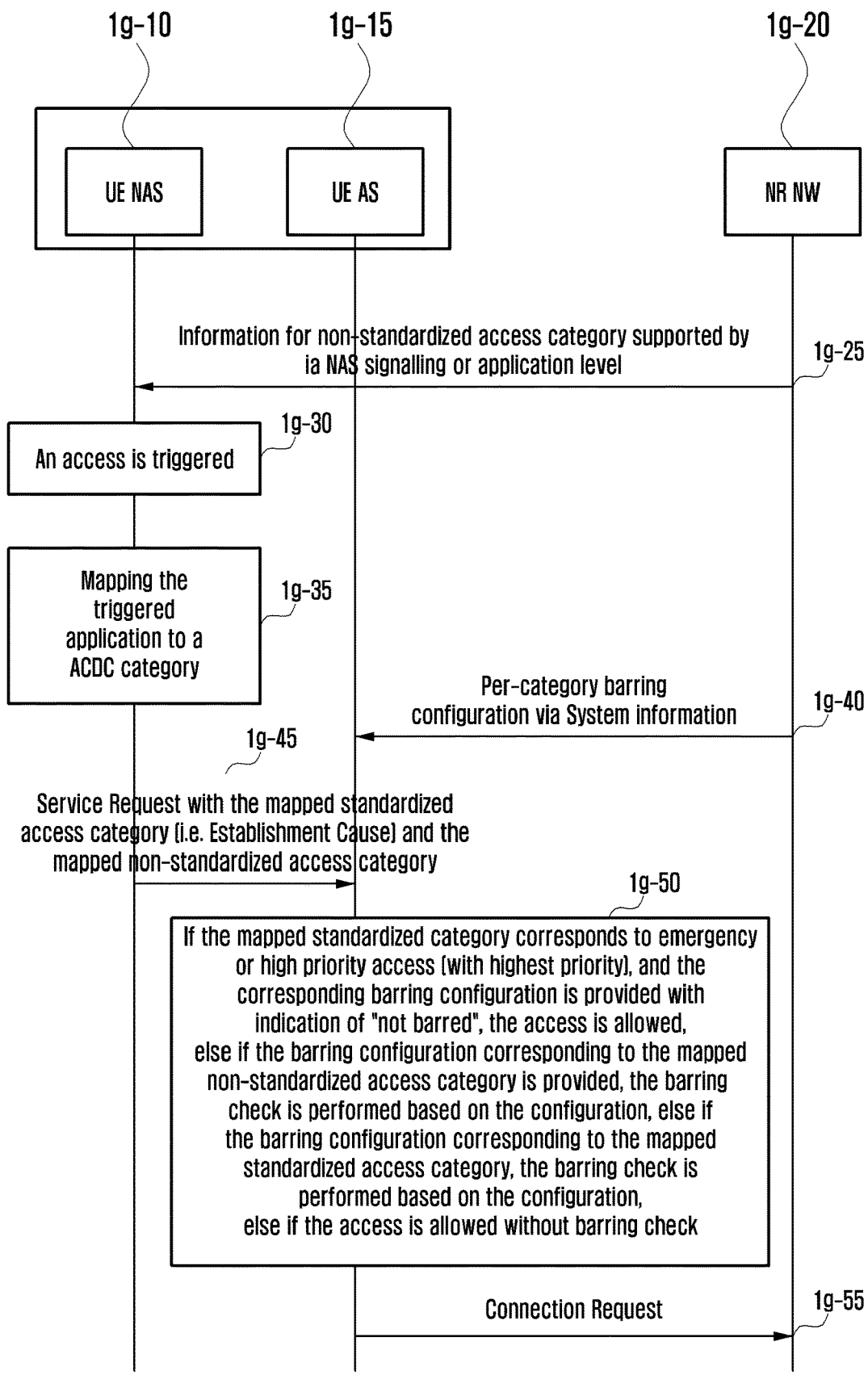
FIG. 1G is a signal flow diagram illustrating an access control procedure according to an embodiment of the disclosure.

FIG. 1G is a signal flow diagram illustrating an access control procedure according to an embodiment of the disclosure.

Referring to FIG. 1G, at operation 1*g*-25, the network 1*g*-20 transmits to the UE NAS 1*g*-10 the information on the non-standardized access categories it supports through NAS signaling or application level signaling. This information includes the mapping between categories and elements. For example, the information may include information on the mapping between categories and applications. The UE NAS triggers an access at operation 1*g*-30. The UE maps the access to a standardized access category at operation 1*g*-35. If the information received from the network includes the information on non-standardized access categories to which the access can be mapped, the UE maps the access to one of the non-standardized access categories. The UE NAS sends a service request including the mapped categories to the UE AS 1*g*-15 at operation 1*g*-45. For example, the UE NAS may notify the UE AS 1*g*-15 of only the standardized access category or both the standardized and non-standardized access categories at operation 1*g*-45. At operation 1*g*-40, the gNB provides the UE with per-category barring configuration information using the system information. The barring configuration information is not mandatorily provided for all categories.

The UE AS 1*g*-15 determines whether the access is permitted according to a predetermined rule.

Referring to at operation 1*g*-50, if the mapped standardized access category is a category corresponding to "emergency" or "high priority access", if the barring configuration information of the category is provided by the gNB, and if the barring configuration information indicates access permission, it is assumed that the access is permitted.

Otherwise, if the barring configuration information of the mapped non-standardized access category is provided by the gNB, the UE AS 1g-15 determines whether the access is permitted based on the corresponding barring information.

If the access corresponds to neither "emergency" nor "high priority access" and if barring configuration information of the mapped standardized access category is provided by the gNB for the access that is not mapped to any non-standardized access category, the UE AS 1g-15 applies the barring configuration information to determine whether the access is permitted.

The UE AS 1g-15 determines whether the access is permitted and, if so, transmits a connection request message to the gNB at operation 1g-55.

Figure 1H:
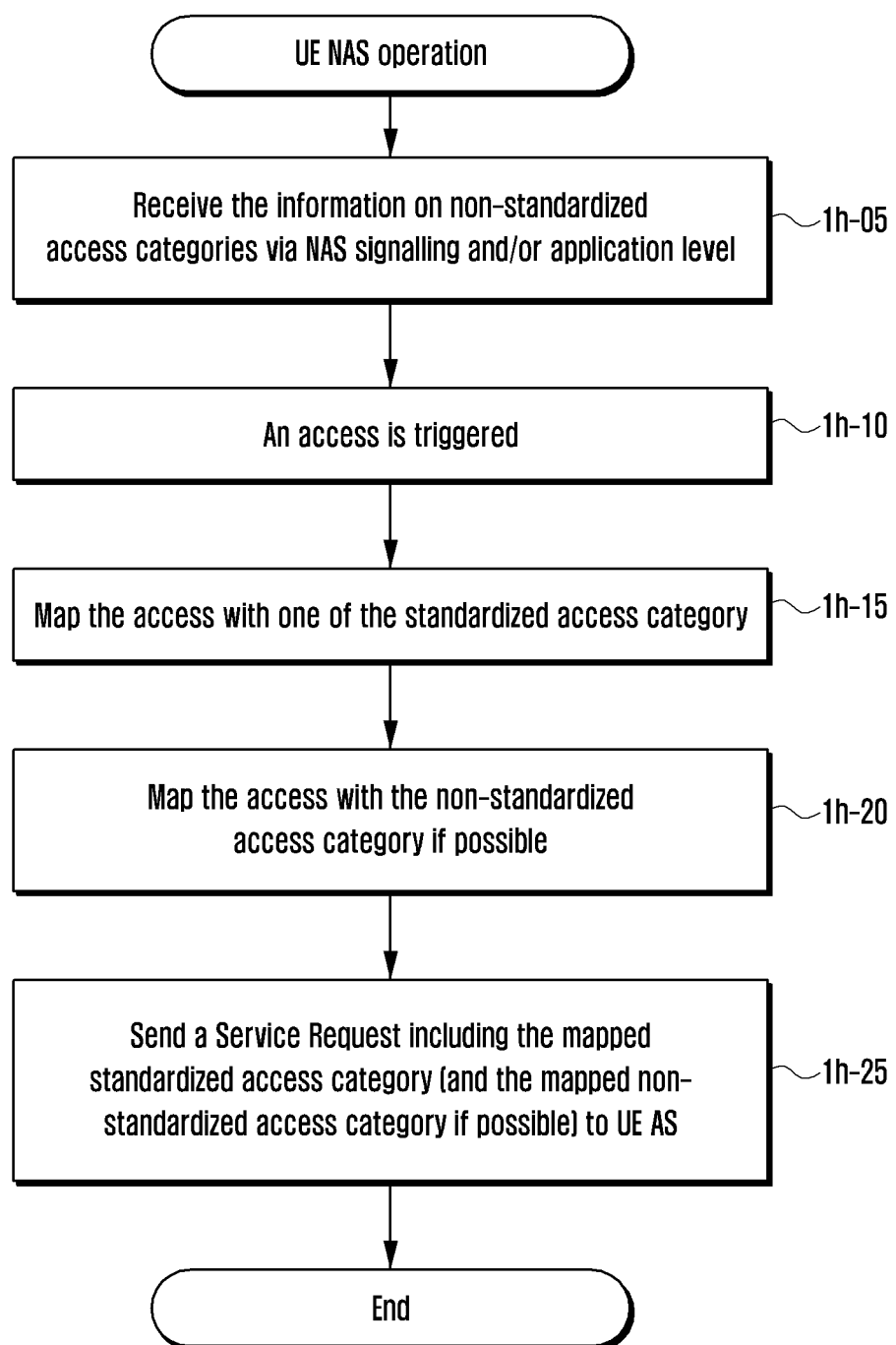
FIG. 1H is a flowchart illustrating a UE NAS operation according to embodiment 2 of the disclosure.

FIG. 1H is a flowchart illustrating a UE NAS operation according to embodiment 2 of the disclosure.

Referring to FIG. 1H, at operation 1h-05, the UE NAS receives information on the non-standardized access categories supportable in the network, the information being provided through NAS signaling or application level signaling. This information includes information on the mapping between categories and elements. For example, this information may include information on the mapping between categories and applications.

At operation 1h-10, the UE NAS triggers an access. At operation 1h-15, the UE NAS maps the access to one of the standardized access categories. At operation 1h-20, the UE NAS maps the access to a non-standardized access category, if possible. If there is no category to which the access can be mapped among the non-standardized access categories notified at operation 1h-05, the non-standardized access category may not be notified to the UE AS. At operation 1h-25, the UE NAS notifies the UE AS of the mapped category.

Figure 1I:
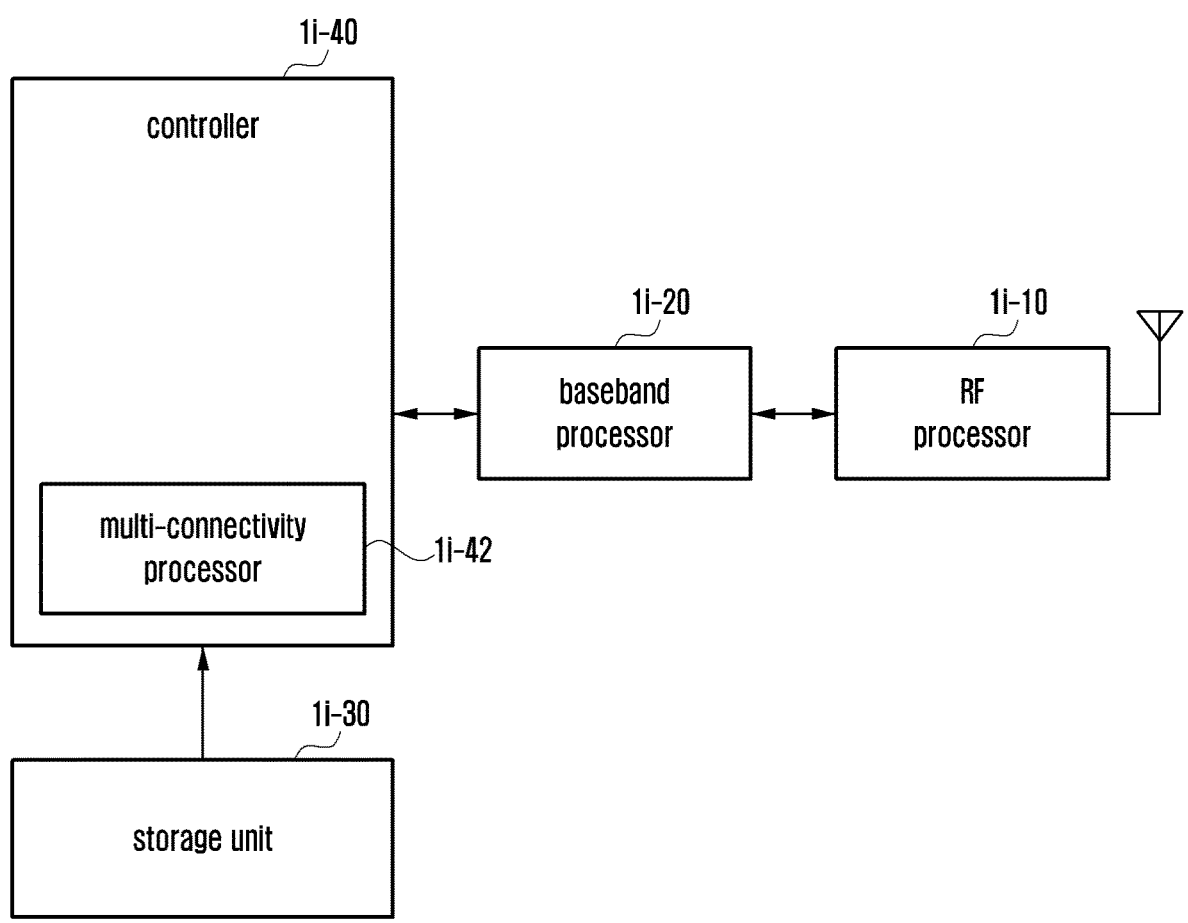
FIG. 1I is a block diagram illustrating a configuration of a UE according to an embodiment of the disclosure.

FIG. 1I is a block diagram illustrating a configuration of a UE according to an embodiment of the disclosure.

Referring to FIG. 1I, the UE includes a radio frequency (RF) processor 1i-10, a baseband processor 1i-20, a storage unit 1i-30, and a controller 1i-40.

The RF processor 1i-10 has a function for transmitting/receiving a signal over a radio channel, such as band conversion and amplification of the signal. For example, the RF processor 1i-10 up-converts a baseband signal from the baseband processor 1i-20 to an RF band signal and transmits the RF signal via an antenna and down-converts the RF signal received via the antenna to a baseband signal. For example, the RF processor 1i-10 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 1i-10 may also include a plurality of RF chains. The RF processor 1i-10 may perform beamforming. For beamforming, the RF processor 1i-10 may adjust the phase and size of a signal to be transmitted/received by means of the antennas or antenna elements in phase and size. The RF processor 1i-1—may be configured to support a multiple-input multiple-output (MIMO) scheme with which the UE can receive multiple layers simultaneously.

The baseband processor 1i-20 has a baseband signal-bit string conversion function according to a physical layer standard of the system. For example, in a data transmission mode, the baseband processor 1i-20 performs encoding and modulation on the transmission bit string to generate complex symbols. In a data reception mode, the baseband processor 1i-20 performs demodulation and decoding on the baseband signal from the RF processor 1i-10 to recover the transmitted bit string. In the case of using an OFDM scheme for data transmission, the baseband processor 1i-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 1i-20 splits the baseband signal from the RF processor 1i-10 into OFDM symbols, perform fast Fourier transform (FFT) on the OFDM symbols to recover the signals mapped to the subcarriers, and performs demodulation and decoding on the signals to recover the transmitted bit string.

The baseband processor 1i-20 and the RF processor 1i-10 process the transmission and reception signals as described above. Accordingly, the baseband processor 1i-20 and the RF processor 1i-10 may be referred to as a transmitter, a receiver, a transceiver, or a communication unit. At least one of the baseband processor 1i-20 and the RF processor 1i-10 may include a plurality of communication modules for supporting different radio access technologies. At least one of the baseband processor 1i-20 and the RF processor 1i-10 may also include multiple communication modules for processing the signals in different frequency bands. For example, the different radio access technologies may include a wireless local area network (WLAN) (e.g., institute of electrical and electronics engineers (IEEE) 802.11) and a cellular network (e.g., LTE). The different frequency bands may include a super high frequency (SHF) band (e.g., 2.5 GHz and 5 Ghz bands) and an mmWave band (e.g., 60 GHz).

The storage unit 1i-30 stores data, such as basic programs for operation of the UE, application programs, and setting information. The storage unit 1i-30 may also store the information on a second access node for radio communication with a second radio access technology. The storage unit 1i-30 provides the stored information in response to a request from the controller 1i-40.

The controller 1i-40 includes a multi-connectivity processor 1i-42 and controls overall operations of the UE. For example, the controller 1i-40 controls the baseband processor 1i-20 and the RF processor 1i-10 for transmitting and receiving signals. The controller 1i-40 writes and reads data to and from the storage unit 1i-30. For this purpose, the controller 1i-40 may include at least one processor. For example, the controller 1i-40 may include a communication processor (CP) for controlling communications and an application processor (AP) for controlling higher layer programs, such as applications.

Figure 1J:
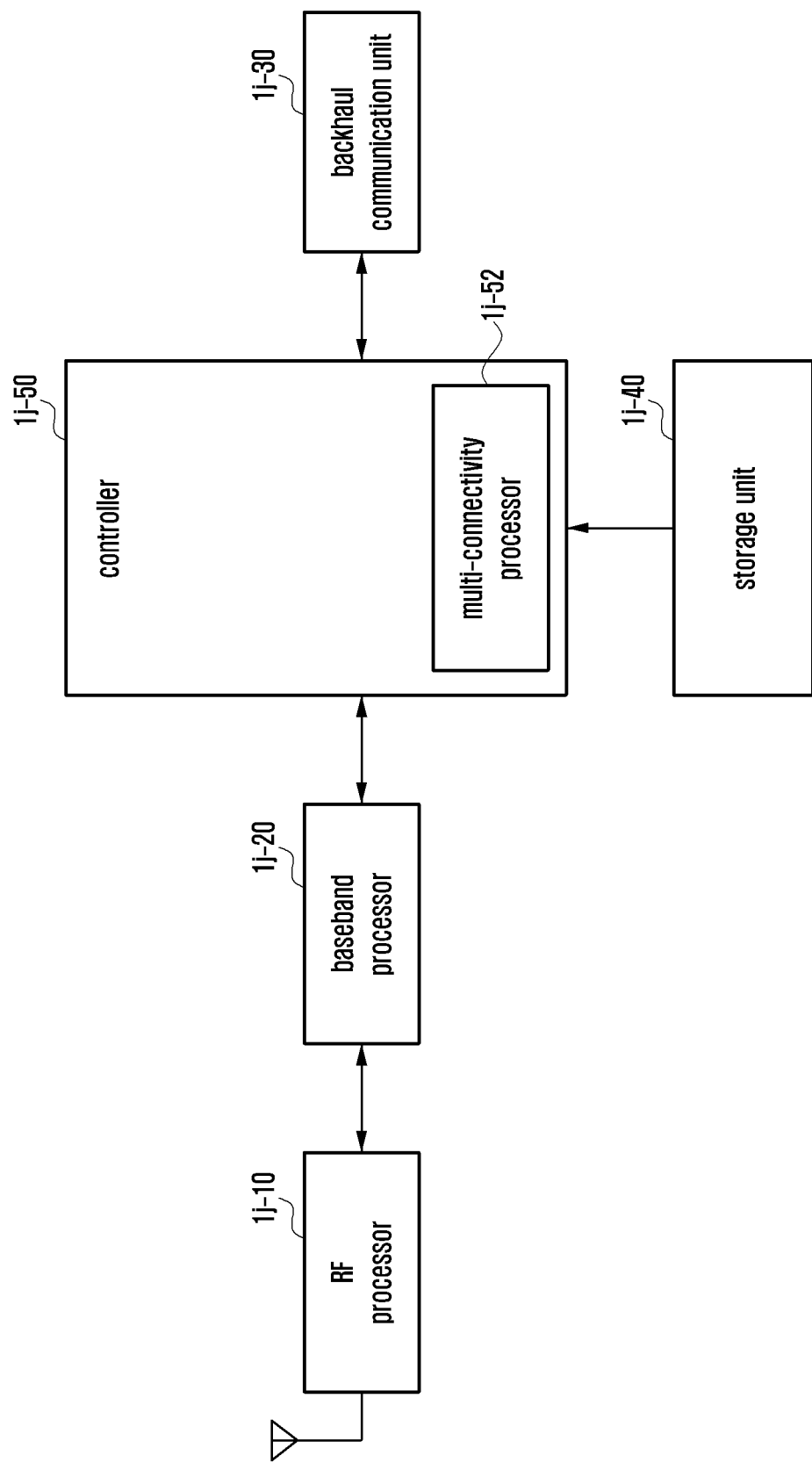
FIG. 1J is a block diagram illustrating a configuration of a new radio Node B (gNB) according to an embodiment of the disclosure.

FIG. 1J is a block diagram illustrating a configuration of a new radio Node B (gNB) according to an embodiment of the disclosure.

Referring to FIG. 1J, the gNB includes an RF processor 1j-10, a baseband processor 1j-20, a backhaul communication unit 1j-30, a storage unit 1j-40, and a controller 1j-50.

The RF processor 1j-10 has a function for transmitting/receiving a signal over a radio channel, such as band conversion and amplification of the signal. For example, the RF processor 1j-10 up-converts a baseband signal from the baseband processor 1j-20 to an RF band signal and transmits the RF signal via an antenna and down-converts the RF signal received via the antenna to a baseband signal. For example, the RF processor 1j-10 may include a transmission filter, a reception filter, an amplifier, a mixer, an oscillator, a DAC, and an ADC. Although one antenna is depicted in the drawing, the gNB may be provided with a plurality of antennas. The RF processor 1*j*-10 may also include a plurality of RF chains. The RF processor 1*i*-10 may perform beamforming. For beamforming, the RF processor 1*j*-10 may adjust the phase and size of a signal to be transmitted/received by means of the antennas or antenna elements. The RF processor 1*j*-10 may be configured to transmit one or more layers for a downlink MIMO operation.

The baseband processor 1*j*-20 has a baseband signal-bit string conversion function according to a physical layer standard of the system. For example, in a data transmission mode, the baseband processor 1*j*-20 performs encoding and modulation on the transmission bit string to generate complex symbols. In a data reception mode, the baseband processor 1*j*-20 performs demodulation and decoding on the baseband signal from the RF processor 1*j*-10 to recover the transmitted bit string. In the case of using an OFDM scheme for data transmission, the baseband processor 1*j*-20 performs encoding and modulation on the transmission bit string to generate complex symbols, maps the complex symbols to subcarriers, performs inverse IFFT on the symbols, and inserts a CP into the symbols to generate OFDM symbols. In the data reception mode, the baseband processor 1*j*-20 splits the baseband signal from the RF processor 1*j*-10 into OFDM symbols, performs FFT on the OFDM symbols to recover the signals mapped to the subcarriers, and performs demodulation and decoding on the signals to recover the transmitted bit string. The baseband processor 1*j*-20 and the RF processor 1*j*-10 process the transmission and reception signals as described above. Accordingly, the baseband processor 1*j*-20 and the RF processor 1*j*-10 may be referred to as a transmitter, a receiver, a transceiver, or a communication unit.

The backhaul communication unit 1*j*-30 provides an interface for communication with other nodes in the network. For example, the backhaul communication unit 1*j*-30 converts a bit string to be transmitted from the gNB to another node, e.g., another gNB and core network, to a physical signal and converts a physical signal received from another node to a bit string.

The storage unit 1*j*-40 stores data, such as basic programs for operation of the gNB, application programs, and setting information. The storage unit 1*j*-40 may also store the information on the bearers established for UEs and measurement results reported by the connected UEs. The storage unit 1*j*-40 may also store the information for use by a UE in determining whether to enable or disable multi-connectivity. The storage unit 1*j*-40 may provide the stored data in reference to a request from the controller 1*j*-50.

The controller 1*j*-50 includes a multi-connectivity processor 1*j*-52 and controls overall operations of the gNB. For example, the controller 1*j*-50 controls the baseband processor 1*j*-20, the RF processor 1*j*-10, and the backhaul communication unit 1*j*-30 for transmitting and receiving signals. The controller 1*j*-50 writes and reads data to and from the storage unit 1*j*-40. For this purpose, the controller 1*j*-50 may include at least one processor.

Embodiment 2

Figure 2A:
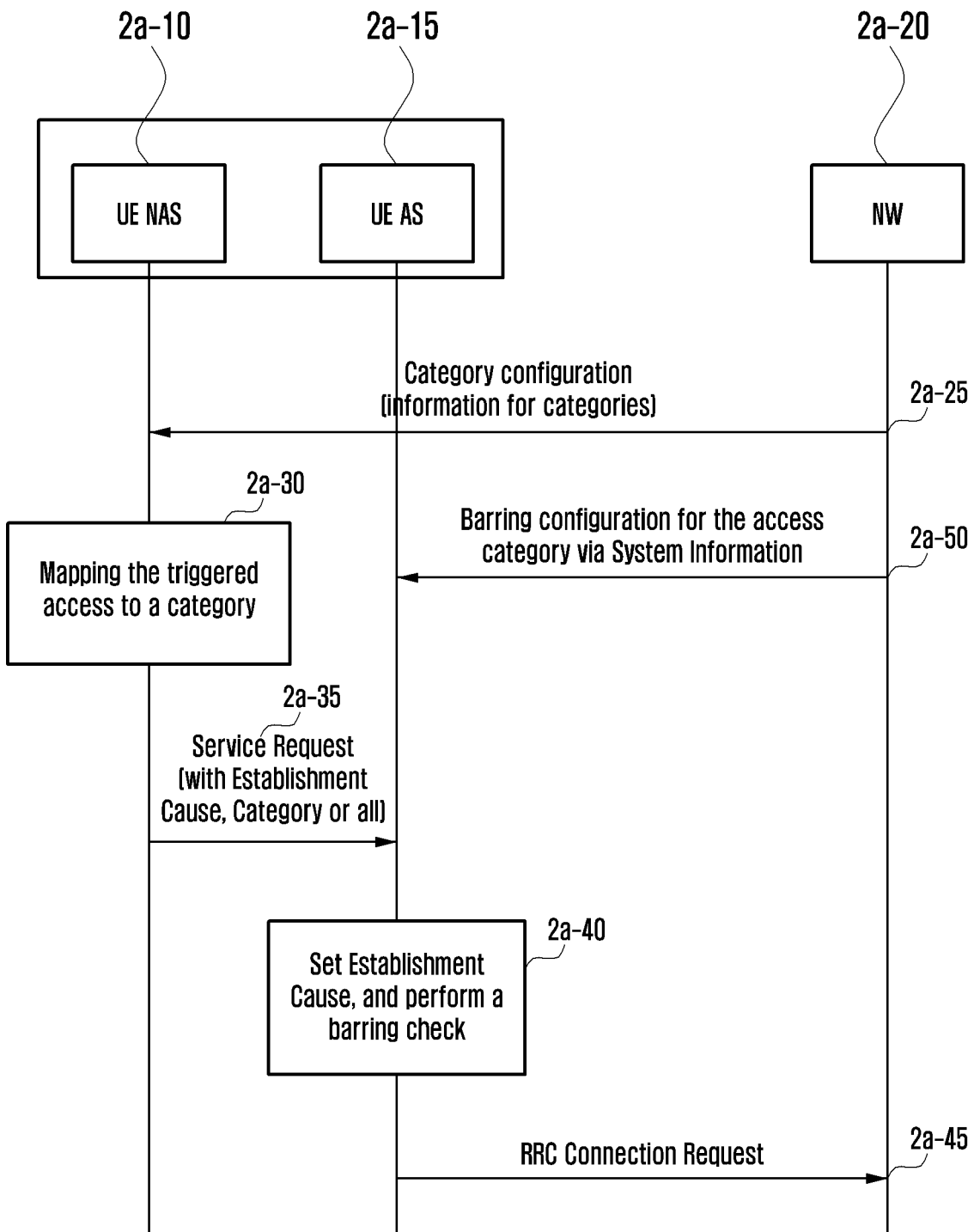
FIG. 2A is a signal flow diagram illustrating an access control procedure according to an embodiment of the disclosure.

FIG. 2A is a signal flow diagram illustrating an access control procedure according to an embodiment of the disclosure.

Referring to FIG. 2A, at operation 2*a*-25, the network 2*a*-20 transmits to the UE NAS 2*a*-10 the information on non-standardized access categories that it supports through NAS signaling or application level signaling. This information includes the mapping between categories and elements. For example, the information may include information on the mapping between categories and applications. At operation 2*a*-30, the UE maps an establishment cause value corresponding to the access to an access category. The establishment cause value is included in an initial message being transmitted to the gNB for connection request and used by the gNB in making an access barring determination. At operation 2*a*-50, the gNB transmits to the UE per-category barring configuration information via the system information. The barring configuration information is not mandatorily provided for all categories.

At operation 2*a*-35, the UE NAS notifies a UE AS 2*a*-15 of the access category mapped to the determined establishment cause value.

At operation 2*a*-40, the UE AS 2*a*-15 determines whether the access is permitted according to a predetermined rule.

If it is determined that the access is permitted, the UE AS 2*a*-15 transmits a connection request message to the gNB at operation 2*a*-45.

In the disclosure, the establishment cause values are mapped to the standardized access categories one by one. The standardized access categories are used for access barring. The standardized access categories include at least one category corresponding to "emergency" and "high priority access", and each category is used to indicate the establishment cause value. In the disclosure, the connection request message may include the standardized access category information (index value) instead of the establishment cause value. In the legacy LTE technology, the following establishment cause values are used.

emergency,
highPriorityAccess,
mt-Access,
mo-Signalling,
mo-Data,
delayTolerantAccess,
mo-VoiceCall According to an embodiment of the disclosure, the establishment cause values have standardized access categories corresponding thereto as follows:

emergency (Access Category 0),
highPriorityAccess (Access Category 1),
mt-Access (Access Category 2),
mo-Signalling (Access Category 3),
mo-Data (Access Category 4),
delayTolerantAccess (Access Category 5),
mo-VoiceCall (Access Category 6)

Embodiment 2-1

In embodiment 2-1, if there is any non-standardized access category to which the access can be mapped, the UE NAS notifies the UE AS 2*a*-15 of both the mapped non-standardized access category and standardized access category.

Figure 2B:
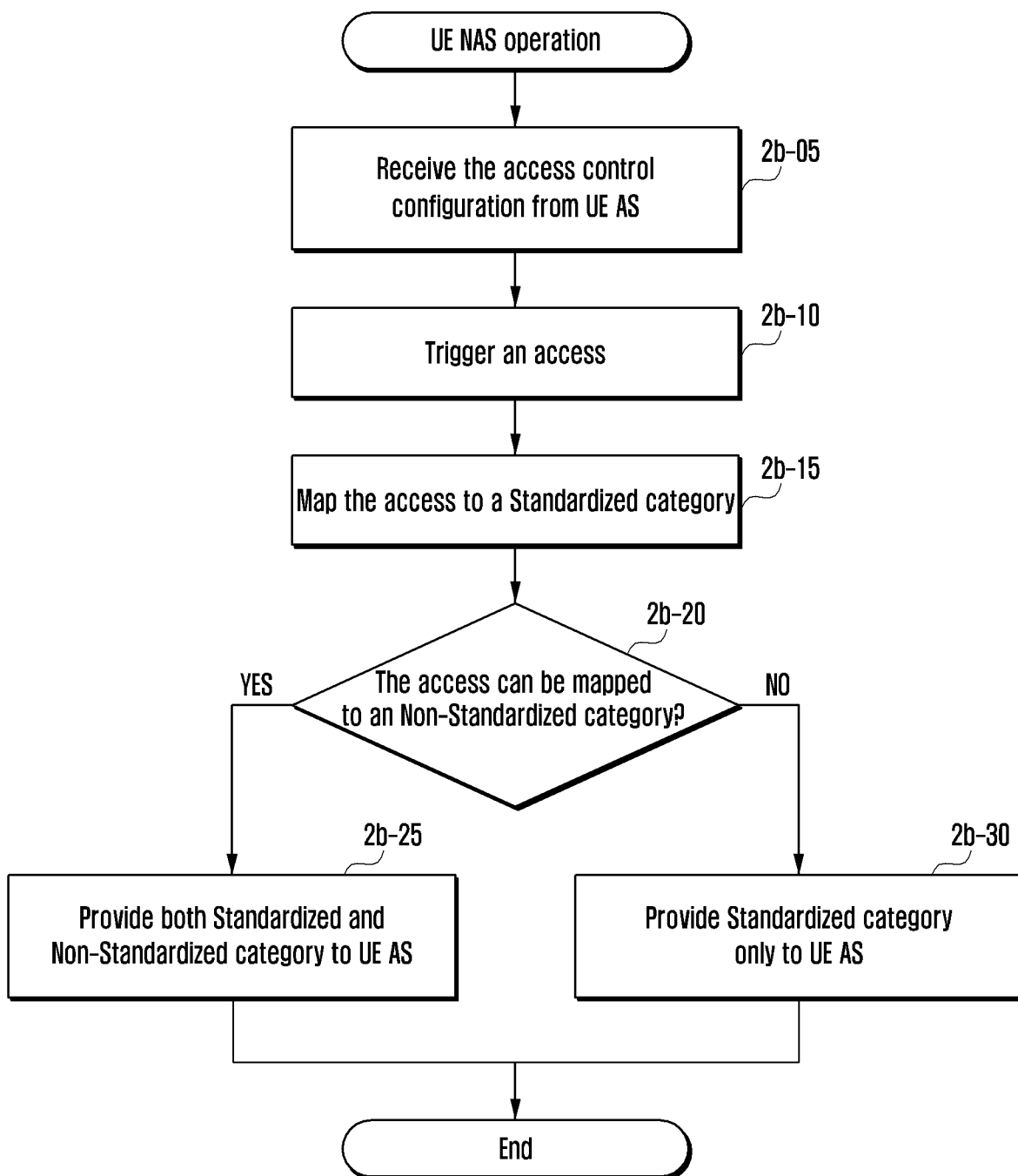
FIG. 2B is a flowchart illustrating a UE NAS operation according to embodiment 2-1 of the disclosure.

FIG. 2B is a flowchart illustrating a UE NAS operation according to embodiment 2-1 of the disclosure.

Referring to FIG. 2B, at operation 2*b*-05, the UE NAS receives information on the non-standardized access categories supportable in the network, the information being provided through NAS signaling or application level signaling. At operation 2*b*-10, the UE NAS triggers an access. At operation 2*b*-15, the UE NAS maps the access to a standardized access category. At operation 2*b*-20, the UE NAS determines whether the access can be mapped to a non-standardized access category. If the access can be mapped to a non-standardized access category, the category corresponding to the access should be included in the non-standardized access categories notified at operation 2b-05. If there is a non-standardized access category to which the access can be mapped, the UE NAS sends the UE AS a service request including both the mapped standardized access category and non-standardized access category at operation 2b-25. If there is no non-standardized access category to which the access can be mapped, the UE NAS sends the UE AS a service request including only the mapped standardized access category at operation 2b-30. If the standardized access category is sent to the UE AS, this is the same meaning as an establishment cause value being sent to the UE AS because the standardized access categories are mapped to establishment cause values one by one.

Figure 2C:
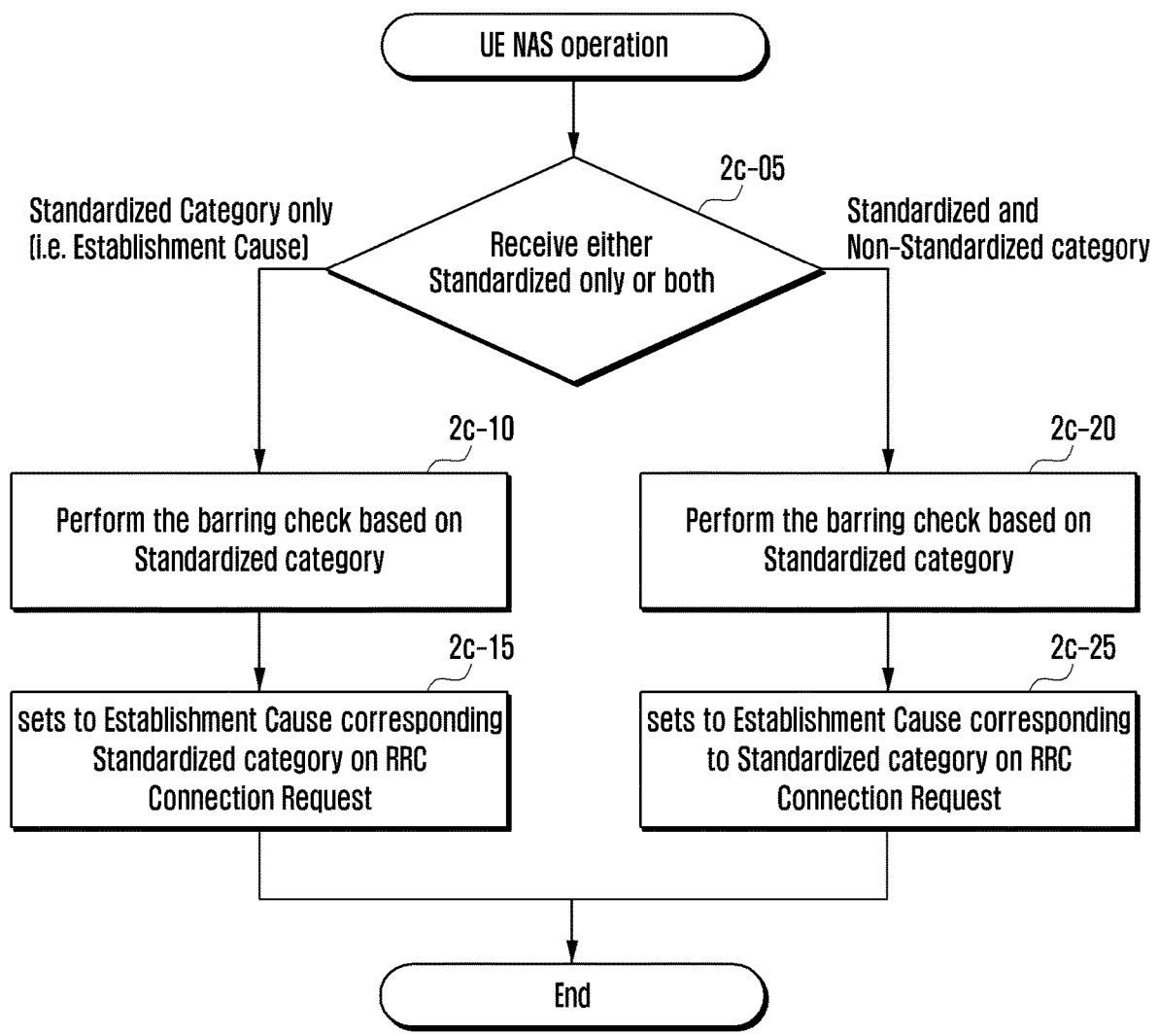
FIG. 2C is a flowchart illustrating a UE AS operation according to embodiment 2-1 of the disclosure.

FIG. 2C is a flowchart illustrating a UE AS operation according to embodiment 2-1 of the disclosure.

Referring to FIG. 2C, at operation 2c-05, the UE AS receives a service request from the UE NAS and determines whether the service request includes either a standardized access category (or establishment cause value) or both the standardized access category and non-standardized access category. If it is determined that the service request includes only the standardized access category, the UE AS determines at operation 2c-10 whether the access to the requested service is to be permitted based on only the barring configuration information corresponding to the standardized access category. If it is determined that the access is to be permitted, the UE AS transmits an RRC Connection Request message to the gNB. If the barring configuration information corresponding to the standardized access category is not included the system information broadcast by the gNB, the UE AS assumes that the access is permitted. At operation 2c-15, the UE AS includes the standardized access category value (index value) or the establishment cause value corresponding to the standardized access category in the RRC Connection Request message, which is transmitted to the gNB. If it is determined that the service request includes both the standardized access category and the non-standardized access category, the UE AS determines at operation 2c-20 whether the access to the requested service is to be permitted first based on the barring configuration information corresponding to the non-standardized access category. If the barring configuration information corresponding to the non-standardized access category is not included in the system information broadcast by the gNB, the UE AS determines whether the access is to be permitted based on the barring configuration information corresponding to the standardized access category. If neither the barring configuration information corresponding to the non-standardized access category nor the barring configuration information corresponding to the standardized access category is included in the system information broadcast by the gNB, the UE AS assumes that the access is permitted. At operation 2c-25, the UE AS includes the standardized category value (index value) or the establishment cause value corresponding to the standardized access category in the RRC Connection Request message, which is transmitted to the gNB.

Embodiment 2-2

In embodiment 2-2, if there is any non-standardized access category to which the access can be mapped, the UE NAS notifies the UE AS of only the mapped non-standardized access category.

Figure 2D:
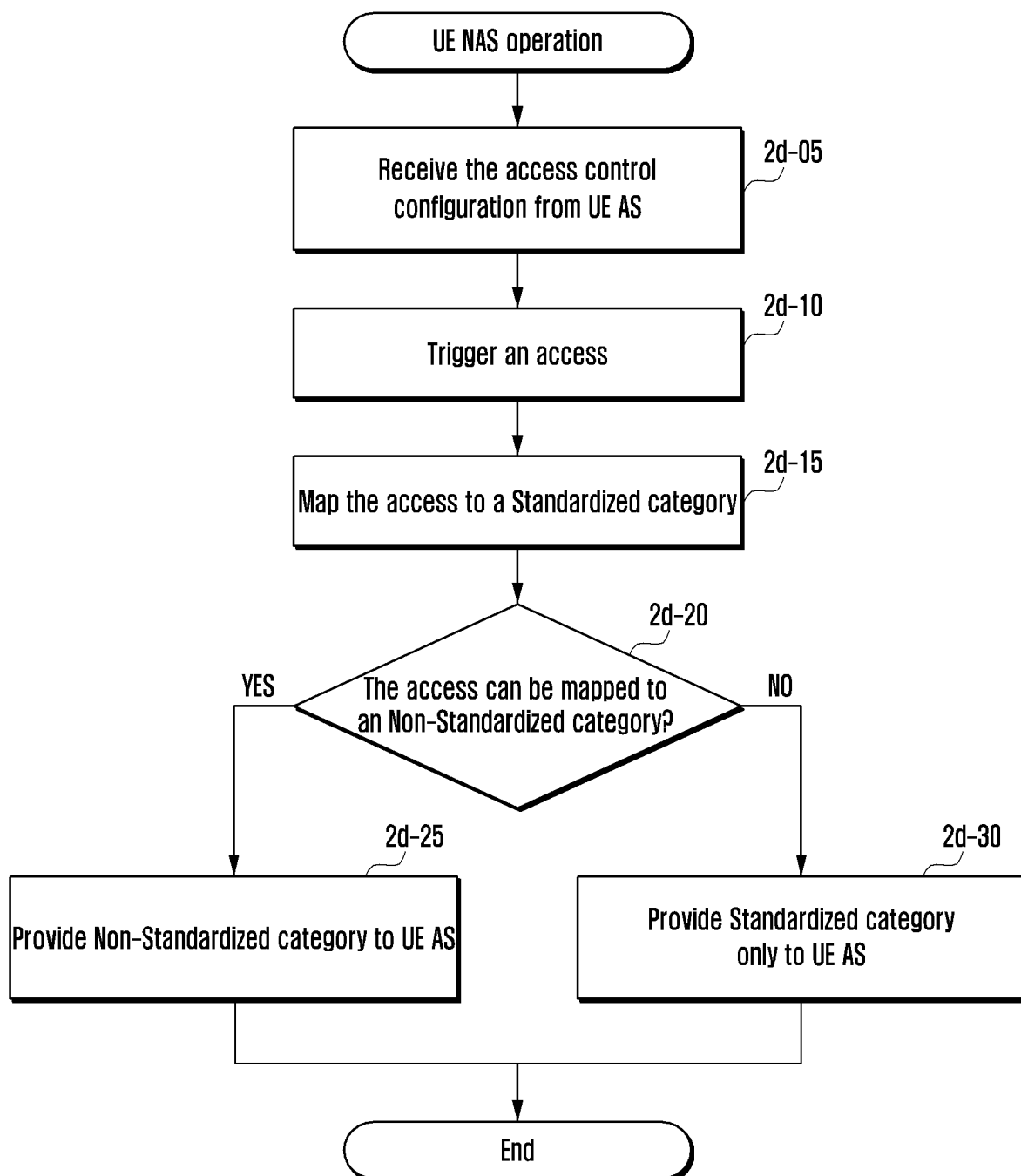
FIG. 2D is a flowchart illustrating a UE NAS operation according to embodiment 2-2 of the disclosure.

FIG. 2D is a flowchart illustrating a UE NAS operation according to embodiment 2-2 of the disclosure.

Referring to FIG. 2D, at operation 2d-05, the UE NAS receives information on the non-standardized access categories supportable in the network, the information being provided through NAS signaling or application level signaling. At operation 2d-10, the UE NAS triggers an access. At operation 2d-15, the UE NAS maps the access to a standardized access category. At operation 2d-20, the UE NAS determines whether the access can be mapped to a non-standardized access category. If the access can be mapped to a non-standardized access category, the category corresponding to the access should be included in the non-standardized access categories provided at operation 2d-05. If there is a non-standardized access category to which the access can be mapped, the UE NAS sends the UE AS a service request including the mapped non-standardized access category at operation 2d-25. If there is no non-standardized access category to which the access can be mapped, the UE NAS sends the UE AS a service request including the mapped standardized access category, at operation 2d-30. If the standardized access category is sent to the UE AS, this is the same meaning as an establishment cause value being sent to the UE AS because the standardized access categories are mapped to establishment cause values one by one.

Figure 2E:
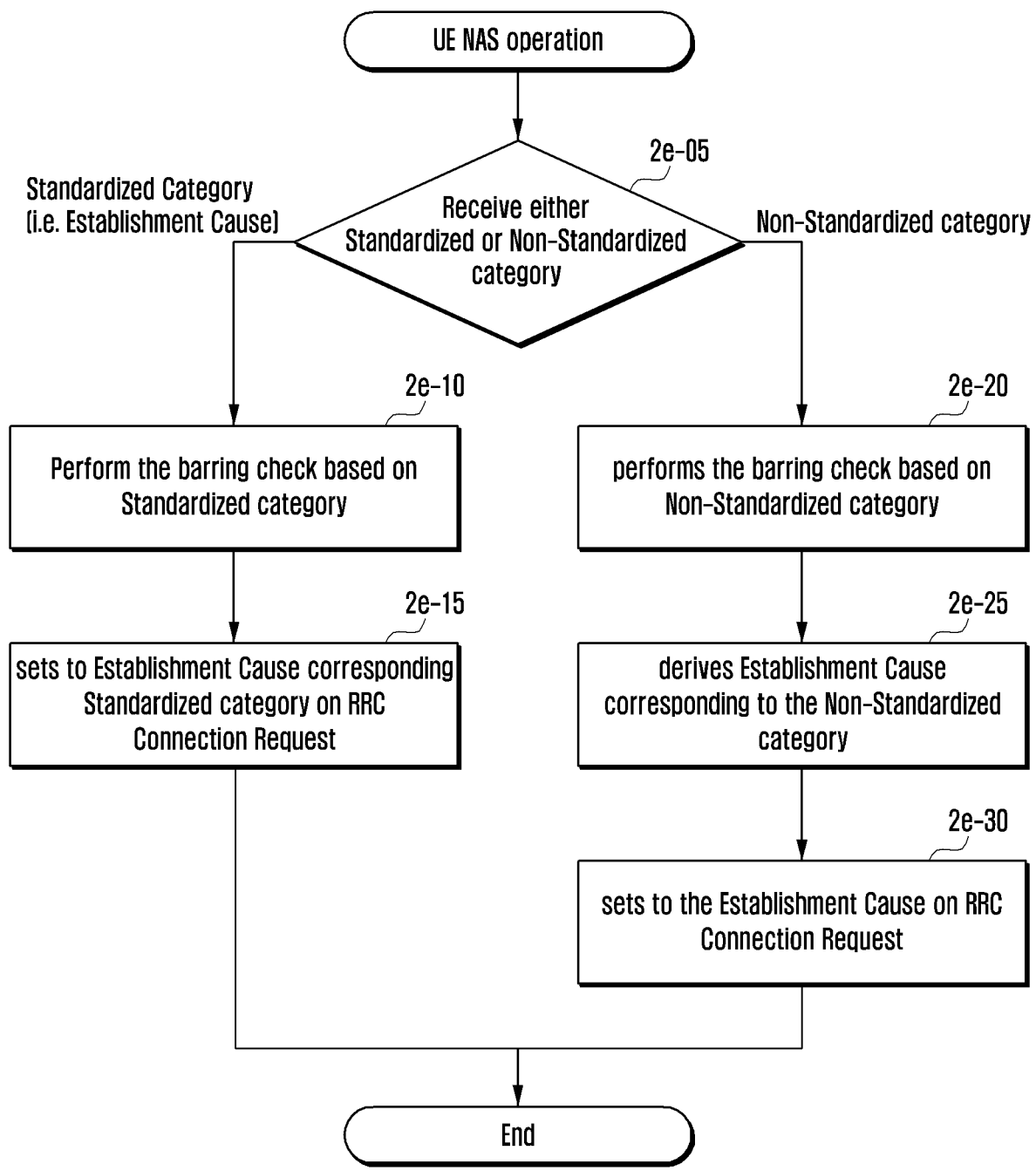
FIG. 2E is a flowchart illustrating a UE AS operation according to embodiment 2-2 of the disclosure.

FIG. 2E is a flowchart illustrating a UE AS operation according to embodiment 2-2 of the disclosure.

Referring to FIG. 2E, at operation 2e-05, the UE AS receives a service request from the UE NAS and determines whether the service request includes either a standardized access category (or establishment cause value) or a non-standardized access category. If it is determined that the service request includes only the standardized access category, the UE AS determines at operation 2e-10 whether the access to the requested service is to be permitted based on only the barring configuration information corresponding to the standardized access category. If it is determined that the access is to be permitted, the UE AS transmits an RRC Connection Request message to the gNB. If the barring configuration information corresponding to the standardized access category is not included in the system information broadcast by the gNB, the UE AS assumes that the access is permitted. At operation 2e-15, the UE AS includes the standardized access category value (index value) or the establishment cause value corresponding to the standardized access category in the RRC Connection Request message, which is transmitted to the gNB. If it is determined that the service request includes only the non-standardized access category, the UE AS determines at operation 2e-20 whether the access to the requested service is to be permitted based on the barring configuration information corresponding to the non-standardized access category. If the barring configuration information corresponding to the non-standardized access category is not included in the system information broadcast by the gNB, the UE AS determines whether the access is to be permitted based on the barring configuration information corresponding to the standardized access category. At operation 2e-25, the UE AS has to determine a suitable standardized access category autonomously based on the non-standardized access category because the UE NAS has not notified any standardized access category. If neither the barring configuration information corresponding to the non-standardized access category nor the barring configuration information corresponding to the standardized access category is included in the system information broadcast by the gNB, the UE AS assumes that the access is permitted. At operation 2c-30, the UE AS includes the standardized category value (index value) or the establishment cause value corresponding to the standardized access category in the RRC Connection Request message, which is transmitted to the gNB.

Figure 2F:
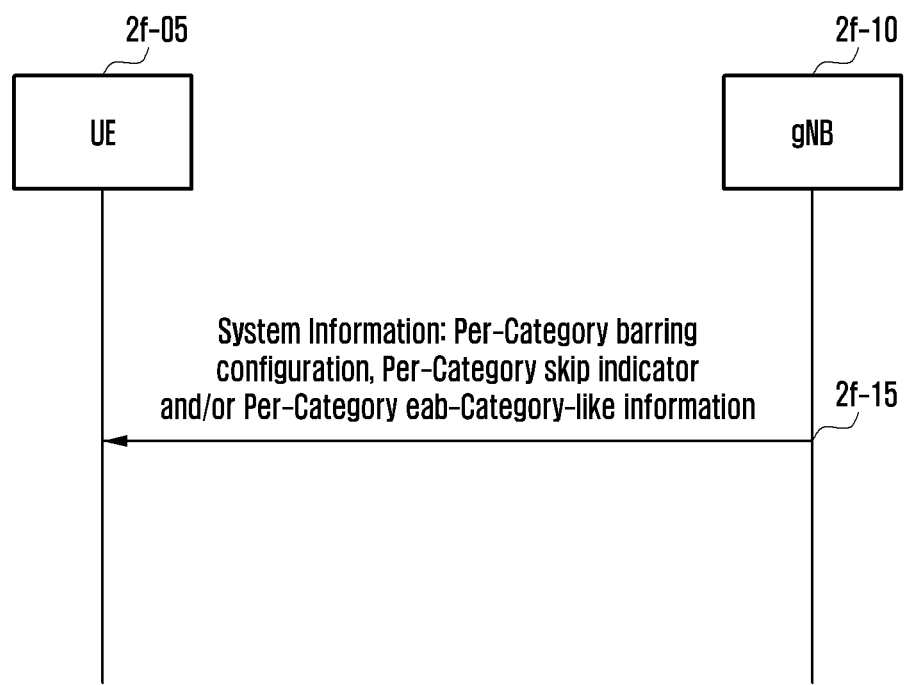
FIG. 2F is a signal flow diagram for a network to provide a UE with various types of barring configuration information for access control according to an embodiment of the disclosure.

FIG. 2F is a signal flow diagram for a network to provide a UE with various types of barring configuration information for access control according to an embodiment of the disclosure.

Referring to FIG. 2F, the gNB 2f-10 transmits the barring configuration information to the UE 2f-05 using system information at operation 2f-15. The disclosure proposes a method for configuring the barring configuration information efficiently. As described above, the barring configuration information may be provided per access category. Here, the barring configuration information of an access category corresponding to "emergency" has a BOOLEAN format. For example, 1-bit information is used to indicate whether the access to the emergency service is permitted. The barring configuration information of an access category corresponding to "high priority access" has a BOOLEAN or bitmap format. The "high priority access" denotes mobile communication operator-exclusive or public office-exclusive access. In the case where there may be multiple types of exclusive links, the bitmap format is used to indicate whether each of the exclusive links are allowed for access. For example, it may be possible to use a 5-bit bitmap of which the first bit indicates whether the mobile communication operator-exclusive link is permitted for access and the second bit indicates whether the police-exclusive link is permitted for access. The information carried by a predetermined bit of the bitmap may be valid only in a specific country or PLMN. For example, the first and last bits of the 5-bit bitmap may be valid in home-PLMN/equivalent-PLMN (HPLMN/EPLMN), and the second, third, and fourth bits of the 5-bit bitmap may be valid in the home country. It may be possible to provide the bitmap information indicating whether access to the "high priority access" service is permitted per category. For example, it may be possible to include the bitmap information in per-category barring configuration information to indicate whether the access to the "high priority access" service is permitted per category.

The barring configuration information corresponding to the standardized and non-standardized access categories includes an ac-BarringFactor IE and an ac-Barringtime IE. The ac-BarringFactor $\alpha$ has a value in the range of $0 \leq \alpha < 1$. The UE AS 1c-15 draws a random value of rand in the range of $0 \leq rand < 1$; if the random value is less than the ac-BarringFactor, it is assumed that the access is not barred, and, if not, it is assumed that the access is barred. If it is determined that the access is barred, the UE AS delays the access attempt for a duration drawn with a predetermined equation. For example, the delay duration may be calculated according to the following equation.

"Tbarring"=(0.7+0.6*rand)*ac-BarringTime.

In the disclosure, if the mobile communication operator wants to permit 100% access to a service belonging to a specific standardized access category, all that is needed is to not provide the barring configuration information corresponding to the category.

The mobile communication operator may want to permit 100% access to a service belonging to a specific non-standardized access category. However, although the barring configuration information corresponding to the category is not provided as in the case of the standardized access category, the access barring check is performed first with the barring configuration information corresponding to standardized access category in the disclosure. Accordingly, it is difficult to permit 100% access as intended. Thus, there is a need of an indicator indicating whether the access associated with a specific non-standardized access category is permitted 100%. The disclosure proposes a 1-bit indicator indicating whether to skip the barring check for a category in the barring configuration information of the corresponding category.

In the LTE Rel-11 EAB technique, the barring configuration information for an MTC device is applicable for a specific UE group. Table 1 shows a related-ASN.1 taken from the 3GPP TS36.331.

TABLE 1

| EAB-Config-r11 ::= | SEQUENCE { |
| eab-Category-r11 | ENUMERATED {a, b, c}, |
| eab-BarringBitmap-r11 | BIT STRING(SIZE (10)) |

In Table 1, eab-Category indicates the category of UEs for which EAB applies. Value a corresponds to all UEs, value b corresponds to the UEs that are neither in their HPLMN nor in a PLMN that is equivalent to it, and value c corresponds to the UEs that are neither in the PLMN listed as most preferred PLMN of the country where the UEs are roaming in the operator-defined PLMN selector list on the USIM nor in their HPLMN nor in a PLMN that is equivalent to their HPLMN, see TS 22.011 [10].

The eab-Category IE is used to make indications for three categorized groups to which barring configuration information is applied. In the next generation mobile communication system, the barring configuration information may be applied per access category in a similar manner. In the disclosure, the access category-specific barring configuration information includes the information indicating a group of UEs to which the configuration information applies. The UEs may be divided into three groups.

1) Group 1: all UEs
2) Group 2: UEs that are neither in their HPLMN nor in a PLMN that is equivalent to it
3) Group 3: UEs that are neither in the PLMN listed as most preferred PLMN of the country where the UEs are roaming in the operator-defined PLMN selector list on the USIM nor in their HPLMN nor in a PLMN that is equivalent to their HPLMN Embodiment 3

Figure 3A:
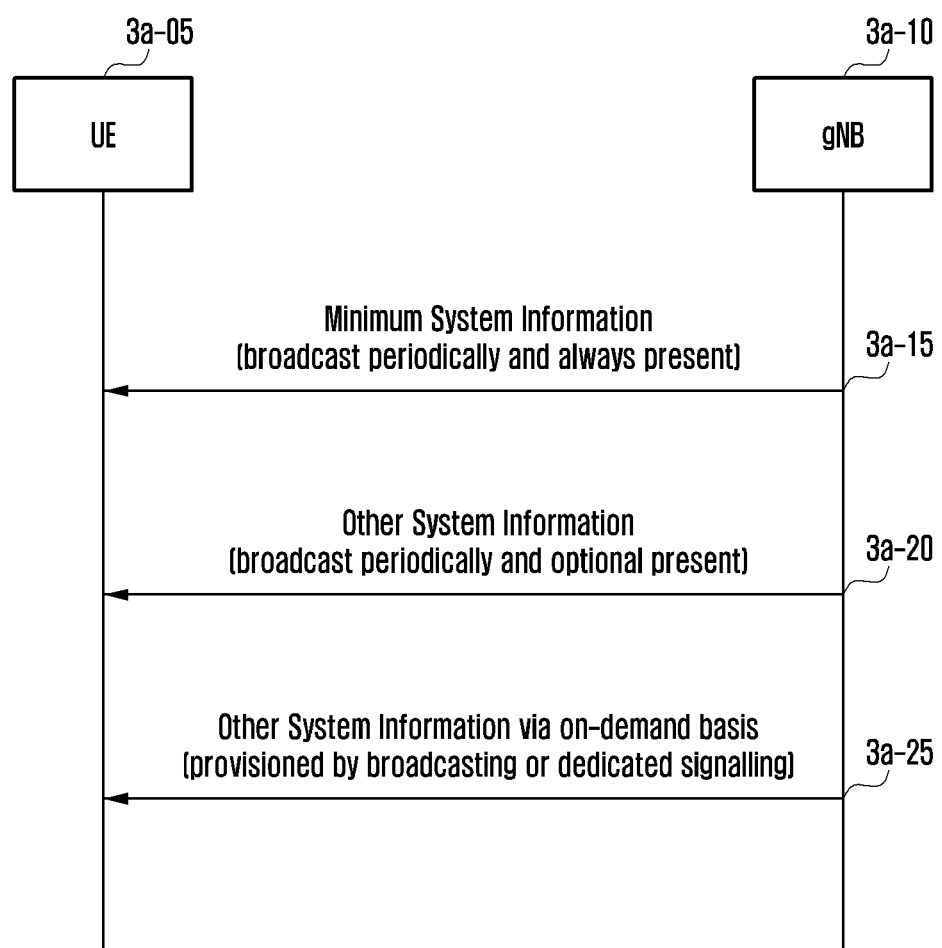
FIG. 3A is a signal flow diagram illustrating a procedure for providing system information in a next generation mobile communication system according to an embodiment of disclosure.

FIG. 3A is a signal flow diagram illustrating a procedure for providing system information in a next generation mobile communication system.

Referring to FIG. 3A, in the next generation mobile communication system, the system information broadcasted by a gNB 3a-10 is divided into minimum system information (SI) and other SI. The gNB 3a-10 broadcasts the minimum SI periodically at operation 3a-15, the minimum SI including configuration information necessary for initial access and SI scheduling information necessary for the UE 3a-05 to receive the other SI that is broadcasted periodically or in response to a request. Typically, the other SI includes entire configuration information that is not included in the minimum SI. The other SI is broadcast periodically or in response to a request from the UE 3a-05 at operation 3a-20 or transmitted to the UE 3a-05 through dedicated signaling at operation 3a-25. In the case where the other SI is transmitted in response to a request from the UE 3a-05, it is necessary for the UE 3a-05 to determine whether the other SI is valid in the serving cell or being broadcast (in response to a request from another UE). Such a determination can be made based on specific information included in the minimum SI. A UE in an idle mode (RRC_IDLE) or an INACTIVE mode (RRC_INACTIVE) may request for the other SI without RRC state transition. The UE in connected mode (RRC_CONNECTED) may request for and receive the other SI through dedicated RRC signaling. The other SI is broadcast during a period at a predetermined interval. Public warning system (PWS) information is provided as part of the other SI. Whether the other SI is broadcast or transmitted to the UE through RRC signaling is determined depending on the network implementation.

Figure 3B:
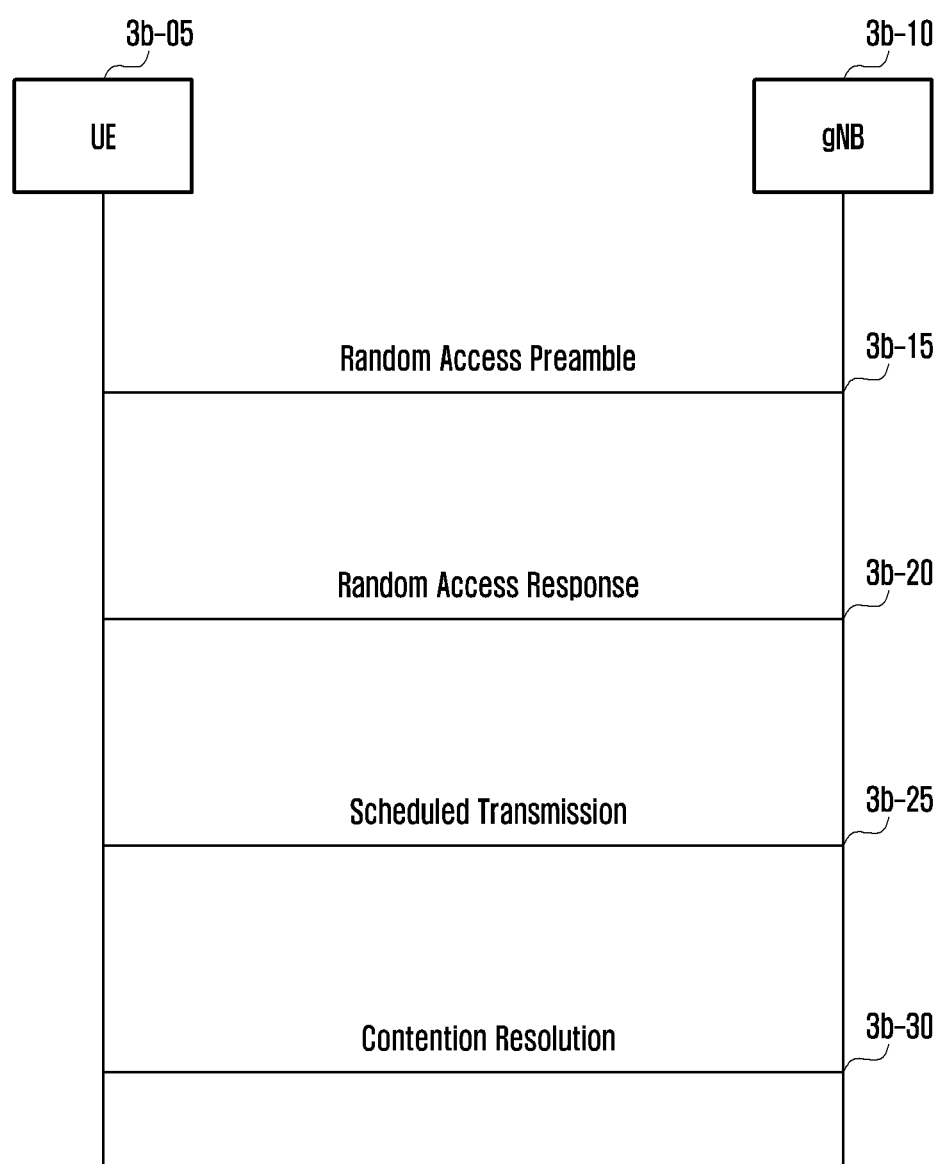
FIG. 3B is a signal flow diagram illustrating a random access procedure in a legacy LTE system according to an embodiment of disclosure.

FIG. 3B is a signal flow diagram illustrating a random access procedure in a legacy LTE system.

Referring to FIG. 3B, the random access is performed to achieve uplink synchronization and transmit data to the network. The random access may be performed for mode transition from the idle mode to the connected mode, RRC reestablishment, handover, and uplink/downlink data transmission. If the UE 3b-05 receives a dedicated preamble from the gNB 3b-10, it performs the random access procedure by transmitting the dedicated preamble to the gNB 3b-10. Otherwise, the UE 3b-05 selects one of two preamble groups and then randomly selects a preamble from the selected group. The two groups are referred to as group A and group B. If the channel quality status is greater than a threshold value and if the size of msg3 is greater than a threshold value, the UE 3b-05 selects a preamble from group A; if these conditions are not fulfilled, the UE 3b-05 selects a preamble from group B. The UE 3b-05 transmits the selected preamble in the $n^{th}$ subframe at operation 3b-15. If the preamble is transmitted in the $n^{th}$ subframe, a random access response (RAR) window starts from the $(n+3)^{th}$ subframe such that the UE 3b-05 monitors the RAR window to receive an RAR at operation 3b-20. The RAR scheduling information may be indicated with a random access radio network temporary identifier (RA-RNTI) of physical downlink control channel (PDCCH). The RA-RNTI is derived based on the radio resource position in the time and frequency domains that is used for preamble transmission. The RAR includes a Timing Advance Command, a UL grant, and a temporary cell RNTI (C-RNTI). If the RAR is received successfully within the RAR window, the UE 3b-05 transmits an msg3, at operation 3b-25, based on the information contained in the UL grant included in the RAR. The msg3 includes different information depending on the purpose of the random access. Table 2 exemplifies the information that can be included in the msg3.

TABLE 2

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |

TABLE 2-continued

| CASE | Message 3 Contents |
| --- | --- |
| PDCCH order (dedicate preamble) | BSR, PHR, (part of) DCCH/DTCH SDU |

If the RAR is received in the $n^{th}$ subframe, the UE 3b-05 transmits the msg3 in the $(n+6)^{th}$ subframe. A hybrid automatic repeat request (HARQ) process starts from the msg3. Upon transmitting the msg3, the UE 3b-05 starts a predetermined timer and monitors to receive a contention resolution (CR) message at operation 3b-30 until the timer expires. The CR message may include an RRC Connection Setup or RRC Connection Reestablishment message, depending on the purpose of the random access, in addition to a CR media access control (MAC) control element (CE).

Figure 3C:
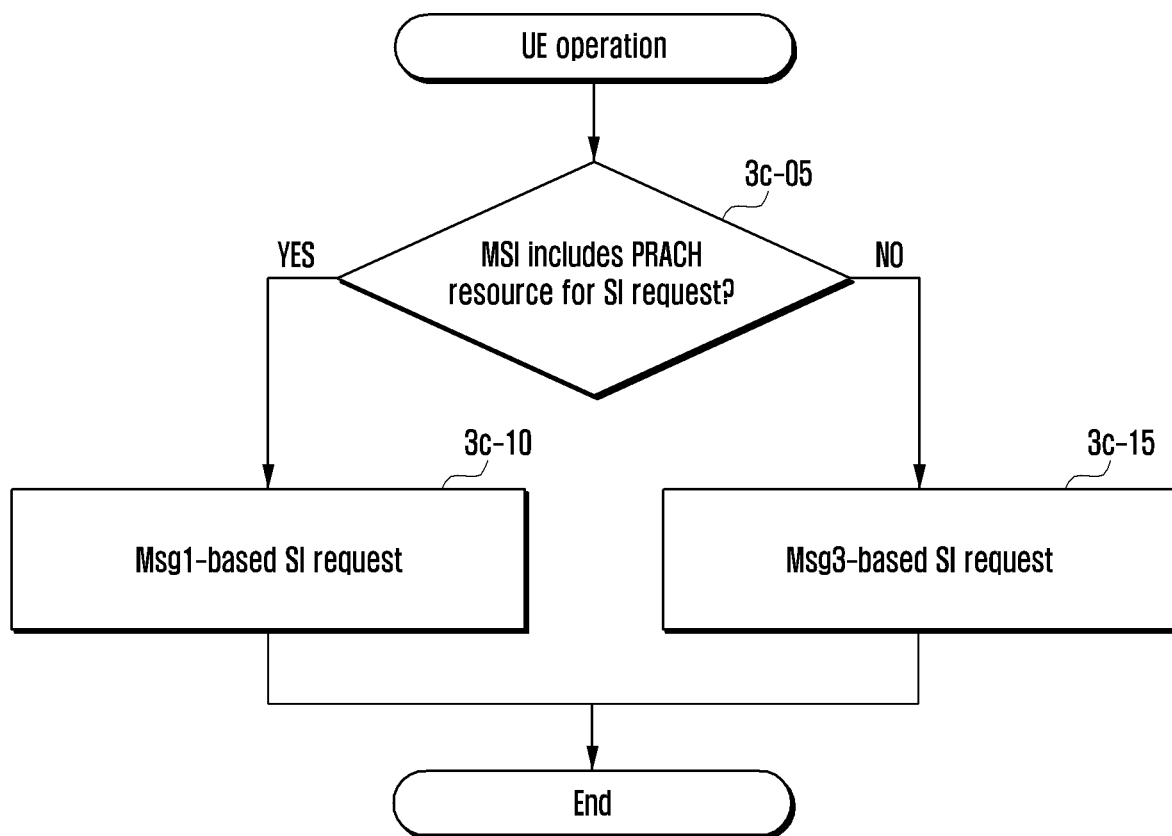
FIG. 3C is a flowchart illustrating a procedure for selecting one of msg1-based system information (SI) request method and msg3-based SI request message according to an embodiment of the disclosure.

FIG. 3C is a flowchart illustrating a procedure for selecting one of an msg1-based system information (SI) request method and an msg3-based SI request message according to an embodiment of the disclosure.

Referring to FIG. 3C, in order to request for the other SI, a UE performs a random access procedure. The UE may request to the network for required system information using an msg1 (preamble) or an msg3. At operation 3c-05, the UE determines whether the minimum SI that is periodically broadcast by a gNB includes information on physical random access channel (PRACH) resources for use in requesting the SI. The PRACH resource information may include a preamble ID (index) (prach-ConfigIndex) for use in requesting for the SI and information on the radio resources for use in transmitting the preamble. If it is determined that the minimum SI includes the PRACH resource information, the UE may request for the other SI, using the msg1 dedicated for an SI request, at operation 3c-10. If it is determined that the minimum SI includes no PRACH resource information, the UE may request for the other SI, using the msg3, at operation 3c-15. In order to request for the SI, a new RRC message is defined.

Embodiment 3-1

In embodiment 3-1, if a service request is triggered before a predetermined time point during a random access procedure of a UE to request to a gNB for system information, the UE transmits an RRC Connection Request or RRC Connection Resume Request message indicating the system information, the RRC Connection Request or RRC Connection Resume Request message being used for the service request. In this case, it is not necessary to define a new RRC message for the system information request.

Figure 3D:
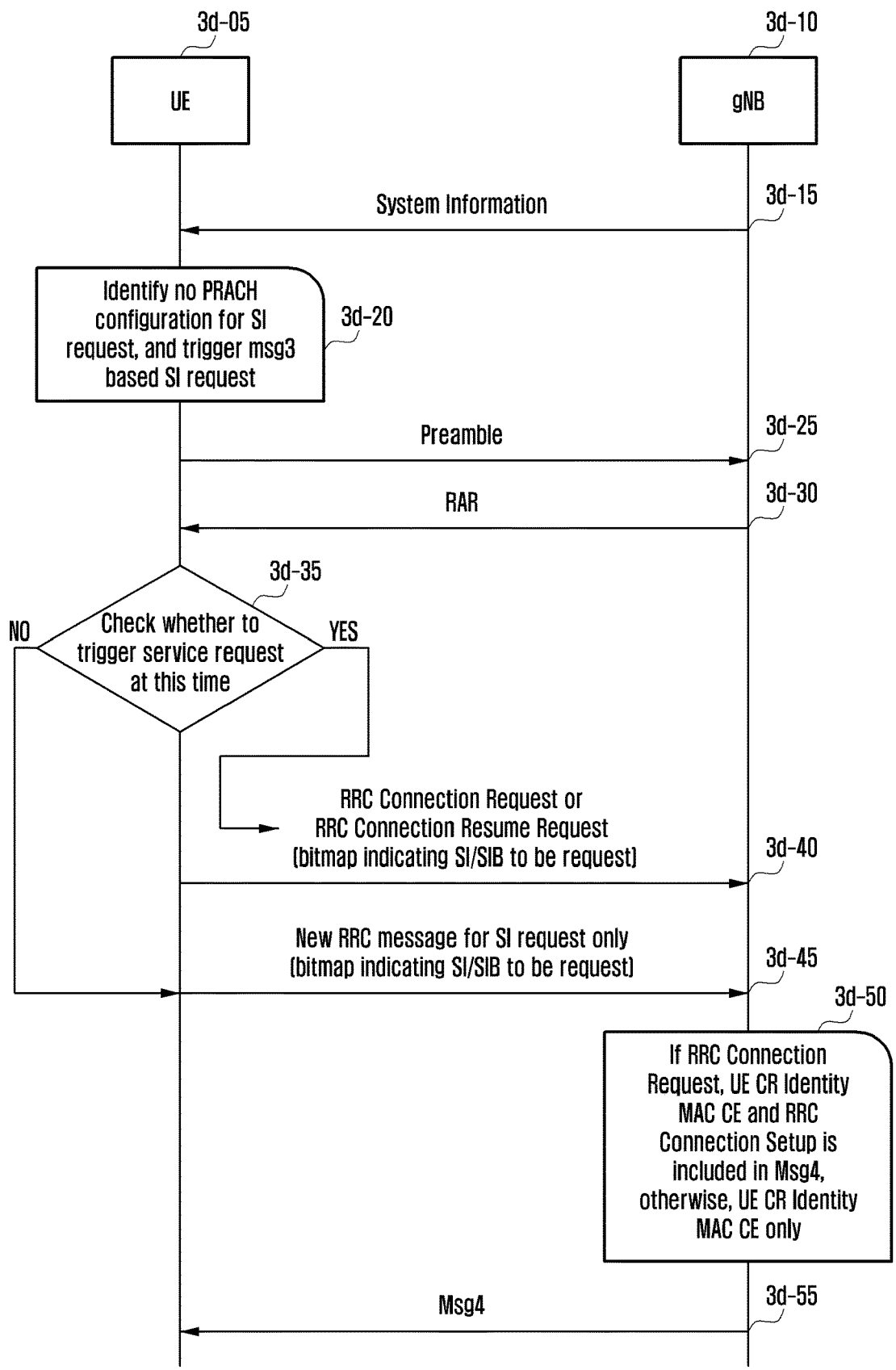
FIG. 3D is a signal flow diagram illustrating a service request processing procedure in a course of requesting for system information according to embodiment 3-1 of the disclosure.

FIG. 3D is a signal flow diagram illustrating a service request processing procedure in a course of requesting for system information according to embodiment 3-1 of the disclosure.

Referring to FIG. 3D, the UE 3d-05 receives system information from the gNB 3d-10 at operation 3d-15. The system information may include random access configuration information necessary for an msg1-based SI request. If the system information does not include the random access configuration information necessary for the msg1-based SI request, the UE 3d-05 triggers an msg3-based SI request at operation 3d-20. The UE 3d-05 triggers a random access procedure for the purpose of an SI request by transmitting a preamble at operation 3d-25. The UE 3d-05 receives an RAR from the gNB 1d-10 at operation 3d-30 and transmits to the gNB 3d-10 an RRC message using the msg3 at operation 3d-45, the RRC message being newly defined for the SI request. The UE 3d-05 may trigger a service request before transmitting the msg3 during the random access procedure at operation 3d-35. The service request may be triggered by the UE NAS in the IDLE mode or the UE AS in the INACTIVE mode. At operation 3d-40, the UE transmits the msg3 carrying the RRC Connection Request message in the IDLE mode or the RRC Connection Resume Request message in the INACTIVE mode, the RRC Connection Request or RRC Connection Resume Request message including an indicator indicating the requested system information (i.e., SI message or SIB) instead of the new RRC message defined for a system information request.

If the gNB 3d-10 receives the RRC Connection Request message from the UE 3d-05, it generates an msg4 including the UE CR Identity MAC CE and RRC Connection Setup message at operation 3d-50.

If the gNB 3d-10 receives the RRC Connection Resume Request message from the UE 3d-05, it generates an msg4 including the UE CR Identity MAC CE and RRC Connection Resume message at operation 3d-50.

If the gNB 3d-10 receives the new RRC message defined for a system information request from the UE 3d-05, it generates an msg4 including the UE CR Identity MAC CE at operation 3d-50.

The gNB 3d-10 transmits the msg4 to the UE 3d-05 at operation 3d-55.

If the gNB 3d-10 receives one of the new RRC messages defined for an SI request, RRC Connection Request, or RRC Connection Resume Request message including the indicator indicating the requested system information from the UE 3d-05, it transmits to the UE 3d-05 the system information indicated by the indicator as scheduled. The scheduling information is provided to the gNB 3d-10 in advance via the minimum SI.

In the case where the service request is triggered after transmitting the msg3 carrying the system information request message, the UE 3d-05 triggers a separate random access procedure for processing the access corresponding to the service request. If the random access procedure for the service request is in progress, the UE 3d-05 may request for the system information by transmitting the msg3 carrying the RRC Connection Request message in the IDLE mode or the RRC Connection Resume Request message in the INACTIVE mode, the RRC messages including an indicator indicating the request system information, i.e., SI message or SIB.

Embodiment 3-2

In embodiment 3-2, if a service request is triggered before a predetermined time point during a random access procedure for a UE to request to a gNB for system information, the UE processes the service request preferentially. Typically, the configuration information necessary for access to the network is included in the minimum SI. Accordingly, it is possible to perform the random access procedure without the other SI being requested as above. In addition, it is preferable to process the service request preferentially rather than system information acquisition in view of the user. Although the random access procedure is performed to request for system information, the msg3 carries the RRC Connection Request or RRC Connection Resume Request message for a service request. The UE suspends the system information request and, if the service request is processed completely, resumes the system information request.

Figure 3E:
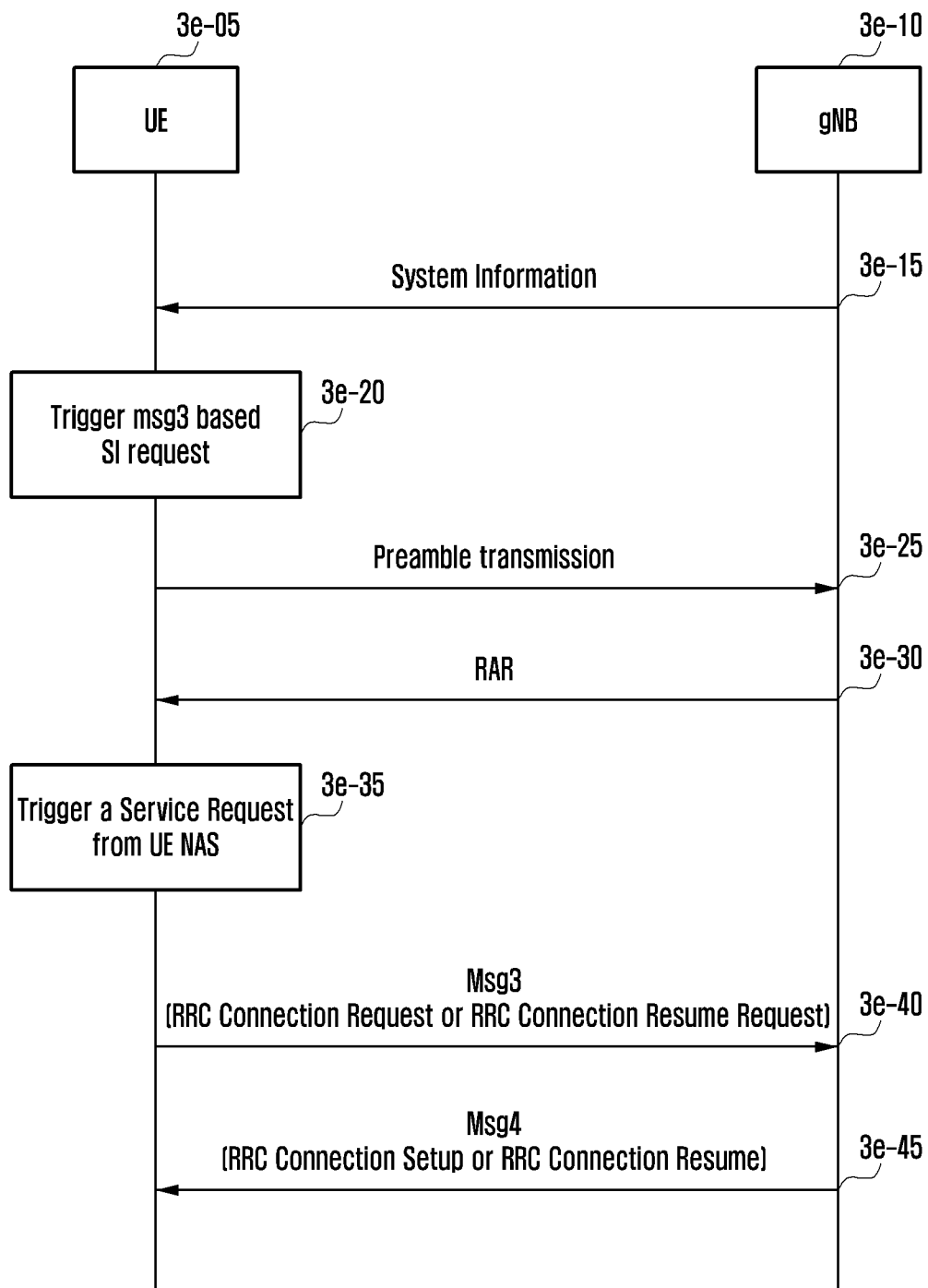
FIG. 3E is a signal flow diagram illustrating a procedure for processing a service request in a course of requesting for system information according to embodiment 3-2 of the disclosure.

FIG. 3E is a signal flow diagram illustrating a procedure for processing a service request in a course of requesting for system information according to embodiment 3-2 of the disclosure.

Referring to FIG. 3E, the UE 3e-05 receives system information from the gNB 3e-10 at operation 3e-15. The system information may include random access configuration information necessary for an msg1-based SI request. If the system information does not include the random access configuration information necessary for an msg1-based SI request, the UE 3e-05 triggers an msg3-based SI request at operation 3e-20. The UE 3e-05 triggers a random access procedure for the purpose of an SI request by transmitting a preamble at operation 3e-25. The UE 3e-05 receives an RAR from the gNB 1e-10 at operation 3e-30. The UE 3e-05 transmits to the gNB 3e-10 an RRC message including an indicator indicating the requested SI based on the UL grant included in the RAR via the msg3. The UE 3e-05 may trigger a service request before transmitting the msg3 during the random access procedure. The service request may be triggered by the UE NAS in the IDLE mode or the UE AS in the INACTIVE mode at operation 3e-35. At operation 3e-40, UE transmits the msg3 carrying the RRC Connection Request message in the IDLE mode or the RRC Connection Resume Request message in the INACTIVE mode instead of the new RRC message defined for a system information request.

If the gNB 3e-10 receives the RRC Connection Request message from the UE 3e-05, it generates an msg4 including the UE CR Identity MAC CE and RRC Connection Setup message.

If the gNB 3e-10 receives the RRC Connection Resume Request message from the UE 3e-05, it generates an msg4 including the UE CR Identity MAC CE and RRC Connection Resume message.

The gNB 3e-10 transmits the msg4 to the UE 3e-05 at operation 3d-45.

In the case where the service request is triggered after transmitting the msg3 carrying the system information request message, the UE 3e-05 triggers a separate random access procedure for processing the access corresponding to the service request. If the random access procedure for the service request is in progress, the UE 3e-05 does not request for system information According to another embodiment of the disclosure, it may be possible for the gNB to transmit configuration information to the UE such that the UE selects, when a service request is triggered before a predetermined time point during a random access procedure for a UE to request to a gNB for system information, one of the system information request and the service request to process preferentially. In order to accomplish this, the gNB may configure a 1-bit indicator indicating the request to be processed preferentially in the minimum SI.

Fourth Embodiment

Detailed descriptions of well-known functions and structures incorporated herein may be omitted to avoid obscuring the subject matter of the disclosure. Description of embodiments of the disclosure are described with reference to the accompanying drawings.

Figure 4A:
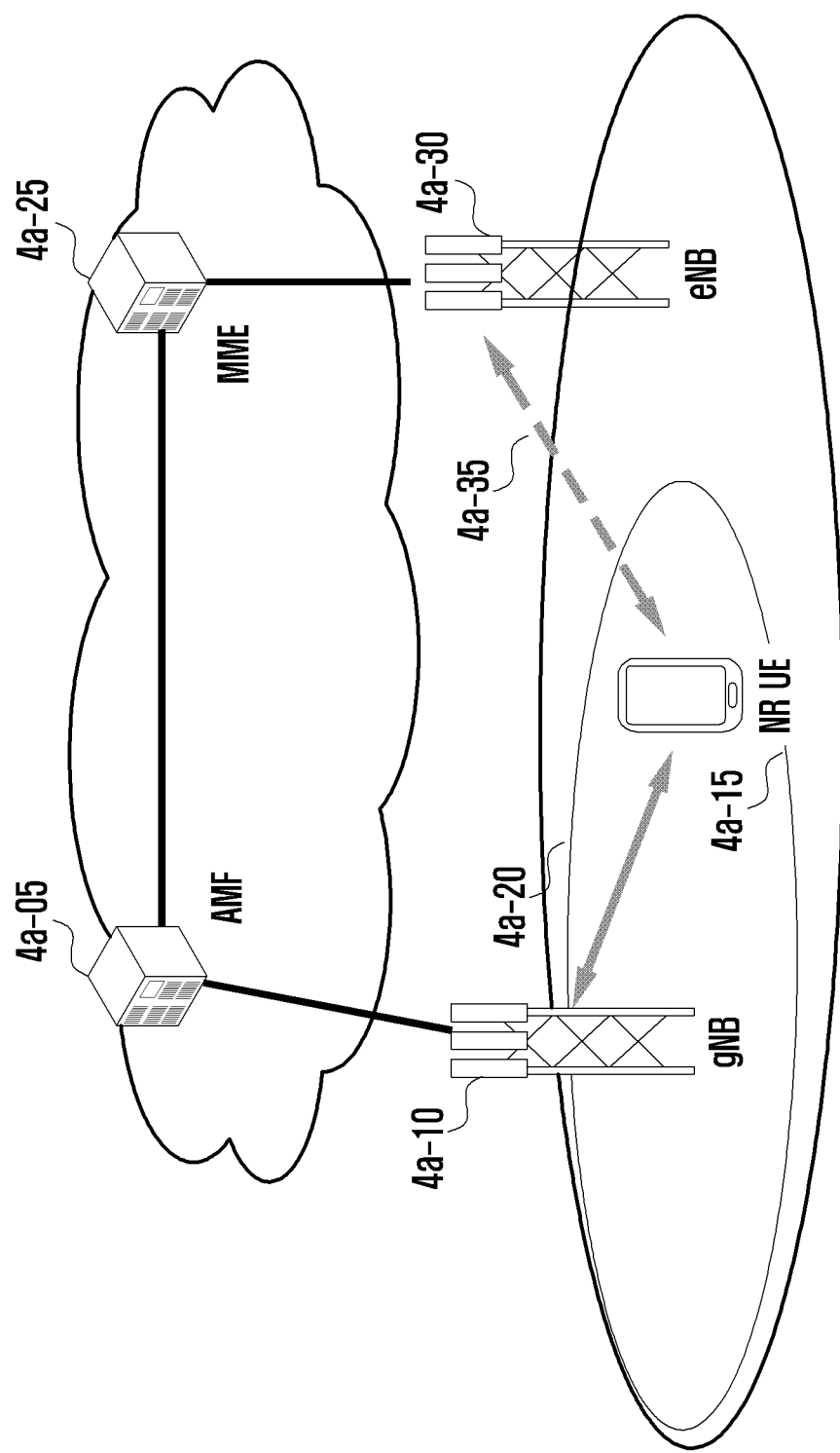
FIG. 4A is a diagram illustrating an architecture of a next generation mobile communication system according to an embodiment of disclosure.

FIG. 4A is a diagram illustrating an architecture of a next generation mobile communication system according to an embodiment of disclosure.

Referring to FIG. 4A, a radio access network of the next generation mobile communication system includes a new radio Node B (gNB) 4a-10 and a new radio core network (AMF) 4a-05. A new radio user equipment (hereinafter, referred to as NR UE or simply UE) 4a-15 connects to an external network via the gNB 4a-10 and the AMF 4a-05.

In FIG. 4A, the gNB 4a-10 corresponds to the evolved Node B (eNB) in the legacy LTE system. The NR UE 4a-15 connects to the gNB, which may provide services superior to those of the legacy eNB. In the next generation mobile communication system where all user traffic is served through shared channels, there is a need of an entity for collecting UE-specific status information (such as buffer status, power headroom status, and channel status) and scheduling the UEs based on the collected information, and the gNB 4a-10 takes charge of such functions. Typically, one gNB hosts multiple cells. In order to meet the data rate requirement that is higher than that for legacy LTE, it is necessary to secure a maximum bandwidth broader than ever before by employing advanced technologies, such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE. The AMF 4a-05 is responsible for mobility management, bearer setup, and QoS setup. The AMF 4a-05 is responsible for other control functions as well as UE mobility management functions in connection with a plurality of gNBs. The next generation mobile communication system may interoperate with legacy LTE systems in such a way of connecting the AMF 4a-05 to a mobility management entity (MME) 4a-25 through a network interface. The MME 4a-25 is connected to an eNB 4a-30 as a legacy base station. A UE supporting LTE-NR Dual Connectivity may establish a connection to the eNB 4a-30 as denoted by reference number 4a-35 as well as the gNB 4a-10 as denoted by reference number 4a-20.

Figure 4B:
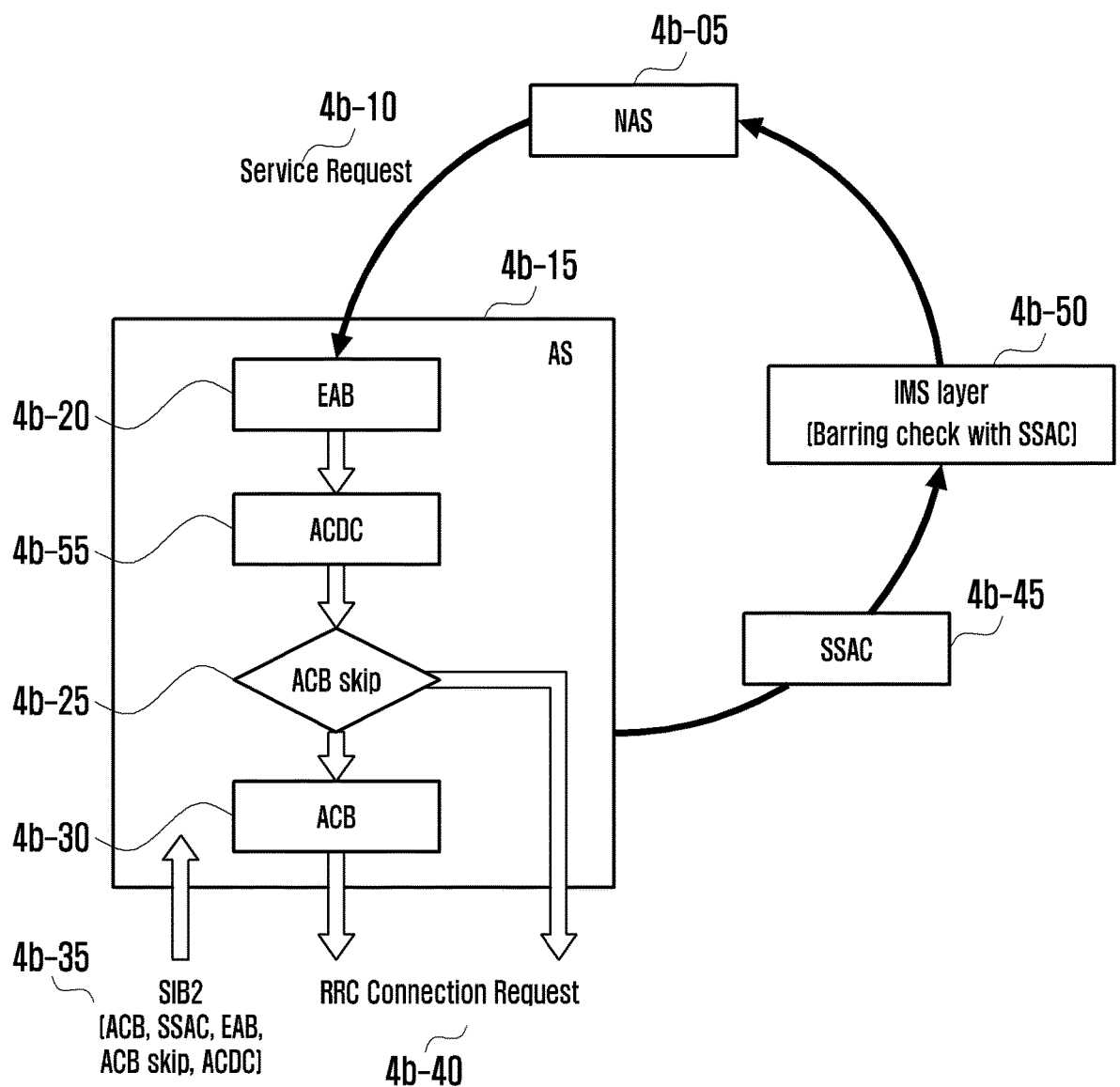
FIG. 4B is a diagram illustrating a method for determining whether to accept an access in a legacy LTE system according to an embodiment of disclosure.

FIG. 4B is a diagram illustrating a method for determining whether to accept an access in a legacy LTE system according to an embodiment of disclosure.

Referring to FIG. 4A, typically, the functionalities of an LTE UE are split into an access stratum (AS) 4b-15 and a NAS 4b-05. The AS is responsible for all access-related functionalities, and the NAS 4b-05 is responsible for non-access-related functionalities, such as public land mobile network (PLMN) selection and service request. The accessibility determination may be mainly determined by the UE AS. As aforementioned, the network in congestion may restrict new access and, for this purpose, it broadcasts related configuration information in order for each UE to make its own access determination as denoted by reference number 4b-35. Along with the introduction of new requirements in the legacy LTE system, a new barring mechanism has been proposed, which as a consequence allows for multiple access barring checks. If the UE NAS layer issues a service request as denoted by reference number 4b-10, the UE AS checks whether the UE can actually access the network. If an establishment cause value of the service request is "delay tolerant access", the UE AS performs extended access barring (EAB) first, as denoted by reference number 4b-20. The EAB barring mechanism is performed as an access check procedure applied only for machine type communication (MTC). If the EAB check is passed, the UE AS performs application specific congestion control for data communication (ACDC), as denoted by reference number 4b-20. An application requesting for the service is assigned an ACDC category, as denoted by reference number 4b-55, the value of which may be included in the service request being transferred to the UE AS. The network may provide barring configuration information per ACDC category. Accordingly, the access check procedure may be performed per group, the groups being categorized by the ACDC category. If the barring configuration information per ACDC category is not provided by the network, the UE AS omits the ACDC access check procedure. If the ACDC check is passed, the UE AS performs access class barring (ACB) as denoted by reference number 4b-30. The ACB is an access check procedure using the barring configuration information provided separately according to mobile originating (MO) data or MO signaling. For multiple telephony (MMTEL) voice/video/SMS services, the ACB procedure may be omitted with the use of an ACB skip indicator as denoted by reference number 4b-25. If all the aforementioned access check procedures are passed, the UE AS may attempt access to the network. For example, the UE AS performs random access and transmits a radio resource control (RRC) connection request message to the eNB, as denoted by reference number 4b-40. There may be another access check procedure that is not performed by the UE AS. If the barring configuration information for the MMTEL voice/video (SSAC) is received from the network as denoted by reference number 4b-45, the UE AS transfers the information to the IMS layer that is responsible for managing the services in the UE as denoted by reference number 4b-50. After receiving the barring configuration information, the IMS layer may perform the access check procedure when the service is triggered. The SSAC, when it was introduced, was designed such that the UE AS performs the corresponding function regardless of the type of application or service. Accordingly, in order to control the determination on whether to accept the access for a specific service, such as MMTEL voice/video, it was necessary to directly transfer the barring configuration information to a layer managing the service in order for the corresponding layer to perform the access check procedure.

In the next generation mobile communication system, such a complex procedure is not necessary. This is because it is possible to design a single access check procedure encompassing, from the beginning, all requirements introduced in LTE. The disclosure proposes a single barring mechanism evolved from the legacy ACDC access check procedure.

Figure 4C:
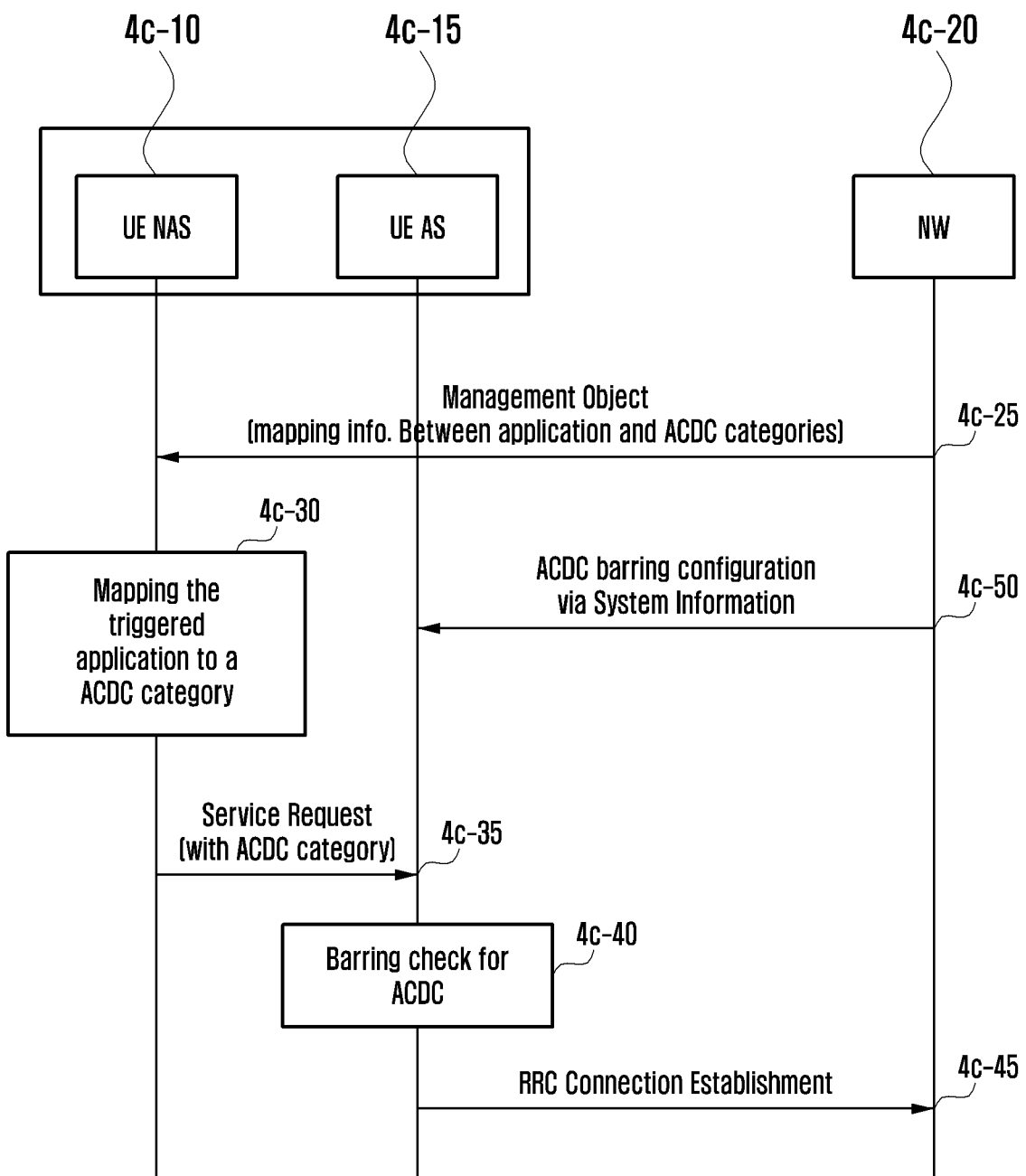
FIG. 4C is a diagram illustrating a procedure for performing an ACDC operation in a legacy LTE system according to an embodiment of disclosure.

FIG. 4C is a diagram illustrating a procedure for performing an ACDC operation in a legacy LTE system according to an embodiment of disclosure.

Referring to FIG. 4C, in the legacy LTE system, it has been proposed that the ACDC makes an accessibility determination per application (service). Every application is assigned at least one ACDC category value. The ACDC category value is selected in the range from 1 to 16. The network 4c-20 provides the UE NAS 4c-10 with per-application ACDC category information using a NAS message at operation 4c-25. The network 4c-20 provides the UE AS 4c-15 with the barring configuration information to be applied per ACDC category using system information block 2 (SIB2) at operation 4c-50. The barring configuration information includes an ac-BarringFactor information element (IE) and an ac-Barringtime IE. The ac-BarringFactor $\alpha$ has a value in the range of $0 \leq \alpha < 1$. The UE AS 4c-15 draws a random value of rand in the range of $0 \leq \text{rand} < 1$; if the random value is less than the ac-BarringFactor, it is assumed that the access is not barred, and, if not, it is assumed that the access is barred. If it is determined that the access is barred, the UE AS 4c-15 delays the access attempt for a duration drawn based on the following equation.

$$\text{"Tbarring"} = (0.7 + 0.6 * \text{rand}) * \text{ac-BarringTime}. \quad \text{Equation 2}$$

If a service request is triggered, the UE AS 4c-15 draws an ACDC category value corresponding to the application for the service at operation 4c-30. The UE NAS 4c-10 sends the service request including the ACDC category value to the UE AS 4c-15 at operation 4c-35. Upon receipt of the service request, the UE AS 4c-15 determines at operation 4c-40 whether the access is accepted based on the ACDC barring configuration information included in the SIB2 according to the ACDC category value. If the SIB2 includes no barring configuration information corresponding to the ACDC category, it is assumed that the application belonging to the ACDC category is allowed for access in the ACDC procedure. If the access is permitted through the access barring check procedure, the UE AS 4c-15 transmits an RRC Connection Request for random access to the network at operation 4c-45.

Figure 4D:
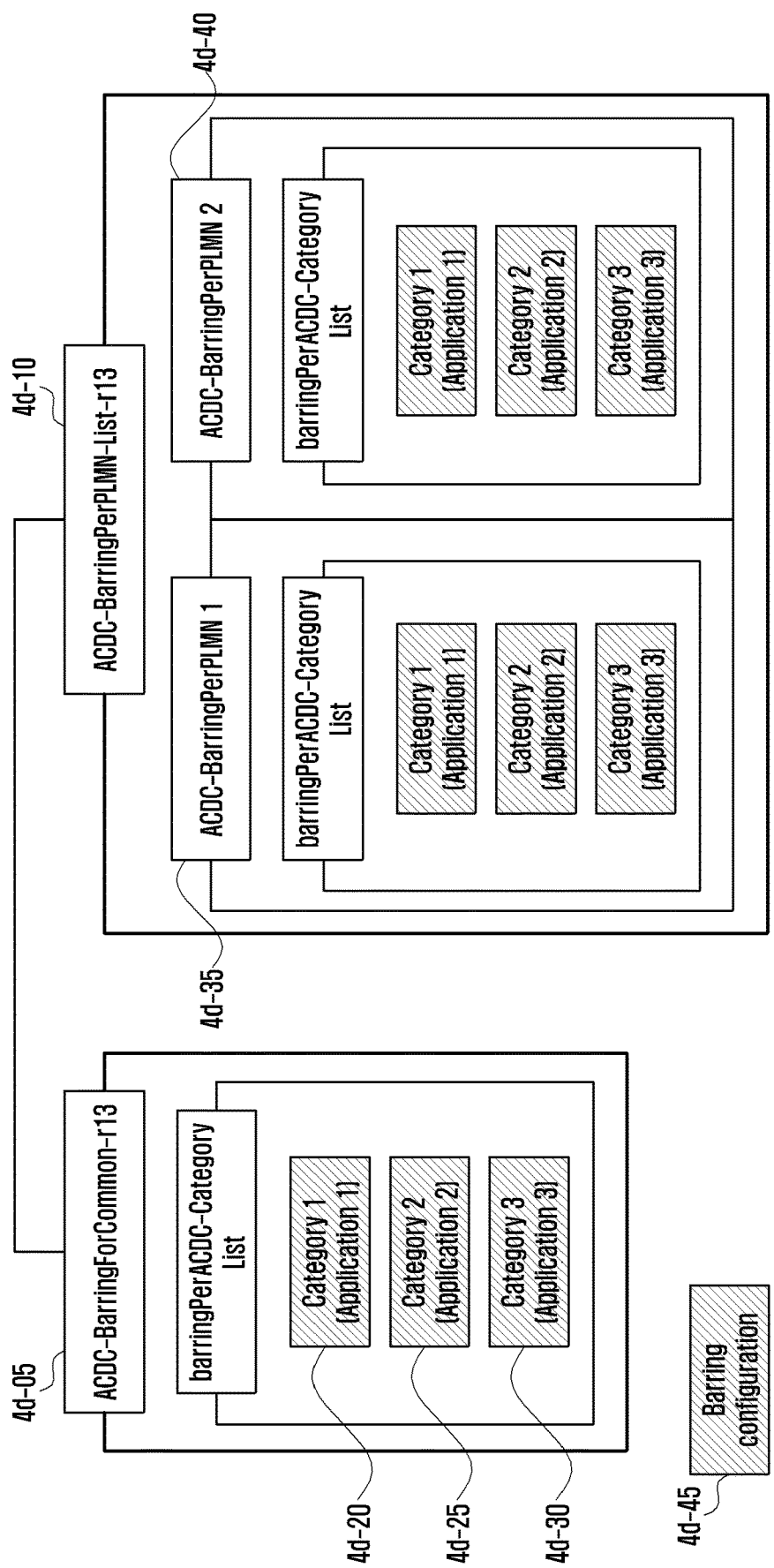
FIG. 4D is a diagram illustrating a structure of ACDC configuration information for use in a legacy LTE system according to an embodiment of the disclosure.

FIG. 4D is a diagram illustrating a structure of ACDC configuration information for use in a legacy LTE system according to an embodiment of disclosure.

Referring to FIG. 4D, the ACDC configuration information (ACDC-BarringForCommon-r13) 4d-10 may provide PLMN-specific barring configuration information sets (ACDC-BarringPerPLMN 1, ACDC-BarringPerPLMN 2, . . . ) 4d-35 and 4d-40. If all PLMNs have the same barring configuration information set, it may be possible to broadest one barring configuration information set (ACDC-BarringForCommon-r13) 4d-05. The PLMN-specific barring configuration information or common barring configuration information set includes category-specific barring configuration information 4d-20, 4d-25, and 4d-30. As described above, the barring configuration information 4d-45 includes the ac-BarringFactor IE and the ac-Barringtime IE. If there is not barring configuration information for a specific ACDC category, it is assumed that the application belonging to the corresponding ACDC category is not barred by the ACDC.

Figure 4E:
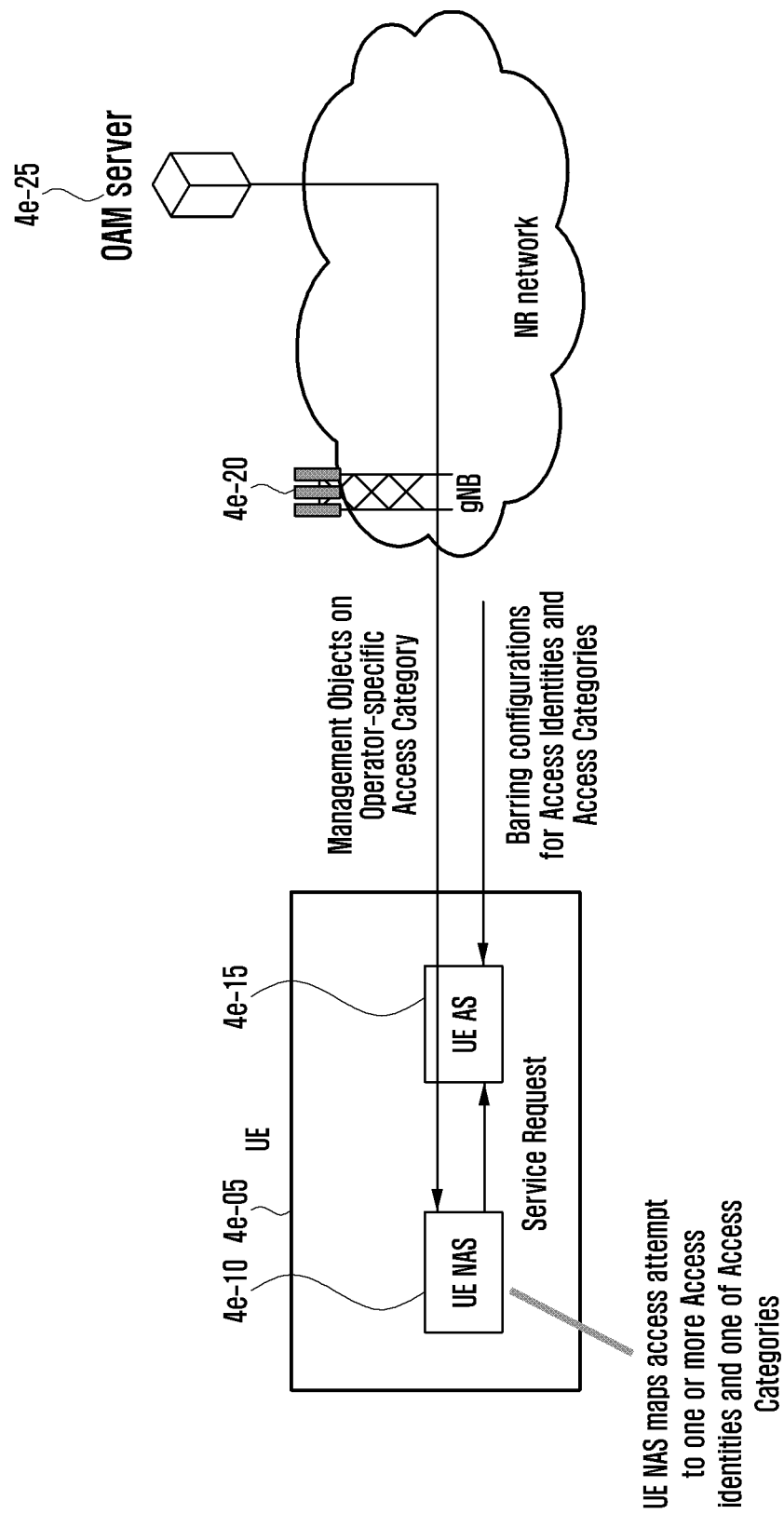
FIG. 4E is a diagram illustrating a procedure for a UE access control operation according to an embodiment of the disclosure.

FIG. 4E is a diagram illustrating a procedure for a UE access control operation according to an embodiment of the disclosure.

Referring to FIG. 4E, the disclosure proposes a method for controlling an access based on and access identity and an access category as in the legacy ACDC. The access identity is indication information defined in the 3GPP standard, i.e., specified explicitly in the standard document. The access identity is used to indicate one of several types of accesses as exemplified in following table. It mainly indicates the access types categorized as Access Classes 11 to 15 and multimedia priority services (MPS) and special-purpose services (Mission Critical Service (MCS)) with a high priority. The Access Classes 11 to 15 indicate operator-dedicated or public purpose accesses.

| Access Identity number | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |

-continued

| Access Identity number | UE configuration |
| --- | --- |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access Identity 1 is used to provide overrides according to the subscription information in UEs configured for MPS. The subscription information defines whether an overide applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.

NOTE 2:
Access Identity 2 is used to provide overrides according to the subscription information in UEs configured for MCS. The subscription information defines whether an overide applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.

NOTE 3:
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

The access categories are divided into two categories. One of the two categories is a standardized access category. This category is defined at a RAN level, i.e., explicitly categorized in the standard document. Accordingly, the dame standardized access categories are applied to different operators. In the disclosure, an emergency-related category belongs to the standard access category. Every access belongs to at least one standardized access category. The other is a non-standardized access category. This category is defined outside the 3rd generation partnership project (3GPP) architecture and thus is not explicitly categorized in the standard document. Accordingly, the operators have their own operator-specific access categories different in meanings. This is identical in characteristic with the categories in the legacy ACDC. However, a certain access triggered by the UE NAS may not be mapped to the non-standardized access category. The proposed access control scheme differs from the legacy ACDC in that the categorization is made with other elements as well as an application, e.g., service access type, call type, UE class, user group, signaling type, slice type, and any combination thereof. For example, the access control may be performed for certain element-specific types of access. The aforementioned access categories are used to indicate specific accesses as shown in the following table. The access categories 0 to 7 are used to indicate the standardized access categories, and the access categories 32 to 63 are used to indicate the operator-specific access categories.

| Access Category number | Conditions related to UE | Type of access attempt |
| --- | --- | --- |
| 0 | All | MO signalling resulting from paging |
| 1 (NOTE 1) | UE is configured for delay tolerant service and subject to access control for Access Category 1, which is judged based on relation of UE's | All except for Emergency |

-continued

| Access Category number | Conditions related to UE | Type of access attempt |
|---|---|---|
| | HPLMN and the selected PLMN. | |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

The operator's server 4e-25 provides the UE NAS 1e-10 with operator-specific access category information MO through NAS signaling or application level data transmission. The above information indicates a certain element corresponding thereto, such as application. For example, the above information may explicitly indicate that the access category 32 corresponds to a Facebook application access. A gNB 4e-20 provides UEs with a category list containing the barring configuration information and per-category barring configuration information using system information. A UE 4e-05 includes a logical block of NAS 4e-10 and AS 4e-15. The UE NAS maps the triggered access to the one or more access identities and one access category according to a predetermined rule. Alternatively, it may be possible to map an access to a standardized access category and, additionally, an operator-specific access category. The UE NAS 4e-10 sends the UE AS 4e-10 the mapped access identity and access category along with the service request. The UE AS 4e-15 determines whether the access triggered by the UE NAS 4e-10 is permitted based on the barring configuration information (barring check).

Providing the access identity and access category may be considered in association with an establishment cause. In LTE, the UE NAS provides the UE AS with the establishment cause information, and the UE transmits an RRC Connection Request message including the establishment cause information to the network. The network determines whether to accept or reject the RRC Connection Request based on the establishment cause information. The legacy establishment cause information is configured as follows.

EstablishmentCause ::= ENUMERATED {
emergency, highPriorityAccess, mt-Access, mo-Signalling,
mo-Data, delayTolerantAccess-v1020, mo-VoiceCall-v1280, spare1}

The cause values may be substituted by the access identity and Standardized Access Category. For example, in the establishment cause information, highPriorityAccess may be substituted by the access identity, Emergency by Standardized Access Category 2, mt-Access by Standardized Access Category 0, mo-Signalling by Standardized Access Category 3, mo-Data by Standardized Access Category 7, delayTolerantAccess by Standardized Access Category 1, and mo-VoiceCall by Standardized Access Category 4. If an access attempt is mapped to an access identity and a standardized access category, it is not necessary to provide the establishment cause information along with the service request. However, if the access attempt is mapped to an operator-specific access category instead of the standardized access category, it is still necessary to provide the establishment cause information. In the disclosure, three options are proposed.

In option 1, an access attempt is always mapped to a standard access category and, if available, to an operator-specific access category. In this case, the UE NAS provides the UE AS with no establishment cause information. The UE AS includes an establishment cause value corresponding (substituting) the access identity or standardized access category information in the RRC Connection Request message. It may also be possible to include the access identity or standardized access category value, without being substituted, in the RRC Connection Request message.

In option 2, an access attempt is mapped to an access category regardless whether the access category is a standardized access category or an operator-specific access category. The UE NAS may provide the UE AS with the establishment cause information selectively depending on whether the access attempt is mapped to a standardized access category. For example, if the access attempt is mapped to a standardized access category, the UE NAS provides the UE AS with no establishment cause value; if the access attempt is mapped to an operator-specific access category rather than a standardized access category, the UE NAS provides the UE AS with an establishment cause value.

In option 3, an access attempt is mapped to an access category regardless whether the access category is a standardized access category or an operator-specific access category. If the access attempt is mapped to an operator-specific access category without being mapped to any other access identity, the UE AS derives an establishment cause value from the operator-specific access category according to a predetermined rule and includes the establishment cause value in the RRC connection request message. For example, the predetermined rule is regarding that all operator-specific access categories correspond to mo-Data of the establishment cause information.

If the access-attempt is mapped to a standardized access category, the UE AS includes an establishment cause value corresponding to (substituting) the access identity or standardized access category information in the RRC Connection Request message. It may also be possible to include the access identity or standardized access category value, without being substituted, in the RRC Connection Request message.

If the UE NAS provides an access identity in any of the options, the highPriorityAccess corresponding to the access identity is included, as the establishment cause value, in the RRC Connection Request message. It may also be possible to include the access identity value, without being substituted, in the RRC Connection Request message.

The operator may want to permit access to a predetermined type of services corresponding to at least one of Access Classes 11 to 15. The disclosure is characterized by determining whether to permit an access belonging to access classes 11, 12, 13, 14, and 15 depending on the property identified by the access category. In order to accomplish this, the disclosure provides a method for configuring barring configuration information of an access identity or access category. In the disclosure, it is assumed that the access category-specific barring configuration information is configured with ac-barringFactor and ac-barring time like the barring configuration information of the ACB or ACDC of the related art.

Figure 4F:
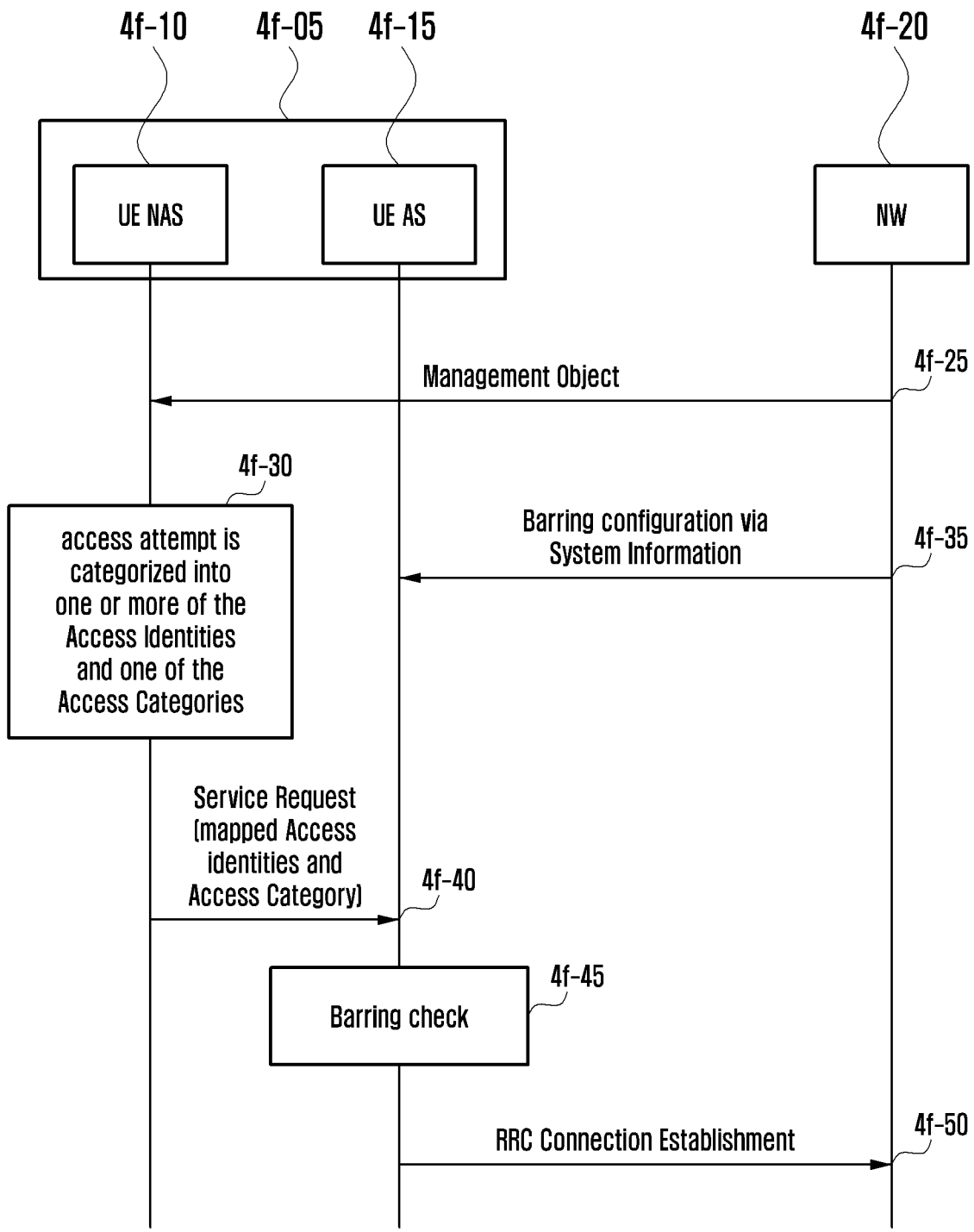
FIG. 4F is a signal flow diagram illustrating an access control procedure according to an embodiment of the disclosure.

FIG. 4F is a signal flow diagram illustrating an access control procedure according to an embodiment of the disclosure.

Referring to FIG. 4F, a UE 4f-05 includes a NAS 4f-10 and an AS 4f-15. The NAS is responsible for operations that are not directly related to a radio access, such as authentication service request and session management, while the AS 4f-15 is responsible for operations that are related to the radio access. The network 4f-20 provides the NAS 4f-10 with MOI via an OAM (application level data message) or a NAS message at operation 4f-25. The MOI indicates an element, such as application, corresponding to each operator-specific access category. In order to identify the operator-specific category to which the triggered access is mapped, the NAS 4f-10 use the MOI. If a service is triggered, the NAS maps an access identity corresponding to the property of the service to an access category at operation 4f-30. The service may be mapped to none or at least one access identity. The service may be mapped to an access category. Under the assumption that the service can be mapped to one access category, the NAS 4f-10 determines whether the service is mapped to an operator-specific access category provided in the MO. If the service is not mapped to any operator-specific access category, the NAS 4f-10 maps the service to one of available standardized access categories. Under the assumption that the service can be mapped to multiple access categories, the NAS 4f-10 maps a service to an operator-specific access category and a standardized access category. However, the service is not mapped to any operator-specific access category, the NAS 4f-10 maps the service to one of available standardized access categories. The mapping rule may be applied with the exception of the emergency service. At operation 4f-40, the NAS 4f-10 sends the AS 4f-15 a service request including the mapped access identity and access category. At operation 4f-35, the AS 4f-15 receives barring configuration information included in the system information broadcast by the network 4f-20. The barring configuration information is described below. At operation 4f-45, the AS determine whether the service request is accepted based on the access identity and access category information which the NAS has mapped to the service and the corresponding mapping configuration information received from the network 4f-20. If the service request is accepted according to the predetermined rule, the AS 4f-15 requests to the network 4f-20 for RRC connection establishment at operation 4f-50.

Figure 4G:
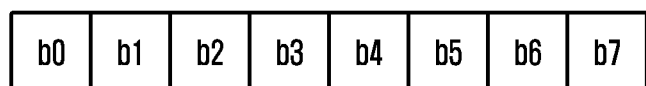
FIG. 4G is a diagram illustrating a method for configuring access barring configuration information according to an embodiment of the disclosure.
Figure 4G:
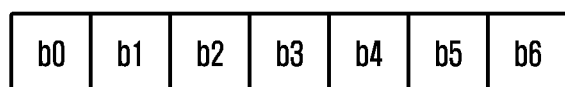
Figure 4G:
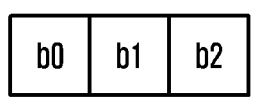
Figure 4G:
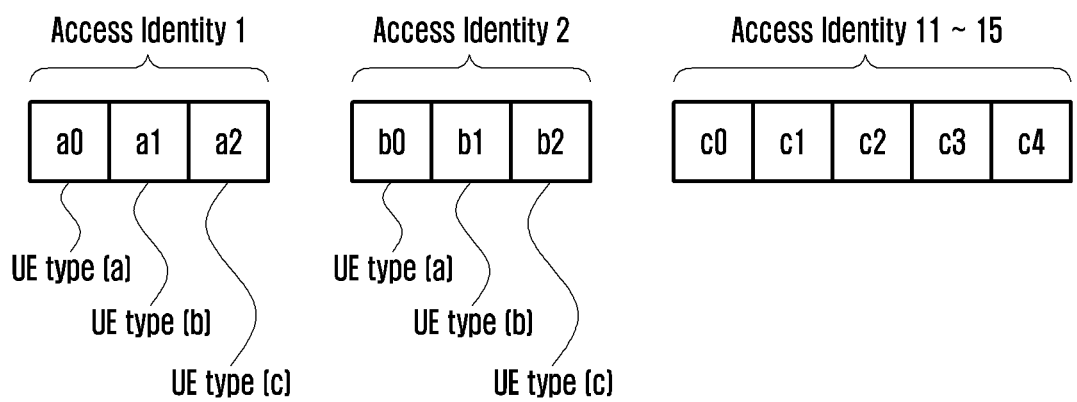

FIG. 4G is a diagram illustrating a method for configuring access barring configuration information according to an embodiment of the disclosure.

Referring to FIG. 4G, the disclosure proposes a method for permitting specific types of accesses among the accesses corresponding to at least one of Access Classes 11 to 15. For example, it may be possible to permit the access that belongs to Access Class 11 and is attempted to text and voice call services.

In the first embodiment of the disclosure, the network provides separate configuration information corresponding to each access identity in the form of a bitmap of which bits are mapped to predetermined services as shown in part (a) of FIG. 4G. The services may be categorized into one of a text service, a voice call service, a video call service, and the like. In this embodiment of the disclosure, the bits are mapped to the services indicated by the access categories. Here, the access categories may be restricted to the standardized access categories. In this case, the bitmap including 8 bits is generated as the per-access identity barring configuration information because the number of the aforementioned standardized access categorizes is 8. Certain services corresponding to the standardized access categories may be excluded in configuring the bitmap. For example, it may be assumed that the standardized access category number 0 corresponding to the mobile terminated (MT) service is always permitted to access. Under this assumption, there is no need a bit mapped to such a service in the bitmap. If one of the bits constituting the bitmap is set to '0', this means that the service corresponding to the access category mapped to the corresponding bit is permitted to access. If the corresponding bit is set to '1', this means that the corresponding service is not permitted to access or that there is a need of an extra barring check to make a final decision on whether to permit the access. An access attempt may be mapped to one or more access identities and, in this case, if at least one of the bits corresponding to the multiple access identities is set to '0', it is assumed that the access attempt is permitted.

In the second embodiment of the disclosure, the network may include information in the form of a bit may include bits mapped to respective access identities in the barring configuration information of each access category as shown in part (b) of FIG. 4G. It is assumed that the per-access category barring configuration information includes ac-barringFactor and ac-barringTime like the barring configuration information of the legacy ACB or ACDC. Since there are 7 active access identities in the above table, the bitmap consists of 7 bits. For example, in part (b) of FIG. 4G, b0 bit corresponds to identity number 1, b1 bit to identity number 2, b2 bit to identity number 11, b3 bit to identity number 12, b4 bit to identity number 13, b5 bit to identity number 14, and b6 bit to identity number 15.

In the third embodiment of the disclosure, the network provides separate configuration information corresponding to the first and second access identities in the form of a bit map include bits mapped to predetermined services as shown in part (c) of FIG. 4G. This configuration information is used by the UE AS when the access attempt corresponds to the first or second access identity. The first and second access identities indicate a multimedia service with a priority (Multimedia Priority Service (MPS)) and a special purpose service (Mission Critical Service (MCS)), respectively. Whether to permit access to the services corresponding to the above access identities is determined depending on one of the three types of the UEs as follows.
 a) UEs that are configured for MPS (or MCS);
 b) UEs that are configured for MPS (or MCS) and are in the PLMN listed as most preferred PLMN of the country where the UE is roaming in the operator-defined PLMN selector list or in their HPLMN or in a PLMN that is equivalent to their HPLMN;
 c) UEs that are configured for MPS (or MCS) and are in their HPLMN or in a PLMN that is equivalent to it.

Accordingly, the separate barring configuration information of the access identity is generated in the form of a bitmap include 3 bits corresponding to three types of UEs. Each bit indicates to whether the access of the corresponding UE is permitted. For example, in part (c) of FIG. 4G, the b0 bit corresponds to UEs that are configured for MPS (or MCS), the b1 bit corresponds to UEs that are configured for MPS (or MCS) and are in the PLMN listed as most preferred PLMN of the country where the UE is roaming in the operator-defined PLMN selector list or in their HPLMN or in a PLMN that is equivalent to their HPLMN, and the b2 bit corresponds to the UEs that are configured for MPS (or MCS) and are in their HPLMN or in a PLMN that is equivalent to it. The UE is aware of the type to which it belongs among the aforementioned types.

The UEs indicated by the bitmap information is permitted access. Whereas, a UE that is not indicated by the bitmap information is barred access or tested whether it is permitted access finally through a barring check with the barring configuration information corresponding to the access category.

It may be assumed that the UE that is not indicated by the bitmap information is permitted access. Meanwhile, the UE indicated by the bitmap information may be barred access or tested whether it is permitted finally whether it is permitted access through a barring check with the barring configuration information corresponding to the access category.

The separate barring configuration information corresponding to an access identity may include the configuration information proposed in the first and second embodiments. The configuration information proposed in the third embodiment is included in the configuration information of the first or second identity. It may also be possible that the barring configuration information corresponding to the access category in the second embodiment includes the configuration information proposed in the third embodiment. Even in this case, the configuration information proposed in the third embodiment is applied only to the first or second access identity. In the case where the barring configuration information corresponding to the access category includes the configuration information proposed in the third embodiment as an optimal scheme, the first and second identities have 3 bits corresponding thereto. The individual bits are used to indicate the types of the UEs as described in the third embodiment. Furthermore, the access identity has 1 bit corresponding thereto.

Figure 4H:
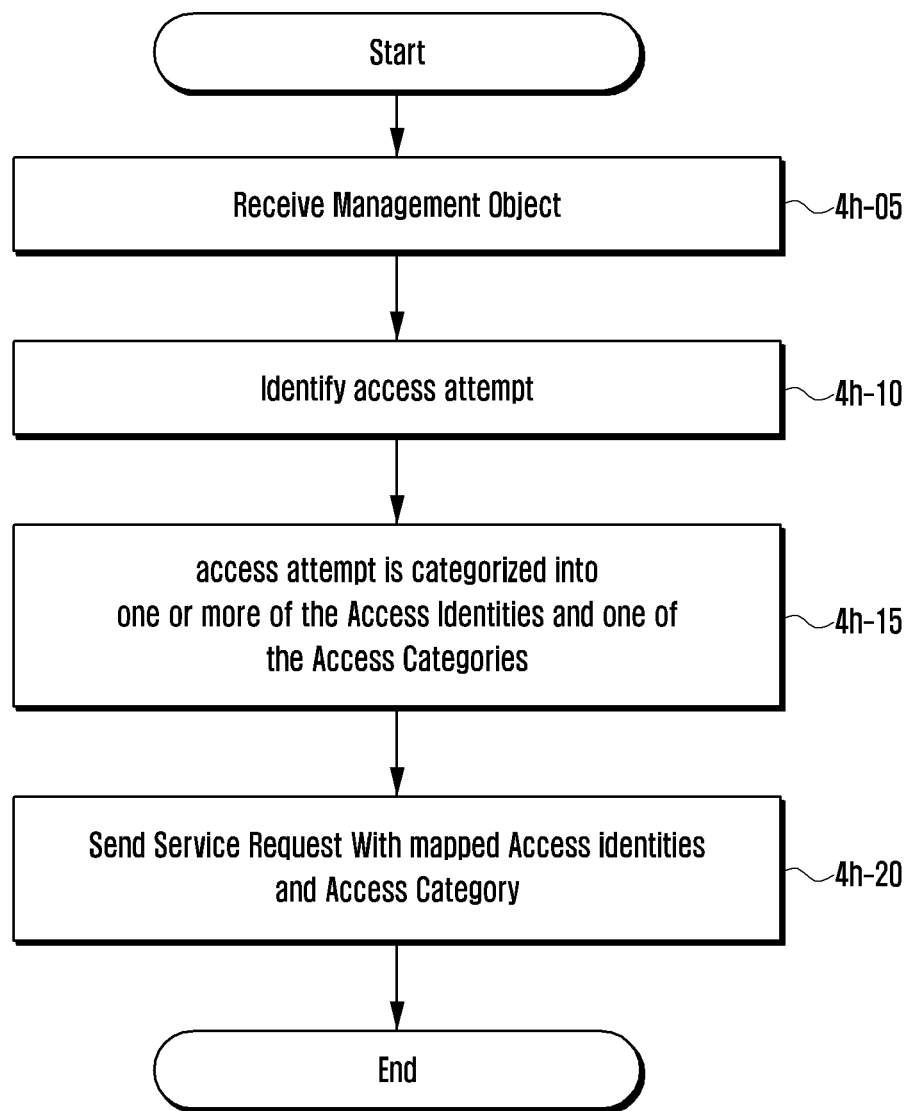
FIG. 4H is a flowchart illustrating an operation of a UE NAS according to an embodiment of the disclosure.

FIG. 4H is a flowchart illustrating an operation of a UE NAS according to an embodiment of the disclosure.

Referring to FIG. 4H, at operation 4h-05, the UE NAS receives MOI from the network through OAM or RRC signaling. The MOI indicates an element, such as 'application' that corresponds to each operator-specific access category.

At operation 4h-10, the UE NAS detects an access attempt.

At operation 4h-15, the UE NAS maps the access attempt to at least one access identity and an access category. There may not be any corresponding access identity.

At operation 4h-20, the UE NAS sends the UE AS a service request including the mapped access identity and access category information.

Figure 4I:
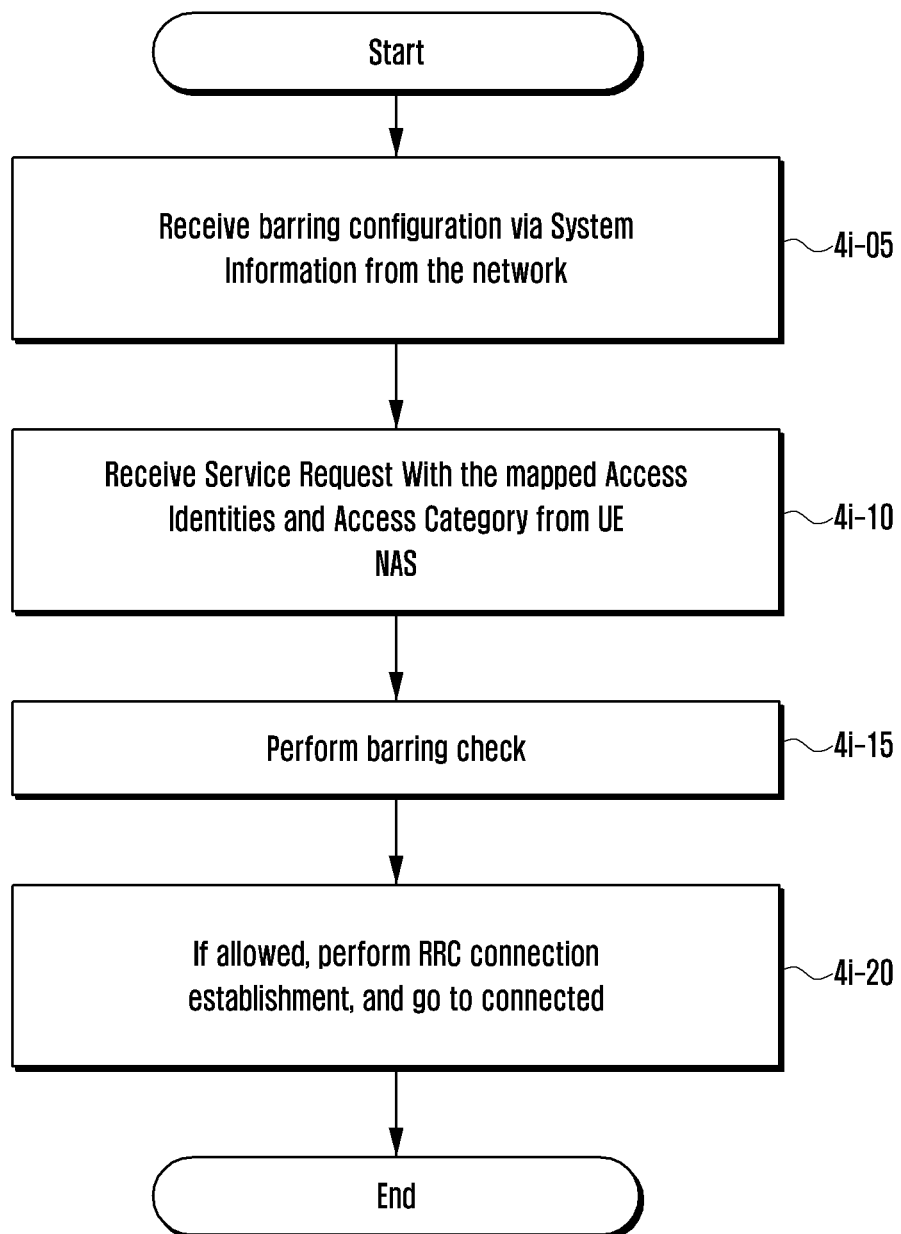
FIG. 4I is a flowchart illustrating an operation of a UE AS according to an embodiment of the disclosure.

FIG. 4I is a flowchart illustrating an operation of a UE AS according to an embodiment of the disclosure.

Referring to FIG. 4I, at operation 4i-05, the UE AS receives barring configuration information from the network via system information. The barring configuration information is provided per access identity and access category.

At operation 4i-10, the UE AS receives a service request including access identity and access category information from the UE NAS.

At operation 4i-15, the UE AS determines whether the access is permitted first based on the barring configuration information corresponding to the access identity. Two cases are considered. In one of the two cases, a separate barring configuration information corresponding to the access identity is provided, and the configuration information includes the bitmap information proposed in the first or third embodiment. The UE AS determines whether at least one of the bits corresponding to the access categories provided by the UE NAS is set to '0' in the bitmap of the barring configuration information corresponding to one or more mapped identities that is provided by the UE NAS and, if so, assumes that the access is always permitted. For the barring configuration information of the first or second access identity, even the bitmap information proposed in the third embodiment is considered. The UE NAS determines whether the bit corresponding to the access category is set to '0' and whether the UE belongs to the type of the UE that is indicated by the bitmap proposed in the third embodiment of the disclosure, simultaneously. The access of the UE is permitted when it belongs to the type of the UE that is indicated by the bitmap and when the bit corresponding to the access category is set to '0'.

If the access is not permitted with the separate barring configuration information corresponding to the access identity, the UE AS performs a barring check with the configuration information corresponding to the access category to determine finally whether the access is permitted.

In the other case, the barring configuration information corresponding to the access category includes the bitmap information proposed in the second or third embodiment. The UE AS determines whether at least one of the bits corresponding to at least one access identities that are provided by the UE NAS in the bitmap information proposed in the second embodiment is set to '0' before performing the barring check using the barring configuration information, i.e., ac-barringFactor and ac-barringtime, of the access category provided by the UE NAS. If the at least one bit is set to '0', the access is permitted and thus the barring check is omitted. For the case of the first or second identity, the UE type proposed in the third embodiment is further considered.

At operation 4i-20, the UE AS performs an RRC connection establishment with the network and enters the connected mode.

Figure 4J:
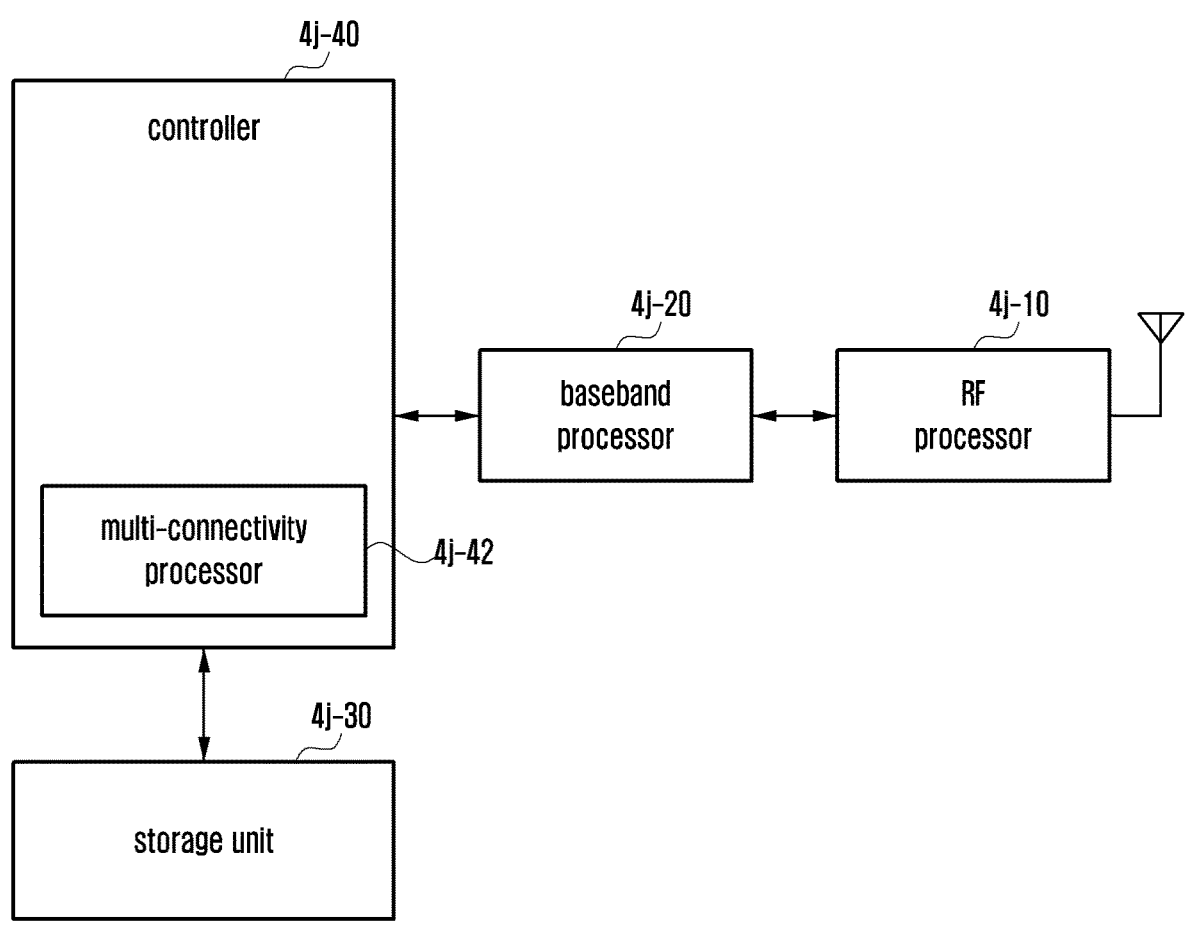
FIG. 4J is a block diagram illustrating a configuration of a UE according to an embodiment of the disclosure.

FIG. 4J is a block diagram illustrating a configuration of a UE according to an embodiment of the disclosure.

Referring to FIG. 4J, the UE includes a radio frequency (RF) processor 4j-10, a baseband processor 4j-20, a storage unit 4j-30, and a controller 4j-40.

The RF processor 4j-10 has a function for transmitting/receiving a signal over a radio channel, such as band conversion and amplification of the signal. For example, the RF processor 4j-10 up-converts a baseband signal from the baseband processor 4j-20 to an RF band signal and transmits the RF signal via an antenna and down-converts the RF signal received via the antenna to a baseband signal. For example, the RF processor 4j-10 may include a transmission filter, a reception filter, an amplifier, a mixer, an oscillator, a DAC, and an ADC. Although one antenna is depicted in the drawing, the UE may be provided with a plurality of antennas. The RF processor 4j-10 may also include a plurality of RF chains. The RF processor 4j-10 may perform beamforming. For beamforming, the RF processor 4j-10 may adjust the phase and size of a signal to be transmitted/received by means of the antennas or antenna elements in phase and size. The RF processor 4j-1—may be configured to support a MIMO scheme with which the UE can receive multiple layers simultaneously.

The baseband processor 4j-20 has a baseband signal-bit string conversion function according to a physical layer standard of the system. For example, in a data transmission mode, the baseband processor 4j-20 performs encoding and modulation on the transmission bit string to generate complex symbols. In a data reception mode, the baseband processor 4j-20 performs demodulation and decoding on the baseband signal from the RF processor 4j-10 to recover the transmitted bit string. In the case of using an OFDM scheme for data transmission, the baseband processor 4j-20 performs encoding and modulation on the transmission bit string to generate complex symbols, maps the complex symbols to subcarriers, performs inverse IFFT on the symbols, and inserts a CP into the symbols to generate OFDM symbols. In the data reception mode, the baseband processor 4j-20 splits the baseband signal from the RF processor 4j-10 into OFDM symbols, perform FFT on the OFDM symbols to recover the signals mapped to the subcarriers, and performs demodulation and decoding on the signals to recover the transmitted bit string.

The baseband processor 4j-20 and the RF processor 4j-10 process the transmission and reception signals as described above. Accordingly, the baseband processor 4j-20 and the RF processor 4j-10 may be referred to as a transmitter, a receiver, a transceiver, or a communication unit. At least one of the baseband processor 4j-20 and the RF processor 4j-10 may include a plurality of communication modules for supporting different radio access technologies. At least one of the baseband processor 4j-20 and the RF processor 4j-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 Ghz bands) and an mmWave band (e.g., 60 GHz).

The storage unit 4j-30 stores data, such as basic programs for operation of the UE, application programs, and setting information. The storage unit 4j-30 may also store the information on a second access node for radio communication with a second radio access technology. The storage unit 4j-30 provides the stored information in response to a request from the controller 4j-40.

The controller 4j-40 controls overall operations of the UE. For example, the controller 4j-40 controls the baseband processor 4j-20 and the RF processor 4j-10 for transmitting and receiving signals. The controller 4j-40 writes and reads data to and from the storage unit 4j-30. For this purpose, the controller 4j-40 may include at least one processor. For example, the controller 4j-40 may include a CP for controlling communications and an AP for controlling higher layer programs, such as applications. The controller 4j-40 may include a multi-connectivity processor 4j-42 for processing operations in a multi-connectivity mode.

According to an embodiment of the disclosure, the UE may include part of the components depicted in the drawing, and the components of the UE are controlled by the controller 4j-40.

Figure 4K:
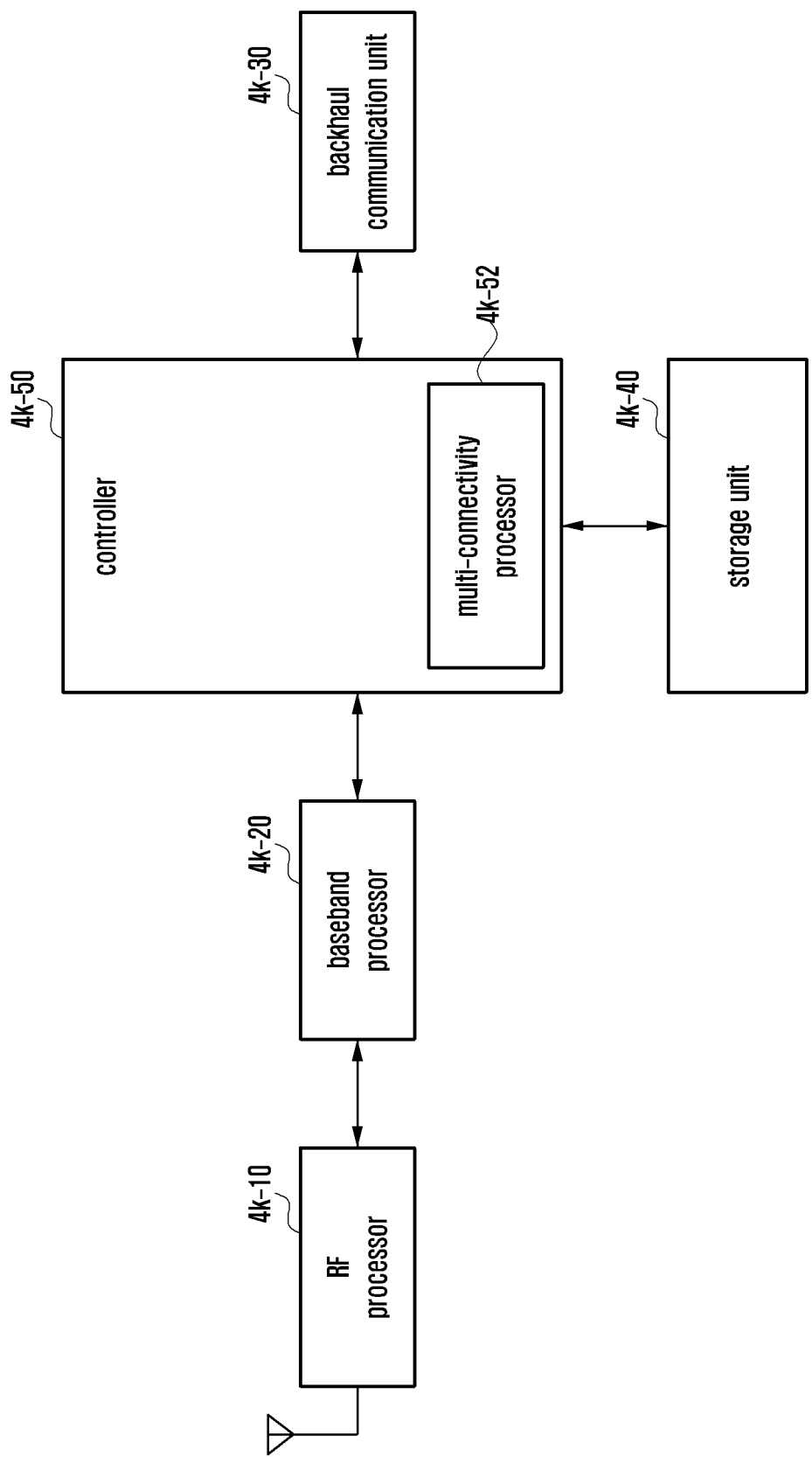
FIG. 4K is a block diagram illustrating a configuration of a gNB according to an embodiment of the disclosure.

FIG. 4K is a block diagram illustrating a configuration of a gNB according to an embodiment of the disclosure.

Referring to FIG. 4K, the gNB includes an RF processor 4k-10, a baseband processor 4k-20, a backhaul communication unit 4k-30, a storage unit 4k-40, and a controller 4k-50.

The RF processor 4k-10 has a function for transmitting/receiving a signal over a radio channel, such as band conversion and amplification of the signal. For example, the RF processor 4k-10 up-converts a baseband signal from the baseband processor 4k-20 to an RF band signal and transmits the RF signal via an antenna and down-converts the RF signal received via the antenna to a baseband signal. For example, the RF processor 4k-10 may include a transmission filter, a reception filter, an amplifier, a mixer, an oscillator, a DAC, and an ADC. Although one antenna is depicted in the drawing, the gNB may be provided with a plurality of antennas. The RF processor 4k-10 may also include a plurality of RF chains. The RF processor 4k-10 may perform beamforming. For beamforming, the RF processor 4k-10 may adjust the phase and size of a signal to be transmitted/received by means of the antennas or antenna elements. The RF processor 4k-10 may be configured to transmit one or more layers for a downlink MIMO operation.

The baseband processor 4k-20 has a baseband signal-bit string conversion function according to a physical layer standard of the system. For example, in a data transmission mode, the baseband processor 4k-20 performs encoding and modulation on the transmission bit string to generate complex symbols. In a data reception mode, the baseband processor 4k-20 performs demodulation and decoding on the baseband signal from the RF processor 4k-10 to recover the transmitted bit string. In the case of using an OFDM scheme for data transmission, the baseband processor 4k-20 performs encoding and modulation on the transmission bit string to generate complex symbols, maps the complex symbols to subcarriers, performs IFFT on the symbols, and inserts a CP into the symbols to generate OFDM symbols. In the data reception mode, the baseband processor 4k-20 splits the baseband signal from the RF processor 4k-10 into OFDM symbols, performs FFT on the OFDM symbols to recover the signals mapped to the subcarriers, and performs demodulation and decoding on the signals to recover the transmitted bit string. The baseband processor 4k-20 and the RF processor 4k-10 process the transmission and reception signals as described above. Accordingly, the baseband processor 4k-20 and the RF processor 4k-10 may be referred to as a transmitter, a receiver, a transceiver, or a communication unit.

The backhaul communication unit 4k-30 provides an interface for communication with other nodes in the network. For example, the backhaul communication unit 4k-30 converts a bit string to be transmitted from the gNB to another node, e.g., another gNB and core network, to a physical signal and converts a physical signal received from another node to a bit string.

The storage unit 4k-40 stores data, such as basic programs for operation of the gNB, application programs, and setting information. The storage unit 4k-40 may also store the information on the bearers established for UEs and measurement results reported by the connected UEs. The storage unit 4k-40 may also store the information for use by a UE in determining whether to enable or disable multi-connectivity. The storage unit 4k-40 may provide the stored data in reference to a request from the controller 4k-50.

The controller 4k-50 controls overall operations of the gNB. For example, the controller 4k-50 controls the baseband processor 4k-20, the RF processor 4k-10, and the backhaul communication unit 4k-30 for transmitting and receiving signals. The controller 4k-50 writes and reads data to and from the storage unit 4k-40. For this purpose, the controller 4k-50 may include at least one processor. The controller 4k-50 may also include a multi-connectivity processor 4k-52 for processing operations in a multi-connectivity mode.

According to an embodiment of the disclosure, the gNB may also include part of the components depicted in the drawing, and the components of the gNB are controlled by the controller 4k-50.

Fifth Embodiment

Embodiments of the disclosure are described with reference to the accompanying drawings. Detailed description of well-known functions and structures incorporated herein may be omitted to avoid obscuring the subject matter of the disclosure. Further, the following terms are defined based on the functionality in the disclosure, and may vary according to the intention of a user or an operator, usage, and the like. Therefore, the definition should be made based on the overall content of the specification.

Detailed description of well-known functions and structures incorporated herein may be omitted to avoid obscuring the subject matter of the disclosure. Embodiments of the disclosure are described with reference to the accompanying drawings.

The terms used, in the following description, for indicating access nodes, network entities, messages, interfaces between network entities, and diverse identity information are provided for convenience of explanation. Accordingly, the terms used in the following description are not limited to specific meanings but may be replaced by other terms equivalent in technical meanings.

Figure 5A:
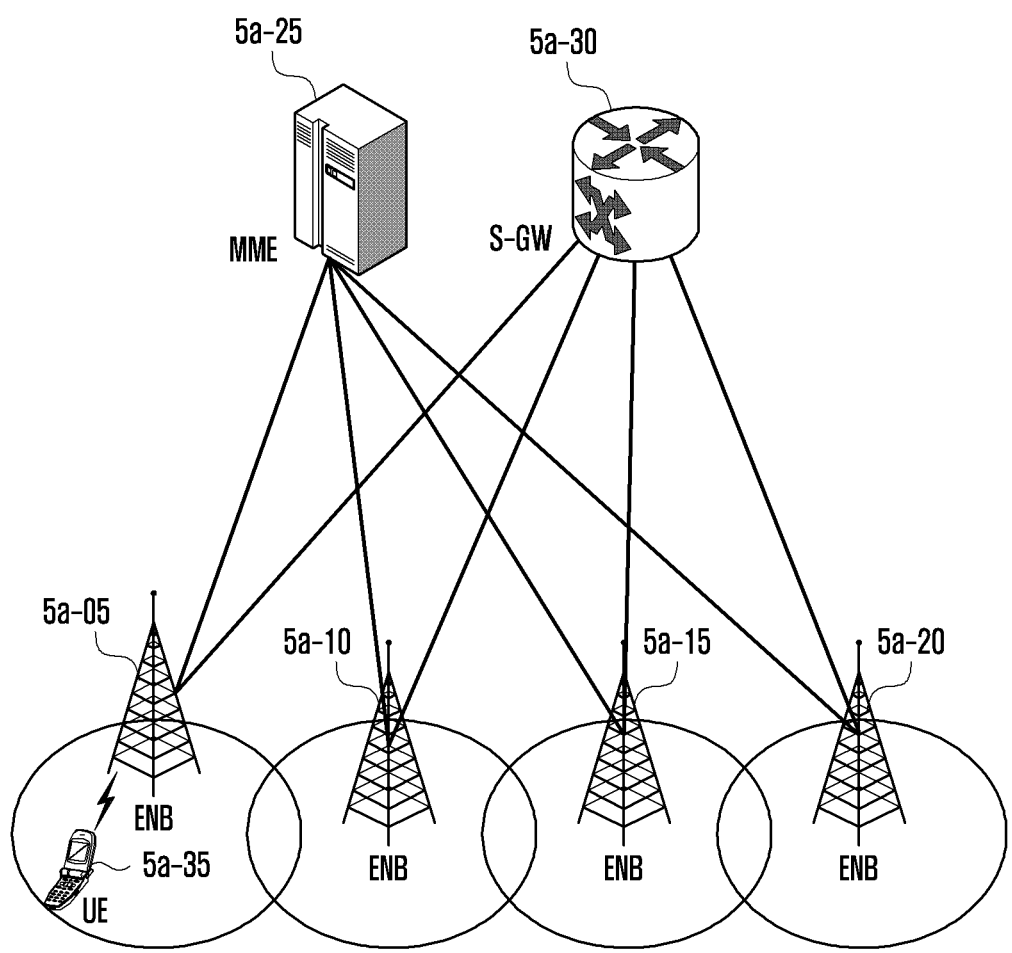
FIG. 5A is a diagram illustrating an architecture of an LTE system according to an embodiment of disclosure.

FIG. 5A is a diagram illustrating an architecture of an LTE system according to an embodiment of disclosure.

Referring to FIG. 5A, a radio access network of the LTE system includes evolved Node Bs (hereinafter, interchangeably referred to as eNB, node B, and base station) 5a-05, 5a-10, 5a-15, and 5a-20; a mobility management entity (MME) 5a-25; and a serving gateway (S-GW) 5a-30. A user terminal (hereinafter, interchangeably referred to as user equipment (UE) and terminal) 5a-35 connects to an external network via the eNBs 5a-05, 5a-10, 5a-15, and 5a-20 and the S-GW 5a-30.

The eNBs 5a-05, 5a-10, 5a-15, and 5a-20 correspond to the legacy node Bs of the universal mobile telecommunications system (UMTS). The UE 5a-35 connects to one of the eNBs via a radio channel, and the eNB has more complex functions than the legacy node B. In the LTE system where all user traffic including real time services, such as Voice over IP (VoIP) is served through shared channels, there is a need of an entity for collecting UE-specific status information (such as buffer status, power headroom status, and channel status) and scheduling the UEs based on the collected information, and the eNB takes charge of such functions. Typically, one eNB hosts multiple cells. For example, the LTE system adopts Orthogonal Frequency Division Multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 5a-30 handles data bearer functions to establish and release data bearer under the control of the MME 5a-25. The MME 5a-25 handles various control functions for the UE as well as the mobile management function and has connections with the eNBs 5a-05, 5a-10, 5a-15, and 5a-20.

Figure 5B:
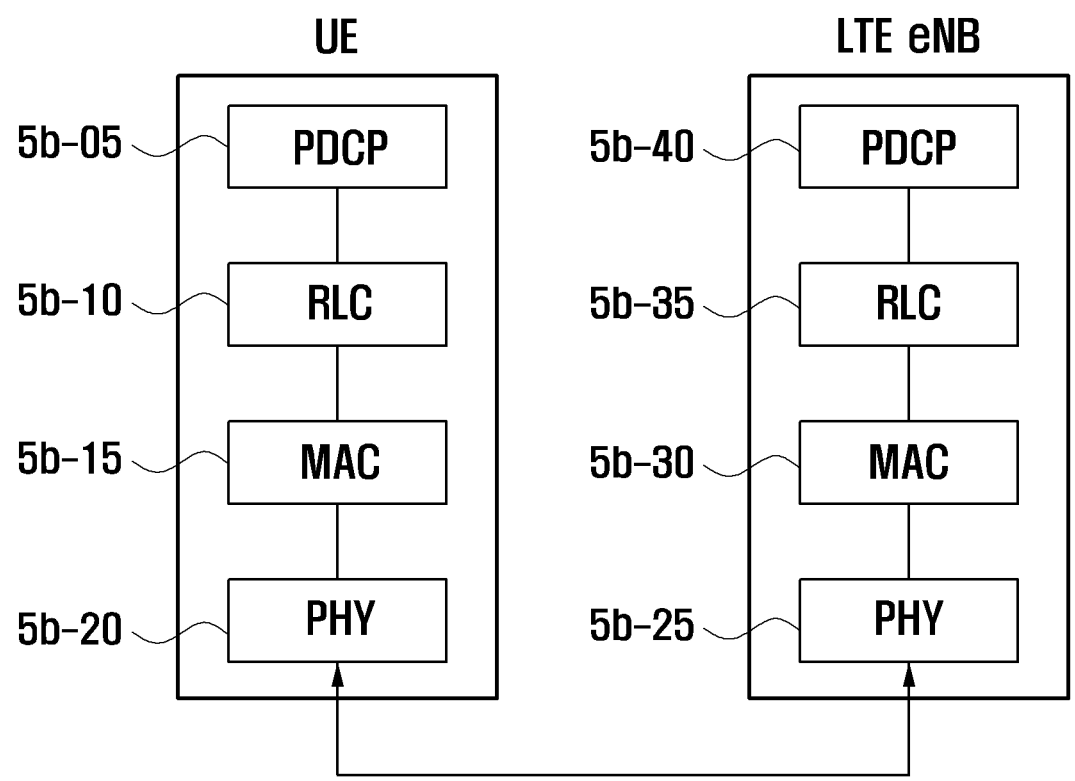
FIG. 5B is a diagram illustrating a protocol stack of an interface between a UE and an eNB in an LTE system according to an embodiment of disclosure.

FIG. 5B is a diagram illustrating a protocol stack of an interface between a UE and an eNB in an LTE system according to an embodiment of disclosure.

Referring to FIG. 5B, the protocol stack of the interface between the UE and the eNB in the LTE system includes a plurality of protocol layers stacked from the bottom to the top: physical layer denoted by reference numbers 5b-20 and 5b-25, medium access control (MAC) layer denoted by reference numbers 5b-15 and 5b-30, radio link control (RLC) layer denoted by reference numbers 5b-10 and 5b-35, and packet data convergence control (PDCP) layer denoted by reference numbers 5b-05 and 5b-40. The PDCP layer denoted by reference numbers 5b-05 and 5b-40 takes charge of compressing/decompressing an IP header. The main functions of the PDCP layer are summarized as follows:

Header compression and decompression: ROHC only

Transfer of user data

In-sequence delivery of upper layer PDUs at PDCP re-establishment procedure for RLC AM For split bearers in DC (only support for RLC AM): PDCP PDU routing for transmission and PDCP PDU reordering for reception)

Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer designated by reference number 5b-10 and 5b-35 takes charge of reformatting PDCP PDUs in order to fit them into the size for ARQ operation. The main functions of the RLC protocol are summarized as follows:

Transfer of upper layer PDUs)

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer))

RLC SDU discard (only for UM and AM data transfer)

RLC re-establishment

The MAC layer denoted by reference number 5b-15 and 5b-30 allows for connection of multiple RLC entities established for one UE and takes charge of multiplexing RLC PDUs from the RLC layer into a MAC PDU and demultiplexing a MAC PDU into RLC PDUs. The main functions of the MAC protocol are summarized as follows:

> Mapping between logical channels and transport channels
> Multiplexing/demultiplexing of MAC SDUs belonging to one or different logical channels into/from transport blocks (TB) delivered to/from the physical layer on transport channels
> Scheduling information reporting
> HARQ function (Error correction through HARQ)
> Priority handling between logical channels of one UE
> Priority handling between UEs by means of dynamic scheduling
> MBMS service identification
> Transport format selection
> Padding The PHY layer denoted by reference numbers 5b-20 and 5b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 5C:
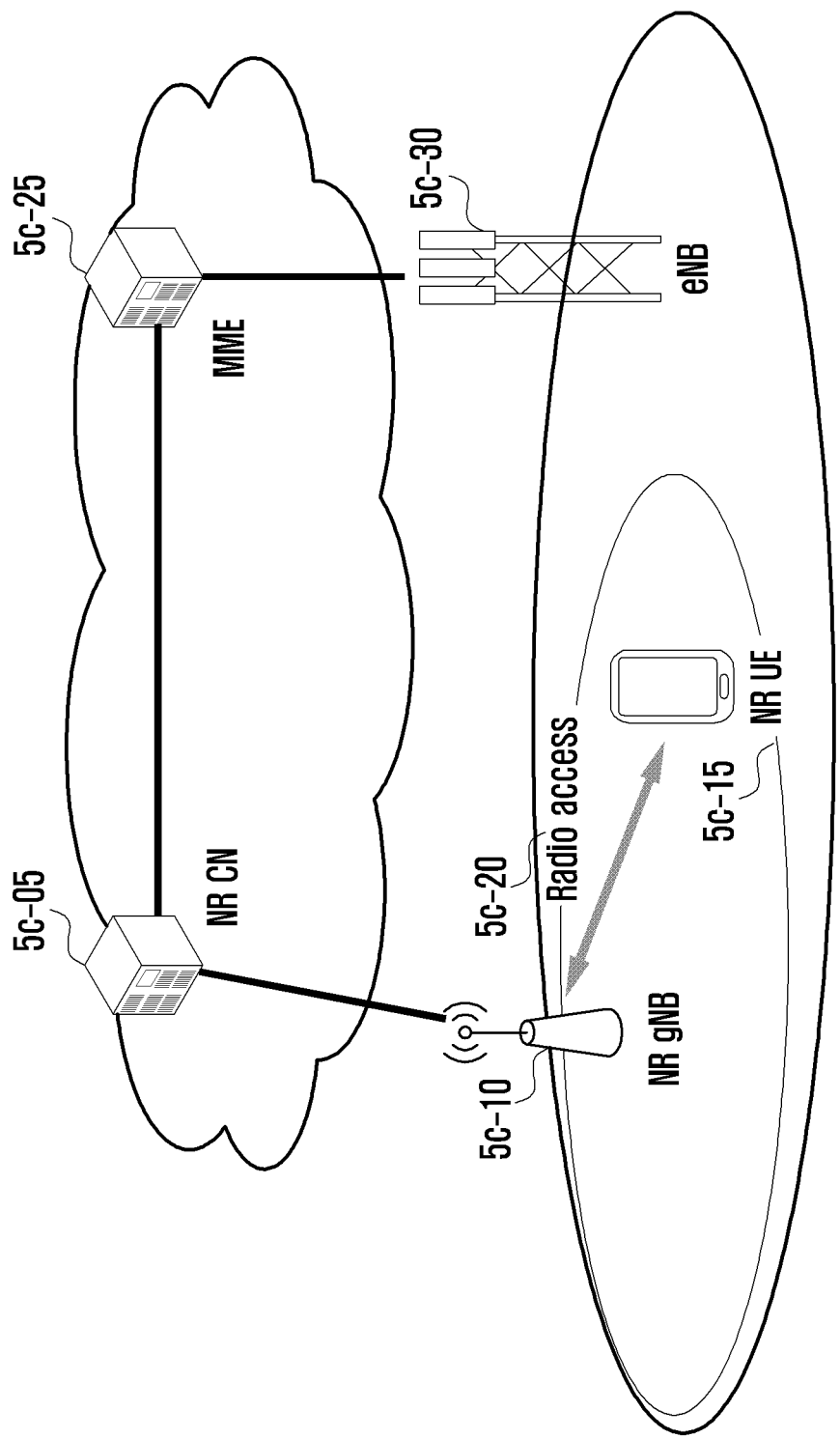
FIG. 5C is a diagram illustrating an architecture of a next generation mobile communication system according to an embodiment of disclosure.

FIG. 5C is a diagram illustrating an architecture of a next generation mobile communication system according to an embodiment of disclosure.

Referring to FIG. 5C, a radio access network 5c-20 of the next generation mobile communication system includes a new radio Node B (RN NB) 5c-10 and a new radio core network (NR CN) 5c-05. A new radio user equipment (hereinafter, referred to as NR UE or simply UE) 5c-15 connects to an external network via the NR NB 5c-10 and the NR CN 5c-05.

In FIG. 5C, the NR NB 5c-10 corresponds to the evolved Node B (eNB) in the legacy LTE system. The NR UE 5c-15 connects to the NR NB, which may provide services superior to those of the legacy eNB. In the next generation mobile communication system where all user traffic is served through shared channels, there is a need of an entity for collecting UE-specific status information (such as buffer status, power headroom status, and channel status) and scheduling the UEs based on the collected information, and the NR NB 5c-10 takes charge of such functions. Typically, one NR NB hosts multiple cells. In order to meet the data rate requirement that is higher than that for legacy LTE, it is necessary to secure a maximum bandwidth broader than ever before by employing advanced technologies, such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE. The NR CN 5c-05 is responsible for mobility management, bearer setup, and QoS setup. The NR CN 5c-05 is responsible for other control functions as well as UE mobility management functions in connection with a plurality of NR NBs. The next generation mobile communication system may interoperate with legacy LTE systems in such a way of connecting the NR CN 5c-05 to a mobility management entity (MME) 5c-25 through a network interface. The MME 5c-25 is connected to an eNB 5c-30 as a legacy base station.

Figure 5D:
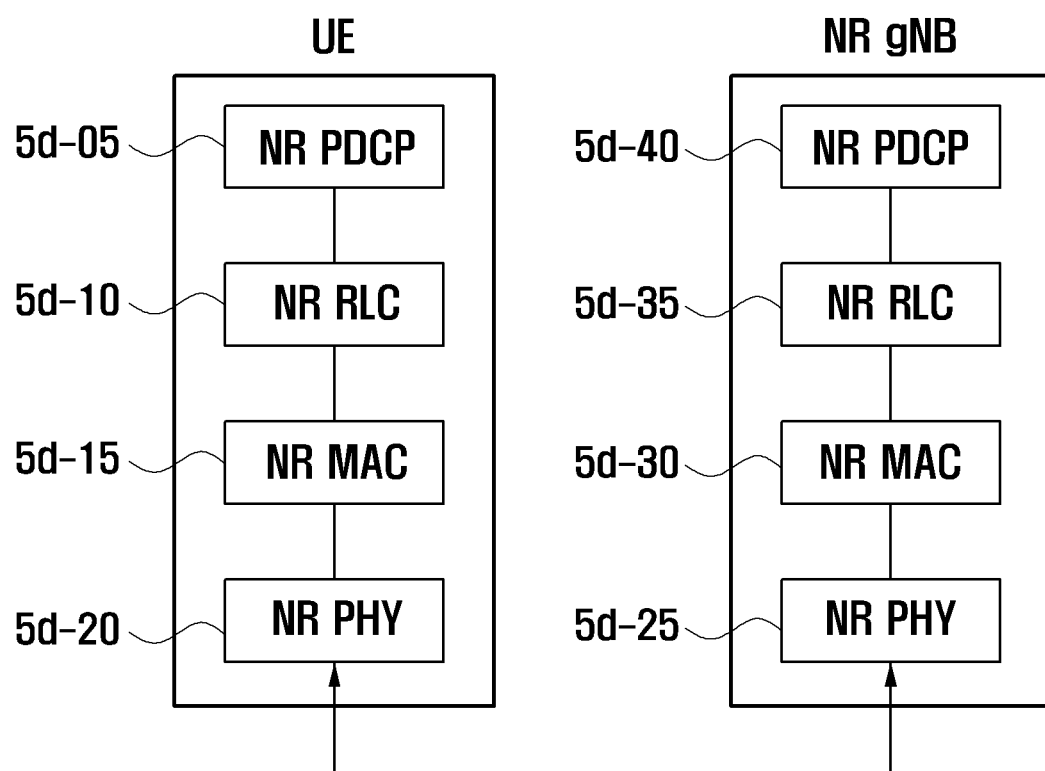
FIG. 5D is a diagram illustrating a protocol stack of an interface between a new radio (NR) UE and an NR gNB in a next generation mobile communication system according to an embodiment of disclosure.

FIG. 5D is a diagram illustrating a protocol stack of an interface between an NR UE and an NR gNB in a next generation mobile communication system according to an embodiment of disclosure.

Referring to FIG. 5D, the protocol stack of the interface between an NR UE and an NR gNB in a next generation mobile communication system includes a plurality of protocol layers stacked from the bottom to the top: NR PHY layer denoted by reference numbers 5d-20 and 5d-25, NR MAC layer denoted by reference numbers 5d-15 and 5d-30, NR RLC layer denoted by reference numbers 5d-10 and 5d-35, and NR PDCP layer denoted by reference numbers 5d-05 and 5d-40. The main functions of the NR PDCP layer denoted by reference numbers 5d-05 and 5d-40 may include some of the following functions:

> Header compression and decompression: ROHC only
> Transfer of user data
> In-sequence delivery of upper layer PDUs
> Out-of-sequence delivery of upper layer PDUs
> PDCP PDU reordering for reception
> Duplicate detection of lower layer SDUs
> Retransmission of PDCP SDUs
> Ciphering and deciphering
> Timer-based SDU discard in uplink The PDCP PDU reordering function of an NR PDCP entity is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC layer denoted by reference numbers 5d-10 and 5d-35 may include some of the following functions.

> Transfer of upper layer PDUs
> In-sequence delivery of upper layer PDUs
> Out-of-sequence delivery of upper layer PDUs
> Error Correction through ARQ
> Concatenation, segmentation and reassembly of RLC SDUs
> Re-segmentation of RLC data PDUs
> Reordering of RLC data PDUs
> Duplicate detection
> Protocol error detection
> RLC SDU discard
> RLC re-establishment The in-sequence delivery function of an NR RLC entity is to deliver the RLC SDUs received from the lower layer to the upper layer and may include reassembling, when multiple segmented RLC SDUs constituting an original RLC SDU are received, the RLC SDUs and delivering the reassembled RLC SDU to the upper layer; reordering the received RLC PDUs based on the RLC sequence number (SN) or PDCP SN; recording the missing RLC PDUs among the reordered RLC PDUs; transmitting a status report indicating the missing RLC PDUs to the sender; requesting for retransmission of the missing RLC PDUs; and delivering, when there is a missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence. It may also be possible to process the RLC PDUs in the receiving sequence (in the order of arrival regardless of sequence number) and deliver the RLC PDUs to the PDCP entity out of order (out-of-sequence delivery) and, if an RLC PDU is transmitted in the form of segments, to store the received segments, or wait until all segments constituting the RLC PDU are received and reassemble the segments into the original RLC PDU, which is delivered to the PDCP entity. The NR RLC layer may have no concatenation function and, in this case, the concatenation function may be performed in the NR MAC layer or replaced by the multiplexing function of the NR MAC layer.

The out-of-sequence delivery function of an NR RLC entity is to deliver the RLC SDUs received from the lower layer to the upper layer out of order and may include reassembling, when multiple segmented RLC SDUs constituting an original RLC SDU are received, the segmented RLC SDUs, delivering the reassembled RLC SDUs to the upper layer, arranging the received RLC PDUs based on the RLC SN or PDCP SN, and recording the SN of the missing RLC PDUs.

In the NR MAC layer denoted by reference number 5d-15 and 5d-30, an NR MAC entity may be connected to multiple NR RLC entities, and the main functions of the NR MAC entity may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer denoted by reference number 5d-20 and 5d-25 takes charge of channel-coding and modulation on upper layer data to generate and transmit OFDM symbols over a radio channel and demodulating and channel-decoding on OFDM symbols received over the radio channel to deliver the decoded data to the upper layers.

In the next generation mobile communication system supporting a high data rate, if PDCP PDUs are lost or arrived late in a single connectivity environment, if PDCP PDUs are discarded at a transmitter because of the expiry of the PDCP expiry timer, or if one of two PDCP entities receives a PDCP PDU late in a dual connectivity environment, all the received data should be stored in a buffer until a reordering timer that is triggered at the receive PDCP layer expires, resulting in transmission delay. Accordingly, the terminal has to have a large capacity memory or buffer to store all of the data being received while the reordering timer is running. If the memory or buffer capacity is not sufficient, data loss may occur. If the data that has triggered the PDCP reordering timer arrives before the expiry of the timer or if the PDCP reordering timer expires, a large amount of data received while the timer is running may be delivered to the upper layer at one time and, thus, the upper layer is likely to fail to process all of the data, resulting in data loss.

The disclosure proposes a novel PDCP status-reporting method characterized in that a receiver triggers a PDCP status report and transmits the PDCP status report to a transmitter when a predetermined timer running at the receive PDCP layer expires, when the data amount stored in the receive buffer becomes equal to or greater than a threshold value, or when a reordering timer value reaches a predetermined time, and the transmitter receives and checks the PDCP status report to discard the data (PDCP PDU or PDCP SDU) successfully received by the receiver and retransmit the missing data promptly, thereby solving the transmission delay and data loss problems caused by the reordering timer running at the receiver.

The novel PDCP status-reporting method is capable of enabling, when a PDCP status report is received from the receiver, the transmitter to discard the data successfully received by the receiver and retransmit the missing data immediately based on the PDCP status report.

Figure 5E:
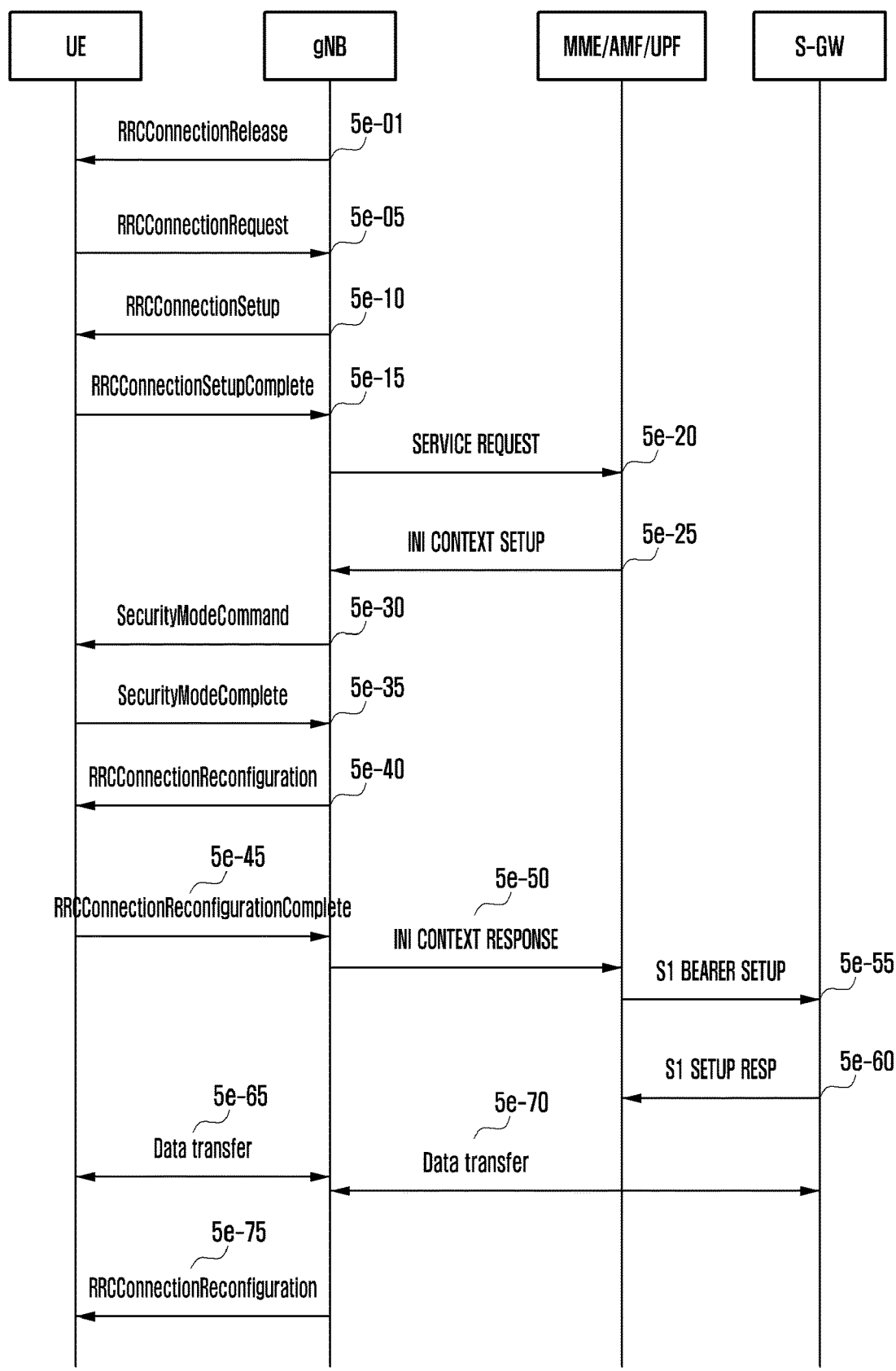
FIG. 5E is a signal flow diagram illustrating a procedure for a gNB to configure a packet data convergence protocol (PDCP) status report request function via an RRC message while a UE establishes a connection with a network according to an embodiment of the disclosure.

FIG. 5E is a signal flow diagram illustrating a procedure for a gNB to configure a packet data convergence protocol (PDCP) status report request function via an RRC message while a UE establishes a connection with a network according to an embodiment of the disclosure.

FIG. 5E depicts a procedure for the UE to transition from an RRC idle mode or RRC inactive mode (or lightly-connected mode) to an RRC connected mode to establish a connection with the network and configure whether to enable the PDCP status report request function.

Referring to FIG. 5E, if there is no transmission or reception of data to or from the UE in the RRC connected mode for a predetermined cause or over a predetermined time period, the gNB may transmit a RRCConnectionRelease message to the UE at operation 5E-01 such that the UE enters the idle mode. Afterward, any data to transmit occurs, the UE in the idle mode (hereinafter, interchangeably referred to as idle mode UE) performs an RRC connection establishment procedure with the gNB. If the UE is in the RRC inactive mode, it may transmit an RRCConnectionResumeRequest message to perform an RRC connection resume procedure. The UE achieves uplink synchronization with the gNB through a random access procedure and transmits the RRCConnectionRequest message to the gNB at operation 5e-05. The RRCConnectionRequest message includes a UE identifier and an establishment cause (establishmentCause). The gNB transmits an RRCConnectionSetup message to the UE at operation 5e-10 for connection setup with the UE. This message may include the information indicating whether to enable a new PDCP status report per logical channel (logicalchannelconfig), per bearer, or per PDCP entity (PDCP-config). In more detail, it may be possible to indicate an IP flow or QoS flow, for which the new PDCP status report is enabled, on each logical channel, each bearer, or each PDCP (or SDAP) entity. The new PDCP status report may be enabled with configuration of a buffer threshold or a threshold value of a newly introduced timer or a reordering timer as a condition for triggering the new PDCP status report. If the amount of the data in the buffer for a PDCP or RLC entity reaches the threshold value or if the newly introduced timer or the reordering timer reaches the threshold value, this may trigger the new PDCP status report. The RRCConnectionSetup message also includes RRC connection configuration information. The RRC connection is called signaling radio bearer (SRB) and established for exchanging RRC messages as control messages between the UE and the gNB. After establishing the RRC connection, the UE transmits an RRCConnectionSetupComplete message to the gNB at operation 5e-15. If the gNB does not know and wants to know the capacity of the UE connected thereto, it may transmit a message to inquire about the UE capacity. This message may include an indicator indicating whether the UE has a new PDCP status report capability or supports the new PDCP status report. The RRCConnectionSetupComplete message includes a control message called SERVICE REQUEST for use by the UE in requesting to an MME, an access and mobility management function (AMF), a user plane function (UPF), or a session management function (SMF) for bearer establishment for a certain service. The gNB transmits the SERVICE REQUEST message to the MME/AMF/UPF/SMF at operation 5E-20, and the MME/AMF/UPF/SMF determines whether to provide the service request by the UE. If it is determined to provide the service requested by the UE, the MME/AMF/UPF/SMF transmits an INITIAL CONTEXT SETUP REQUEST message to the gNB at operation 5e-25. This message includes quality of service (QoS) information for use in configuring a data radio bearer (DRB) and security information (e.g., security key and security algorithm) to be applied to the DRB. The gNB transmits a SecurityModeCommand message to the UE at operation 5e-30 and receives a SecurityModeComplete message from the UE at operation 5e-35 for security configuration. After the security configuration is completed, the gNB transmits an RRCConnectionReconfiguration message to the UE at operation 5e-40. This message includes information indicating whether to enable the new PDCP status report per logical channel (logicalchannelcofig), per bearer, or per PDCP entity (PDCP-config). In more detail, it may be possible to indicate an IP flow or QoS flow, for which the new PDCP status report is enabled, on each logical channel, each bearer, or each PDCP (or SDAP) entity. The new PDCP status report may be enabled with configuration of a buffer threshold or a threshold value of a newly introduced timer or a reordering timer as a condition for triggering the new PDCP status report. In this case, if the amount of the data in the buffer for the PDCP or RLC entity reaches the threshold value or if the newly introduced timer or the reordering timer reaches the threshold value, this may trigger the new PDCP status report. The RRCConnectionReconfiguration message also includes information for use in configuring the DRB for user data transmission, and the UE configures the DRB based on this DRB configuration information and transmits an RRCConnectionReconfigurationComplete message to the gNB at operation 5e-45. After establishing the DRB with the UE, the gNB transmits an INI CONTEXT RESPONSE message to the MME at operation 5e-50, the MME transmits an S1 BEARER SETUP message to an S-GW at operation 5e-55 upon receipt of the INI CONTEXT RESPONSE message for establishing an S1 bearer with the S-GW and receives an S1 BEARER SETUP RESPONSE message from the S-GW at operation 5e-60. The S1 bearer is a connection established between the S-GW and the gNB for data transfer and corresponds to the DRB one by one. Once the above processes are completed successfully, the UE transmits and receives data via the gNB and the S-GW at operations 5e-65 and 5e-70. The data transmission procedure may be divided into three phases: RRC connection configuration, security configuration, and DRB configuration. The gNB may also transmit the RRCConnectionReconfiguration message to the UE at operation 5e-75 to update, supplement, or modify the configuration to the UE. This message includes information indicating whether to enable the new PDCP status report per logical channel (logicalchannelcofig), per bearer, or per PDCP entity (PDCP-config). In more detail, it may be possible to indicate an IP flow or QoS flow, for which the new PDCP status report is enabled, on each logical channel, each bearer, or each PDCP (or SDAP) entity. The new PDCP status report may be enabled with configuration of a buffer threshold or a threshold value of a newly introduced timer or a reordering timer as a condition for triggering the new PDCP status report. In this case, if the amount of the data in the buffer for the PDCP or RLC entity reaches the threshold value or if the newly introduced timer or the reordering timer reaches the threshold value, this may trigger the new PDCP status report.

Figure 5F:
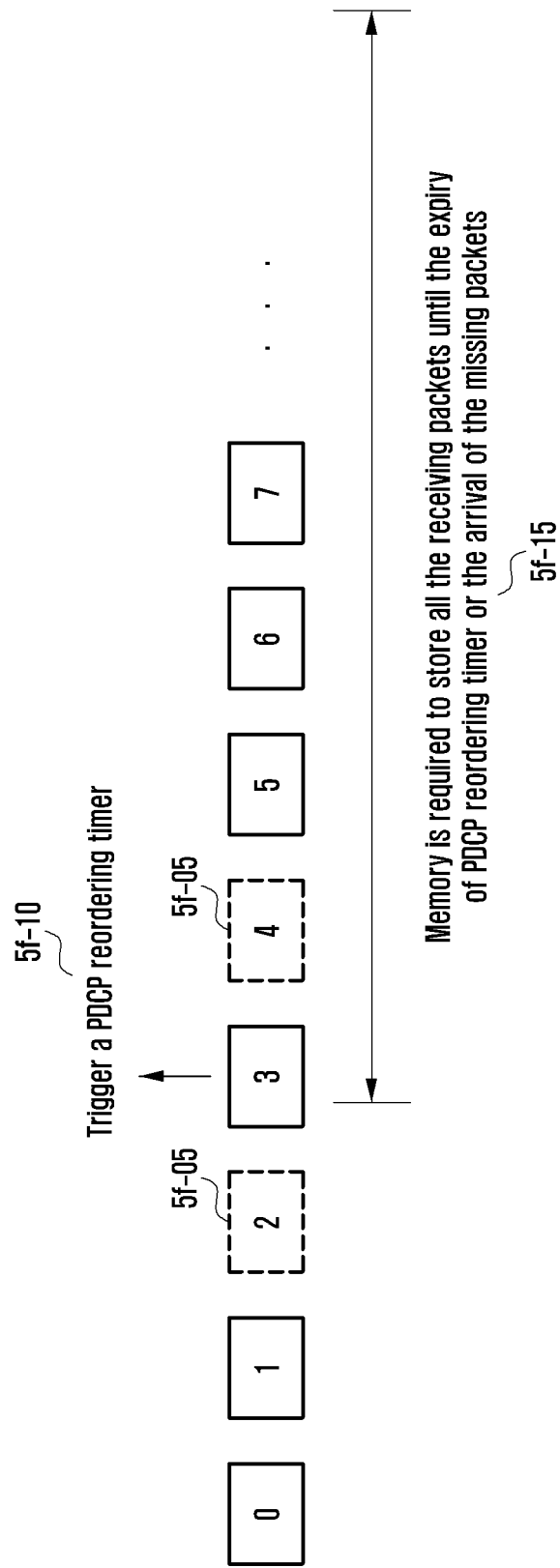
FIG. 5F is a diagram illustrating a transmission delay and data loss problems caused by a PDCP reordering timer for a PDCP entity according to an embodiment of the disclosure.

FIG. 5F is a diagram illustrating a transmission delay and data loss problems caused by a PDCP reordering timer for a PDCP entity according to an embodiment of the disclosure.

Referring to FIG. 5F, a transmit PDCP entity may transmit data (PDCP PDU or PDCP SDU) with a 12-bit PDCP sequence number (0, 1, 2, 3, . . . , 2^(12-1)) and a receive PDCP entity may receive the data out of order rather than in the ascending order of the PDCP sequence number because of HARQ retransmission of a MAC entity or ARQ retransmission of an RLC entity in accordance with the condition of the radio link. In the case where the PDCP discard timer of the transmit PDCP entity expires or data loss occurs over the radio link, the PDCP entity may fail to receive data (PDCP PDU or PDCP SDU) with a certain PDCP sequence number or receive the data too late.

In FIG. 5F, the data (PDCP PDU or PDCP SDU) with the PDCP sequence number 3 may arrive at the receive PDCP entity as denoted by reference number 5f-05 without arrival of the data (PDCP PDU or PDCP SDU) with the PDCP sequence number 2. In this case, the receive PDCP entity triggers the PDCP reordering timer to receive the data (PDCP PDU or PDCP SDU) with the PDCP sequence number for in-sequence delivery of the data to the upper layer as denoted by reference number 5f-10. The PDCP reordering timer indicates how long the PDCP entity waits for the arrival of the missing data and, if the PDCP reordering timer expires, the receive PDCP entity determines that the data which is not arrived yet among the data with the PDCP sequence numbers less than the PDCP sequence number with which the PDCP reordering timer has been triggered are lost and delivers the data with the PDCP sequence numbers less than the PDCP sequence number with which the PDCP reordering timer has been triggered to the upper layer in the ascending order of the PDCP sequence number.

For a service requiring a high data rate, however, if the PDCP reordering timer is set to a long period of time as before, it is necessary to buffer a large amount of received data because the data cannot be delivered to the upper layer until the expiry of the PDCP reordering timer or the arrival of the missing data as denoted by reference number 5f-15; increasing the size of the buffer or memory is expensive and thus increases the whole manufacturing cost of the UE. In the state where a large amount of data are stored in the buffer because of the arrival delay of certain data, if the reordering timer expires or the missing data arrives, all of the data stored in the buffer are delivered to the upper layer at one time. In such a case, the upper layer may not process the large amount of data properly and thus discard the data at a predetermined level or a predetermined rate, resulting in data loss.

In order to address the issue described with reference to FIG. 5F, the disclosure proposes a new PDCP status report, a method for triggering the new PDCP status report, and operations of the transmit and receive PDCP entities.

Figure 5G:
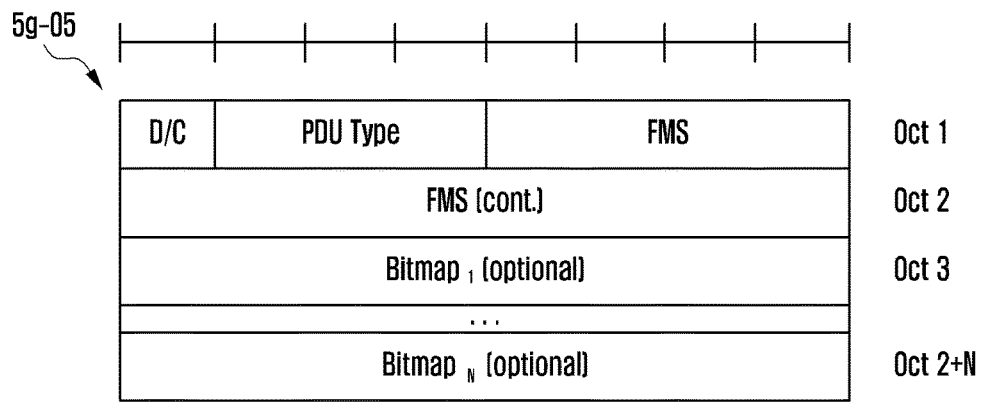
FIG. 5G is a diagram illustrating formats of a first type PDCP status report according to an embodiment of the disclosure.
Figure 5G:
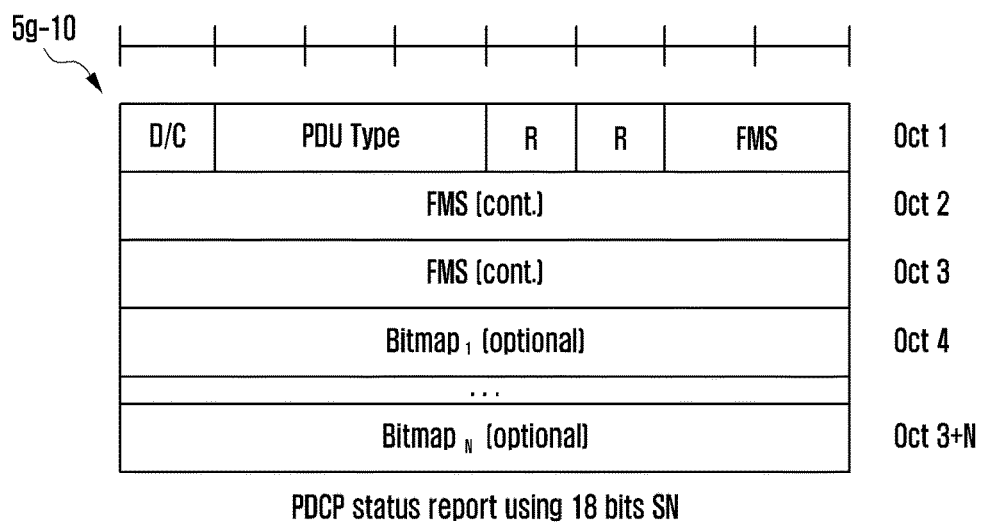
Figure 5G:
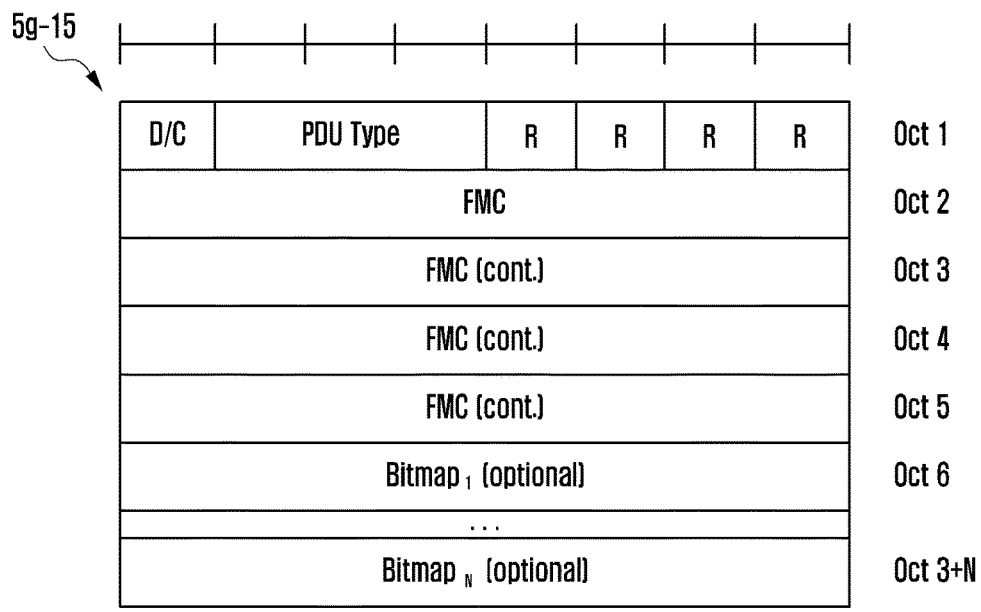

FIG. 5G is a diagram illustrating formats of a first type PDCP status report according to an embodiment of the disclosure.

Referring to FIG. 5G, according to an embodiment of the disclosure, the first type PDCP status report may be configured in the format 2g-05 for the case of using a 12-bit PDCP sequence number, the format 2g-10 for the case of using an 18-bit PDCP sequence number, and the format 2g-15 for the case of used a 32-bit PDCP count value. In the formats 5g-05, 5g-10, and 5g-15, the D/C field indicates whether the buffered data is PDCP user data (PDCP data PDU) or PDCP control data (PDCP control PDU), and the PDU type field indicates the type of the PDCP control PDU. The first missing sequence number (FMS) field indicates the sequence number of the first missing PDU, and the first missing count value (FMC) field indicates the PDCP count value of the first missing PDU within the receive reordering window. The bitmap field following the FMC or the FMS field consists of a plurality of bits mapped to the PDCP PDUs with consecutive PDCP sequence numbers or PDCP count values in an ascending order, each bit is set to 0 or 1 to indicate whether corresponding PDCP data is successfully received or not.

In order to indicate use of the first type PDCP status report proposed in the disclosure, the PDU type field is set to 011 as shown in Table 3. It may also be possible to use one of other reserved values (e.g., 100 to 111).

TABLE 3

| Bit | Description |
|---|---|
| 000 | PDCP status report |
| 001 | Interspersed ROHC feedback packet |
| 010 | LWA status report |
| 011 | PDCP status report for retransmission |
| 100-111 | reserved |

In order to address the issues caused by transmission delay with the PDCP reordering timer as described with reference to FIG. 5F, a receiver may trigger the first type PDCP status report proposed in the disclosure in the following situations. For example, if the UE predicts occurrence of the above problem, it triggers the first type PDCP status report by transmitting the first type PDCP status report to the transmitter to request for retransmission of the missing data (PDCP PDU or PDCP SDU) promptly.

The receiver may trigger the first type PDCP status report when at least one of the following conditions is fulfilled.
1. The amount of data stored in the receive buffer or memory is equal to or greater than a predetermined amount,
2. the amount of the data stored in the receive buffer or memory is equal to or greater than a threshold value configured via an RRC message,
3. a new timer configured via an RRC message expires,
4. a PDCP reordering timer reaches a value configured via an RRC message,
5. a first type PDCP status report request is required according to implementation,
6. an RRC message indicating a request for the first type PDCP status report is received,
7. data with a PDCP header including a 1-bit poll indicator is received,
8. a PDCP control PDU indicating a request for the first type PDCP status report request, and
9. a MAC entity receives a MAC CE indicating request for the first status report.

The RRC message may be one of the RRC messages being transmitted at operations 5e-10, 5e-40, 5e-75 in FIG. 5E.

In an embodiment of the disclosure, the transmitter may transmit the RRC message or request to the receiver for the first type PDCP status report via the MAC CE, PDCP header, or PDCP control PDU when one of the following conditions are fulfilled.
1. The transmitter may request to the receiver for the first type PDCP status report via an indicator included in the RRC message, MAC CE, or PDCP control PDU periodically whenever the newly defined timer expires.
2. The transmitter may request to the receiver for the first type PDCP status report via a 1-bit indicator (e.g., PDCP poll bit) defined in the PDCP header periodically whenever the newly defined timer expires.
3. The transmitter may request to the receiver for the first type PDCP status report via indication in the RRC message, MAC CE, or PDCP control PDU in accordance with the implementation of the transmitter.
4. The transmitter may request to the receiver for the first type PDCP status report in accordance with the implementation or determination of the transmitter by configuring a 1-bit indicator (e.g., PDCP poll bit) defined in the PDCP header.

The newly defined timer may be a timer for the first type PDCP status report, e.g., t-StatusReportType3.

In the disclosure, when the first type PDCP status report is triggered, the receiver or the receive PDCP entity operates as follows.

If the first type PDCP status report is triggered at the receiver according to the above-described first type PDCP status report triggering conditions, the receiver may distinguish between the successfully received data and missing data in association with the PDCP sequence numbers or PDCP count values (PDCP sequence numbers or PDCP count values belonging to a PDCP reception window) that are less than the RX-REORD variable indicating the PDCP sequence number or PDCP COUNT value with which the PDCP reordering status report is triggered among the PDCP reception window variables; configure the D/C field, PDU type field, FMC or FMS field, and bitmap field of the data format depicted in FIG. 5G to generate the first type PDCP status report; and transmit the first type PDCP status report to the receiver.

Alternatively, if the first type PDCP status report is triggered at the receiver according to the above-described first type PDCP status report triggering conditions, the receiver may distinguish between the successfully received data and missing data in association with the PDCP sequence numbers or PDCP count values (PDCP sequence numbers or PDCP count values belonging to a PDCP reception window) that are less than the RX-REORD variable indicating the PDCP sequence number or PDCP COUNT value predicted to be received next among the PDCP reception window variables; configure the D/C field, PDU type field, FMC or FMS field, and bitmap field of the data format depicted in FIG. 5G to generate the first type PDCP status report; and transmit the first type PDCP status report to the receiver.

Alternatively, if the first type PDCP status report is triggered at the receiver according to the above-described first type PDCP status report triggering conditions, the receiver may distinguish between the successfully received data and missing data in association with the PDCP sequence numbers or PDCP count values (PDCP sequence numbers or PDCP count values belonging to a PDCP reception window) that are less than the RX-REORD variable indicating the first PDCP sequence number or PDCP COUNT value of the data that are not delivered yet to the upper layer among the PDCP reception window variables; configure the D/C field, PDU type field, FMC or FMS field, and bitmap field of the data format depicted in FIG. 5G to generate the first type PDCP status report; and transmit the first type PDCP status report to the receiver.

In the disclosure, when the first type PDCP status report is received, the transmitter or the transmit PDCP entity operates as follows.

If the first type PDCP status report is received, the transmit PDCP entity may check the successfully transmitted data (PDCP PDU or PDCP SDU) and the missing data, discard the successfully transmitted data from the transmit buffer, and retransmit the missing data stored in the buffer. For example, the transmit PDCP entity may retrieve the missing data from the transmit buffer and send the retrieved data to the lower layer for retransmission. In order to make it possible for the lower layer to transmit the retransmission target data of the PDCP entity preferentially, the PDCP entity may send the lower layer a fast delivery or expedite deliver indicator. If this indicator is received, the lower layer (RLC entity) assumes the data from the upper layer as the retransmission target data (PDCP PDU) and transmits the corresponding data preferentially.

Alternatively, if the first type PDCP status report is received, the transmit PDCP entity may check the successfully transmitted data (PDCP PDU or PDCP SDU) and the missing data, discard the successfully transmitted data from the transmit buffer, and retrieves the missing data that has been sent to the low layer for retransmission. For example, the transmit PDCP entity may retrieve the missing data from the transmit buffer and send the retrieved data to the lower layer for retransmission. In order to make it possible for the lower layer to transmit the retransmission target data of the PDCP entity preferentially, the PDCP entity may send the lower layer a fast delivery or expedite deliver indicator. If this indicator is received, the lower layer (RLC entity) assumes the data from the upper layer as the retransmission target data (PDCP PDU) and transmits the corresponding data preferentially.

According to an embodiment of the disclosure, a second type PDCP status report may be defined and used in addition to the first type PDCP status report. As described above, the first type PDCP status report is characterized in that if the transmitter receives the first type PDCP status report it discards the successfully transmitted data and retransmit the missing data promptly. In the case of the second type PDCP status report, however, although the transmitter discards the successfully transmitted data immediately upon receipt of the second type PDCP status report, it retransmits the missing data only when a PDCP reestablishment procedure or PDCP data recovery procedure is performed rather than immediately upon receipt of the second type PDCP status report.

Both the first and second type PDCP status reports may use the format depicted in FIG. 5G with the exception of the difference in the PDU type field value. The above-described first type PDCP status report triggering conditions may be applied to the second type PDCP status report in the same manner. The first and second type PDCP status reports may be configured in the same manner. Accordingly, it is obvious that the second type PDCP status report can be used on behalf of the first type PDCP status report in the disclosure.

Figure 5H:
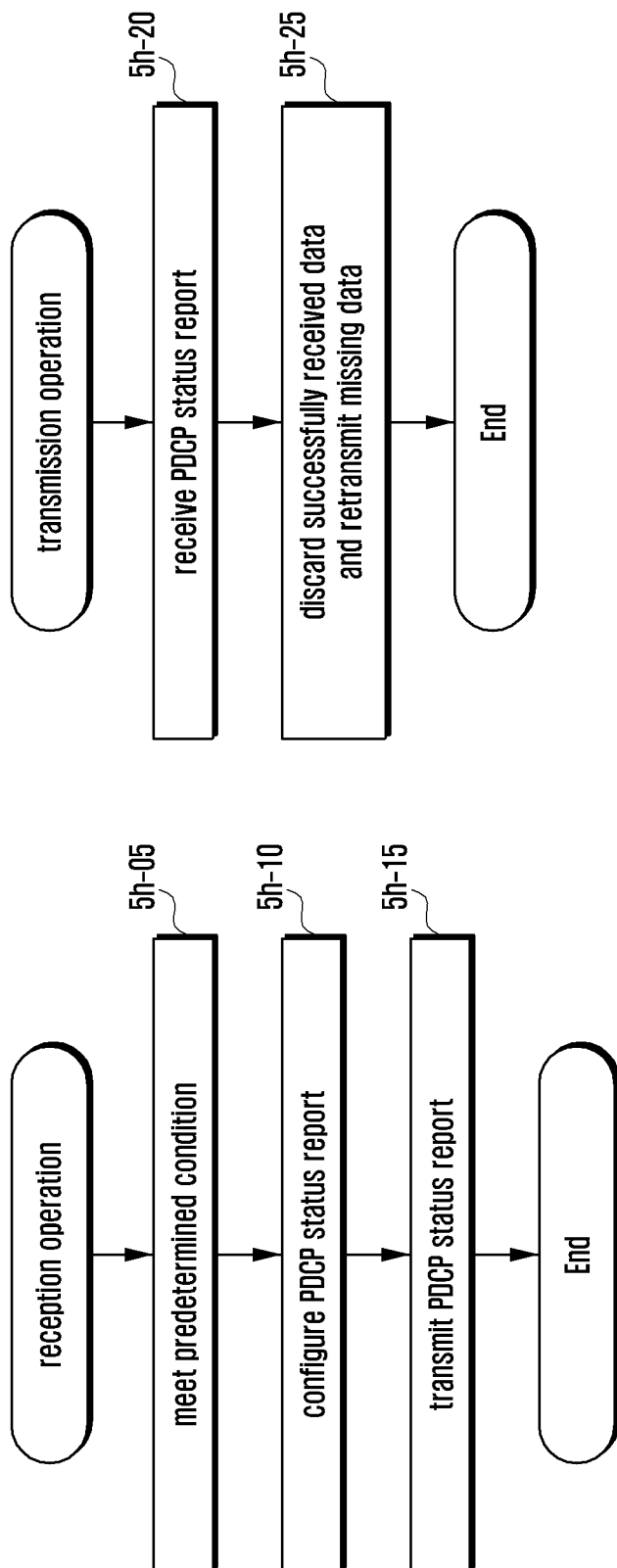
FIG. 5H describes flowcharts illustrating operations of a transmit PDCP entity and a receive PDCP entity for processing a proposed PDCP status report according to an embodiment of the disclosure.

FIG. 5H describes flowcharts illustrating operations of a transmit PDCP entity and a receive PDCP entity for processing a proposed PDCP status report according to an embodiment of the disclosure.

Referring to FIG. 5H, if one of the above-described triggering conditions is fulfilled to trigger the PDCP status report at operation 5h-05, the receive PDCP entity configures the PDCP status report, at operation 5h-10, and the transmits the PDCP status report at operation 5h-15, in the format described with reference to FIG. 5G. If the transmit PDCP entity receives the PDCP status report at operation 5h-20, it may discard the successfully transmitted data and perform retransmission of the missing data at operation 5h-25. The transmit PDCP entity may also send the lower layer an indicator instructing to transmit the retransmission target data preferentially.

According to another embodiment of the disclosure, for the case where the PDCP entity or bearer is configured with the new PDCP status report request function using one of the RRC message being transmitted at operations 5e-10, 5e-40, 5e-75 in FIG. 5E, if the transmitter requests to the receiver for a new PDCP status report via a 1-bit polling indicator of the PDCP header, PDCP control PDU, MAC CE, or RRC message or if the above-described PDCP status report triggering conditions of the receiver are fulfilled, the receiver triggers the first type PDCP status report proposed in the disclosure, and the transmitter checks the first type PDCP status report to discard the successfully transmitted data and perform retransmission of the missing data immediately. However, for the case where the PDCP entity or bearer is not configured with the new PDCP status report request function using one of the RRC message being transmitted at operations 5e-10, 5e-40, 5e-75 in FIG. 5E, if the transmitter requests to the receiver for a new PDCP status report via a 1-bit polling indicator of the PDCP header, PDCP control PDU, MAC CE, or RRC message or if the above-described PDCP status report triggering conditions of the receiver are fulfilled, the receiver triggers the second type PDCP status report proposed in the disclosure, and the transmitter checks the second type PDCP status report to discard the successfully transmitted data and perform retransmission of the missing data only when a PDCP reestablishment procedure or PDCP data recovery procedure is performed rather than immediately upon receipt of the second type PDCP status report.

Figure 5I:
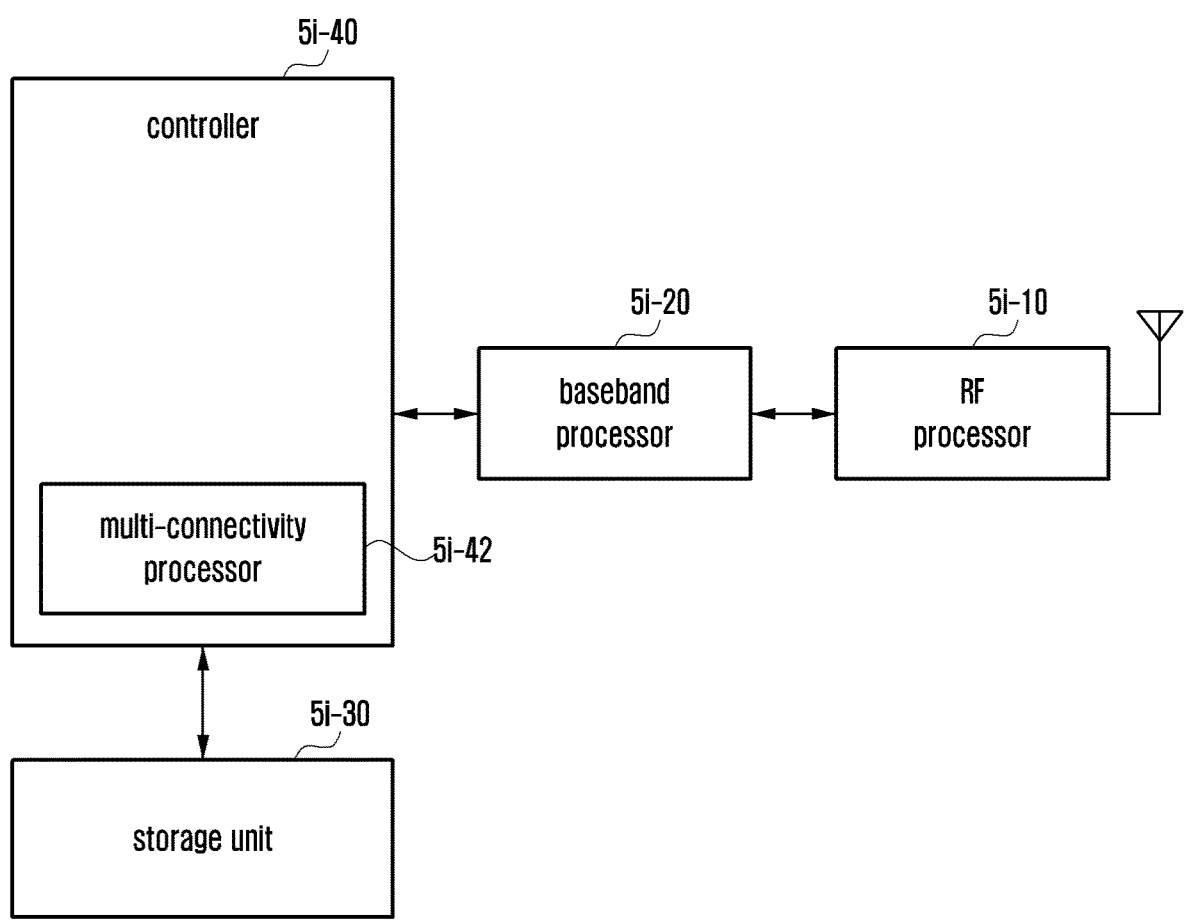
FIG. 5I is a block diagram illustrating a configuration of a UE according to an embodiment of the disclosure.

FIG. 5I is a block diagram illustrating a configuration of a UE according to an embodiment of the disclosure.

Referring to FIG. 5I, the UE includes a radio frequency (RF) processor 5i-10, a baseband processor 5i-20, a storage unit 5i-30, and a controller 5i-40.

The RF processor 5i-10 has a function for transmitting/receiving a signal over a radio channel, such as band conversion and amplification of the signal. For example, the RF processor 5i-10 up-converts a baseband signal from the baseband processor 5i-20 to an RF band signal and transmits the RF signal via an antenna and down-converts the RF signal received via the antenna to a baseband signal. For example, the RF processor 5i-10 may include a transmission filter, a reception filter, an amplifier, a mixer, an oscillator, a DAC, and an ADC. Although one antenna is depicted in the drawing, the UE may be provided with a plurality of antennas. The RF processor 5i-10 may also include a plurality of RF chains. The RF processor 5i-10 may perform beamforming. For beamforming, the RF processor 5i-10 may adjust the phase and size of a signal to be transmitted/received by means of the antennas or antenna elements in phase and size. The RF processor 5i-1—may be configured to support a MIMO scheme with which the UE can receive multiple layers simultaneously. The RF processor 5i-10 may configure the plurality of antennas or antenna elements appropriately, under the control of the controller 5I-40, to perform beam sweeping and adjust the beam direction and beam width to achieve an alignment of the reception and transmission beam.

The baseband processor 5i-20 has a baseband signal-bit string conversion function according to a physical layer standard of the system. For example, in a data transmission mode, the baseband processor 5i-20 performs encoding and modulation on the transmission bit string to generate complex symbols. In a data reception mode, the baseband processor 5i-20 performs demodulation and decoding on the baseband signal from the RF processor 5i-10 to recover the transmitted bit string. In the case of using an OFDM scheme for data transmission, the baseband processor 5i-20 performs encoding and modulation on the transmission bit string to generate complex symbols, maps the complex symbols to subcarriers, performs IFFT on the symbols, and inserts a cyclic prefix (CP) into the symbols to generate OFDM symbols. In the data reception mode, the baseband processor 5i-20 splits the baseband signal from the RF processor 5i-10 into OFDM symbols, perform FFT on the OFDM symbols to recover the signals mapped to the subcarriers, and performs demodulation and decoding on the signals to recover the transmitted bit string.

The baseband processor 5i-20 and the RF processor 5i-10 process the transmission and reception signals as described above. Accordingly, the baseband processor 5i-20 and the RF processor 5i-10 may be referred to as a transmitter, a receiver, a transceiver, or a communication unit. At least one of the baseband processor 5i-20 and the RF processor 5i-10 may include a plurality of communication modules for supporting different radio access technologies. At least one of the baseband processor 5i-20 and the RF processor 5i-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 Ghz bands) and an mmWave band (e.g., 60 GHz).

The storage unit 5i-30 stores data, such as basic programs for operation of the UE, application programs, and setting information. The storage unit 5i-30 provides the stored information in response to a request from the controller 5i-40.

The controller 5i-40 controls overall operations of the UE. For example, the controller 5i-40 controls the baseband processor 5i-20 and the RF processor 5i-10 for transmitting and receiving signals. The controller 5i-40 writes and reads data to and from the storage unit 5i-30. For this purpose, the controller 5i-40 may include at least one processor. For example, the controller 5i-40 may include a CP for controlling communications and an AP for controlling higher layer programs, such as applications. The controller 5i-40 may include a multi-connectivity processor 5i-42 for processing operations in a multi-connectivity mode.

According to an embodiment of the disclosure, the UE may include part of the components depicted in the drawing, and the components of the UE are controlled by the controller 5i-40.

Figure 5J:
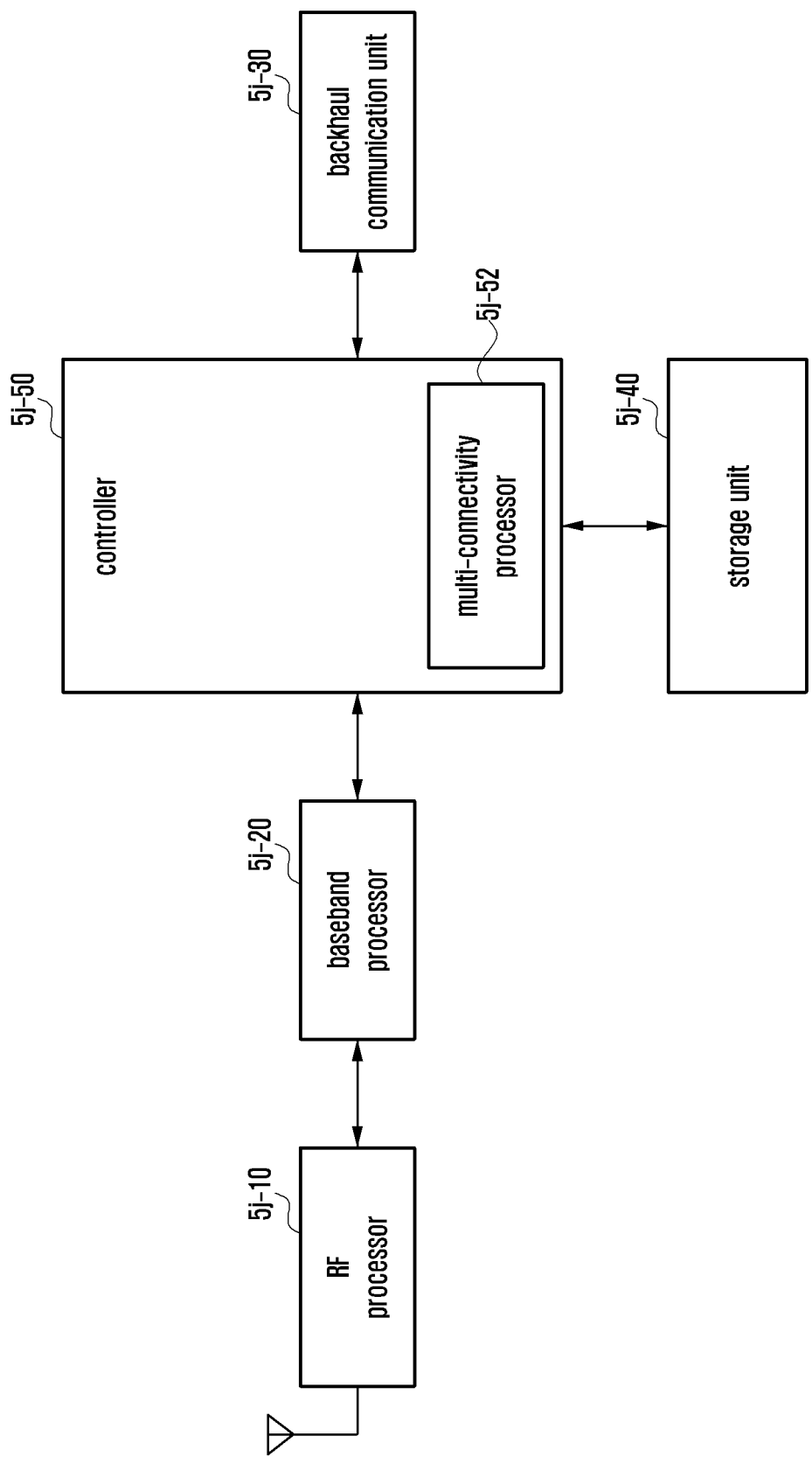
FIG. 5J is a block diagram illustrating a configuration of a gNB according to an embodiment of the disclosure.

FIG. 5J is a block diagram illustrating a configuration of a gNB according to an embodiment of the disclosure.

Referring to FIG. 5J, the gNB includes an RF processor 5j-10, a baseband processor 5j-20, a backhaul communication unit 5j-30, a storage unit 5j-40, and a controller 5j-50.

The RF processor 5j-10 has a function for transmitting/receiving a signal over a radio channel, such as band conversion and amplification of the signal. For example, the RF processor 5j-10 up-converts a baseband signal from the baseband processor 5j-20 to an RF band signal and transmits the RF signal via an antenna and down-converts the RF signal received via the antenna to a baseband signal. For example, the RF processor 5j-10 may include a transmission filter, a reception filter, an amplifier, a mixer, an oscillator, a DAC, and an ADC. Although one antenna is depicted in the drawing, the gNB may be provided with a plurality of antennas. The RF processor 5j-10 may also include a plurality of RF chains. The RF processor 5j-10 may perform beamforming. For beamforming, the RF processor 5j-10 may adjust the phase and size of a signal to be transmitted/received by means of the antennas or antenna elements. The RF processor 5j-10 may be configured to transmit one or more layers for a downlink MIMO operation.

The baseband processor 5j-20 has a baseband signal-bit string conversion function according to a physical layer standard of the system. For example, in a data transmission mode, the baseband processor 5j-20 performs encoding and modulation on the transmission bit string to generate complex symbols. In a data reception mode, the baseband processor 5j-20 performs demodulation and decoding on the baseband signal from the RF processor 5j-10 to recover the transmitted bit string. In the case of using an OFDM scheme for data transmission, the baseband processor 5j-20 performs encoding and modulation on the transmission bit string to generate complex symbols, maps the complex symbols to subcarriers, performs IFFT on the symbols, and inserts a CP into the symbols to generate OFDM symbols. In the data reception mode, the baseband processor 5j-20 splits the baseband signal from the RF processor 5j-10 into OFDM symbols, performs fast Fourier transform (FFT) on the OFDM symbols to recover the signals mapped to the subcarriers, and performs demodulation and decoding on the signals to recover the transmitted bit string. The baseband processor 5j-20 and the RF processor 5j-10 process the transmission and reception signals as described above. Accordingly, the baseband processor 5j-20 and the RF processor 5j-10 may be referred to as a transmitter, a receiver, a transceiver, or a communication unit.

The backhaul communication unit 5j-30 provides an interface for communication with other nodes in the network.

The storage unit 5j-40 stores data, such as basic programs for operation of the gNB, application programs, and setting information. The storage unit 5j-40 may also store the information on the bearers established for UEs and measurement results reported by the connected UEs. The storage unit 5j-40 may also store the information for use by a UE in determining whether to enable or disable multi-connectivity. The storage unit 5j-40 may provide the stored data in reference to a request from the controller 5j-50.

The controller 5j-50 controls overall operations of the gNB. For example, the controller 5j-50 controls the baseband processor 5j-20, the RF processor 5j-10, and the backhaul communication unit 5j-30 for transmitting and receiving signals. The controller 5j-50 writes and reads data to and from the storage unit 5j-40. For this purpose, the controller 5j-50 may include at least one processor. The controller 5j-50 may also include a multi-connectivity processor 5j-52 for processing operations in a multi-connectivity mode.

According to an embodiment of the disclosure, the gNB may also include part of the components depicted in the drawing, and the components of the gNB are controlled by the controller 5j-50.

Sixth Embodiment

Embodiments of the disclosure are described with reference to the accompanying drawings. Detailed description of well-known functions and structures incorporated herein may be omitted to avoid obscuring the subject matter of the disclosure. Further, the following terms are defined based on the functionality in the disclosure, and may vary according to the intention of a user or an operator, usage, and the like. Therefore, the definition should be made based on the overall content of the specification. The terms used, in the following description, for indicating access nodes, network entities, messages, interfaces between network entities, and diverse identity informations are provided for convenience of explanation. Accordingly, the terms used in the following description are not limited to specific meanings but may be replaced by other terms equivalent in technical meanings.

Figure 6A:
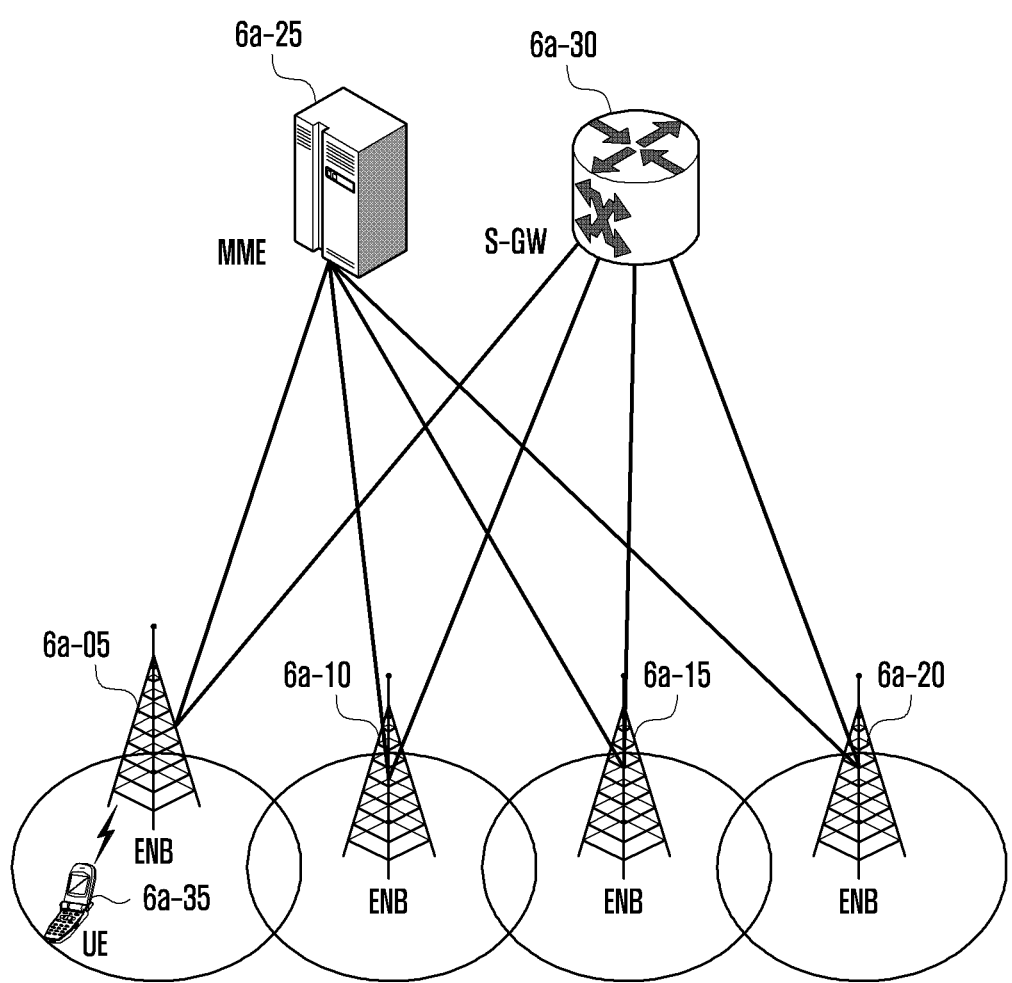
FIG. 6A is a diagram illustrating an architecture of an LTE system according to an embodiment of disclosure.

FIG. 6A is a diagram illustrating an architecture of an LTE system according to an embodiment of disclosure.

Referring to FIG. 6A, a radio access network of the LTE system includes evolved Node Bs (hereinafter, interchangeably referred to as eNB, node B, and base station) 6a-05, 6a-10, 6a-15, and 6a-20; a mobility management entity (MME) 6a-25; and a serving gateway (S-GW) 6a-30. A user terminal (hereinafter, interchangeably referred to as user equipment (UE) and terminal) 6a-35 connects to an external network via the eNBs 6a-05, 6a-10, 6a-15, and 6a-20 and the S-GW 6a-30.

The eNBs 6a-05, 6a-10, 6a-15, and 6a-20 correspond to the legacy node Bs of the universal mobile telecommunications system (UMTS). The UE 6a-35 connects to one of the eNBs via a radio channel, and the eNB has more complex functions than the legacy node B. In the LTE system where all user traffic including real time services, such as Voice over IP (VoIP) is served through shared channels, there is a need of an entity for collecting UE-specific status information (such as buffer status, power headroom status, and channel status) and scheduling the UEs based on the collected information, and the eNB takes charge of such functions. Typically, one eNB hosts multiple cells. For example, the LTE system adopts Orthogonal Frequency Division Multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 6a-30 handles data bearer functions to establish and release data bearer under the control of the MME 6a-25. The MME 6a-25 handles various control functions for the UE as well as the mobile management function and has connections with the eNBs 6a-05, 6a-10, 6a-15, and 6a-20.

Figure 6B:
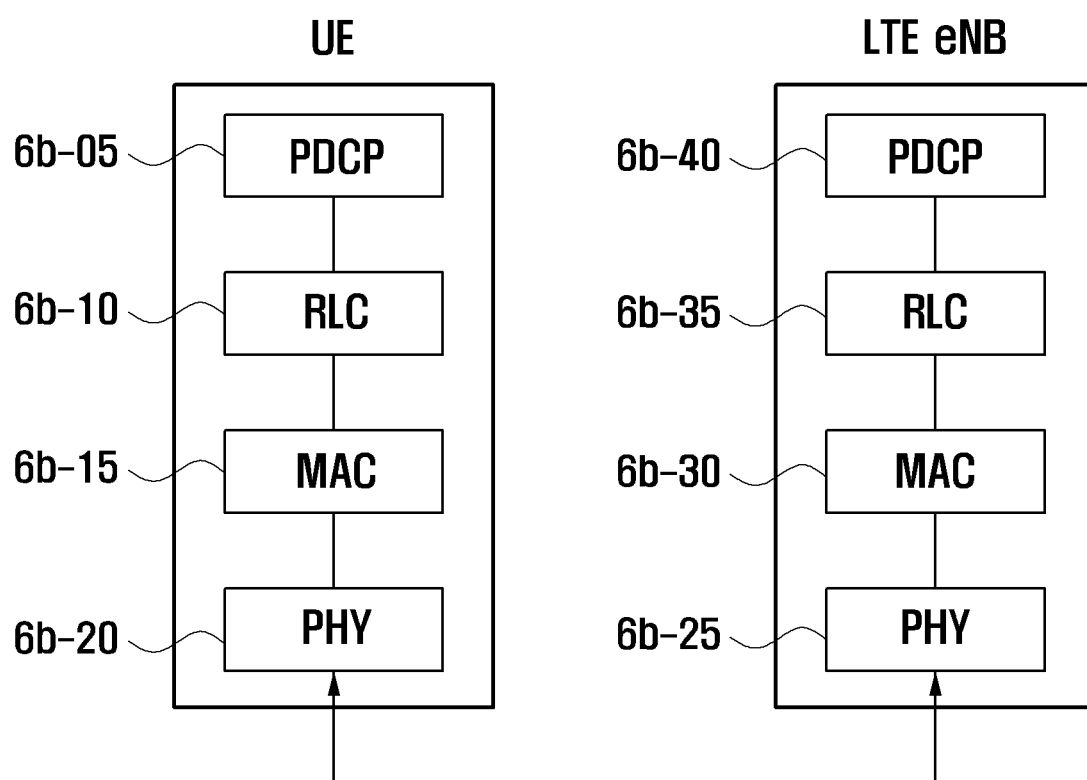
FIG. 6B is a diagram illustrating a protocol stack of an interface between a UE and an eNB in an LTE system according to an embodiment of disclosure.

FIG. 6B is a diagram illustrating a protocol stack of an interface between a UE and an eNB in an LTE system according to an embodiment of disclosure.

Referring to FIG. 6B, the protocol stack of the interface between the UE and the eNB in the LTE system includes a plurality of protocol layers stacked from the bottom to the top: physical layer denoted by reference numbers 6b-20 and 6b-25, medium access control (MAC) layer denoted by reference numbers 6b-15 and 6b-30, radio link control (RLC) layer denoted by reference numbers 6b-10 and 6b-35, and packet data convergence control (PDCP) layer denoted by reference numbers 6b-05 and 6b-40. The PDCP layer denoted by reference numbers 6b-05 and 6b-40 takes charge of compressing/decompressing an IP header. The main functions of the PDCP layer are summarized as follows:
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink.

The RLC layer designated by reference number 6b-10 and 6b-35 takes charge of reformatting PDCP PDUs in order to fit them into the size for ARQ operation. The main functions of the RLC protocol are summarized as follows:
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MAC layer denoted by reference number 6b-15 and 6b-30 allows for connection of multiple RLC entities established for one UE and takes charge of multiplexing RLC PDUs from the RLC layer into a MAC PDU and demultiplexing a MAC PDU into RLC PDUs. The main functions of the MAC protocol are summarized as follows:
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding The PHY layer denoted by reference numbers 6b-20 and 6b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 6C:
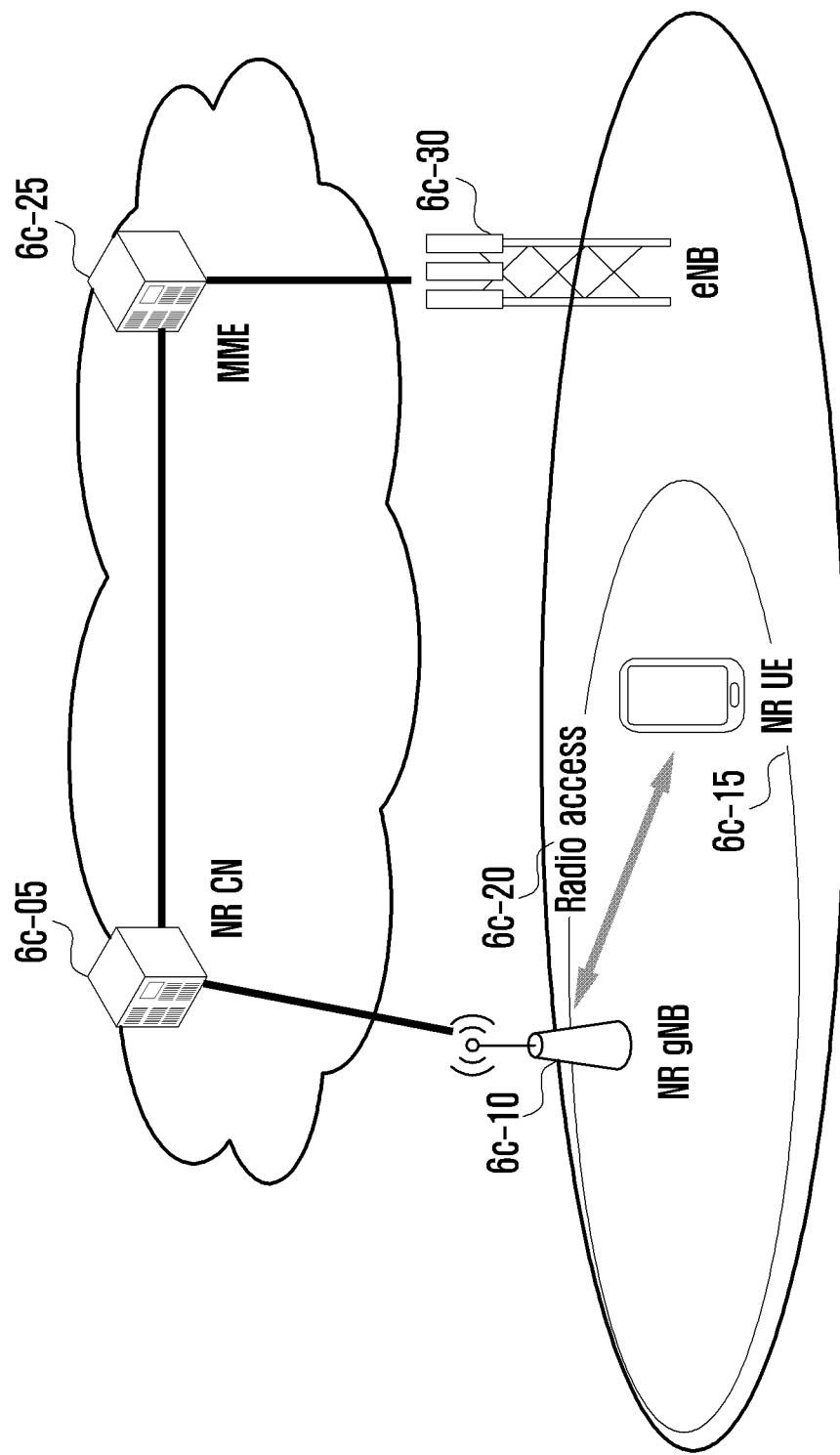
FIG. 6C is a diagram illustrating an architecture of a next generation mobile communication system according to an embodiment of disclosure.

FIG. 6C is a diagram illustrating an architecture of a next generation mobile communication system according to an embodiment of disclosure.

Referring to FIG. 6C, a radio access network 6c-20 of the next generation mobile communication system includes a new radio Node B (RN NB) 6c-10 and a new radio core network (NR CN) 6c-05. A new radio user equipment (hereinafter, referred to as NR UE or simply UE) 6c-15 connects to an external network via the NR NB 6c-10 and the NR CN 6c-05.

In FIG. 6C, the NR NB 6c-10 corresponds to the evolved Node B (eNB) in the legacy LTE system. The NR UE 6c-15 connects to the NR NB, which may provide services superior to those of the legacy eNB. In the next generation mobile communication system where all user traffic is served through shared channels, there is a need of an entity for collecting UE-specific status information (such as buffer status, power headroom status, and channel status) and scheduling the UEs based on the collected information, and the NR NB 6c-10 takes charge of such functions. Typically, one NR NB hosts multiple cells. In order to meet the data rate requirement that is higher than that for legacy LTE, it is necessary to secure a maximum bandwidth broader than ever before by employing advanced technologies, such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE. The NR CN 6c-05 is responsible for mobility management, bearer setup, and QoS setup. The NR CN 6c-05 is responsible for other control functions as well as UE mobility management functions in connection with a plurality of NR NBs. The next generation mobile communication system may interoperate with legacy LTE systems in such a way of connecting the NR CN 6c-05 to a mobility management entity (MME) 6c-25 through a network interface. The MME 6c-25 is connected to an eNB 6c-30 as a legacy base station.

Figure 6D:
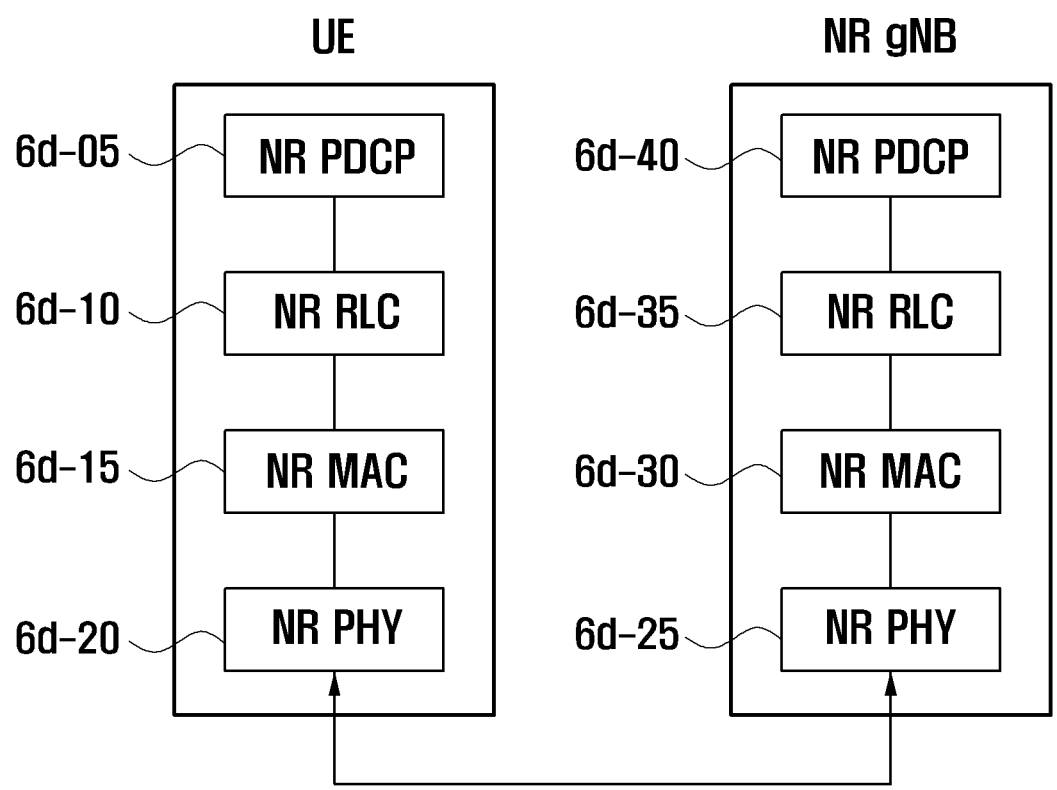
FIG. 6D is a diagram illustrating a protocol stack of an interface between an NR UE and an NR gNB in a next generation mobile communication system according to an embodiment of disclosure.

FIG. 6D is a diagram illustrating a protocol stack of an interface between an NR UE and an NR gNB in a next generation mobile communication system according to an embodiment of disclosure.

Referring to FIG. 6D, the protocol stack of the interface between an NR UE and an NR gNB in a next generation mobile communication system includes a plurality of protocol layers stacked from the bottom to the top: NR PHY layer denoted by reference numbers 6d-20 and 6d-25, NR MAC layer denoted by reference numbers 6d-15 and 6d-30, NR RLC layer denoted by reference numbers 6d-10 and 6d-35, and NR PDCP layer denoted by reference numbers 6d-05 and 6d-40. The main functions of the NR PDCP layer denoted by reference numbers 6d-05 and 6d-40 may include some of the following functions:

- Header compression and decompression: ROHC only
- Transfer of user data
- In-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink The PDCP PDU reordering function of an NR PDCP entity is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC layer denoted by reference numbers 6d-10 and 6d-35 may include some of the following functions.

- Transfer of upper layer PDUs
- In-sequence delivery of upper layer PDUs
- Out-of-sequence delivery of upper layer PDUs
- Error Correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment The in-sequence delivery function of an NR RLC entity is to deliver the RLC SDUs received from the lower layer to the upper layer and may include reassembling, when multiple segmented RLC SDUs constituting an original RLC SDU are received, the RLC SDUs and delivering the reassembled RLC SDU to the upper layer; reordering the received RLC PDUs based on the RLC sequence number (SN) or PDCP SN; recording the missing RLC PDUs among the reordered RLC PDUs; transmitting a status report indicating the missing RLC PDUs to the sender; requesting for retransmission of the missing RLC PDUs; and delivering, when there is a missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence. It may also be possible to process the RLC PDUs in the receiving sequence (in the order of arrival regardless of sequence number) and deliver the RLC PDUs to the PDCP entity out of order (out-of-sequence delivery) and, if an RLC PDU is transmitted in the form of segments, to store the received segments, or wait until all segments constituting the RLC PDU are received and reassemble the segments into the original RLC PDU, which is delivered to the PDCP entity. The NR RLC layer may have no concatenation function and, in this case, the concatenation function may be performed in the NR MAC layer or replaced by the multiplexing function of the NR MAC layer.

The out-of-sequence delivery function of an NR RLC entity is to deliver the RLC SDUs received from the lower layer to the upper layer out of order and may include reassembling, when multiple segmented RLC SDUs constituting an original RLC SDU are received, the segmented RLC SDUs, delivering the reassembled RLC SDUs to the upper layer, arranging the received RLC PDUs based on the RLC SN or PDCP SN, and recording the SN of the missing RLC PDUs.

In the NR MAC layer denoted by reference number 6d-15 and 6d-30, an NR MAC entity may be connected to multiple NR RLC entities, and the main functions of the NR MAC entity may include some of the following functions:

- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding The NR PHY layer denoted by reference number 6d-20 and 6d-25 takes charge of channel-coding and modulation on upper layer data to generate and transmit OFDM symbols over a radio channel and demodulating and channel-decoding on OFDM symbols received over the radio channel to deliver the decoded data to the upper layers.

Figure 6E:
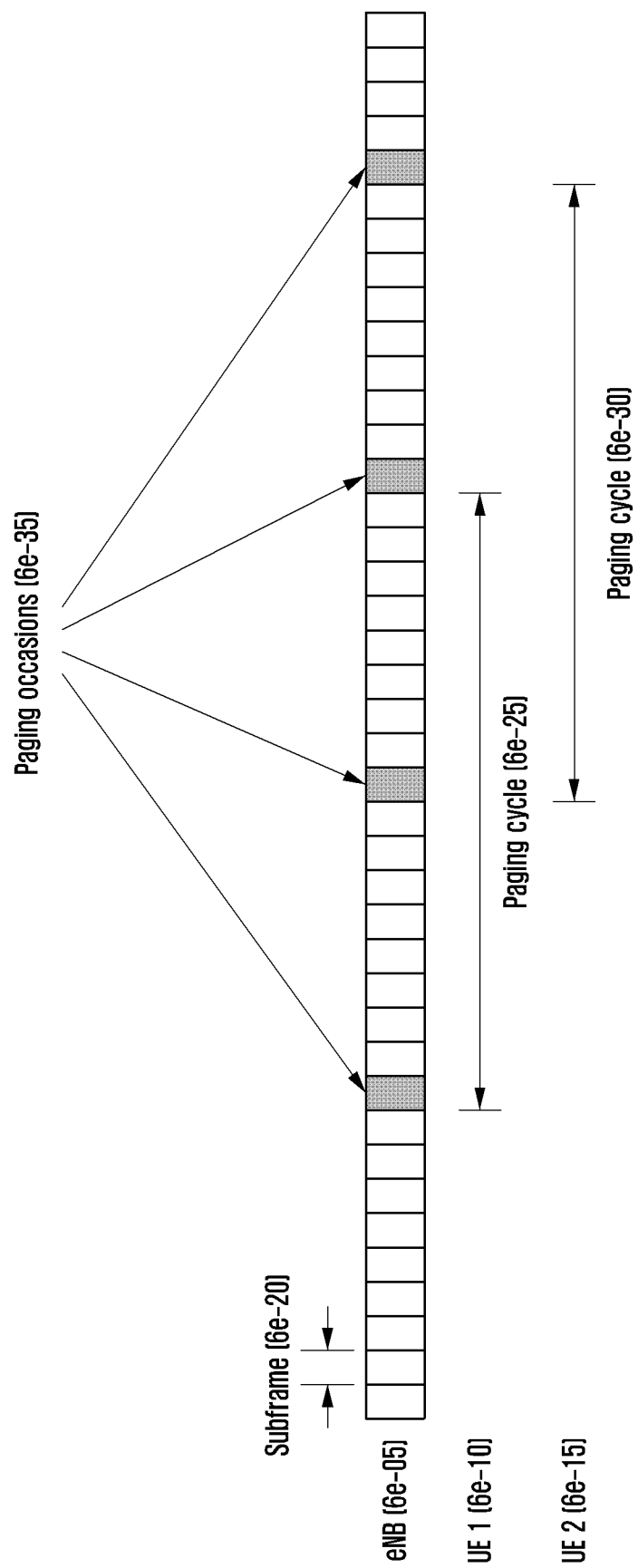
FIG. 6E is a diagram illustrating a discontinuous reception (DRX) operation of a UE in idle mode in an LTE system according to an embodiment of disclosure.

FIG. 6E is a diagram illustrating a discontinuous reception (DRX) operation of a UE in idle mode in an LTE system according to an embodiment of disclosure.

Referring to FIG. 6E, each of the UEs 6e-10 and 6e-15 in idle mode monitors PDCCH for receiving a paging message from the eNB 6e-05. The DRX adopted as an effective UE power saving technique in LTE is characterized by configuring a DRX cycle such that the receiver remains in a sleep mode during the "off" time and wakes up during the "on" time at predetermined interval. For example, a paging cycle is configured in order for the UEs to receive message from the network 6e-05 as denoted by reference number 6e-25 and 6e-30. If the UE (one of the UEs 6e-10 and 6e-15) detects a paging RNTI (P-RNTI), it processes the corresponding downlink paging message. The paging message includes a UE ID such that other UEs having a different UE ID discard the received information and enters the sleep mode according to the DRX cycle. Since the UE is not aware of the DRX cycle, HARQ is not applied during the DRX cycle.

The network 6e-05 configures subframes 6e-20 for use in paging a UE. The configuration is made based on the smallest one of the UE-requested cycle Tue and cell-specific cycle Tc. The paging cycle is set to one of 32, 64, 128, and 256 frames. The paging subframes 6e-20 within one frame may be identified based on the international mobile subscriber identity (IMSI) of the UE. Since the UEs have different IMSIs, each UE operates according to the paging instances belonging to the UE among all of the paging occasions 63-35.

The paging message can be transmitted at predetermined number of subframes 6e-20, which may be configured as shown in table 4.

TABLE 4

| | | Number of paging subframes | | | | | | |
|---|---|---|---|---|---|---|---|---|
| | | 1/32 | 1/16 | 1/8 | 1/4 | 1/2 | 1 | 2 | 4 |
| Paging subframe | FDD | 9 | 9 | 9 | 9 | 9 | 9 | 4, 9 | 0, 4, 5, 9 |
| | TDD | 0 | 0 | 0 | 0 | 0 | 0 | 0, 5 | 0, 1, 5, 6 |

Figure 6F:
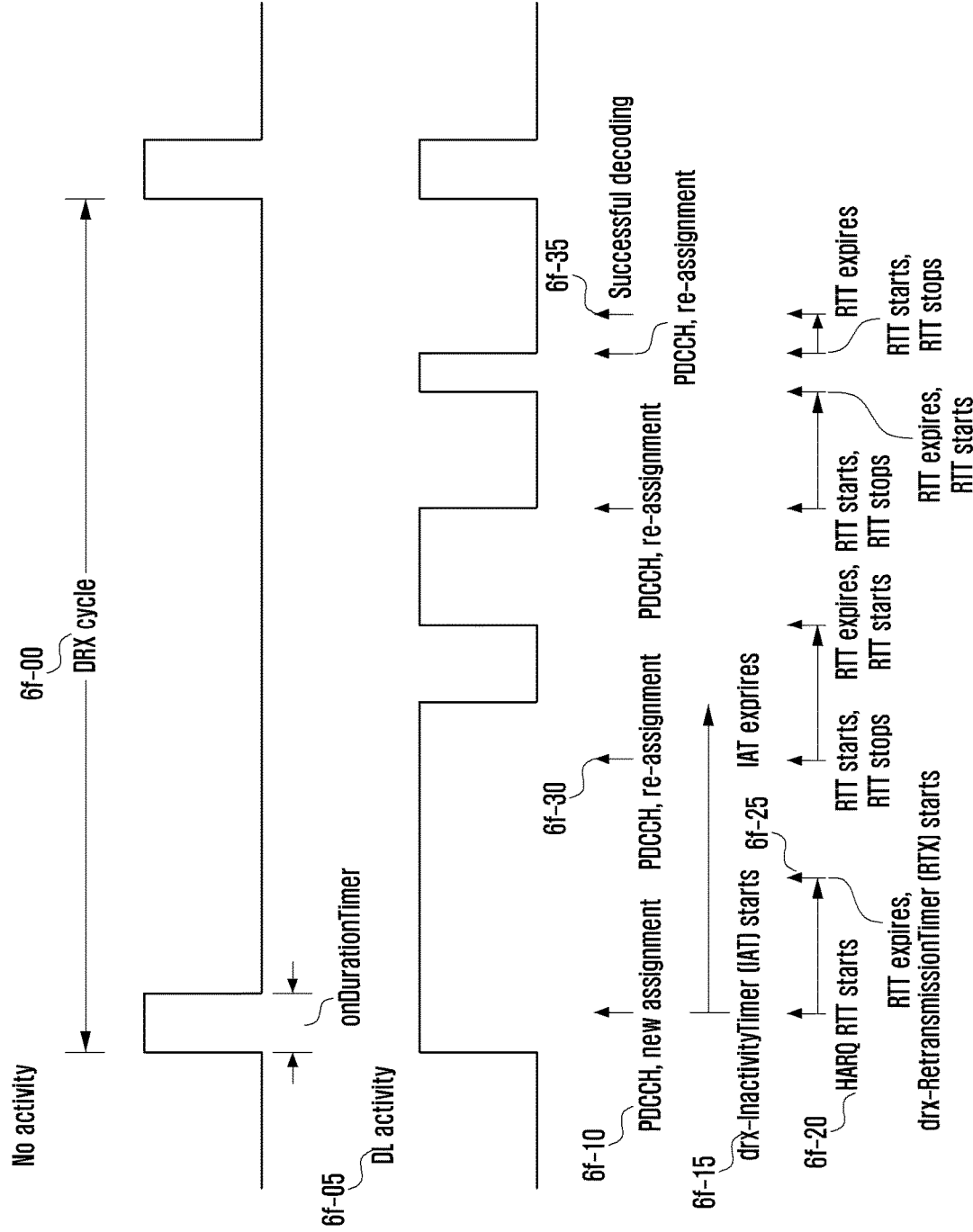
FIG. 6F is a diagram illustrating a DRX operation of a UE in a radio resource control (RRC) connected mode in an LTE system according to an embodiment of disclosure.

FIG. 6F is a diagram illustrating a DRX operation of a UE in a radio resource control (RRC) connected mode in an LTE system according to an embodiment of disclosure.

Referring to FIG. 6F, DRX is also supported in the RRC connected mode, and the RRC connected mode operation differs from the RRC idle mode operation. The DRX in connected mode is referred to as connected mode DRX (CDRX). As described above, if the UE monitors PDCCH continuously for scheduling information, this causes a large power consumption. The CDRX is configured with a DRX cycle 6f-00 with an on-duration period 6f-05 in which the UE wakes up to perform PDCCH monitoring. The CDRX may be configured with two DRX cycles, i.e., long DRX cycle and short DRX cycle. The long DRX cycle is usually configured and, if necessary, the eNB may trigger the short DRX cycle using a MAC CE. After a predetermined time period, the UE switches from the short DRX cycle to the long DRX cycle. The initial scheduling information for a certain UE is provided in a predetermined PDCCH. Accordingly, the UE monitors only the corresponding PDCCH candidates to minimize power consumption. If scheduling information for a new packet is received during the on-duration period 6f-05 as denoted by reference number 6f-10, the UE starts a DRX inactivity timer as denoted by reference number 6f-15. The UE remains in the active state while the DRX inactivity timer is running. For example, the UE keeps monitoring the PDCCH. In addition, an HARQ RTT timer starts as denoted by reference number 6f-20. The HARQ RTT timer is used to prevent the UE to perform PDCCH monitoring unnecessarily during the HARQ round trip time (RTT), i.e., it is not necessary for the UE to perform PDCCH monitoring while the timer is running. However, while both the DRX inactivity timer and the HARQ RTT timer are running, the UE keeps monitoring the PDCCH according to the DRX inactivity timer. If the HARQ RTT timer expires, a DRX retransmission timer starts as denoted by reference number 6f-25. While the DRX retransmission timer is running, the UE has to keep monitoring the PDCCH. Typically, while the DRX retransmission timer is running, scheduling information for HARQ retransmission is received as denoted by reference number 6f-30. If the UE receives the scheduling information, it stops the DRX retransmission timer immediately and starts the HARQ RTT timer again. This operation is repeated until the packet is received successfully as denoted by reference number 6f-35.

The UE receives the CDRX operation-related configuration information via an RRCConnectionReconfiguration message. Each of the on-duration timer, DRX inactivity timer, and DRX retransmission timer specifies a number of PDCCH subframes. If the number of PDCCH subframes for a timer go by, the timer expires. In FDD, all downlink subframes may convey PDCCH; In TDD, downlink subframes and special subframes may convey PDCCH. In TDD, there are downlink, uplink, and special subframes in the same frequency band. Among them, the downlink subframes and special subframes are regarded as PDCCH subframes.

The eNB may configure two states of longDRX and shortDRX. Typically, the eNB may remain in one of the two states based on power preference indication information transmitted by the UE, UE mobility history information, and characteristics of the configured DRB. A transition between the two states is triggered by expiry of a predetermined timer or receipt of a predetermined MAC CE.

Figure 6G:
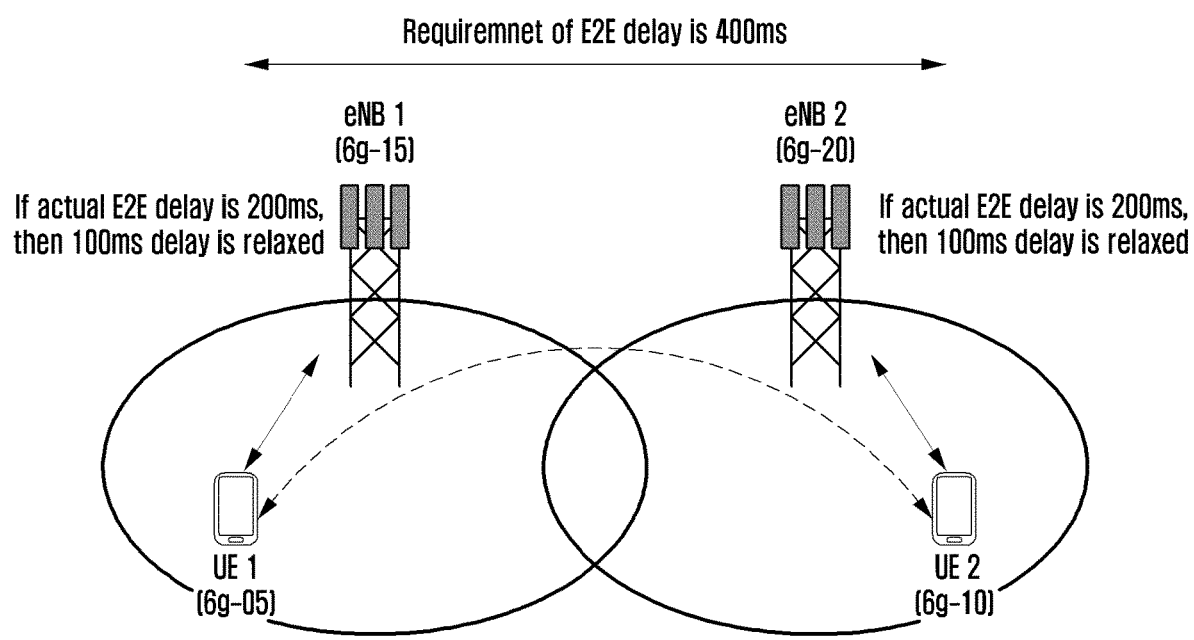
FIG. 6G is a diagram illustrating a packet delay budget-reporting operation for improving quality of voice over LTE (VoLTE) in a wireless communication system according to an embodiment of the disclosure.

FIG. 6G is a diagram illustrating a packet delay budget-reporting operation for improving quality of voice over LTE (VoLTE) in a wireless communication system according to an embodiment of the disclosure.

In LTE, the end-to-end (E2E) unidirectional delay time to meet the current VoLTE QoS requirements has a recommended value of 150 ms and a tolerable value of 40 ms.

Referring to FIG. 6G, when two UEs 6g-05 and 6g-10 are using a VoLTE service via eNBs 6g-15 and 6g-20 that are respectively serving them, the VoLTE service quality may vary depending on the qualities of channels established with the eNBs. It may be possible that UE 1 3g-15 has good VoLTE quality while UE 2 3g-20 has poor VoLTE quality. The eNBs may adjust the CDRX cycle for the UEs according to the aforementioned unidirectional packet delay time and, especially for an MTC UE, it may adjust the repetitive transmission period of the UE. Typically, when the channel condition is good between an eNB and a UE, the eNB configures a CDRX for the corresponding UE to reduce unnecessary power consumption. Whereas, if the channel condition is poor between the eNB and the UE, the eNB configures no CDRX for the corresponding UE. The embodiment of FIG. 6G is directed to a CDRX reconfiguration request operation for the case where UE 1 6g-05 and UE 2 6g-10 are experiencing poor VoLTE service quality (see Table 5).

TABLE 5

| VoLTE quality | Channel quality | Delay budget report triggering | Configuration detail | ENB operation |
|---|---|---|---|---|
| Poor | Poor | ENB request to UE 2 for delay budget report | Transmit available repetitive transmission period of X ms on DBR (Type 1) | Perform eMTC repetitive transmission (delay of X ms occur) |
| Poor | Good | UE 1 transmit delay budget report including preferred CDRX cycle to improve VoLTE quality | Transmit adjusted (reduced) CDRX cycle of Y ms on DBR (Type 2) | Change CDRX cycle (by Y ms) |

As summarized in Table 5, if the channel condition between UE 1 6g-05 and eNB 2 6g-15 is good and the channel condition between UE 2 6g-10 and eNB 2 6g-20 is poor while the VoLTE quality is bad at both the UE 1 6g-05 and UE 2 6g-10, it is likely to be that the CDRX is configured for the UE 1 6g-05 but not for the UE 2 6g-10. However, the CDRX operation associated with the UE 1 6g-05 may cause further degradation of VoLTE communication performance with the UE 2 6g-10, which affects packet reception failure at the UE 2 6g-20 during its sleep period of the CDRX. If the UE 1 6g-05 knows the E2E unidirectional delay time with the eNB 2 6g-20, it may calculate its tolerable delay value and requested CDRX cycle value based on the corresponding delay time and CDRX cycle configured by the serving eNB. For example, the tolerable E2E delay may be calculated with the following equation.

Tolerable E2E delay=E2E delay margin(400 ms)−
measured E2E delay

For example, assuming the E2E delay requirement (delay margin) of 400 ms and UE-measured E2E delay of 200 ms, the UE allows for extra delay of 200 ms. If the UE 1 6g-05 is currently configured with the CDRX cycle of 160 ms, it may adjust the configured CDRX cycle value to improve the VoLTE performance or increase the CDRX cycle to save power. The measured E2E delay time may be thought as the sum of the configured CDRX cycle value and the packet transmission delay over wireless and wireline channels, and the maximum value of the CDRX cycle change may be 100 ms (tolerable E2E delay value/2). This is the case when the channels of both the UE 1 6g-05 and UE 2 6g-10 are considered by taking notice of the operation of other UEs, the value may be accurately changed. For example, if the CDRX cycle value is reduced, the UE may receive packets more frequently, resulting in improvement of VoLTE performance. The CDRX cycle change value for which the UE can request may be configured according to the implementation of the UE based on the tolerable E2E delay value. Since the eNB and network does know the accurate value of the E2E transmission delay value that is measured by the UE, the corresponding operation may be triggered by the UE. For example, for the delay budget report, the UE may request for the CDRX cycle value of Yms as a change target value in accordance with the E2E transmission delay value measured by the UE rather than the previously configured CDRX cycle value. Upon receipt of this request message, the eNB reconfigured the previously configured CDRX cycle.

Figure 6H:
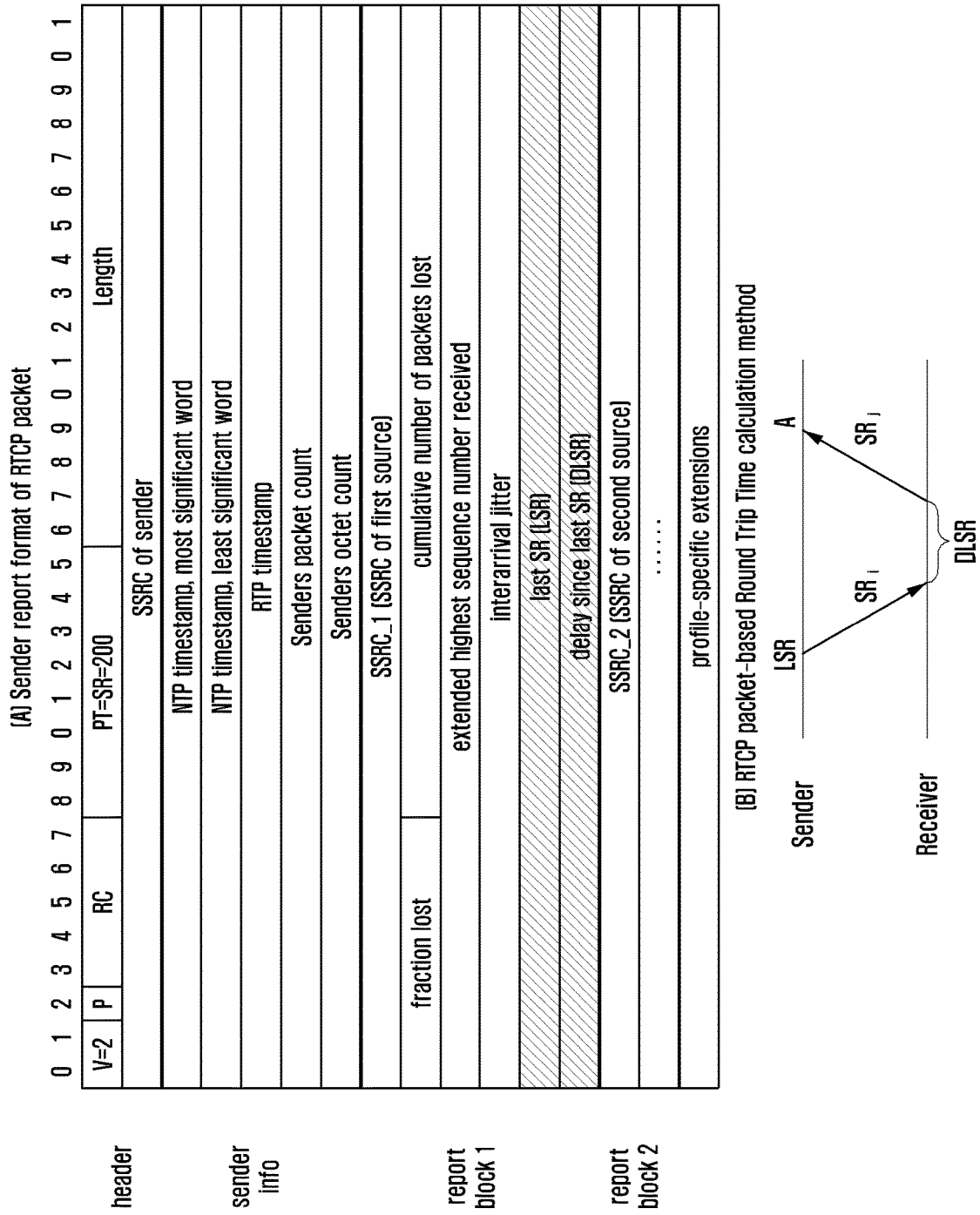
FIG. 6H is a diagram illustrating a packet transmission delay measurement method of a term in a VoLTE system according to an embodiment of disclosure.

FIG. 6H is a diagram illustrating a packet transmission delay measurement method of a term in a VoLTE system according to an embodiment of disclosure.

Referring to FIG. 6H, as described briefly with reference to FIG. 6G, since the eNB and network cannot measure the unidirectional packet delay time between UEs, there is no way of knowing the inter-UE unidirectional packet delay time unless the UEs report an accurate packet delay measurement value. During the VoLTE service, the UEs may transmit data with real time protocol (RTP) packets and measure E2E delay time by transmitting and receiving real time control protocol (RTCP) packets. Part (A) of FIG. 6H depicts a sender report format of an RTCP packet; the last sender report (LSR) and delay since LSR (DLSR) in the sender report format can be used for measuring the E2E packet delay time. For example, the unidirectional E2E delay time as depicted in part (B) of FIG. 6H may be calculated with the following equation.

Unidirectional E2E delay=((time A−time LSR)−
DLSR)/2

This method is just an example, and the packet transmit delay time between the UEs may be calculated in various methods. The reason for dividing the numerator by 2 is that the transmitter can measure the E2E delay time based on the round-trip time, i.e., the E2E is half the round-trip time.

Figure 6I:
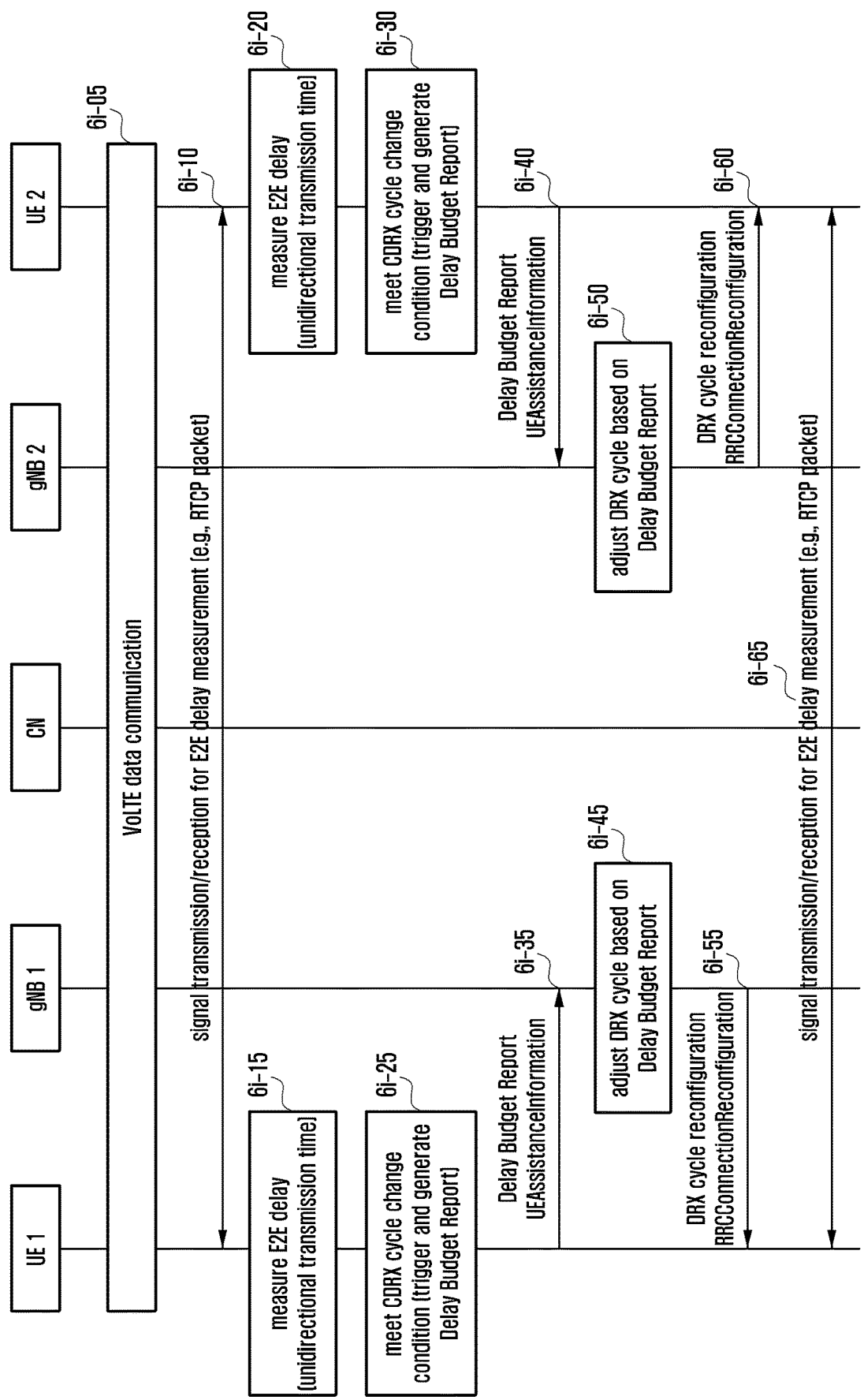
FIG. 6I is a signal flow diagram illustrating a method for a UE to request for a connected mode discontinuous reception (CDRX) cycle change and transmitting and receiving data with changed CDRX cycle according to an embodiment of the disclosure.

FIG. 6I is a signal flow diagram illustrating a method for a UE to request for CDRX cycle change and transmitting and receiving data with changed CDRX cycle according to an embodiment of the disclosure.

Referring to FIG. 6I, the procedure being described with reference to FIG. 6I are applicable to both the LTE and next generation mobile communication systems.

The UE 1 and UE 2 in the RRC connected mode are connected to gNB 1 and gNB 2, respectively, to transmit and receive voice data through a VoLTE service. This embodiment is directed to the VoLTE service-related procedure in which a UE measures the E2E delay time and requests for change of the CDRX cycle to reconfigure the DRX cycle, thereby improving the VoLTE service quality. However, the disclosure is not limited to the VoLTE service, i.e., voice data service, but may be applied to other types of services in the same manner At operation 6i-05, the UE 1 connected to the eNB 1 and the UE 2 connected to the eNB 2 are performing voice call through the VoLTE service. The VoLTE data communication may be performed with RTP packets and, in this case, the UEs may transmit and receive RTCP packets, at operation 6i-10, and measure the round-trip time of packets by decoding corresponding field values in RTCP packets as described with reference to FIG. 6H. At operations 6i-15 and 6i-20, the UE 1 and UE 2 may measure the unidirectional transmission delay time based on the signal transmitted at operation 6i-10 for use in E2E delay measurement. For example, the unidirectional E2E delay time can be obtained by diving the packet round-trip time measured operation 6i-10 by 2. Although this embodiment includes all of the operations of the UE 1 and UE 2, each UE operate independently. For example, the same operation may be performed by one or both of the UE 1 and UE 2. In addition, the same operation may be performed by the UE 1 and UE 2 at different timings.

At operations 6i-25 and 6i-30, the UE 1 and the UE 2 may request for change of the CDRX cycle or repetitive transmission period for eMTC UE to improve VoLTE quality based on the measured unidirectional transmission delay time and a predetermined required E2E delay requirement time margin value. In this embodiment of the disclosure, the DRX cycle change is performed in such a way that the UE transmits a DRX cycle change request to the corresponding gNB via a delay budget request. The delay budget request may be conveyed in an RRC message, i.e., UEAssistanceInformation, at operations 6i-35 and 6i-40. This UEAssistanceInformation is generated in the format as follows. Here, the DRX cycle change request corresponds to type 1 field value of DelayBudgetReport-14 IE, and the UE sets the type 1 field to a change target DRX cycle value.

| UEAssistanceInformation message |
|---|
| ```
-- ASN1START
UEAssistanceInformation-v1430-IEs ::=    SEQUENCE {
    Bw-Preference-r14              BW-Preference-r14              OPTIONAL,
    sps-AssistanceInformation-r14  SEQUENCE {
        trafficPatternInfoListSL-r14    TrafficPatternInfoList-r14    OPTIONAL,
        trafficPatternInfoListSL-r14    TrafficPatternInfoList-r14    OPTIONAL,
    }    OPTIONAL,
    rlm-Report-r14                 SEQUENCE {
        rlm-Event-r14              ENUMERATED {early OutofSync, earlyIn Sync},
        excessRsp-MPDCCH-r14           ENUMERATED {excessRep1, excessRep2}
OPTIONAL
    }    OPTIONAL,
    delayBudgetReport-r14          DelayBudgetReport-r14          OPTIONAL,
    nonCriticalExtension           SEQUENCE { }                   OPTIONAL
}
DelayBudgetReport-r14::=    CHIOCE {
    Type1                                  ENUMERATED {
                                               msMinus1280,       msMinus640,
                                               msMinus320,        msMinus160,
                                               msMinus80, msMinus60, msMinus40,
                                               msMinus20, ms0, ms20, ms40, ms60,
                                               ms80, ms160, ms320, ms640, ms1280},
    Type2                                  ENUMERATED {
                                               msMinus192,        msMinus168,
                                               msMinus144,        msMinus120,
                                               msMinus96, msMinus72, msMinus48,
                                               msMinus24, ms0, ms24, ms48, ms72,
                                               ms96, ms120, ms144, ms168, ms192}
-- ASN1STOP
``` |

At this operation, there may be various options for selecting a DRX cycle as the reference.

1. Option 1: long DRX cycle of MCG (Master Cell Group)
   The long DRX cycle value set for MCG is applied
2. Option 2: short DRX cycle of MCG
   The short DRX cycle value set for the MCG is applied
3. Option 3: Actual DRX cycle of MCG (long or short which is currently applied)
   The DRX cycle value (long or short DRX) set currently for the MCG is applied.
4. Option 4: Short DRX cycle of MCG if short DRX cycle is configured for MCG. Otherwise long DRX cycle of MCG
   If short DRX cycle is set for MCG, the short DRX cycle value of the MCG is applied
5. Option 5: DelayBudgetReport indicates which DRX cycle should be adjusted
   DelayBudgetReport indicates the DRX value to be applied At operations 6*i*-45 and 6*i*-50, the eNB 1 and eNB 2 reconfigure the DRX cycles based on the DRX cycle change request signals received from the UEs (UE 1 and UE 2). The eNBs may reconfigure the DRX cycles as requested via the DRX cycle change requests included in the RRC report message from the UEs or according to its own determination or eNB implementation. At operations 6*i*-55 and 6*i*-60, the eNBs transmit RRC messages including the reconfigured DRX cycle values to the UEs. Afterward, the UE 1 and UE 2 continue performing the service (VoLTE or another data communication) according to the reconfigured DRX cycle and perform the E2E delay time measurement operation at operation 6*i*-65 as at operation 6*i*-65 to trigger, if the currently required DRX change value calculated based on the unidirectional packet delay time measured by the UE differs from the previously requested DRX cycle, the DRX change request operation of operations 6*i*-25 to 6*i*-60.

Figure 6J:
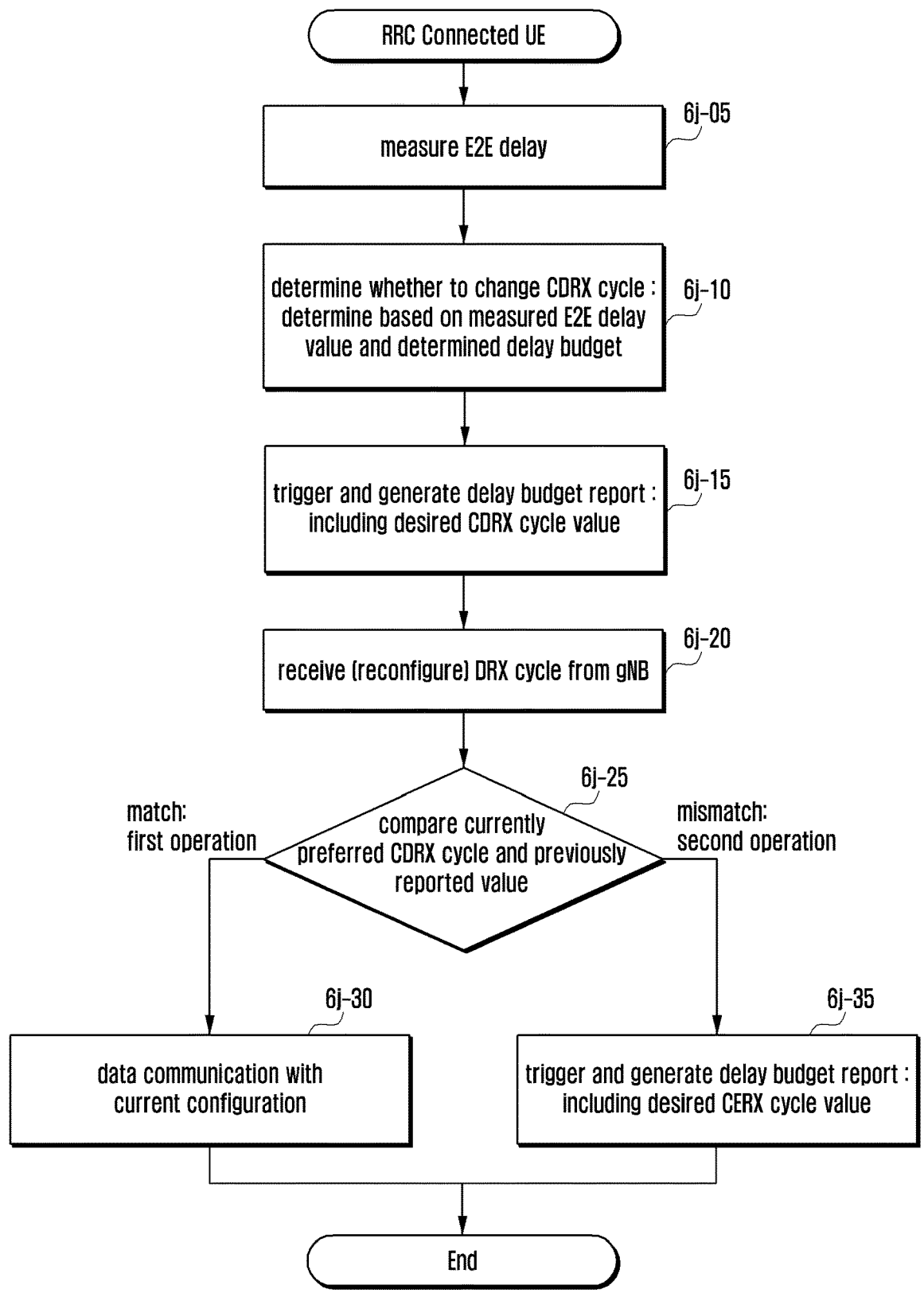
FIG. 6J is a flowchart illustrating a CDRX cycle change procedure of a UE according to an embodiment of the disclosure.

FIG. 6J is a flowchart illustrating a CDRX cycle change procedure of a UE according to an embodiment of the disclosure.

Referring to FIG. 6J, at operation 6*j*-05, the UE in connected mode measures the unidirectional E2E delay. The unidirectional E2E delay may be measured in various manners, e.g., transmitting/receiving an RTP packet, particularly RTCP packet; in the case of using the RTCP packet, the UE decodes a specific filed configured for E2E delay measurement in the RTCP packet, measures the round trip time of the packet transmitted by the transmitter, and measures the unidirectional D2D delay based on the measurement result. At operation 6*j*-10, the UE determines to change the CDRX cycle based on the measured unidirectional E2E delay and a predetermined E2E delay requirement (this may be predetermined according to a time margin and QoS). For example, if the currently configured DRX cycle is too long or too short to mismatch the E2E delay requirement, it may be possible to achieve data transmission/reception performance by adjusting the DRX cycle. For example, in the case where the VoLTE quality for the UE using the VoLTE service is poor and if the measured E2E value is greater than the E22 delay requirement, the UE may request for decrease of the CDRX cycle value to achieve improvement of VoLTE quality and meet the E2E delay requirement. For reference, the CDRX cycle value and the E2E delay are correlated such that, if the DRX cycle decreases, the E2E delay decreases too. This is because the E2E delay should be longer than the CDRX cycle as there is no data transmission/reception during the CDRX cycle. Otherwise, if the VoLTE quality for the UE is good and if the measured E2E delay value is less than the E2E delay requirement, the UE may request for increase of the CDRX cycle value to achieve UE power saving gain.

At operation 6*j*-15, the UE triggers a delay budget report and generates a delay budget report message including the UE-desired CDRX cycle value for the change determined at the previous operation. Here, the DRX cycle change request may correspond to the type 1 filed value of the DelayBudgetReport-14 IE in the UEAssistanceInformation message as RRC signaling, the type 1 field being configured with the DRX cycle value with which the UE requests for the change. The corresponding information may be transmitted via other RRC messages or MAC CEs.

At operation 6j-20, the UE receives an RRC message (RRCConnectionReconfiguration) from the gNB and reconfigures the DRX cycle. At operation 6j-25, the UE compares the preferred DRX cycle value that is currently reconfigured with the previously reported DRX cycle value to perform the first operation for a case where the two values are identical with each other and the second operation for a case where the two values are different from each other. In the first operation of operation 6j-30, the UE maintain the current configuration and transmits/receives data; in the second operation of operation 6j-35, the UE triggers the delay budget report to re-request for a UE-desired CDRX cycle value through RRC signaling. This means the repetition of operations 6j-10 to 6j-20.

Figure 6K:
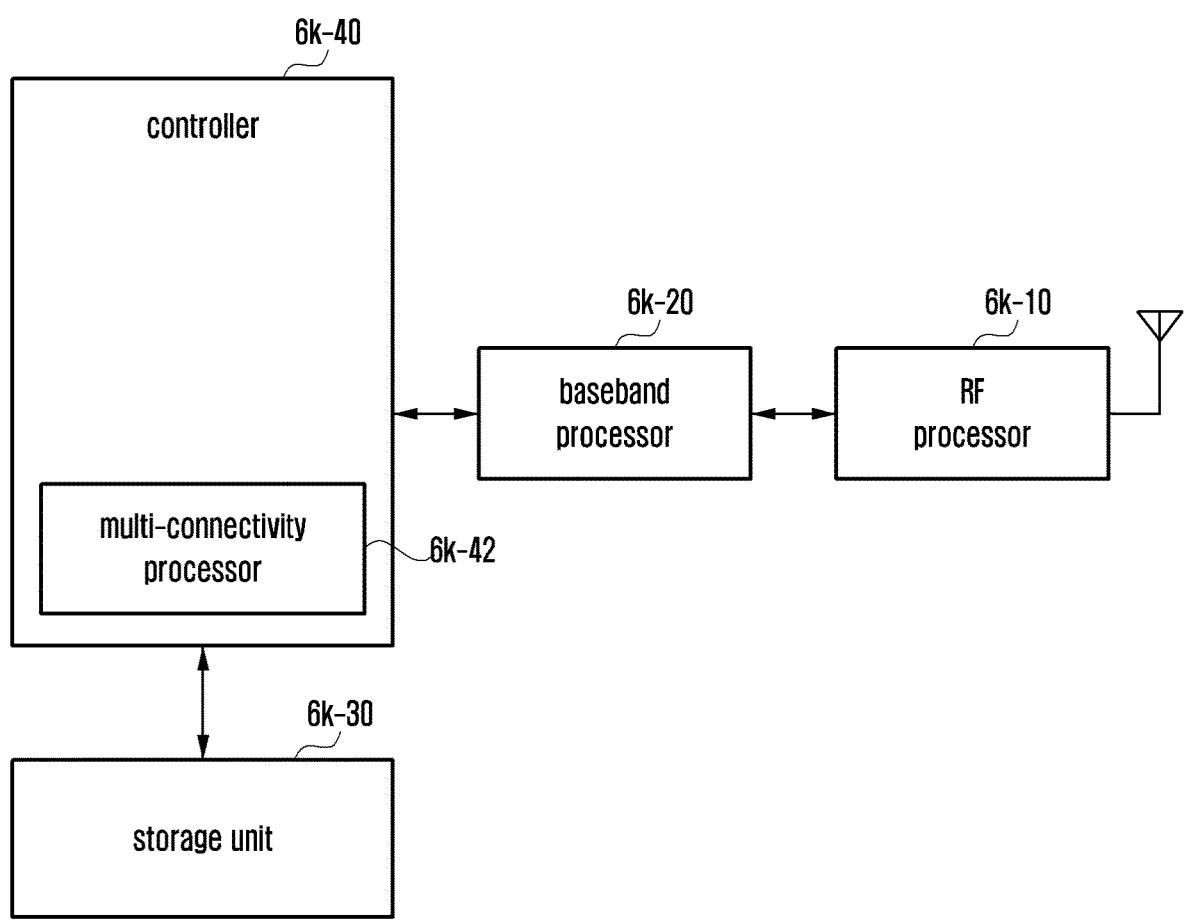
FIG. 6K is a block diagram illustrating a configuration of a UE according to an embodiment of the disclosure.

FIG. 6K is a block diagram illustrating a configuration of a UE according to an embodiment of the disclosure.

Referring to FIG. 6K, the UE includes a radio frequency (RF) processor 6k-10, a baseband processor 6k-20, a storage unit 6k-30, and a controller 6k-40.

The RF processor 6k-10 has a function for transmitting/receiving a signal over a radio channel, such as band conversion and amplification of the signal. For example, the RF processor 6k-10 up-converts a baseband signal from the baseband processor 6k-20 to an RF band signal and transmits the RF signal via an antenna and down-converts the RF signal received via the antenna to a baseband signal. For example, the RF processor 6k-10 may include a transmission filter, a reception filter, an amplifier, a mixer, an oscillator, a DAC, and an ADC). Although one antenna is depicted in the drawing, the UE may be provided with a plurality of antennas. The RF processor 6k-10 may also include a plurality of RF chains. The RF processor 6k-10 may perform beamforming. For beamforming, the RF processor 6k-10 may adjust the phase and size of a signal to be transmitted/received by means of the antennas or antenna elements in phase and size. The RF processor 5i-10 may be configured to support a MIMO scheme with which the UE can receive multiple layers simultaneously.

The baseband processor 6k-20 has a baseband signal-bit string conversion function according to a physical layer standard of the system. For example, in a data transmission mode, the baseband processor 6k-20 performs encoding and modulation on the transmission bit string to generate complex symbols. In a data reception mode, the baseband processor 6k-20 performs demodulation and decoding on the baseband signal from the RF processor 6k-10 to recover the transmitted bit string. In the case of using an OFDM scheme for data transmission, the baseband processor 6k-20 performs encoding and modulation on the transmission bit string to generate complex symbols, maps the complex symbols to subcarriers, performs IFFT on the symbols, and inserts a CP into the symbols to generate OFDM symbols. In the data reception mode, the baseband processor 6k-20 splits the baseband signal from the RF processor 6k-10 into OFDM symbols, perform FFT on the OFDM symbols to recover the signals mapped to the subcarriers, and performs demodulation and decoding on the signals to recover the transmitted bit string.

The baseband processor 6k-20 and the RF processor 6k-10 process the transmission and reception signals as described above. Accordingly, the baseband processor 6k-20 and the RF processor 6k-10 may be referred to as a transmitter, a receiver, a transceiver, or a communication unit. At least one of the baseband processor 6k-20 and the RF processor 6k-10 may include a plurality of communication modules for supporting different radio access technologies. At least one of the baseband processor 6k-20 and the RF processor 6k-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 Ghz bands) and an mmWave band (e.g., 60 GHz).

The storage unit 6k-30 stores data, such as basic programs for operation of the UE, application programs, and setting information. The storage unit 6k-30 may also store the information on a second access node for radio communication with a second radio access technology. The storage unit 6k-30 provides the stored information in response to a request from the controller 6k-40.

The controller 6k-40 controls overall operations of the UE. For example, the controller 6k-40 controls the baseband processor 6k-20 and the RF processor 6k-10 for transmitting and receiving signals. The controller 6k-40 writes and reads data to and from the storage unit 6k-30. For this purpose, the controller 6k-40 may include at least one processor. For example, the controller 6k-40 may include a CP for controlling communications and an AP for controlling higher layer programs, such as applications. The controller 6k-40 may include a multi-connectivity processor 6k-42 for processing operations in a multi-connectivity mode.

According to an embodiment of the disclosure, the UE may include part of the components depicted in the drawing, and the components of the UE are controlled by the controller 6k-40.

Figure 6L:
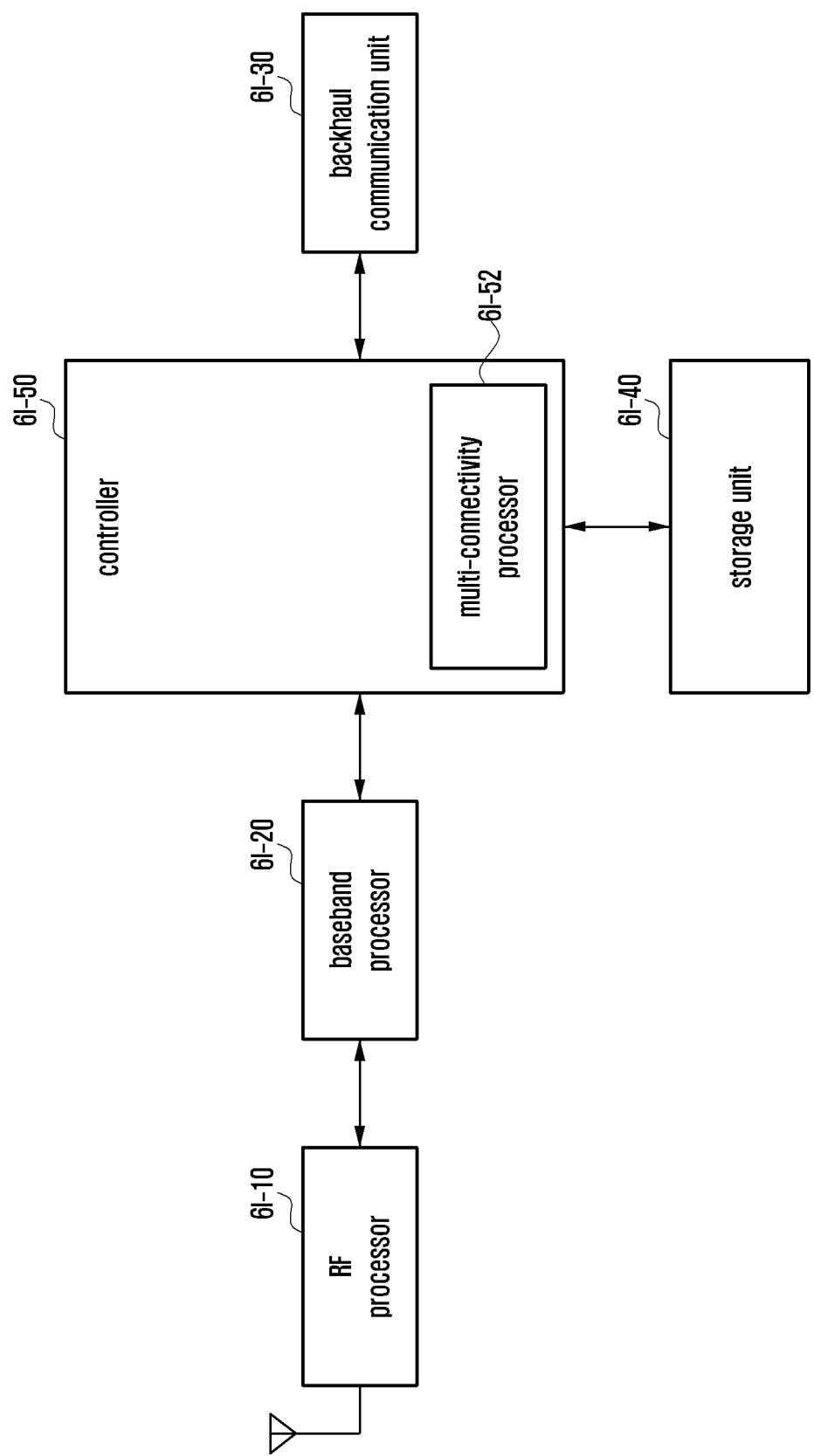
FIG. 6L is a block diagram illustrating a configuration of a gNB according to an embodiment of the disclosure.

FIG. 6L is a block diagram illustrating a configuration of a gNB according to an embodiment of the disclosure.

Referring to FIG. 6L, the gNB includes an RF processor 6l-10, a baseband processor 6l-20, a backhaul communication unit 6l-30, a storage unit 6l-40, and a controller 6l-50.

The RF processor 6l-10 has a function for transmitting/receiving a signal over a radio channel, such as band conversion and amplification of the signal. For example, the RF processor 6l-10 up-converts a baseband signal from the baseband processor 6l-20 to an RF band signal and transmits the RF signal via an antenna and down-converts the RF signal received via the antenna to a baseband signal. For example, the RF processor 6l-10 may include a transmission filter, a reception filter, an amplifier, a mixer, an oscillator, a DAC, and an ADC. Although one antenna is depicted in the drawing, the gNB may be provided with a plurality of antennas. The RF processor 6l-10 may also include a plurality of RF chains. The RF processor 6l-10 may perform beamforming. For beamforming, the RF processor 6l-10 may adjust the phase and size of a signal to be transmitted/received by means of the antennas or antenna elements. The RF processor 6l-10 may be configured to transmit one or more layers for a downlink MIMO operation.

The baseband processor 6l-20 has a baseband signal-bit string conversion function according to a physical layer standard of the system. For example, in a data transmission mode, the baseband processor 6l-20 performs encoding and modulation on the transmission bit string to generate complex symbols. In a data reception mode, the baseband processor 6l-20 performs demodulation and decoding on the baseband signal from the RF processor 6l-10 to recover the transmitted bit string. In the case of using an OFDM scheme for data transmission, the baseband processor 6*l*-20 performs encoding and modulation on the transmission bit string to generate complex symbols, maps the complex symbols to subcarriers, performs IFFT on the symbols, and inserts a CP into the symbols to generate OFDM symbols. In the data reception mode, the baseband processor 6*l*-20 splits the baseband signal from the RF processor 6*l*-10 into OFDM symbols, performs fast Fourier transform (FFT) on the OFDM symbols to recover the signals mapped to the subcarriers, and performs demodulation and decoding on the signals to recover the transmitted bit string. The baseband processor 6*l*-20 and the RF processor 6*l*-10 process the transmission and reception signals as described above. Accordingly, the baseband processor 6*l*-20 and the RF processor 6*l*-10 may be referred to as a transmitter, a receiver, a transceiver, or a communication unit.

The backhaul communication unit 6*l*-30 provides an interface for communication with other nodes in the network. For example, the backhaul communication unit 6*l*-30 converts a bit string to be transmitted from the gNB to another node, e.g., another gNB and core network, to a physical signal and converts a physical signal received from another node to a bit string.

The storage unit 6*l*-40 stores data, such as basic programs for operation of the gNB, application programs, and setting information. The storage unit 6*l*-40 may also store the information on the bearers established for UEs and measurement results reported by the connected UEs. The storage unit 6*l*-40 may also store the information for use by a UE in determining whether to enable or disable multi-connectivity. The storage unit 6*l*-40 may provide the stored data in reference to a request from the controller 6*l*-50.

The controller 6*l*-50 controls overall operations of the gNB. For example, the controller 6*l*-50 controls the baseband processor 6*l*-20, the RF processor 6*l*-10, and the backhaul communication unit 6*l*-30 for transmitting and receiving signals. The controller 6*l*-50 writes and reads data to and from the storage unit 6*l*-40. For this purpose, the controller 6*l*-50 may include at least one processor. The controller 6*l*-50 may also include a multi-connectivity processor 6*l*-52 for processing operations in a multi-connectivity mode.

The sixth embodiment of the disclosure can be summarized as follows.

Issue 1: Which DRX cycle?

delayBudgetAdjustment

This parameter indicates the preferred amount of increment/decrement with respect to the current configuration. This parameter has a value of milliseconds. For example, ms40 corresponds to 40 milliseconds, msMinus40 corresponds to −40 milliseconds, and so on.)

As described above, a UE reports the preferred DRX cycle with respect to the current DRX cycle. A question is which DRX cycle is the current DRX cycle. Is it MCG DRX cycle or SCG DRX cycle, of is it short DRX cycle and long DRX cycle.

Possible Options

Option 1: long DRX cycle of MCG

Option 2: short DRX cycle of MCG

Option 3: Actual DRX cycle of MCG (long or short DRX cycle which is currently applied)

Option 4: Short DRX cycle of MCG if short DRX cycle is configured for MCG. Otherwise, long DRX cycle of MCG Option 5: DelayBudgetReport indicates which DRX cycle should be adjusted (Option 1: long DRX cycle of MCG Option 2: short DRX cycle of MCG Option 3: Actual DRX cycle of MCG (long or short which is currently applied)

Option 4: Short DRX cycle of MCG if short DRX cycle is configured for MCG. Otherwise long DRX cycle of MCG Option 5: DelayBudgetReport indicates which DRX cycle should be adjusted)

Issue 2: Unnecessary report caused by change of current DRX cycle

This embodiment is directed to the case where the UE retransmits a delay budget report if the current delayBudgetAdjustment is different from the reported one. However, the delayBudgetAdjustment may be varied because of change of the reference value (current DRX cycle) rather than change of the UE's preference.

The above comparison should be made between the current preference and the reported preference.

(Issue 2: unnecessary reporting due to current DRX cycle change

In the current specification, UE retransmit delay budget report if the current delayBudgetAdjustment is different from the reported one.

But delayBudgetAdjustment could become different not because UE preference change but because the reference value (i.e., current DRX cycle) changes The comparison shall be between the current preference and reported preference. The text could be updated as below)

According to an embodiment of the disclosure, the gNB may also include part of the components depicted in the drawing, and the components of the gNB are controlled by the controller 5*j*-50.

Seventh Embodiment

Figure 7A:
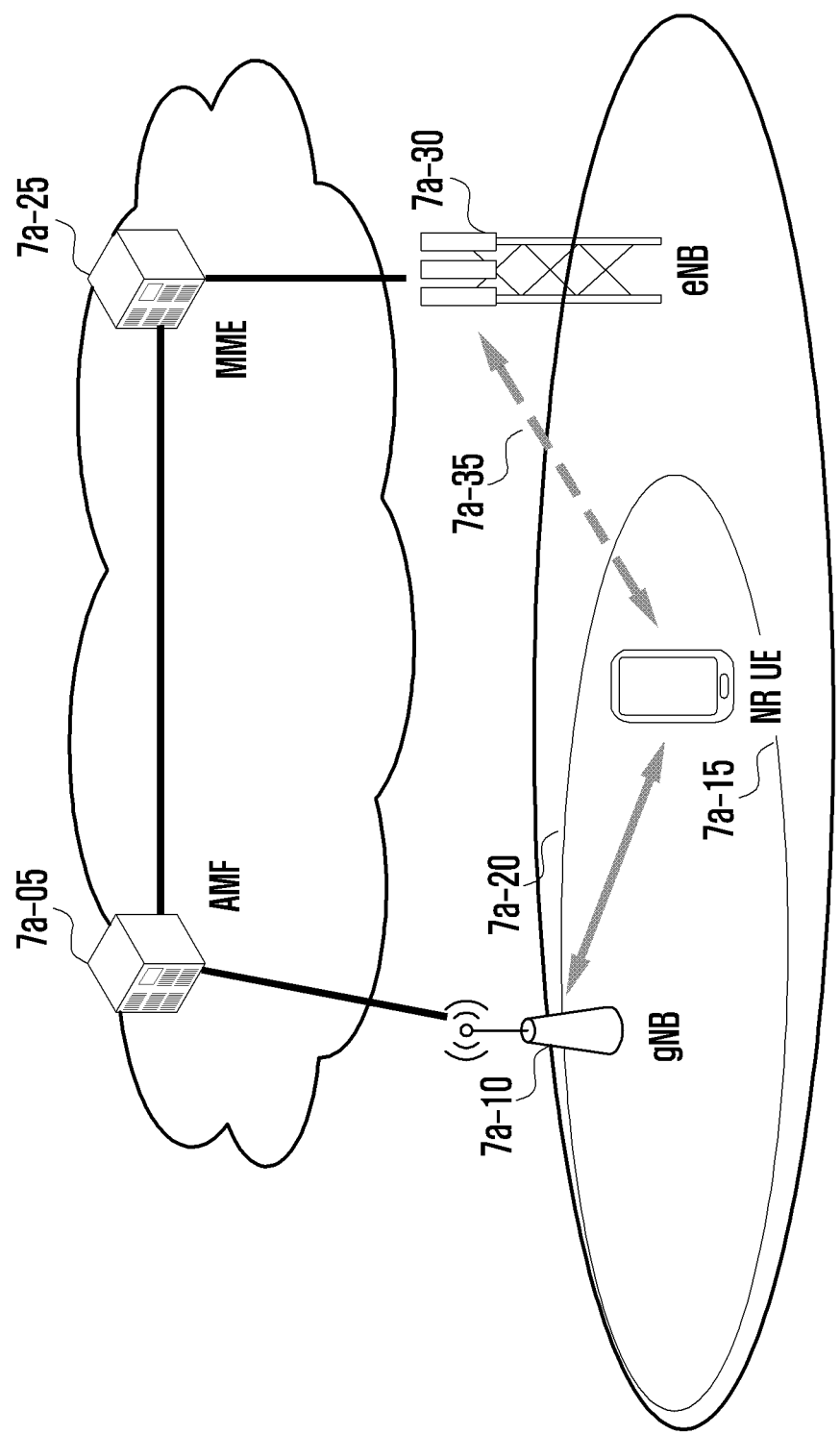
FIG. 7A is a diagram illustrating an architecture of a next generation mobile communication system according to an embodiment of disclosure.

FIG. 7A is a diagram illustrating an architecture of a next generation mobile communication system according to an embodiment of disclosure.

Referring to FIG. 7A, a radio access network of the next generation mobile communication system includes a new radio Node B (gNB) 7*a*-10 and a new radio core network (AMF) 7*a*-05. A new radio user equipment (hereinafter, referred to as NR UE or simply UE) 7*a*-15 connects to an external network via the gNB 7*a*-10 and the AMF 7*a*-05.

In FIG. 7A, the gNB 7*a*-10 corresponds to the evolved Node B (eNB) in the legacy LTE system. The NR UE 7*a*-15 connects to the gNB, which may provide services superior to those of the legacy eNB. In the next generation mobile communication system where all user traffic is served through shared channels, there is a need of an entity for collecting UE-specific status information (such as buffer status, power headroom status, and channel status) and scheduling the UEs based on the collected information, and the gNB 7*a*-10 takes charge of such functions. Typically, one gNB hosts multiple cells. In order to meet the data rate requirement that is higher than that for legacy LTE, it is necessary to secure a maximum bandwidth broader than ever before by employing advanced technologies, such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE. The AMF 7*a*-05 is responsible for mobility management, bearer setup, and QoS setup. The AMF 7*a*-05 is responsible for other control functions as well as UE mobility management functions in connection with a plurality of gNBs. The next generation mobile communication system may interoperate with legacy LTE systems in such a way of connecting the AMF 7a-05 to a mobility management entity (MME) 7a-25 through a network interface. The MME 7a-25 is connected to an eNB 7a-30 as a legacy base station. A UE supporting LTE-NR Dual Connectivity may establish a connection to the eNB 7a-30 as denoted by reference number 7a-35 as well as the gNB 7a-10 as denoted by reference number 7a-20.

Figure 7B:
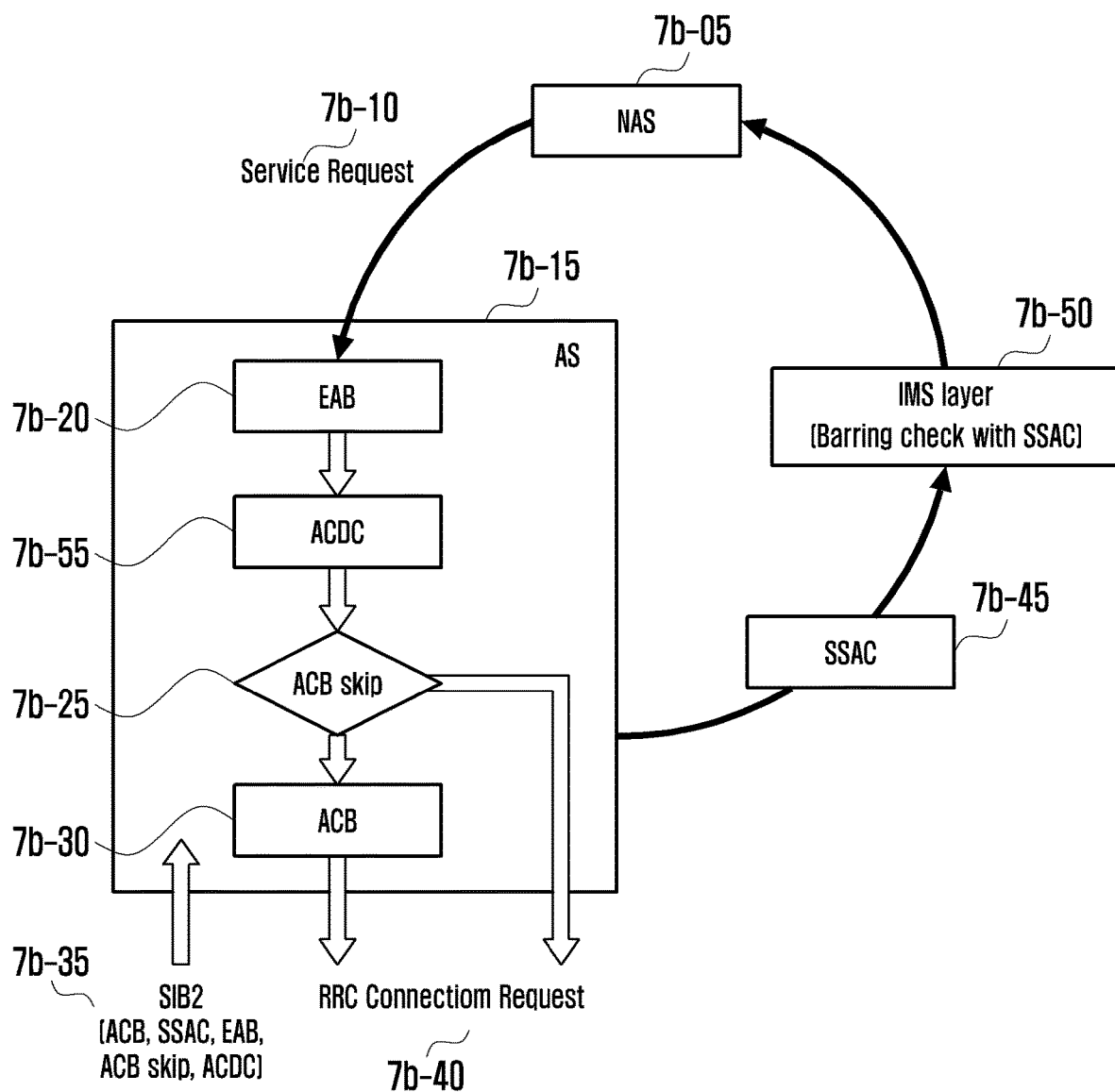
FIG. 7B is a diagram illustrating a method for determining whether to accept an access in a legacy LTE system according to an embodiment of disclosure.

FIG. 7B is a diagram illustrating a method for determining whether to accept an access in a legacy LTE system according to an embodiment of disclosure.

Referring to FIG. 7B, the functionalities of an LTE UE are split into an access stratum (AS) 7b-15 and a non-access stratum (NAS) 7b-20. The AS is responsible for all access-related functionalities, and the NAS 7b-05 is responsible for non-access-related functionalities, such as public land mobile network (PLMN) selection and service request. The accessibility determination may be mainly determined by the UE AS. As aforementioned, the network in congestion may restrict new access and, for this purpose, it broadcasts related configuration information in order for each UE to make its own access determination as denoted by reference number 7b-35. Along with the introduction of new requirements in the legacy LTE system, a new barring mechanism has been proposed, which as a consequence allows for multiple access barring checks. If the UE NAS layer issues a service request as denoted by reference number 7b-10, the UE AS checks whether the UE can actually access the network. If an establishment cause value of the service request is "delay tolerant access", the UE AS performs extended access barring (EAB) first, as denoted by reference number 7b-20. The EAB barring mechanism is performed as an access check procedure applied only for machine type communication (MTC). If the EAB check is passed, the UE AS performs application specific congestion control for data communication (ACDC) 7b-55, as denoted by reference number 7b-20. An application requesting for the service is assigned an ACDC category, the value of which may be included in the service request being transferred to the UE AS. The network may provide barring configuration information per ACDC category. Accordingly, the access check procedure may be performed per group, the groups being categorized by the ACDC category. If the barring configuration information per ACDC category is not provided by the network, the UE AS omits the ACDC access check procedure. If the ACDC check is passed, the UE AS performs access class barring (ACB) as denoted by reference number 7b-30. The ACB is an access check procedure using the barring configuration information provided separately according to mobile originating (MO) data or MO signaling. For multiple telephony (MMTEL) voice/video/SMS services, the ACB procedure may be omitted with the use of an ACB skip indicator as denoted by reference number 7b-25. If all the aforementioned access check procedures are passed, the UE AS may attempt access to the network. For example, the UE AS performs random access and transmits a radio resource control (RRC) connection request message to the eNB, as denoted by reference number 7b-40. There may be another access check procedure that is not performed by the UE AS. If the barring configuration information for the MMTEL voice/video (SSAC) is received from the network as denoted by reference number 7b-45, the UE AS transfers the information to the IMS layer that is responsible for managing the services in the UE as denoted by reference number 7b-50. After receiving the barring configuration information, the IMS layer may perform the access check procedure when the service is triggered. The SSAC, when it was introduced, was designed such that the UE AS performs the corresponding function regardless of the type of application or service. Accordingly, in order to control the determination on whether to accept the access for a specific service, such as MMTEL voice/video, it was necessary to directly transfer the barring configuration information to a layer managing the service in order for the corresponding layer to perform the access check procedure.

In the next generation mobile communication system, such a complex procedure is not necessary. This is because it is possible to design a single access check procedure encompassing, from the beginning, all requirements introduced in LTE. The disclosure proposes a single barring mechanism evolved from the legacy ACDC access check procedure.

Figure 7C:
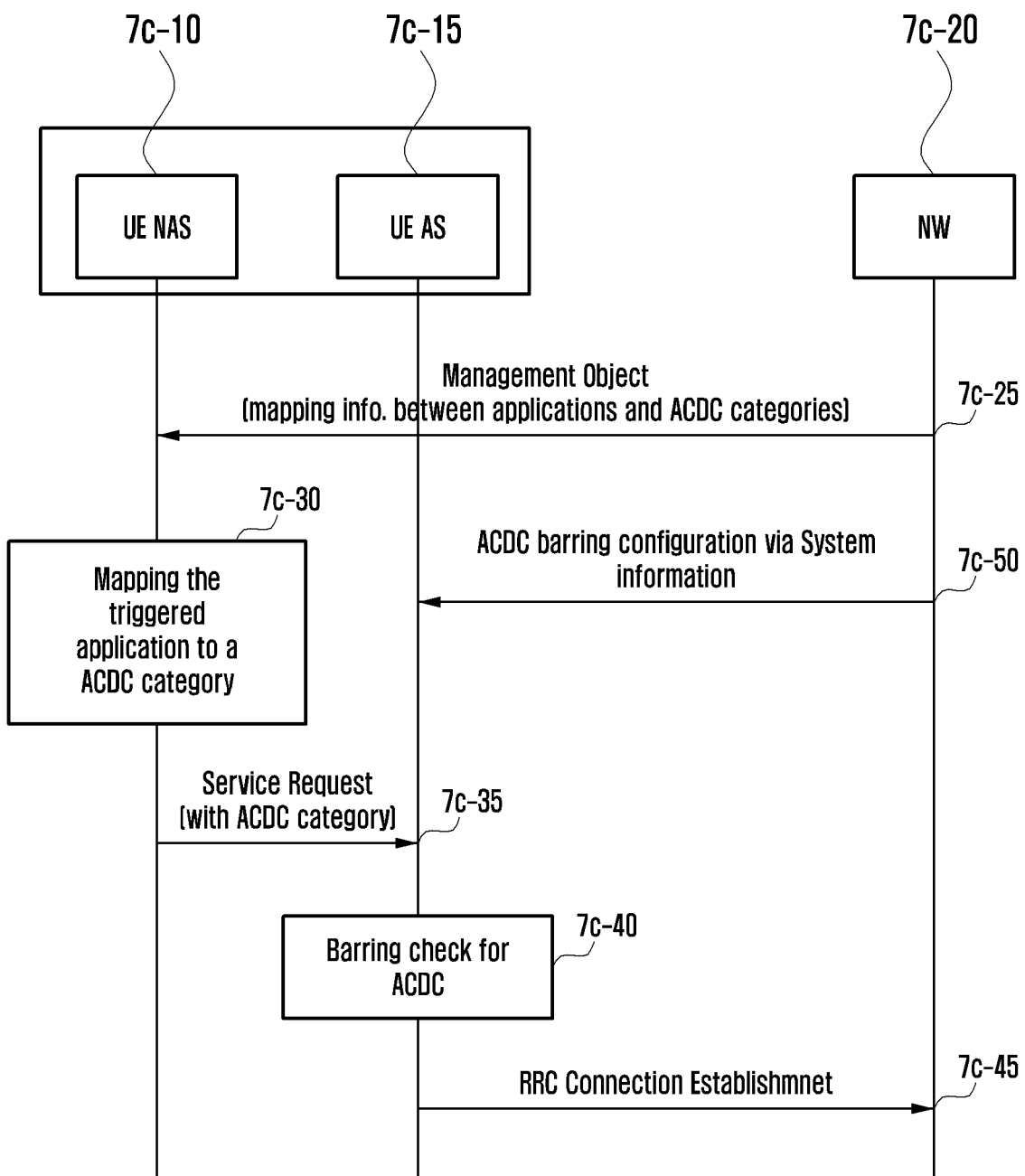
FIG. 7C is a diagram illustrating a procedure for performing an ACDC operation in an LTE system according to an embodiment of disclosure.

FIG. 7C is a diagram illustrating a procedure for performing an ACDC operation in an LTE system according to an embodiment of disclosure.

Referring to FIG. 7C, in the LTE system, it has been proposed that the ACDC makes an accessibility determination per application (service). Every application is assigned at least one ACDC category value. The ACDC category value is selected in the range from 1 to 16. The network 7c-20 provides the UE NAS 7c-10 with per-application ACDC category information using a NAS message at operation 7c-25. The network 7c-20 provides the UE AS 7c-15 with the barring configuration information to be applied per ACDC category using system information block 2 (SIB2) at operation 7c-50. The barring configuration information includes an ac-BarringFactor information element (IE) and an ac-Barringtime IE. The ac-BarringFactor $\alpha$ has a value in the range of $0 \leq \alpha < 1$. The UE AS 7c-15 draws a random value of rand in the range of $0 \leq rand < 1$; if the random value is less than the ac-BarringFactor, it is assumed that the access is not barred, and, if not, it is assumed that the access is barred. If it is determined that the access is barred, the UE AS 7c-15 delays the access attempt for a duration drawn based on the following equation.

$$\text{"}Tbarring\text{"} = (0.7 + 0.6 * rand) * \text{ac-BarringTime}. \qquad \text{Equation}$$

If a service request is triggered, the UE AS 7c-15 draws an ACDC category value corresponding to the application for the service at operation 7c-30. The UE NAS 7c-10 sends the service request including the ACDC category value to the UE AS 7c-15 at operation 7c-35. Upon receipt of the service request, the UE AS 7c-15 determines at operation 7c-40 whether the access is accepted based on the ACDC barring configuration information included in the SIB2 according to the ACDC category value. If the SIB2 includes no barring configuration information corresponding to the ACDC category, it is assumed that the application belonging to the ACDC category is allowed for access in the ACDC procedure. If the access is permitted through the access barring check procedure, the UE AS 7c-15 transmits an RRC Connection Request for random access to the network at operation 7c-45.

Figure 7D:
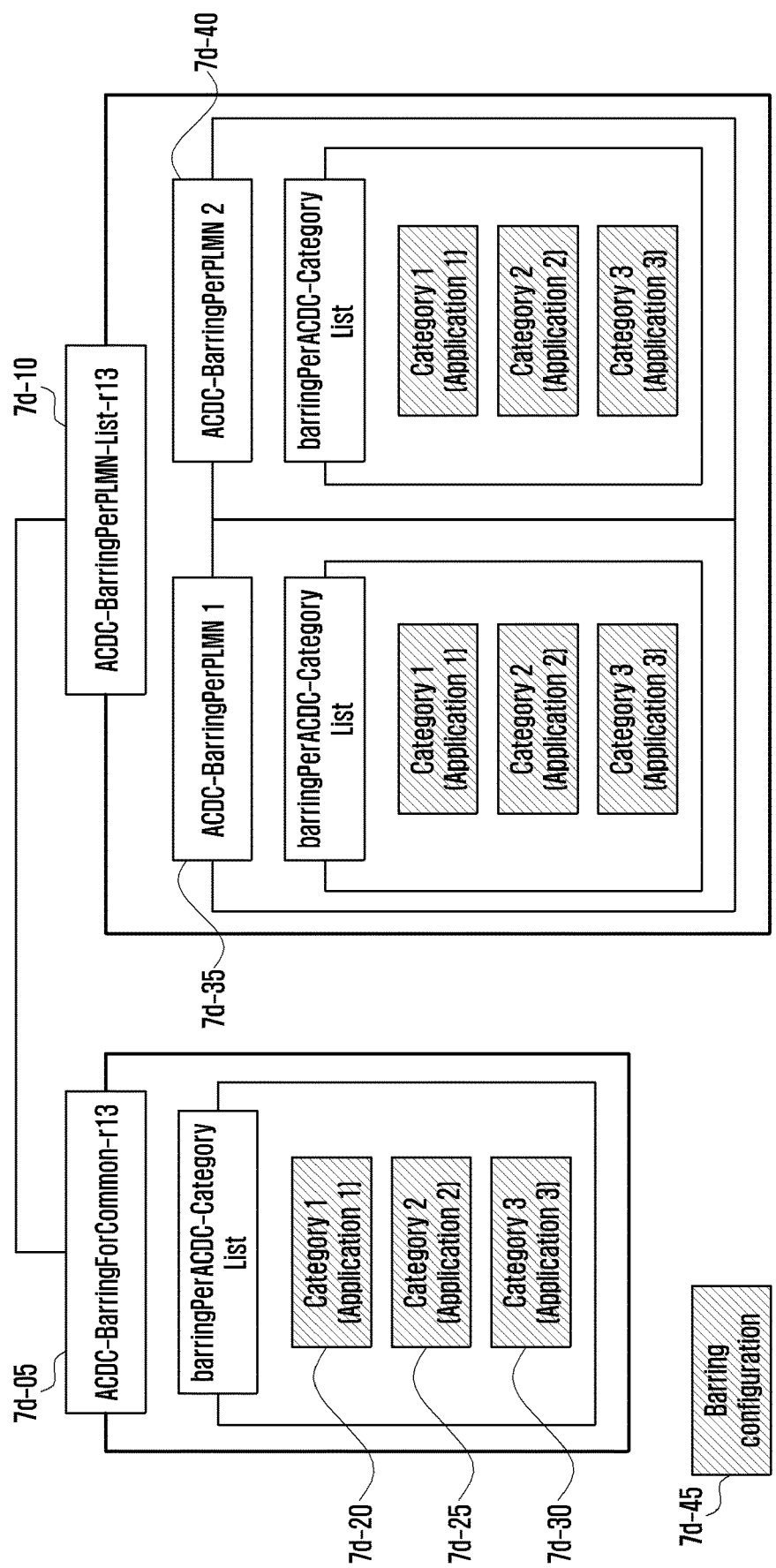
FIG. 7D is a diagram illustrating a structure of ACDC configuration information for use in an LTE system according to an embodiment of disclosure.

FIG. 7D is a diagram illustrating a structure of ACDC configuration information for use in an LTE system according to an embodiment of disclosure.

Referring to FIG. 7D, the ACDC configuration information (ACDC-BarringForCommon-r13) 7d-10 may provide PLMN-specific barring configuration information sets (ACDC-BarringPerPLMN 1, ACDC-BarringPerPLMN 2, . . . ) 7d-35 and 7d-40. If all PLMNs have the same barring configuration information set, it may be possible to broadest one barring configuration information set (ACDC-BarringForCommon-r13) 7d-05. The PLMN-specific barring configuration information or common barring configuration information set includes category-specific barring configuration information 7d-20, 7d-25, and 7d-30. As described above, the barring configuration information 7d-45 includes the ac-BarringFactor IE and the ac-Barringtime IE. If there is not barring configuration information for a specific ACDC category, it is assumed that the application belonging to the corresponding ACDC category is not barred by the ACDC.

Figure 7E:
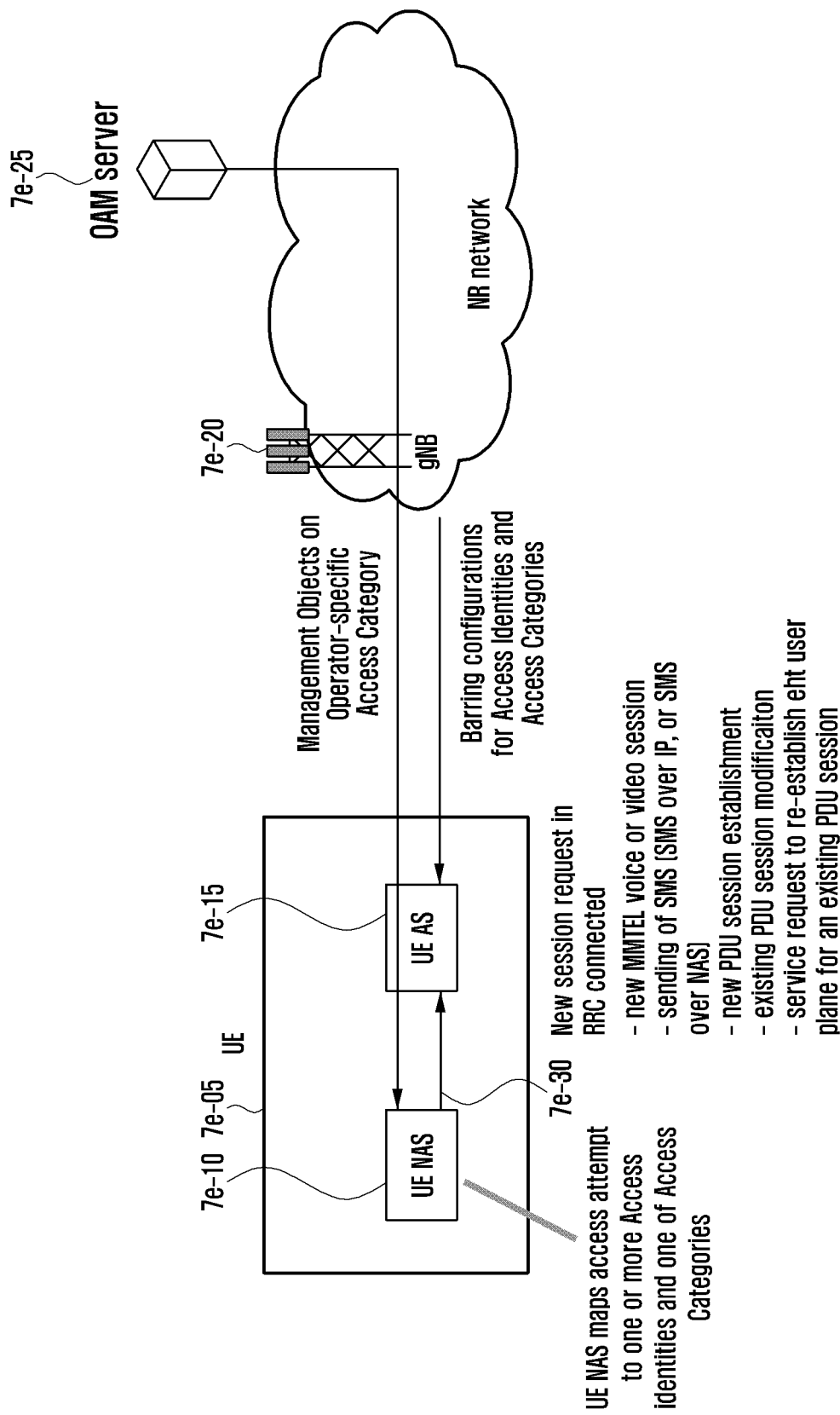
FIG. 7E is a diagram illustrating a procedure for controlling an access of a UE in connected mode or inactive mode according to an embodiment of the disclosure.

FIG. 7E is a diagram illustrating a procedure for controlling an access of a UE in connected mode or inactive mode according to an embodiment of the disclosure.

Referring to FIG. 7E, the disclosure proposes a method for controlling an access based on and access identity and an access category as in the legacy ACDC. The access identity is indication information defined in the 3GPP standard, i.e., specified explicitly in the standard document. The access identity is used to indicate one of several types of accesses as exemplified in Table 6. It mainly indicates the access types categorized as Access Classes 11 to 15 and multimedia priority services (MPS) and special-purpose services (Mission Critical Service (MCS)) with a high-priority. The Access Classes 11 to 15 indicate operator-dedicated or public purpose accesses.

TABLE 6

| Access Identity number | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access Identity 1 is used to provide overrides according to the subscription information in UEs configured for MPS. The subscription information defines whether an override applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
NOTE 2:
Access Identity 2 is used to provide overrides according to the subscription information in UEs configured for MCS. The subscription information defines whether an override applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
NOTE 3:
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

The access categories are divided into two categories. One of the two categories is a standardized access category. This category is defined at a RAN level, i.e., explicitly categorized in the standard document. Accordingly, the dame standardized access categories are applied to different operators. In the disclosure, an emergency-related category belongs to the standard access category. Every access belongs to at least one standardized access category. The other is a non-standardized access category. This category is defined outside the 3rd generation partnership project (3GPP) architecture and thus is not explicitly categorized in the standard document. Accordingly, the operators have their own operator-specific access categories different in meanings. This is identical in characteristic with the categories in the legacy ACDC. However, a certain access triggered by the UE NAS may not be mapped to the non-standardized access category. The proposed access control scheme differs from the legacy ACDC in that the categorization is made with other elements as well as an application, e.g., service access type, call type, UE class, user group, signaling type, slice type, and any combination thereof. For example, the access control may be performed for certain element-specific types of access. The aforementioned access categories are used to indicate specific accesses as shown in Table 7. The access categories 0 to 7 are used to indicate the standardized access categories, and the access categories 32 to 63 are used to indicate the operator-specific access categories.

TABLE 7

| Access Category number | Conditions related to UE | Type of access attempt |
| --- | --- | --- |
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

The operator's server 7e-25 provides the UE NAS 1e-10 with operator-specific access category information MO through NAS signaling or application level data transmission. The above information indicates a certain element corresponding thereto, such as an application. For example, the above information may explicitly indicate that the access category 32 corresponds to a Facebook application access. The gNB 7e-20 provides UEs with a category list containing the barring configuration information and per-category barring configuration information using system information. The UE 7e-05 includes a logical block of NAS 7e-10 and AS 7e-15.

The UE NAS 7e-10 maps the triggered access to the one or more access identities and one access category according to a predetermined rule. The mapping operation is performed in all of the RRC states, i.e., connected mode (RRC_CONECTED), idle mode (RRC_IDLE), and inactive mode (RRC_INACTIVE). The RRC states characterized by features as follows.

RRC_IDLE:
A UE specific DRX may be configured by upper layers;
UE controlled mobility based on network configuration;
The UE:
Monitors a Paging channel;
Performs neighboring cell measurements and cell (re-) selection;
Acquires system information.
RRC_INACTIVE:
A UE specific DRX may be configured by upper layers or by RRC layer;
UE controlled mobility based on network configuration;
The UE stores the AS context;
The UE:
Monitors a Paging channel;
Performs neighboring cell measurements and cell (re-) selection;
Performs RAN-based notification area updates when moving outside the RAN-based notification area;
Acquires system information.
RRC_CONNECTED:
The UE stores the AS context.
Transfer of unicast data to/from UE.
At lower layers, the UE may be configured with a UE specific DRX;
For UEs supporting CA, use of one or more S Cells, aggregated with the SpCell, for increased bandwidth;
For UEs supporting DC, use of one SCG, aggregated with the MCG, for increased bandwidth;
Network controlled mobility, i.e., handover within NR and to/from E-UTRAN.
The UE:
Monitors a Paging channel;
Monitors control channels associated with the shared data channel to determine if data is scheduled for it;
Provides channel quality and feedback information;
Performs neighboring cell measurements and measurement reporting;
Acquires system information.

Alternatively, it may be possible to map an access to a standardized access category and, additionally, an operator-specific access category. The UE NAS 7e-10 sends the UE AS 7e-15 the mapped access identity and access category along with the service request.

In this embodiment of the disclosure, if the UE AS 7e-15 receives a message including the access identity or access category information from the UE NAS 7e-10 in any of all RRS states, it performs a barring check operation to determine whether the corresponding access is permitted before attempting radio access triggered by the corresponding message. If it is determined that the radio access is permitted through the barring check operation, the UE AS 7e-15 requests to the network for RRC connection setup. For example, in connected mode or inactive mode, the UE NAS 7e-10 sends the UE AS 7e-15 the access identity and access category at operation 7e-30 for a cause as follows. In the disclosure, the following causes are collectively referred to as 'new session request'.

new MMTEL voice or video session
sending of SMS (SMS over IP, or SMS over NAS)
new PDU session establishment
existing PDU session modification
service request to re-establish the user plane for an existing PDU session In the idle mode, however, the UE NAS 7e-10 sends the access identity and access category to the UE AS 7e-15 via a service request.

The UE AS 7e-15 determines whether the access triggered by the UE NAS 7e-10 is permitted based on the barring configuration information (barring check).

The operator may want to permit access to a predetermined type of services corresponding to at least one of Access Classes 11 to 15. The disclosure is characterized by determining whether to permit an access belonging to access classes 11, 12, 13, 14, and 15 depending on the property identified by the access category. In order to accomplish this, the disclosure provides a method for configuring barring configuration information of an access identity or access category. In the disclosure, it is assumed that the access category-specific barring configuration information is configured with ac-barringFactor and ac-barring time like the barring configuration information of the ACB or ACDC of the related art.

Figure 7F:
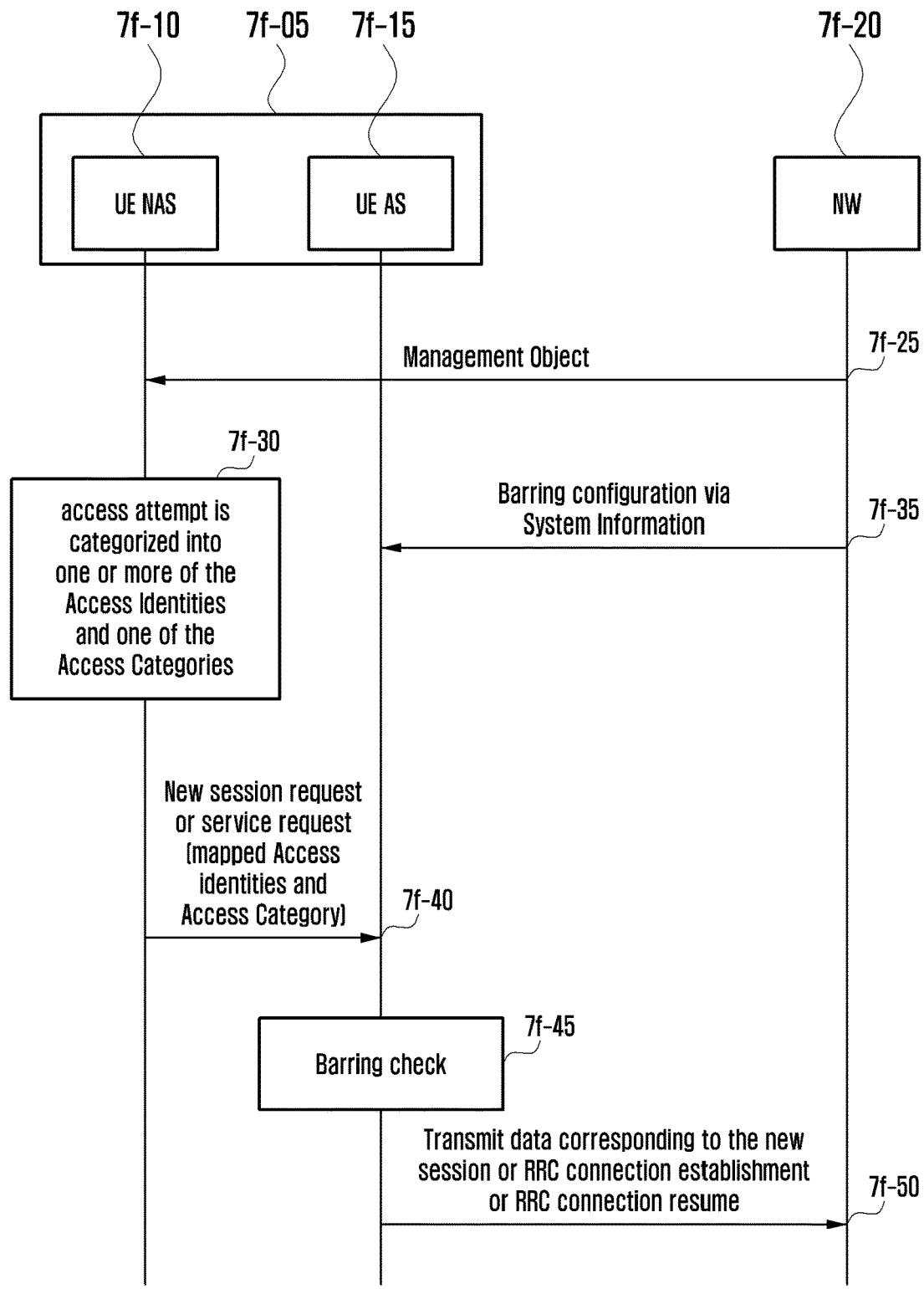
FIG. 7F is a signal flow diagram illustrating an access control procedure of a UE in connected mode or inactive mode according to an embodiment of the disclosure.

FIG. 7F is a signal flow diagram illustrating an access control procedure of a UE in connected mode or inactive mode according to an embodiment of the disclosure.

Referring to FIG. 7F, a UE 7f-05 includes a NAS 7f-10 and an AS 7f-15. The NAS is responsible for operations that are not directly related to a radio access, such as authentication service request and session management, while the AS 7f-15 is responsible for operations that are related to the radio access. The network 7f-20 provides the NAS 7f-10 with MOI via an OAM (application level data message) or a NAS message at operation 7f-25. The MOI indicates an element, such as an application, corresponding to each operator-specific access category. In order to identify the operator-specific category to which the triggered access is mapped, the NAS 7f-10 use the MOI. The triggered access corresponds to a new MMTEL service (voice communication and video communication), SMS transmission, new PDU session establishment, previous PDU session change, and the like. If a service is triggered, the NAS 7f-10 maps an access identity corresponding to the property of the service to an access category at operation 7f-30. The service may be mapped to none or at least one access identity. The service may be mapped to an access category. Under the assumption that the service can be mapped to one access category, the NAS 7f-10 determines whether the service is mapped to an operator-specific access category provided in the MO. If the service is not mapped to any operator-specific access category, the NAS 7f-10 maps the service to one of available standardized access categories. Under the assumption that the service can be mapped to multiple access categories, the NAS 7f-10 maps a service to an operator-specific access category and a standardized access category. However, the service is not mapped to any operator-specific access category, the NAS 7f-10 maps the service to one of available standardized access categories. The mapping rule may be applied with the exception of the emergency service. At operation 7f-40, the NAS 7f-10 sends the AS 7f-15 a new session request or service request message including the mapped access identity and access category. The NAS 7f-10 transits the new session request in connected mode or inactive mode and the service request in idle mode. At operation 7f-35, the AS 7f-15 receives barring configuration information included in the system information broadcast by the network 7f-20. The barring configuration information is described below. At operation 7f-45, the AS determine whether the service request is accepted based on the access identity and access category information which the NAS has mapped to the service and the corresponding mapping configuration information received from the network 7f-20. If the service request is accepted according to the predetermined rule, the AS 7f-15 requests to the network 7f-20 for RRC connection establishment (RRC Connection Establishment or RRC connection Resume) or transmits data related to the new session to the network 7f-20 at operation 7f-50.

Figure 7G:
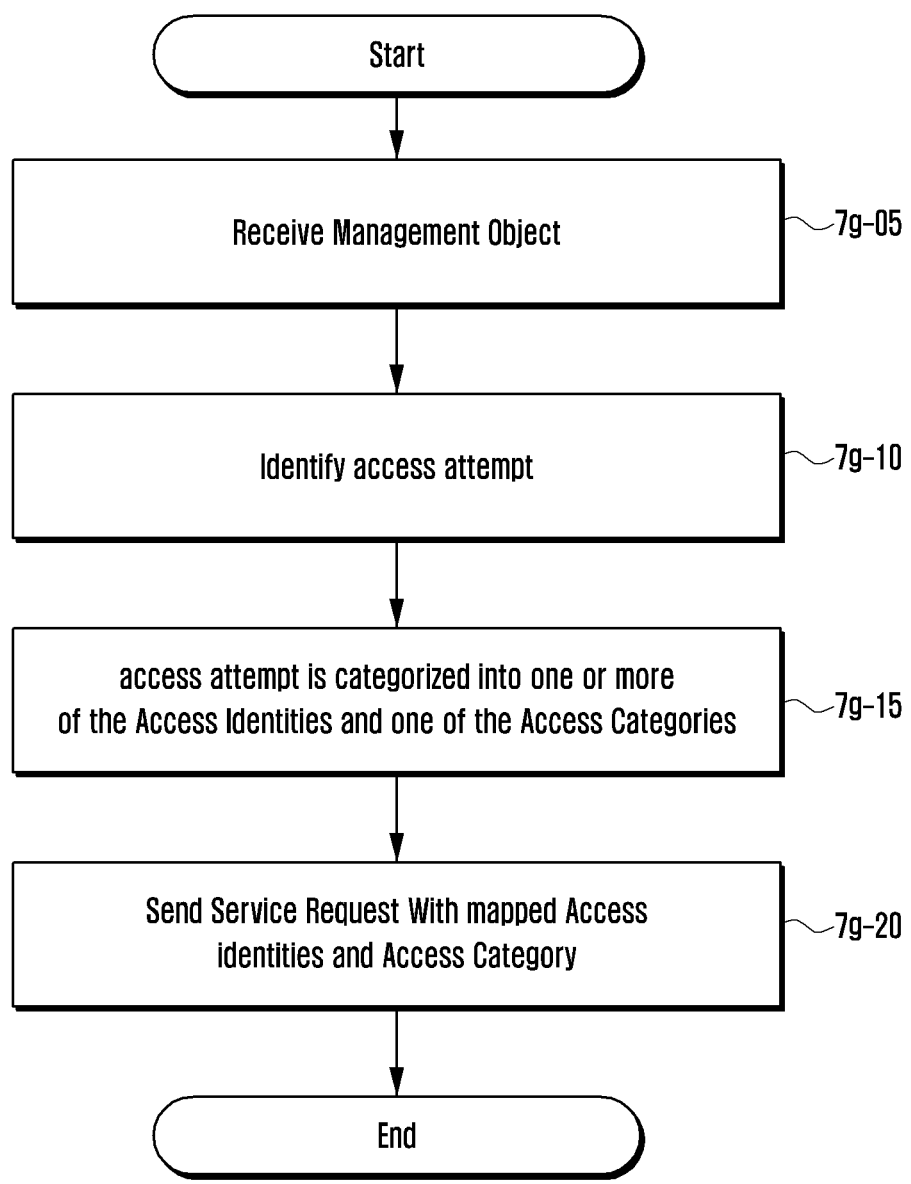
FIG. 7G is a flowchart illustrating an operation of a UE NAS according to an embodiment of the disclosure.

FIG. 7G is a flowchart illustrating an operation of a UE NAS according to an embodiment of the disclosure.

Referring to FIG. 7G, at operation 7g-05, the UE NAS receives MOI from the network through OAM or RRC signaling. The MOI indicates an element, such as 'application' that corresponds to each operator-specific access category.

At operation 7g-10, the UE NAS detects one of the following causes.
  Access attempt
  new MMTEL voice or video session
  sending of SMS (SMS over IP, or SMS over NAS)
  new PDU session establishment
  existing PDU session modification
  service request to re-establish the user plane for an existing PDU session At operation 7g-15, the UE NAS maps the access attempt to at least one access identity and an access category. There may not be any corresponding access identity.

At operation 7g-20, the UE NAS sends the UE AS a new session request/session modification (session management) or the service request including the mapped access identity and access category information.

Figure 7H:
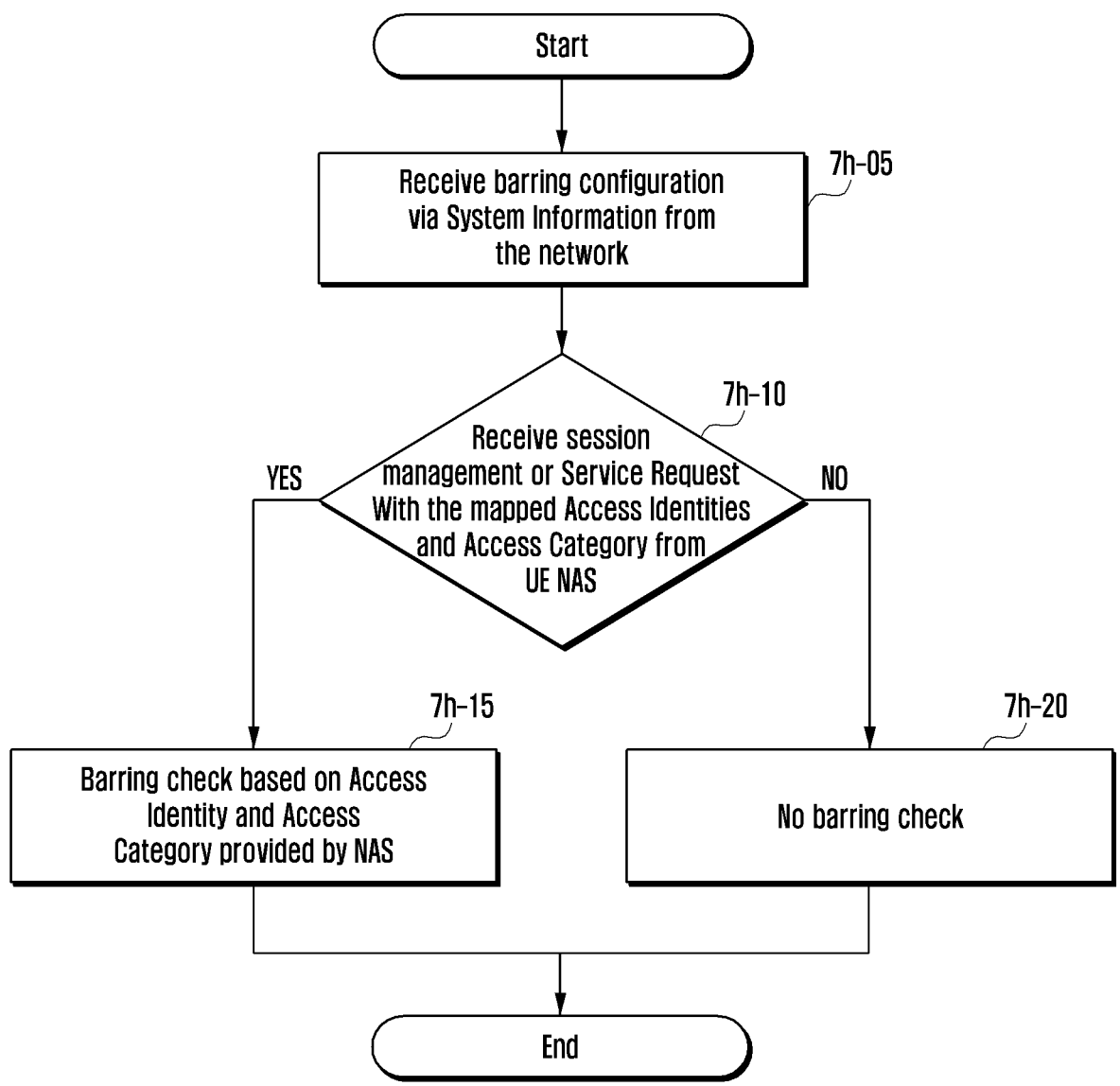
FIG. 7H is flowchart illustrating an operation of a UE AS according to an embodiment of the disclosure.

FIG. 7H is flowchart illustrating an operation of a UE AS according to an embodiment of the preset invention.

Referring to FIG. 7H, at operation 7h-05, the UE AS receives barring configuration information via system information from the network. The barring configuration information is provided per access identity and access category.

At operation 7h-10, the UE AS determines whether an access identity or access category is received via a new session request/session modification (session management) or service request from the UE NAS. The new session request/session modification (session management) or the service request triggers data transmission for RRC connection establishment or RRC connection resume or new session.

If the access identity and access category is received via the new session request/session modification (session management) or service request from the UE NAS, the UE AS performs barring check based on the configuration information corresponding to the access identity and access category in the barring configuration information at operation 7h-15. Here, the barring check is performed regardless of the current RRC state of the UE.

If neither the access identity nor the access category is received via the new session request/session modification (session management) or service request from the UE NAS, the UE AS performs no barring check on any data transmission at operation 7h-20. For example, the UE AS does not perform any barring check on initial data transmission and RRC connection resume in which the NAS is not involved.

In this operation, the UE AS performs the barring check only on the access for which the UE NAS provides the access identity and access category. Meanwhile, there may be an access triggered by the AS (without involvement of the NAS). No barring check is performed for such an access. If the AS-triggered accesses become dominant, this may contribute to network congestion. Accordingly, there may be a need of an extra barring check for the accesses triggered by the AS. One approach is for the AS to perform a separate barring check on the AS-triggered access. The AS-triggered accesses may be categorized by property. For example, the AS-triggered accesses may fall into one of two types: MO signaling or MO data. The network provides the barring configuration information to be applied in connected mode or inactive mode per category. The barring configuration of the access identity or access category corresponding to each type may be reused. According to an embodiment of the disclosure, if a RAN area update is triggered while the UE is in inactive state, the RAN area update falls into the MO signaling. The UE AS performs barring check using the barring configuration information corresponding to the MO signaling. Here, the barring configuration information corresponding to Access Category 3 may be reused for the barring check.

The disclosure relates to a barring check procedure being performed based on access identities and access categories. The barring check procedure is applicable to a UE in idle mode as well as in connected mode.

The UE NAS maps an access to one or more access identities and one access category and sends the mapping to the UE AS. If the access identity is set to 0, it may be assumed that there is no other mapped access identity.

The UE AS determines whether there is one received access identity and, if so, the access identity is set to 0.

If the at least one access identity is set to a non-zero value, the UE AS performs barring check based on the non-zero access identity. The UE AS performs the barring check based on the barring configuration information broadcast by the network. The configuration information is used to determine whether the access corresponding to the access identity is permitted. For example, the network may provide the information for use in determining whether an access is permitted in the form of a bitmap of which each bit is set to on or off or a probability information, such as barring factor having a value in the range from 0 to 1 to indicate whether the corresponding access is permitted. If at least one of the non-zero access identities is permitted, the UE AS may not perform barring check on the corresponding access based on the access category and may finally determine the access is permitted and perform RRC connection setup. If the barring check for the corresponding access identity is not permitted, the UE NAS may bar the access and perform extra barring check with the access category and the barring configuration information corresponding to the access category to determine finally whether to perform the access.

If one access identity is received and the access identity is set to 0, the UE AS performs barring check with the barring configuration information corresponding to the received access category. If it is determined that the barring check for the access category is permitted, the UE regards that the access is permitted, and it performs RRC connection setup.

Figure 7I:
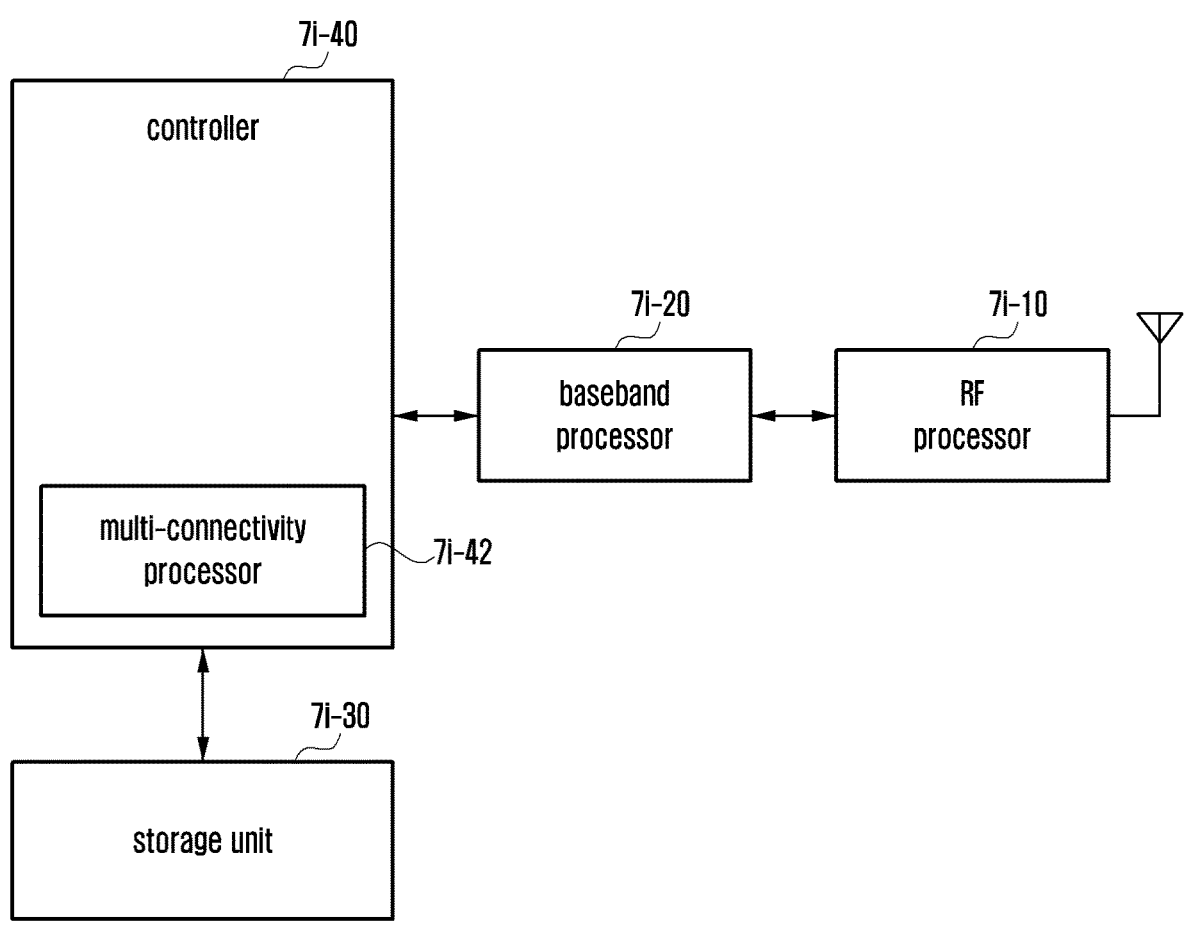
FIG. 7I is a block diagram illustrating a configuration of a UE according to an embodiment of the disclosure.

FIG. 7I is a block diagram illustrating a configuration of a UE according to an embodiment of the disclosure.

Referring to FIG. 7I, the UE includes a radio frequency (RF) processor 7i-10, a baseband processor 7i-20, a storage unit 7i-30, and a controller 7i-40.

The RF processor 7i-10 has a function for transmitting/receiving a signal over a radio channel, such as band conversion and amplification of the signal. For example, the RF processor 7i-10 up-converts a baseband signal from the baseband processor 7i-20 to an RF band signal and transmits the RF signal via an antenna and down-converts the RF signal received via the antenna to a baseband signal. For example, the RF processor 7i-10 may include a transmission filter, a reception filter, an amplifier, a mixer, an oscillator, a DAC, and an ADC. Although one antenna is depicted in the drawing, the UE may be provided with a plurality of antennas. The RF processor 7i-10 may also include a plurality of RF chains. The RF processor 7i-10 may perform beamforming. For beamforming, the RF processor 7i-10 may adjust the phase and size of a signal to be transmitted/received by means of the antennas or antenna elements in phase and size. The RF processor 5i-10 may be configured to support a MIMO scheme with which the UE can receive multiple layers simultaneously.

The baseband processor 7i-20 has a baseband signal-bit string conversion function according to a physical layer standard of the system. For example, in a data transmission mode, the baseband processor 7i-20 performs encoding and modulation on the transmission bit string to generate complex symbols. In a data reception mode, the baseband processor 7i-20 performs demodulation and decoding on the baseband signal from the RF processor 7i-10 to recover the transmitted bit string. In the case of using an OFDM scheme for data transmission, the baseband processor 7i-20 performs encoding and modulation on the transmission bit string to generate complex symbols, maps the complex symbols to subcarriers, performs IFFT on the symbols, and inserts a CP into the symbols to generate OFDM symbols. In the data reception mode, the baseband processor 7i-20 splits the baseband signal from the RF processor 7i-10 into OFDM symbols, perform FFT on the OFDM symbols to recover the signals mapped to the subcarriers, and performs demodulation and decoding on the signals to recover the transmitted bit string.

The baseband processor 7i-20 and the RF processor 7i-10 process the transmission and reception signals as described above. Accordingly, the baseband processor 7i-20 and the RF processor 7i-10 may be referred to as a transmitter, a receiver, a transceiver, or a communication unit. At least one of the baseband processor 7i-20 and the RF processor 7i-10 may include a plurality of communication modules for supporting different radio access technologies. At least one of the baseband processor 7i-20 and the RF processor 7i-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 Ghz bands) and an mmWave band (e.g., 60 GHz).

The storage unit 7i-30 stores data, such as basic programs for operation of the UE, application programs, and setting information. The storage unit 7i-30 provides the stored information in response to a request from the controller 7i-40.

The controller 7i-40 controls overall operations of the UE. For example, the controller 7i-40 controls the baseband processor 7i-20 and the RF processor 7i-10 for transmitting and receiving signals. The controller 7i-40 writes and reads data to and from the storage unit 7i-30. For this purpose, the controller 7i-40 may include at least one processor. For example, the controller 7i-40 may include a CP for controlling communications and an AP for controlling higher layer programs, such as applications. The controller 7i-40 may include a multi-connectivity processor 7i-42 for processing operations in a multi-connectivity mode.

Figure 7J:
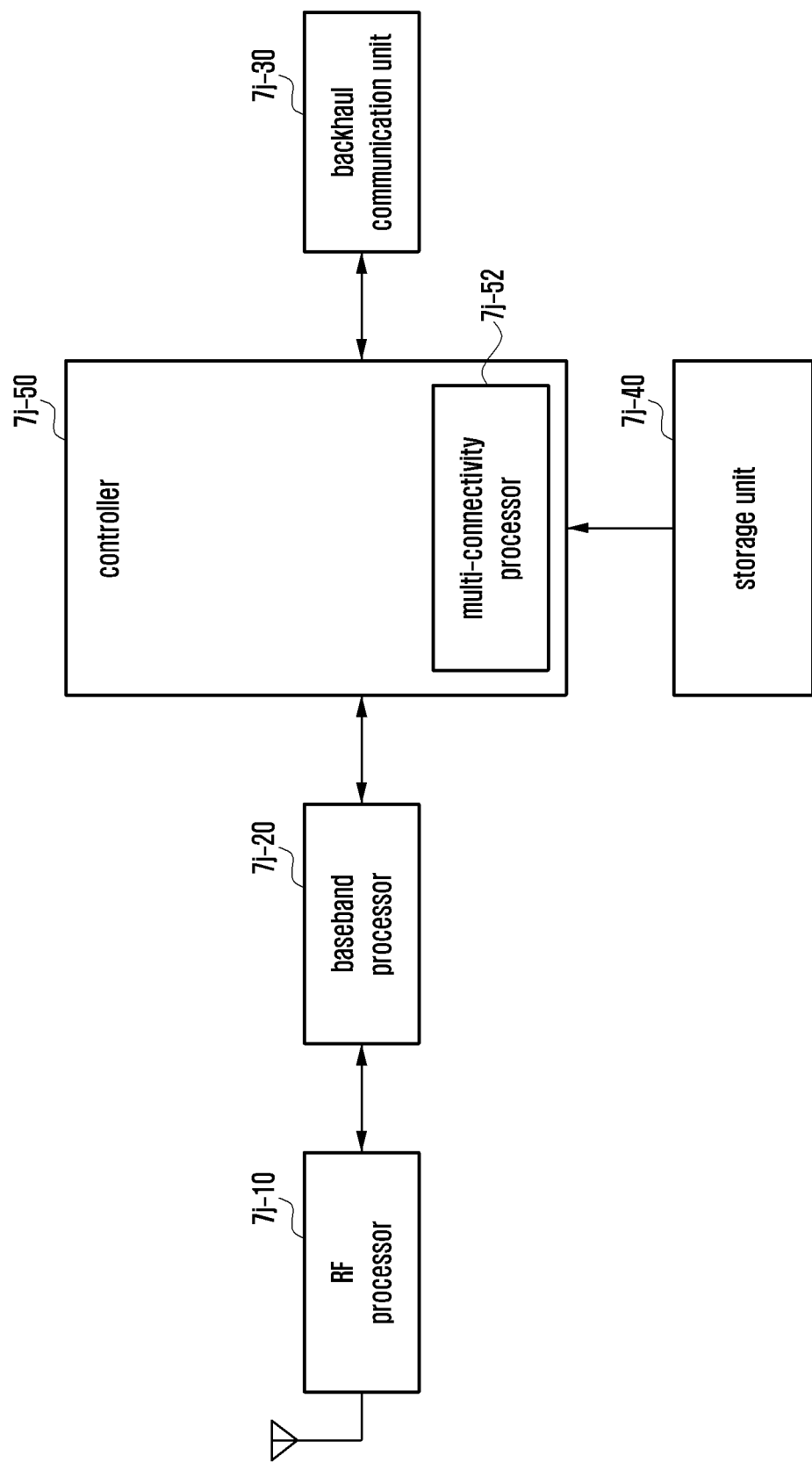
FIG. 7J is a block diagram illustrating a configuration of a gNB according to an embodiment of the disclosure.

FIG. 7J is a block diagram illustrating a configuration of a gNB according to an embodiment of the disclosure.

Referring to FIG. 7J, the gNB includes an RF processor 7j-10, a baseband processor 7j-20, a backhaul communication unit 7j-30, a storage unit 7j-40, and a controller 7j-50.

The RF processor 7j-10 has a function for transmitting/receiving a signal over a radio channel, such as band conversion and amplification of the signal. For example, the RF processor 7j-10 up-converts a baseband signal from the baseband processor 7j-20 to an RF band signal and transmits the RF signal via an antenna and down-converts the RF signal received via the antenna to a baseband signal. For example, the RF processor 7j-10 may include a transmission filter, a reception filter, an amplifier, a mixer, an oscillator, a DAC, and an ADC. Although one antenna is depicted in the drawing, the gNB may be provided with a plurality of antennas. The RF processor 7j-10 may also include a plurality of RF chains. The RF processor 7j-10 may perform beamforming. For beamforming, the RF processor 7j-10 may adjust the phase and size of a signal to be transmitted/received by means of the antennas or antenna elements. The RF processor 7j-10 may be configured to transmit one or more layers for a downlink MIMO operation.

The baseband processor 7j-20 has a baseband signal-bit string conversion function according to a physical layer standard of the system. For example, in a data transmission mode, the baseband processor 7j-20 performs encoding and modulation on the transmission bit string to generate complex symbols. In a data reception mode, the baseband processor 7j-20 performs demodulation and decoding on the baseband signal from the RF processor 7j-10 to recover the transmitted bit string. In the case of using an OFDM scheme for data transmission, the baseband processor 7j-20 performs encoding and modulation on the transmission bit string to generate complex symbols, maps the complex symbols to subcarriers, performs IFFT on the symbols, and inserts a CP into the symbols to generate OFDM symbols. In the data reception mode, the baseband processor 7j-20 splits the baseband signal from the RF processor 7j-10 into OFDM symbols, performs FFT on the OFDM symbols to recover the signals mapped to the subcarriers, and performs demodulation and decoding on the signals to recover the transmitted bit string. The baseband processor 7j-20 and the RF processor 7j-10 process the transmission and reception signals as described above. Accordingly, the baseband processor 7j-20 and the RF processor 7j-10 may be referred to as a transmitter, a receiver, a transceiver, or a communication unit.

The backhaul communication unit 7j-30 provides an interface for communication with other nodes in the network. For example, the backhaul communication unit 7j-30 converts a bit string to be transmitted from the gNB to another node, e.g., another gNB and core network, to a physical signal and converts a physical signal received from another node to a bit string.

The storage unit 7*j*-40 stores data, such as basic programs for operation of the gNB, application programs, and setting information. The storage unit 7*j*-40 may also store the information on the bearers established for UEs and measurement results reported by the connected UEs. The storage unit 7*j*-40 may also store the information for use by a UE in determining whether to enable or disable multi-connectivity. The storage unit 7*j*-40 may provide the stored data in reference to a request from the controller 7*j*-50.

The controller 7*j*-50 controls overall operations of the gNB. For example, the controller 7*j*-50 controls the baseband processor 7*j*-20, the RF processor 7*j*-10, and the backhaul communication unit 7*j*-30 for transmitting and receiving signals. The controller 7*j*-50 writes and reads data to and from the storage unit 7*j*-40. For this purpose, the controller 7*j*-50 may include at least one processor. The controller 7*j*-50 may also include a multi-connectivity processor 7*j*-52 for processing operations in a multi-connectivity mode.

As described above, the disclosure is advantageous in terms of facilitating network access in a next generation mobile communication system.

In addition, the access control method of the disclosure is advantageous in terms of improving system throughput by effectively controlling accesses of UEs.

In addition, the PDCP status-reporting method of the disclosure is advantageous in terms of solving the transmission delay and data loss problems caused by a reordering timer running at the receiver in such a way that a receiver triggers a PDCP status report and transmits the PDCP status report to a transmitter when a predetermined timer running at the receive PDCP layer expires, when the data amount stored in the receive buffer becomes equal to or greater than a threshold value, or when a reordering timer value reaches a predetermined time, and the transmitter receives and checks the PDCP status report to discard the data (PDCP PDU or PDCP SDU) successfully received by the receiver and retransmit the missing data promptly.

In addition, the UE-assisted packet delay budget reporting method of the disclosure is advantageous in terms of clarifying operations of UE and gNB by modifying and making clear the operations defined for use in the legacy LTE system. In addition, the UE-assisted packet delay budget reporting method of the disclosure is advantageous in terms of being applicable to next generation mobile communication systems.

Although preferred embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the invention. If necessary, the embodiments may be combined in whole or in part. For example, parts of the methods proposed in the disclosure may be combined for the operations of a base station and a terminal. Although the embodiments are directed to an LTE/LTE-A system, it is obvious to apply them to other systems, such as a 5G system or an NR system to form other alternative embodiments without departing from the spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal in a wireless communication system, the terminal comprising:
   a transceiver; and
   at least one processor coupled with the transceiver and configured to:
   receive, from a base station, at least one barring configuration, and
   determine whether an access attempt is allowed or not based on a barring configuration corresponding to an access category of the access attempt from the at least one barring configuration, the barring configuration including information for a barring factor and information for a barring time,
   wherein, in case that the access attempt is categorized into both a first standardized access category included in standardized access categories and a non-standardized access category associated with an operator classification, the first standardized access category included in the standardized access categories is applied to the access category of the access attempt, wherein the first standardized access category is a predetermined standardized access category including an access category associated with an emergency,
   wherein, in case that the access attempt is categorized into both a second standardized access category included in the standardized access categories and the non-standardized access category associated with the operator classification, the non-standardized access category associated with the operator classification is applied to the access category of the access attempt, wherein the second standardized access category is not the predetermined standardized access category included in the standardized access categories, and
   wherein the access attempt is determined to be allowed in case that a random value is lower than the barring factor.

2. The terminal of claim 1, wherein the non-standardized access category associated with the operator classification is defined based on a slicing type or an application.

3. The terminal of claim 1, wherein in case that the access attempt is determined to be barred, the access attempt is considered as barred during a timer value determined based on the barring time.

4. The terminal of claim 1, wherein the access attempt is categorized into at least one standardized access category.

5. An access control method of a terminal in a wireless communication system, the method comprising:
   receiving, from a base station, at least one barring configuration; and
   determining whether an access attempt is allowed or not based on a barring configuration corresponding to an access category of the access attempt from the at least one barring configuration, the barring configuration including information for a barring factor and information for a barring time,
   wherein, in case that the access attempt is categorized into both a first standardized access category included in standardized access categories and a non-standardized access category associated with an operator classification, the first standardized access category included in the standardized access categories is applied to the access category of the access attempt, wherein the first standardized access category is a predetermined standardized access category including an access category associated with an emergency, wherein, in case that the access attempt is categorized into both a second standardized access category included in the standardized access categories and the non-standardized access category associated with the operator classification, the non-standardized access category associated with the operator classification is applied to the access category of the access attempt, wherein the second standardized access category is not the predetermined standardized access category included in the standardized access categories, and wherein the access attempt is determined to be allowed in case that a random value is lower than the barring factor.

6. The method of claim 5, wherein the non-standardized access category associated with the operator classification is defined based on a slicing type or an application.

7. The method of claim 5, wherein in case that the access attempt is determined to be barred, the access attempt is considered as barred during a timer value determined based on the barring time.

8. The method of claim 5, wherein the access attempt is categorized into at least one standardized access category.

* * * * *